United States Patent [19]

Edson et al.

[11] 4,396,801

[45] Aug. 2, 1983

[54] MULTIPLEX COMMUNICATION SYSTEM EMPLOYING PULSE CODE MODULATION

[75] Inventors: James O. Edson, Great Kills, N.Y.; Theodore F. Gleichmann, Chatham; Charles O. Mallinckrodt, Summit, both of N.J.

[73] Assignee: Bell Telephone Laboratories, Incorporated, Murray Hill, N.J.

[21] Appl. No.: 675,901

[22] Filed: Jun. 11, 1946

[51] Int. Cl.³ ............................................. H04M 3/16
[52] U.S. Cl. .................................. 179/1.5 R; 375/2.1; 455/26
[58] Field of Search .................................. 250/27-6 T, 250/27-T R, 27-CL; 178/44-1.5, 44-15, 44-12 C, 170 R; 179/1.5 E, 1.5 R, 1.5 S, 1 P; 375/2.1, 23, 25; 328/28, 58, 129.1, 151; 370/112, 115, 108; 377/99, 106, 124; 455/26

[56] References Cited

U.S. PATENT DOCUMENTS

| | | | |
|---|---|---|---|
| 1,776,821 | 9/1930 | Strieby | 178/68 K |
| 2,035,263 | 3/1936 | Cushman et al. | 179/170 R |
| 2,048,081 | 7/1936 | Riggs | 370/112 |
| 2,183,248 | 12/1939 | Riesz | 179/1.5 E |
| 2,199,634 | 5/1940 | Koch | 179/1.5 R |
| 2,263,369 | 11/1941 | Skillman | 370/115 |
| 2,272,070 | 2/1942 | Reeves | 179/1 P |
| 2,282,046 | 5/1942 | Goldsmith | 370/112 |
| 2,310,105 | 2/1943 | Michel | 377/113 |
| 2,384,379 | 9/1945 | Ingram | 377/106 |
| 2,395,467 | 2/1946 | Deloraine | 370/108 |
| 2,403,210 | 7/1946 | Butement | 370/112 |
| 2,403,918 | 7/1946 | Grosdoff | 328/129.1 |
| 2,404,106 | 7/1946 | Snyder | 377/99 |
| 2,405,252 | 8/1946 | Goldsmith | 179/1.5 S |
| 2,406,019 | 8/1946 | Labin | 375/2.1 |
| 2,411,714 | 11/1946 | De Rosa | 377/124 |
| 2,416,308 | 2/1947 | Grieg | 375/23 |
| 2,418,521 | 4/1947 | Morton et al. | 328/28 |
| 2,419,340 | 8/1947 | Easton | 328/58 |
| 2,438,908 | 4/1948 | Goodall | 375/25 |
| 2,458,599 | 1/1949 | Hussey | 328/151 |

*Primary Examiner*—Sal Cangialosi
*Attorney, Agent, or Firm*—W. F. Simpson; G. C. Lord; Daniel D. Dubosky

EXEMPLARY CLAIM

1. In a multichannel communication system in which the intelligence waves are transmitted by pulse code modulation, means for producing a plurality of series of pulses interleaved in their time of occurrence and the pulses of each series being modulated in duration in proportion to successive samples of the intelligence wave of a corresponding channel, a source of oscillations of constant frequency, a gate controlled by the duration modulated pulses for transmitting oscillations from said source for the duration of each of said pulses, a binary counter having a plurality of tandem connected stages each of two conditions of stability, means for supplying to said counter the oscillations transmitted by said gate, a storage circuit for each stage of said binary counter except the first, a switching circuit connecting each of said storage circuits to the corresponding stage of the binary counter to supply to the storage circuit an electrical quantity under control of the condition of stability of the respective counter stage, a timing circuit for producing a sequence of pulses corresponding to the pulse intervals of each pulse code group, a pulse circuit under control of the first stage of said counter, connections for supplying the first pulse of each of said sequences to said pulse circuit to render it operative for transmitting a pulse when the first stage of said counter is in a predetermined one of said conditions of stability, other connections for supplying said first pulse of each of sequences to said switching circuits for registering on said storage circuit the condition of stability of the respective counter stage, a pulse circuit under control of each of said storage circuits, and connections for supplying to the last-mentioned pulse circuits in succession corresponding subsequent pulses of each of said sequences to render the pulse circuits operative for transmitting a pulse under control of the condition of the corresponding storage circuit.

10 Claims, 57 Drawing Figures

FIG. 2

| FIG. 3 | FIG. 4 | FIG. 7 | FIG. 8 |
|---|---|---|---|
| FIG. 5 | FIG. 6 | FIG. 9 | FIG. 10 |

FIG. 57

| FIG. 49 | FIG. 50 | FIG. 51 | FIG. 52 | FIG. 53 | FIG. 54 |
|---|---|---|---|---|---|

FIG. 11

| FIG. 19 | | | | | | | | | |
|---|---|---|---|---|---|---|---|---|---|
| FIG. 20 | FIG. 15 | FIG. 12 | | | | | | | |
| FIG. 21 | FIG. 22 | FIG. 16 | FIG. 13 | FIG. 14 | | | | | |
| FIG. 27 | FIG. 28 | FIG. 23 | FIG. 17 | FIG. 18 | | | | | |
| FIG. 5 | FIG. 6 | FIG. 29 | FIG. 24 | FIG. 25 | FIG. 26 | FIG. 34 | FIG. 33 | FIG. 32 | |
| | | FIG. 30 | FIG. 31 | | | FIG. 38 | FIG. 37 | FIG. 36 | FIG. 35 |
| | | | | | | FIG. 39 | FIG. 40 | FIG. 41 | |
| | | | | | | FIG. 42 | FIG. 43 | FIG. 44 | FIG. 45 | FIG. 46 |
| | | | | | | | | | FIG. 47 | FIG. 48 |
| | | | | | | | | | FIG. 9 | FIG. 10 |

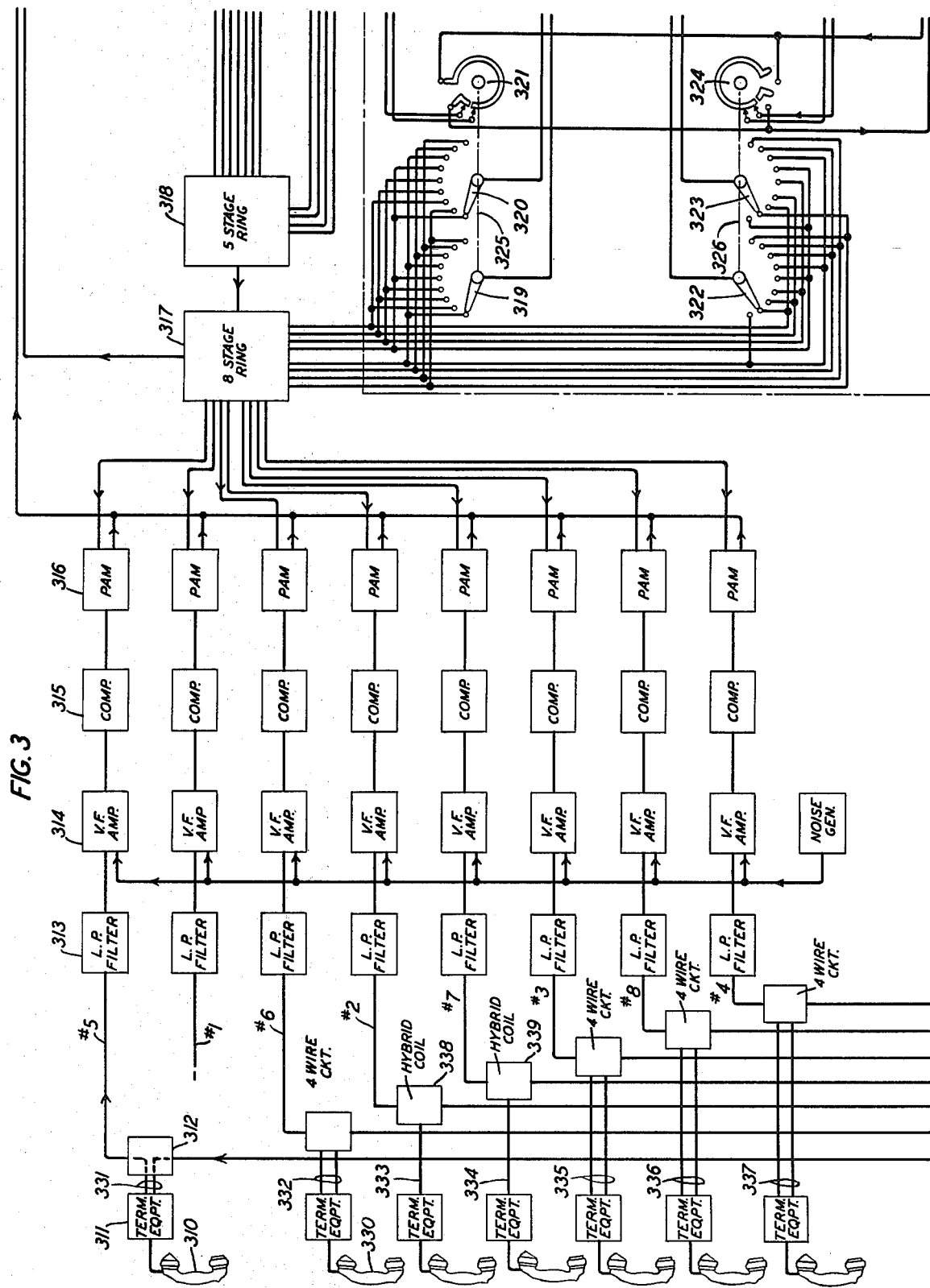

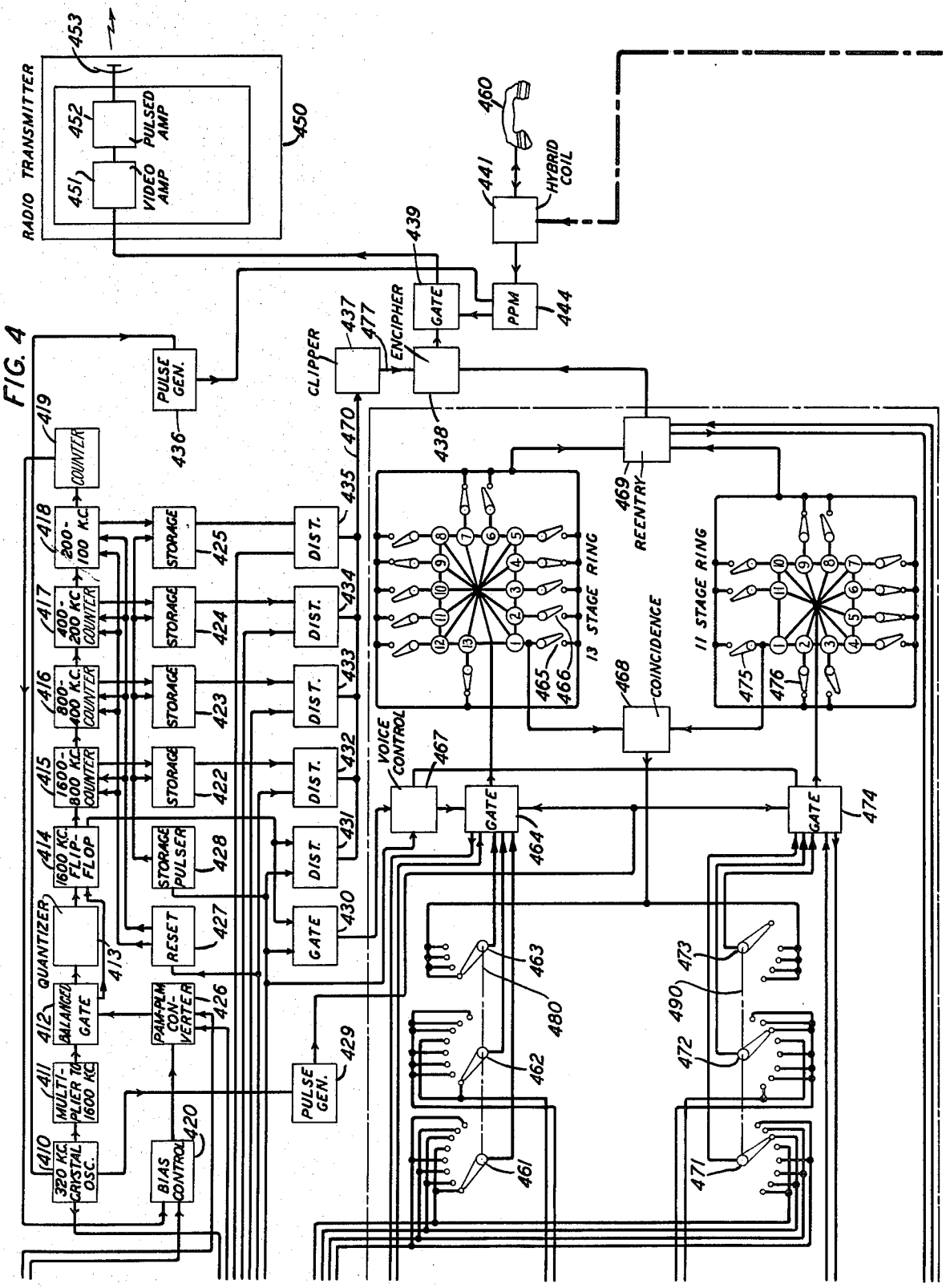

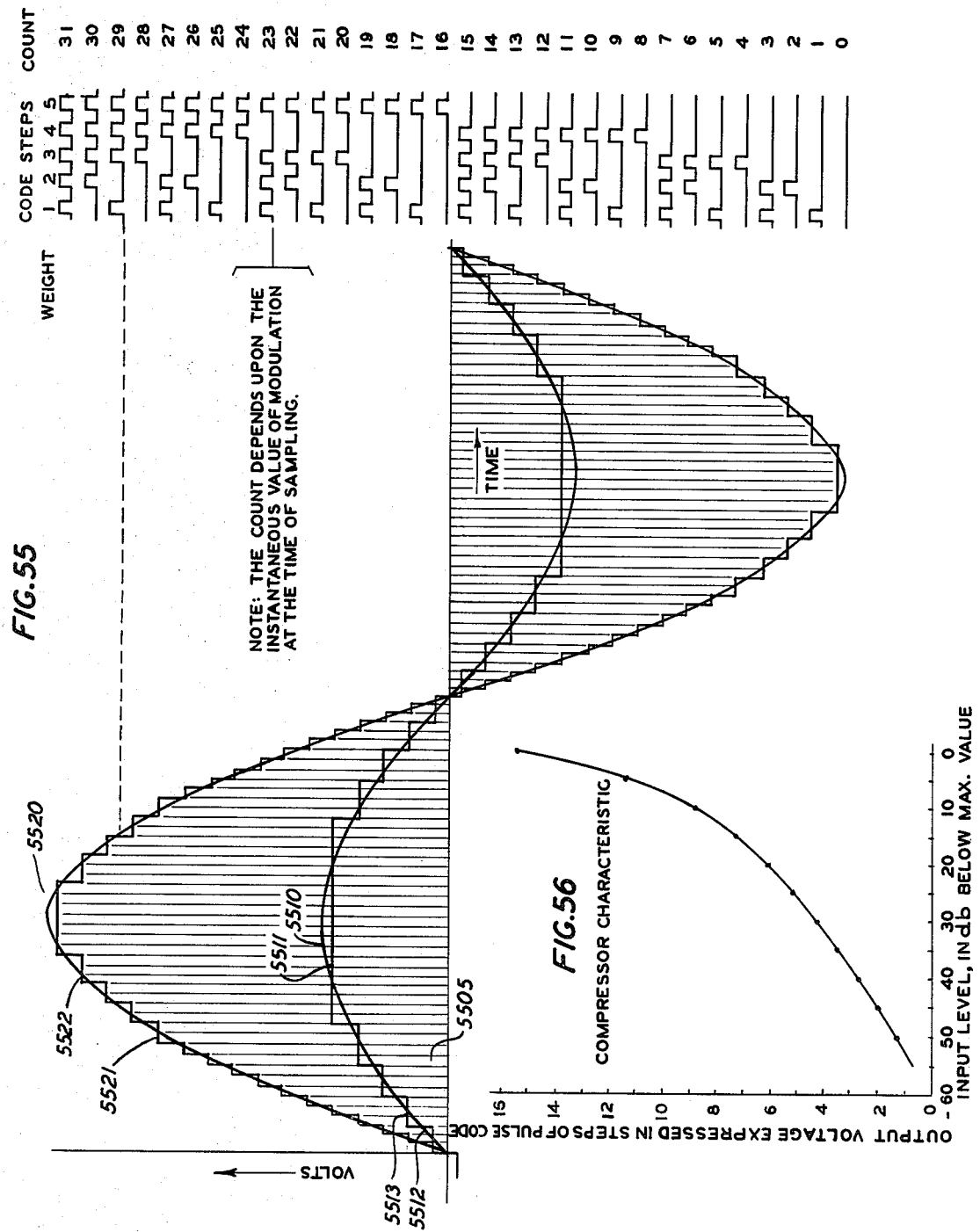

MULTIPLEX COMMUNICATION SYSTEM EMPLOYING PULSE CODE MODULATION

This invention relates to communication systems and more particularly to a communication system capable of transmitting complex waves, such as are employed in the transmission of speech, telegraph, picture, etc., over a microwave radio transmission signaling paths, including such paths operating at the highest frequencies wherein they possess quasi-optical properties.

Techniques in this high frequency region have not been as yet developed to a point where the usual types of amplitude modulation are available first, because the limitations of the high frequency tubes and circuits materially limit the amount of sustained high frequency power available and, second, because such tubes operating at these high frequencies cause excessive amounts of amplitude distortion thus effectively preventing the use of amplitude modulation.

In previous types of pulse modulation systems of either the pulse length type or the time modulation type noises on the transmission path can extend the length of the pulses or actually displace them in time, in the case of the time modulation signals, so that to a greater or lesser degree the channel noise is added to the signals and becomes noise in the communication paths at the terminals. In pulse code modulation, however, the noise on the pulse channel is not added to the communication signals so long as the presence or absence of the pulses, that is, so long as the character of the pulses, can be accurately determined. This means that it is only necessary for the pulses to exceed the level of the noise currents. Under these circumstances, the noise in the transmission path or medium is not added to the communication signals. Consequently, high quality, noise free communication may be maintained over a low quality, noisy transmission path.

Other features of the invention relate to improved pulse forming, pulse limiting, pulse shaping, pulse amplifying and pulse repeating circuits, apparatus and equipment.

A pulse code system of a type employing a permutation code group of pulses which is sometimes called a binary permutation code group of pulses is employed in the exemplary system described herein to convey the information over the high frequency communication path.

In such code systems each code group of pulses comprises an equal number of pulses or pulse intervals and each of the pulses is of any one of a plurality of different signaling conditions or types. In a binary permutation code group each of the pulses of the code group may be of one or the other of two different signaling conditions. These signaling conditions are sometimes referred to as marking and spacing signaling conditions and at other times they are referred to as on and off pulses, pulses of current and pulses of no current, the presence and absence of a current pulse in a pulse interval, etc.

By employing pulse code groups it is possible for a small number of pulses to represent a large number of different discrete entities. The number of different possible code combinations from a group of pulses is $S^n$, where s is the number of different signaling conditions which may be transmitted during any pulse interval and n is the number of pulse intervals.

Thus five pulses, each of which may be either one of two different signaling conditions may be arranged in $2^5$ or 32 different permutations so that they may represent 32 different discrete entities.

Consequently, if a complex wave is sampled at frequent intervals of time and the magnitude of each sample represented by 5 pulses, the single code group of 5 pulses may represent 32 different discrete amplitudes of the representative sample. These pulses may later be decoded and samples having the correct one of the 32 different amplitudes or magnitudes recovered and the complex wave reconstructed at the receiving station.

In addition, the systems of the prior art were not in themselves secret and do not readily lend themselves to the application of cipher or other means for rendering the communication paths secure against unauthorized interception and reception. In accordance with the present invention the pulse code modulation employed is of a type which is more easily enciphered at the transmitting station and deciphered at the receiving station, thus providing a high degree of secrecy and security against unauthorized interception. Such a communication system is particularly valuable for use in time of war by the Government, and military establishments and services.

It is therefore an object of the present invention to provide an improved communication system capable of furnishing a plurality of transmission channels suitable for the transmission of speech and other complex wave forms over a microwave radio communication link or path.

Another object of this invention is to provide modulating equipment for modulation in a microwave or extremely high radio frequency transmission system by means of code groups of pulses.

Another object of this invention is to provide methods and apparatus for enciphering and deciphering pulse signals and thus render the communication paths secure against unauthorized interception.

Another object of this invention is to provide improved methods and apparatus for synchronizing transmitting and receiving equipment including the transmitting enciphering and receiving deciphering equipment.

Microwave signal paths due to their high frequency and other characteristics usually provide a relatively wide frequency band which is sufficiently wide to convey all the essential information of a plurality of lower frequency communication paths of the type employed for voice frequency and other types of communication. Accordingly an object of this invention is to provide improved multiplex arrangements to permit the information or intelligence from a large number of communication paths to be transmitted substantially simultaneously over the ultra-high frequency microwave communication path without mutual interference.

It is another object to separate the information for the various paths and assemble it at the receiving point and direct the assembled information to the corresponding paths at the receiving terminal.

In substantially all communication systems it is desirable and usually necessary to provide one or more repeating, amplifying or relaying stations between the terminals of the system. In other words it is desirable to extend the communication paths between points relatively far removed one from another so that such repeating or amplifying devices become a necessity for the communication between terminals of the system.

An object of the present invention is to provide a system which is readily adapted to employ repeater or relay points and a further object of the invention is to provide a system which is peculiarly adapted to employ regenerative repeaters which are capable of receiving distorted signals and regenerating undistorted signals therefrom and then retransmitting the undistorted signals. In this manner the various types of distortion encountered in the various sections of such a long transmission path are not additive. Instead they are completely eliminated at any and all of the desired repeater points. Such regenerative repeating of signals is peculiar to pulse code systems.

In systems of the type of the present invention it has been found that it is highly desirable to extend the amplitude range acceptable from the various communication paths which is capable of being transmitted by the coded signals without distortion. A feature of the invention relates to apparatus for first instantaneously compressing the amplitude range of the incoming complex wave and then at the receiving terminal making a corresponding expansion of the amplitude range of the signal or complex wave before it is applied to the corresponding receiving channel. In this manner the quality of the transmission over the channel is improved without increasing the required band width and the range of amplitudes capable of being transmitted is increased. The terms "compressor" and "expandor" and derivatives thereof as used throughout the specification and claims refer to the art of volume range compression and expansion; a compressor being a device for producing in its output such a distortion of the input that the smaller amplitudes are increased relative to the larger amplitudes and an expandor being a device having an inverse or complementary characteristic.

Another feature of the invention relates to methods and apparatus for centering the decoded signals relative to the expansion apparatus for properly expanding the signals of the preceding terminal to accurately compensate for the compression of the signals at the transmitting station.

Another feature of this invention relates to improved methods and apparatus for sampling each of a plurality of speech or other complex waves in rapid succession.

Another feature of the invention relates to improved pulse generation and transmission circuits for translating the information of the samples of the various speech waves into, first, pulses of varying amplitude, second, pulses of varying width or length and, third, into pulse code groups.

Another feature of the invention relates to improved methods and apparatus for maintaining the input signals properly centered in the coding range of the coding equipment and circuits.

Another feature of this invention relates to improved coding apparatus and methods employing a binary counter which is automatically stopped when it has counted the largest number which it can count. It is stopped in the position which registers the maximum count in which position it is maintained until reset in the normal and usual manner.

Another feature of this invention relates to a quantizing circuit which insures that the counter will count accurately and register the proper count.

Another feature of the invention relates to decoding apparatus for translating pulse code group pulses into pulses of varying amplitude and then reconstructing a speech or other complex wave from said pulses of varying amplitude.

Another feature of this invention relates to apparatus and equipment for combining the output of a cipher arrangement with pulse signals to render the signal relatively secure from enemy or unauthorized interception and reception.

Another feature of this invention relates to methods and apparatus for changing the cipher in an essentially random manner under control of various selected pulses of the code combinations representing the information being transmitted over the various channels of the system.

Another feature of this invention relates to methods and apparatus for combining the cipher key with the signals in such a manner that both the cipher key and the coded signals must be present before any signals are transmitted. This arrangement prevents the transmission of unciphered code signals and also prevents the transmission of the cipher key signals and thus further improves the security of the transmission channels provided.

Another feature of this invention is to provide deciphering equipment which is capable of deciphering received pulses and then employing the deciphered pulses to control the deciphering equipment in the same manner as the ciphering equipment is controlled at the transmitting station.

Another feature of this invention relates to the application of low level noise currents to each of the channels of the system to mask the cipher key pulses during pauses or idle intervals of the communication paths. Low level noise is also employed to cause the character of the first pulse of each code group to change more frequently and in a more random manner so that the cipher key code will also be more random in character, because the cipher key generating equipment is controlled in part by the character of the No. 1 pulse.

Another feature of the invention relates to improved methods and apparatus for automatically synchronizing the transmitting coding and receiving and decoding equipment and for automatically synchronizing the transmitting and receiving multiplex equipment and for automatically synchronizing the transmitting keyer or cipher equipment with the receiving keyer or deciphering equipment.

Another feature of this invention relates to automatic means for indicating synchronism of the equipment at both ends of the circuit which recognizes the change in noise level currents in a received channel.

Still another feature of this invention relates to improved circuits and apparatus for causing the keyer circuits to supply high level noise currents in all of the channels at the receiving station until synchronism is obtained.

Still another feature of the invention relates to improved methods and apparatus for coordinating the various circuits to provide both a maximum speed of operation of the entire system and also a maximum time for the operation of the various circuits by providing overlap operation of the various portions of the system. That is, various operations and functions which are performed in sequence on any one set of signals are performed simultaneously on different sets of signals.

Another feature of this invention relates to terminal equipment for interconnecting the various communication channels at the terminals with communication channels of other types of systems, so that communication channels provided in accordance with the present invention may be readily interconnected with communication paths in a comprehensive communication network in any desired manner.

Another feature of this invention relates to methods and apparatus for transmitting supervisory signals such as ringing current over the system, and to apparatus and methods at the receiving terminal responsive to these supervisory signals or ringing current.

Another feature of this invention relates to a single noise generation circuit having a wide frequency band which is applied to the various channels so that it is equivalent to an independent noise source for each of the channels.

Another feature of this invention relates to methods and apparatus for the use of low level noise to mask the cipher key during idle periods or pauses in transmission which normally cause the complex wave to have a relative constant value during these times.

In addition to the foregoing objects and features, a further feature relates to a so-called "order wire" channel which permits communication between terminals and any repeater point. The order wire is usually employed by the attendants at the terminals and repeater points to permit them to communicate over the system for maintenance and adjustment and other purposes. A feature of the order wire relates to methods and apparatus for time or position modulating the entire arrangement of random code groups of pulses employed for the other channels of secured communication. The order wire in the specific embodiment disclosed herein is not secured, that is, a cipher is not applied to the order wire signals.

Other features of the system relate to alarms for indicating improper operation of the system and for interrupting transmission under various trouble and improper operating conditions.

Briefly in accordance with the exemplary system embodying the present invention provision has been made for the transmission of eight secured voice frequency communication channels over a microwave radio communication path which may or may not employ one or more relay repeater stations. One of these eight channels is employed for synchronizing purposes leaving seven channels for voice frequency currents. Each or all of these voice frequency channels may be employed to transmit voice frequency carrier telegraph currents thus providing a large number of telegraph channels. Any or all of these channels may also be employed to transmit picture currents or facsimile currents. Inasmuch as the telegraph and picture transmission equipment operates in its usual manner in cooperation with the other equipment of the exemplary system described herein the operation of such equipment will not be described in detail herein.

It is to be understood that all of the voice frequency channels do not necessarily have to be equipped or provided with input signals. Neither is it necessary that signals be sent continuously over any or all of the voice frequency secured channels. Noise currents are however continuously applied to each of the incoming channels at the transmitting station, including the synchronizing channel for reasons of security as will be explained hereinafter.

The system described is arranged to provide either two-wire or four-wire terminations for each of the incoming channels of communication. In case the incoming transmission is on a so-called two-wire basis the terminating equipment separates the incoming and outgoing transmission and conveys and incoming transmission to the radio transmitter and provides a transmission path from the radio receiving equipment to the two-wire terminating equipment. This terminating equipment may extend through any suitable types of communication, transmission and switching equipment including open wire lines, cable conductors, toll lines and switching equipment manual switching centers, as well as automatic switching centers. It may include repeaters, level or gain regulators, equalizing equipment, phase compensating and regulating apparatus, radio transmission paths, etc. which are known in the art. Inasmuch as all of this equipment operates in its usual manner in combination with the exemplary system described herein a detailed description of the operation of this interconnecting equipment is not repeated herein.

In case the terminations of the incoming channels are on a four-wire basis the transmitting pair is extended to the transmitting equipment and the receiving pair extended to the receiving equipment. In this way there is provided in both the four-wire and two-wire cases a two-way communication path between each of the channels and two ends of the system.

The transmission of the signals will be described in detail in only one direction through the system and the system is shown in detail for only one direction of transmission because a substantially duplicate system is provided for transmission in the opposite direction and it operates in substantially the same manner so that the complete operation of the system may be readily understood from a detailed description of the operation for the transmission of messages through the system in one direction.

The incoming signals, after being conveyed through the equipment terminating the incoming channels, pass first through a low-pass filter which eliminates frequencies not necessary in transmitting the incoming voice signal and thus prevents these frequencies from interfering with the operation of the system. From the low-pass filter the signals are transmitted through a combined amplifier and instantaneous compressor which compresses the range of signal amplitudes. In other words, the amplitude range of the signals is decreased by the compressor equipment.

From the compressor the signals are transmitted through a pulse amplitude modulator. This pulse amplitude modulating equipment is a combined multiplexing and modulating equipment and is controlled from a crystal oscillator through a five-stage electronic ring, which is the equivalent of a high speed five-segment distributor, and an eight-stage ring which is the equivalent of a high speed eight-segment distributor. The eight-stage ring runs at a frequency of about 8,000 cycles or revolutions per second. During each revolution or cycle of the eight-stage ring, which is 125 microseconds long, a time interval of approximately 15.6 microseconds is assigned to each one of the incoming channels. The output terminals of each of the pulse amplitude modulators are all connected together to a converter unit which changes the pulse amplitude modulation signals to pulse length modulated signals. The pulse length modulated signals are employed to control a high speed binary counter which counts the half-cycles of a harmonic of the controlling oscillator occurring during the time interval of each of the pulse length modulation signals received from the pulse length modulation converter. At the end of the pulse length modulation signal the counter stops and the position or condition of the various states controls a high speed distributor either directly or through some storage device, and pulses representing the setting of the counter are then transmitted from the high speed distributor under control of the five-stage ring mentioned above. The counter is then reset and is free to determine the length modulation signal.

A bias control circuit is also provided for controlling the pulse length converter so that on the average the incoming signals are properly centered in the middle of the range of amplitudes capable of being transmitted by the pulse code modulation system.

The counter employed is a multistage binary counter having a stage for determining the character of the pulse transmitted in each of the pulse positions of the pulse code groups. Thus the first or high speed counter stage controls the character of the first pulse of each group to be transmitted. The next counter, stage in the chain controls the character of the next pulse transmitted and so on. It is thus apparent that the setting of the counter at the end of the count represents a binary number defining the length of the pulse length modulated signals. Inasmuch as the length of the pulse length modulated signal is a function of the instantaneous amplitude of one of the incoming complex waves at the time it is sampled by the pulse amplitude modulation system the binary number representing the setting of the counter is also representative of the amplitude of one of the complex waves. Consequently the pulses transmitted representing the setting of this counter also represent the amplitude of the complex wave from one of the channels.

If it is assumed that the "on" pulses or marking pulses represent ones and the "off" pulses represent zeros of the binary number, then the first pulse transmitted represents the units denominational order of the binary number and each succeeding pulse the successively higher denominational order digit of the binary number. Thus the first pulse transmitted if of a marking character represents the smallest unit or smallest step of the total possible amplitude of the complex wave to be transmitted. The next pulse transmitted when marking represents in the binary case two units or a step of twice the magnitude of the first pulse, if marking. The next pulse transmitted if marking in character represents four of the units of the amplitude to be transmitted. Thus each succeeding pulse when marking represents twice the portion of the total possible amplitude of the signal represented by each of the previous pulses.

If it is assumed that the "on" or marking pulses represent the presence of the corresponding portions in the sample under consideration and the "off" or spacing pulses represent the absence of such portions, then the sum of the marking pulses when properly weighted as described above represent the magnitude or quantity which is a function of the amplitude of one of the complex waves at the specified instant of time. Each of the complete code groups thus completely defines the amplitude of each of the samples obtained from the pulse amplitude modulators.

These pulse code groups of signals are suitable for controlling or modulating the high frequency radio oscillator and thus cause similar pulses of radio frequency energy to be transmitted over the radio path.

The radio frequency pulses are transmitted over the radio path through any desired number of radio relay repeaters or repeater stations to a receiving station or terminal where they are demodulated and pulse code groups similar to those applied to the radio equipment at the transmitting station recovered and applied to decoding and distributing equipment. Such decoding and distributing equipment operates in synchronism with the equipment at the transmitting station. The decoding equipment weights each of the pulses of each of the code groups in the manner described above and adds them together to form a pulse of varying amplitude for each of the code groups received and the decoding equipment together with the distributing equipment distributes each of these pulses to the proper channel where the successive pulses for each channel are received at the rate of 8,000 per second to form a complex wave similar to that received from the corresponding incoming low frequency channel at the transmitting station. Expansion apparatus is employed at the receiving station to compensate for the compression at the transmission station.

While as pointed out above the coded pulses are suitable for modulating a microwave radio transmitter it is not at all necessary that they be so employed. These pulses may be used to modulate any carrier current or radio transmitter or they may be transmitted directly without further change over any suitable medium or communication path which provides the frquency range or bandwidth. Any or all of these transmission paths may include suitable repeaters including regenerative equipment, gain controls, equalizers, etc.

At the receiving station these pulses will be decoded and the original signal wave recovered in the manner described above. While the pulse modulation system described above may provide some small degree of privacy it does not provide any secrecy, consequently any one using the proper type of receiving equipment may receive the pulses and recover the complex signaling wave and thus all of the information being transmitted over the system.

In order to provide secrecy features ciphering equipment is employed at both ends of the system, this ciphering equipment comprising apparatus for generating a cipher code commonly called a keyer. This apparatus is provided with a number of switches or other devices to permit it to be set at any one of a large number of different conditions so that the cipher or keying code generated by this equipment differs for each different setting of each one of the different keys or other conditioning devices. Thus it is necessary to have the keying equipment set in the same condition or position at both ends of the system before the signals can be properly recovered.

In a further effort to increase the secrecy and security of the transmission over the system the keying equipment is arranged to be operated or controlled by the signalling currents or by certain of the pulses representing the voice or other complex waves so that the keying equipment operates in a substantially random manner. As a result it is essential that for the enemy or any one else to have any hope of deciphering the transmitted material, he should not only have receiving equipment similar to that employed at the receiving terminal but also have this apparatus conditioned in the same manner. The reason for this is that the cipher key generated by the keying equipment is varied by the speech or communication wave forms being transmitted over the system and so when these wave forms change, the cipher key also changes. Features of the cipher keying apparatus and methods which may be novel and which are disclosed herein but not claimed, are claimed in a patent application of A. E. Joel, Jr. Ser. No. 675,903, filed on an even date herewith.

Low level noise is employed in addition to the speech to control the operation of the keying apparatus. This low level noise is also employed to mask the key code during pauses or idle periods in the transmission over the system. In the exemplary embodiment set forth herein the output of the keying equipment comprises a series of random pulses occurring at substantially the same frequency or rate as the pulses from the coding equipment described above. These keying pulses are combined with the "code" pulses in a circuit arrangement sometimes called a reentry circut. This circuit in the exemplary system described herein is arranged to transmit a pulse of either one of two different signaling conditions during each pulse interval. The character of the pulse transmitted is determined by the character of the pulses simultaneously received from the coding equipment and from the keying equipment. If pulses of like character; i.e., if both "on" or both "off", are received from the keying equipment and from the coding equipment the reentry circuit will transmit a pulse of one character, say an "off" pulse. Whereas if the pulse received from the coding equipment is of opposite character from the pulse received from the keying equipment the reentry circuit will transmit a pulse of the opposite or different character, say an "on" pulse.

In this manner the coded pulses are translated into a group of pulses which are arbitrarily arranged in a substantially random manner.

These arbitrary pulses are then transmitted over the communication path which in the specific arrangement shown in the drawings comprises a microwave radio transmission path.

If these pulses are received by any ordinary radio receiver or by the receiving equipment described above which is suitable for decoding the coded pulses, they are totally unintelligible and the message or signalling wave cannot be reconstructed by such receiving equipment. In order to reconstruct the signaling wave from said series of coded and enciphered pulses it is necessary first to decipher the pulses and then decode them. In order to decipher the pulses it is necessary to combine, add or translate the coded pulses under control of a series of cipher pulses which are identical with the cipher pulses employed at the transmitting terminal. If an identical series of keying or ciphering pulses are combined with the enciphered received pulses by means of a so-called reentry circuit operated in the same manner as the reentry circuit at the transmitter, the original coded pulses may be recovered and then these pulses decoded in the manner described above and the original signaling wave recovered from them.

Inasmuch as the keying equipment at the transmitting station is controlled by voice frequency or message currents or the pulses derived from them it is necessary to similarly control the keying equipment at the receiving station. This means that the keying equipment or the pulses therefrom must be employed to decipher the received pulses after which these deciphered pulses must be employed to control the keying equipment for generating the cipher code or key necessary to decipher succeeding pulses.

As pointed out above it is necessary that the equipment at the receiving station be operated synchronously with the equipment at the transmitting station. There are at least three different synchronizing requirements in such a system. In the first place, it is necessary that the proper groups of five pulses be combined or decoded so that the sample of the required amplitude may be recovered. It is thus necessary that the receiving decoding equipment decode the proper groups of five pulses. This is one of the synchronizing requirements.

In the second place, after the groups of pulses are properly decoded it is necessary that either the groups of pulses as such or the result of the decoding thereof be conveyed to the proper one of the signaling channels which corresponds to the signaling channel at the transmitting station from which the code was originally derived. It is obvious that if the receiving equipment does not so distribute the pulses in synchronism with the equipment at the transmitting station the signals will not be properly reconstructed and recovered or else they will be transmitted over the wrong terminating channel.

In the third place, it is essential that the keying or ciphering equipment at the receiving equipment be operated in exact synchronism with the equipment at the transmitting station so that the proper keying pulses are available for combining with the received pulses to recover the desired code group of pulses.

In addition, the synchronizing of the receiver equipment is controlled by the received pulses, consequently the time delay of transmission over the system is automatically compensated for.

In order to secure the desired synchronization of the equipment at the receiving station, the receiving control oscillator is arranged so that it will oscillate at two different frequencies; one frequency being substantially identical with the frequency of the controlling oscillator at the transmitting station and the second frequency being only slightly different from the frequency of the oscillator at the transmitting station. In order to synchronize the equipment at both terminals the equipment is arranged so that when the receiving equipment is not in synchronism the oscillator at the receiving station oscillates at this second frequency, slightly different from the frequency of the oscillator at the transmitting station.

As pointed out above each one of the channels is sampled at a rate of 8,000 times a second so that at the transmitting station every 1/8000 of a second the equipment and circuits will have sampled each channel and be in condition to start sampling each channel in succession another time. Inasmuch as there are 8 channels and 5 pulses transmitted for each channel there will be $5 \times 8$ or 40 pulse time intervals during each 1/8000 of a second, that is, during each 125 microseconds. In other words there are 40 different pulse positions during each multiplex cycle or "frame", both at the transmitting station and at the receiving station. Consequently, there are 40 different relative pulse or phase positions between the multiplex equipments at the transmitting station and at the receiving station.

During the time required for one end of the system to advance one frame, i.e., 40 pulse positions, relative to the other and, assuming that they operate at slightly different frequencies, the multiplex equipment at the two ends will have been in each of the 40 different relative pulse positions for an interval of time.

If the oscillator at the receiving station oscillates at a frequency of 10 cycles per second different from the frequency of the oscillator at the transmitting station it will require 4 seconds for the receiving equipment to have occupied each one of the 40 possible different relative positions with respect to the transmitting equipment. Every 4 seconds thereafter the receiving equipment again occupies each of the 40 different relative positions. If the frequency of the receiving oscillator differs from the oscillator at the transmitting station by 20 cycles then it will require only 2 seconds for the receiving system to either advance or be retarded one whole multiplex frame or cycle and consequently once during each two second time intervals the equipment at the receiving end occupies each one of the 40 different relative positions for a short interval of time.

If it is possible to recognize the proper one of these relative positions during the short interval of time and then maintain the two systems in the proper conditions it will be possible to automatically synchronize the apparatus at both ends of the system so far as the first and second requirements are concerned. It will still be necessary to properly synchronize the keying equipment.

By employing keying equipment which likewise has a number of different possible positions or phase relations and causing the receiving keying equipment to test these various phase relations rapidly in an irregular manner it is possible to insure an extremely high degree of probability that the transmitting and receiving keying equipments will come into the identical phase relation during the short period of time for which the multiplex phases are such as to permit correct operation.

If the key equipment fails to come into identical phase relationship during the first time that the multiplex equipment is in proper phase, the hunting of proper phase continues to the next time the multiplex equipment is again in proper phase at which time the key equipment again hunts for the proper phase relationship. This action continues until proper orientation or phase is simultaneously obtained.

Thus, if the rate of hunting of the multiplex equipment at the receiving station is made sufficiently slow so that it remains in each one of the possible different relative positions for sufficient time, it is possible to recognize the proper relative position and then change the frequency of the controlling oscillator at the receiving station so that it is exactly the same as the frequency of the oscillator at the transmitting station. It is then possible to lock the frequency of the controlling oscillator at the receiving station so that it is maintained at the proper frequency under control of received pulses with the result that the equipment at the received station will be maintained in synchronism with the equipment at the transmitting station.

If a distinctive signal is impressed upon one of the channels, as for example, channel number 1, to indicate at the receiving terminal when the receiving equipment is in synchronism with the transmitting equipment, so long as the distinctive signal is not received over channel number 1 at the receiving station the equipment at the receiving station is not in proper phase and synchronism with the equipment at the transmitting terminal. However, when the distinctive signal is received over the proper channel namely channel number 1 at the receiving terminal the equipment at the receiving terminal will be in proper synchronism with the equipment at the transmitting terminal. Consequently the reception of this signal may be employed to control the change in frequency of the controlling oscillator at the receiving terminal.

Then so long as this signal is received over channel number 1 at the receiving terminal the oscillator is locked in synchronism at the same frequency as the frequency of the oscillator at the transmitting terminal. When this distinctive signal is not received over channel number 1 at the receiving terminal the frequency of the controlling oscillator at the receiving terminal is changed so that the receiving equipmment at the receiving terminal hunts over all of the possible relative positions between the equipment at the receiving terminal and the equipment at the transmitting terminal until the distinctive signal is again received over channel number 1 at the receiving terminal.

In the exemplary system described herein the distinctive signal is low level noise or energy on channel number 1 at the receiving terminal. The keying equipment at both terminals is arranged to be controlled by certain of the code pulses at both terminals. Consequently unless the keying equipment at the receiving terminal is similarly controlled it will not be in synchronism with the keying equipment at the transmitting terminal. As a result and due to the operation of the keying equipment at both terminals when they are not in synchronism high level noise is present on all of the channels at the receiving terminal. However, if and when the system comes into proper synchronism the noise on all channels will fall to a low level. In the exemplary system described herein the noise level of channel number 1 is employed to indicate proper synchronism of the system.

In addition to the foregoing requirements and conditions of the system it is found necessary to provide an order wire or service communication channel between the various terminals and the intermediate relay repeater points so that the attendants at the terminals and intermediate repeater points may keep in communication over the system to properly adjust and maintain the equipment in its operating condition. In order to provide such a circuit the entire array of coded and ciphered pulses are time or position modulated so that their time of transmission relative to their normal or average age is twice altered in accordance with the signals of this so-called order wire or service channel.

Provision has also been made to permit the service channel to be employed for other communication purposes when it is not required for service signals to that another communication path may be provided over the system. However, in the exemplary system described herein in detail no provision has been made for providing a cipher for the so-called order wire or time modulated signal.

At each of the intermediate relay repeater points further time modulation, up to a maximum, may be applied to the signals so that each of the attendants at these stations may communicate over the order wire. At receiving terminals and at each of the intermediate relay repeater points equipment is provided for demodulating the time or position modulation of the pulses, thus permitting communication between the attendants at each one of the repeater points and terminal stations of the system.

In the event that for any reason the coded or ciphered pulses are not received by any particular relay repeater, means are provided for transmitting an emergency group of pulses from that repeater which may be time or position modulated by the order wire apparatus so that the communication may be maintained between stations on either side of the trouble.

Various alarm and disabling features are also provided which are responsive to improper operation of various portions of the system.

The foregoing and other objects and features of this invention, the novel features of which are set forth in the claims appended hereto may be more readily understood from the following description when read with reference to the attached drawings, in which:

FIG. 1 shows the general arrangement of terminal stations and an intermediate relay repeater station of the system embodying the present invention;

FIG. 2 shows the manner in which FIGS. 3 through 10 are arranged adjacent one another;

Figure 5:
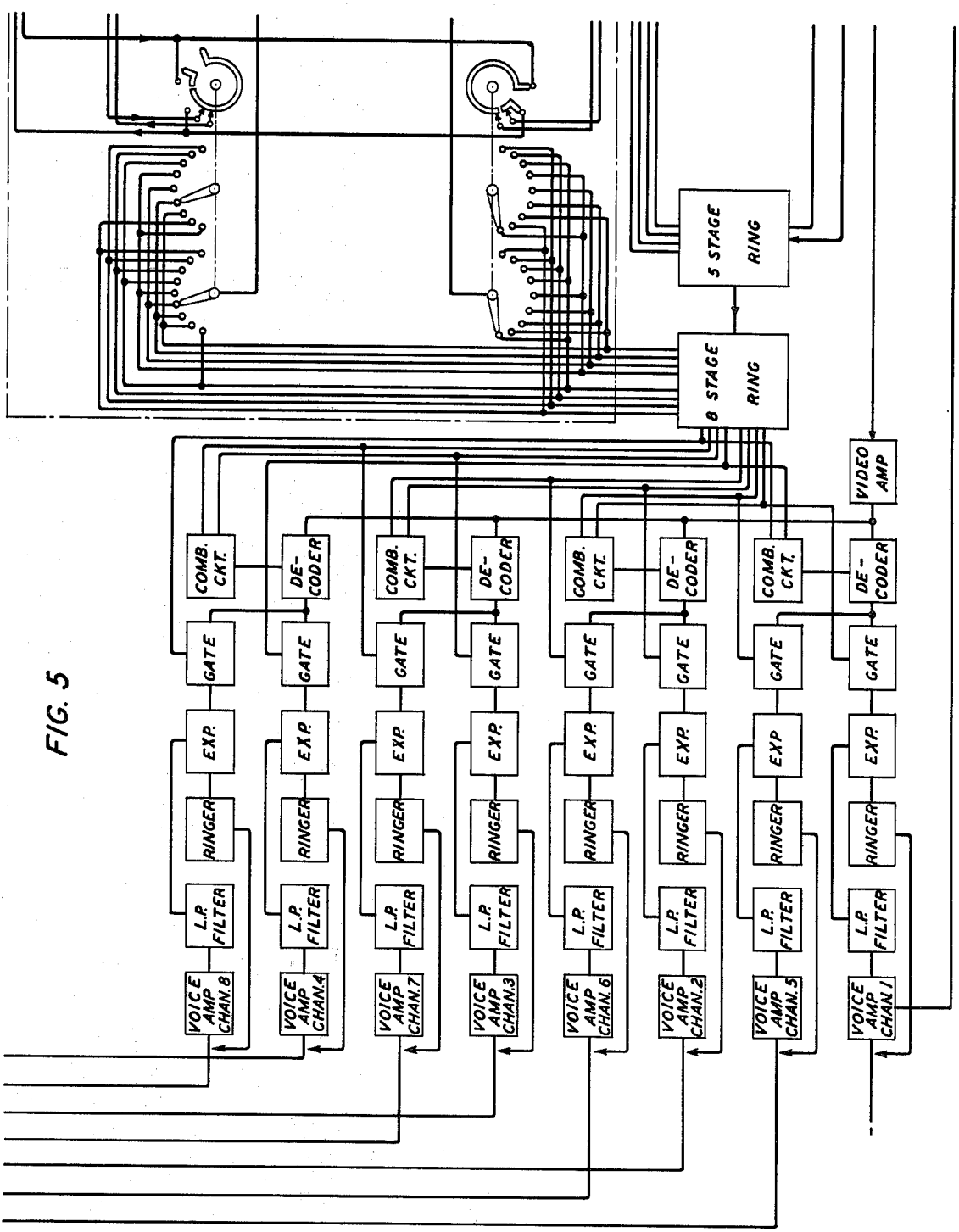

FIGS. 3 through 10, inclusive, show in outline form the various elements of an exemplary system embodying the present invention;

FIGS. 3, 4, 5 and 6 show the various elements and the manner in which they cooperate at one terminal;

FIGS. 7, 8, 9 and 10 show the corresponding equipment and the manner in which it cooperates at the other terminal;

FIG. 11 shows the manner in which FIGS. 5, 6, 9, 10 and 12 through 48, inclusive when arranged as shown in FIG. 11 show in detail the elements of a typical system embodying the present invention and the manner in which these various elements cooperate one with another;

FIGS. 49 through 56 inclusive illustrate graphs representing currents and voltages in various portions of the system so that its operation may be more readily understood;

FIG. 57 shows the manner in which FIGS. 49 through 54 may be arranged adjacent one another.

GENERAL DESCRIPTION

FIG. 1 shows the elements of a typical exemplary system embodying the present invention. The system illustrated in FIG. 1 comprises two terminals A and B and an intermediate relay repeater station C. While a single relay repeater station has been shown in FIG. 1 it will be readily understood that this repeater station may be dispensed with altogether or that any desired number of such repeater stations may be interposed in tandem between the terminals A and B. Inasmuch as these additional relay repeaters will all be similar, only one relay repeater station C is shown in the drawing.

An over-all picture or understanding of the operation of the system may be obtained from a consideration of the circuits and apparatus of the equipment shown in FIG. 1. Terminal A includes a common frame 120 at which 8 two-way voice frequency telephone channels terminate. This common frame has suitable terminating equipment for terminating either two-wire or four-wire circuits in the exemplary system described herein. This terminal equipment may include apparatus for terminating any type of communication channel with which it is desired to operate systems similar to the system described herein in detail. The first of these eight channels is reserved for synchronizing purposes as described herein. Each of the other seven channels may extend through any desired types of transmission, repeating, equalizing and switching equipment desired or necessary to connect the desired transmitter 126 and receiver 127 to the common frame 120 at terminal A. The transmitter and receiver 126 and 127 are shown connected to the second voice frequency channel. It is to be understood that similar transmitting and receiving devices will be connected to the other channels when it is desired to employ them for transmitting speech currents.

The transmitter 126 and receiver 127 are shown to illustrate suitable types of equipment for generating and receiving complex wave forms. The exemplary system described herein however is not limited to speech currents. Consequently the transmitter and receiver 126 and 127 respectively, are intended as merely representative of a large group of transmitting and receiving devices including picture transmission equipment, telegraph equipment including printing or automatic telegraphy and other types of apparatus for generating and responding to complex wave forms. As shown in FIG. 1 the seventh voice frequency channel extends to the voice frequency carrier current system 128 which provides equipment for simultaneously transmitting a plurality of telegraph channels over a voice frequency communication path. Printing equipment 129 of FIG. 1 represents terminal equipment of one of these paths and may include both transmitting and receiving telegraph equipment.

Terminal B similarly includes a common frame at which a corresponding voice frequency transmission path terminates. These paths may be of any of the types described above with reference to terminal A and are arranged so that channel 1 of terminal A corresponds to channel 1 of terminal B, etc. In other words, signals from transmitting device 126, connected to channel 2 at station A cause corresponding signals to be transmitted over the system to station B where signals corresponding to the signals from device 126 are applied to channel 2 extending to receiving device 167. In a similar manner signals from device 166 are conveyed to receiving device 127.

Likewise telegraph signals from the printing equipment 129 are transmitted to the telegraph equipment 169 through the carrier current channel systems 128 and 168 and then over the seventh voice frequency path between terminals A and B. Persons skilled in the art will readily understand that similar or other types of telegraph equipment may likewise be connected to any and all of the other voice frequency paths except the channel or path number 1. It is also evident that incoming lines or channels need not be connected to all of the voice frequency channels. The mode of operation of the system will not be affected by the number of incoming channels actually connected to or delivering signals to the system.

A noise generator 125 is provided at terminal A and a similar generator 165 at terminal B to add noise to the signals to increase their secrecy in the manner described herein.

The signals are conveyed between the common frame 120 and the transmitting modulator frame 122 and receiving demodulator frame 121 at terminal A and between the common frame 160 and the transmitting demodulator frame 162 and the receiving modulator frame 161 at terminal B.

The transmitting modulator frame causes each of the channels to be sampled in succession and represents the magnitude of each of the samples by a uniform number of permutatively coded pulses each of which may have any one of a plurality of different signaling conditions. These code pulses are then suitable for transmission to the other terminal. Persons skilled in the art will readily understand that the output of the modulator frame may be connected over any suitable type of transmission path and related equipment to the receiving modulator frame at the opposite terminal. This communication path may include open wire lines, cable conductors including coaxial cables, wave guides, carrier current or radio channels as well as any and all types of transmission paths through any necessary or required medium.

As shown in FIG. 1 the output of the transmitting modulator 122 extends to radio transmitter 131 where the output pulses from the transmitting modulator 122 are employed to modulate the output of the radio transmitter 131. In the exemplary embodiment described herein these pulses are employed to turn on and off the radio transmitter. From the radio transmitter the pulses are transmitted from an antenna 133. These radio frequency pulses may be transmitted directly to receiving antenna 172, receiving converter 174 and thence to the radio frame 163 and receiving demodulator 161 where the pulses are recovered and converted into a complex wave similar to that applied to the system from the terminal channels at the transmitting terminal.

Transmission in the opposite direction is in substantially the same manner as described above.

Where the transmitting and receiving terminals are widely separated it will be necessary to provide one or more intermediate repeater points or stations similar to the relay repeater C shown in FIG. 1. In this case the signals transmitted from antenna 133 are received by the antenna 144. The signals then pass through a receiving converter 142 and radio frame 140 to repeater 155 which reforms and retransmits the reformed signals to the radio transmitter 151. From the radio transmitter 151 the signals are transmitted from antenna 153 to the receiving antenna 172. Thereafter the signals are transmitted through the equipment in the same manner as described above. Here again the transmission in the opposite direction through the radio repeater station C is in substantially the same manner as described above.

The signals in passing through the amplifier 155 are reformed so that distortions encountered over the transmission path between terminal A and repeater station C are all substantially eliminated.

In addition to sampling in succession the signals applied to the eight channels and representing the magnitude of each sample by a permutation code group of pulses, secrecy features have been added which render the system relatively secure even though the signals may be received by receiving equipment of the type described herein. Features of the cipher equipment providing such secrecy features disclosed herein but no claimed which appear to be novel are described and claimed in the copending application of A. E. Joel, Jr., Ser. No. 675,903, filed on an even date herewith.

In addition to the eight voice frequency channels, an additional order wire channel is provided between the two terminals of the system. Provision has been made for connecting equipment at each of the intermediate relay repeater stations to this order wire circuit. However, due to the fact that a large number of people may be attempting to use the order wire circuit and thus overload it, means have been provided to regulate the total possible amplitude or volume of the signals which may be transmitted over the order wire.

The order wire may terminate in equipment at either of the terminals or at any of the intermediate relay repeater stations or it may extend to more distant communication centers over communication paths and through switching equipment such as described above. The terminal apparatus is illustrated at 130 at terminal A, 148 and 158 at the intermediate relay repeater station and 170 at terminal B.

As shown in FIG. 1 the equipment has been arranged on various frames for easier maintenance and operation. This arrangement of the equipment when desirable has been followed in the description of this specification. It is to be understood however that any other suitable arrangement of the equipment may be employed. The radio apparatus and equipment 131 and 132 at terminal A are usually located on or near the radio tower but need not be so located. The radio transmitting and receiving apparatus at the intermediate repeater station may be similarly located. Both repeaters 145 and 155 are shown in the drawing relatively near one another. These repeaters may be located adjacent to one another in the same building or they may be located at points relatively far apart and signal transmission paths of the desired or necessary bandwidth connecting them together.

The novel features of the relay repeater station including the order wire circuits and apparatus shown and described herein but not claimed are claimed in the copending application of Anderson-Edson Ser. No. 675,902, filed on the same date herewith.

Details of a typical radio system suitable for transmitting the coded pulses has been employed by the Army and designated AN/TRC-6. This equipment is described in the technical manual TM ll-631 or TM ll-632 on the radio transmitting set AN/TRC-6, which description is hereby made a part of the specification as if fully set forth herein.

Suitable power alarm and other equipment is provided at terminal stations and also intermediate relay repeater stations. A source of power is illustrated by the rectangle designated 124 at station A of FIG. 1 designated power supply and voltage regulator frame. Similar power equipment is designated 164 at station B of FIG. 1.

Figure 6:
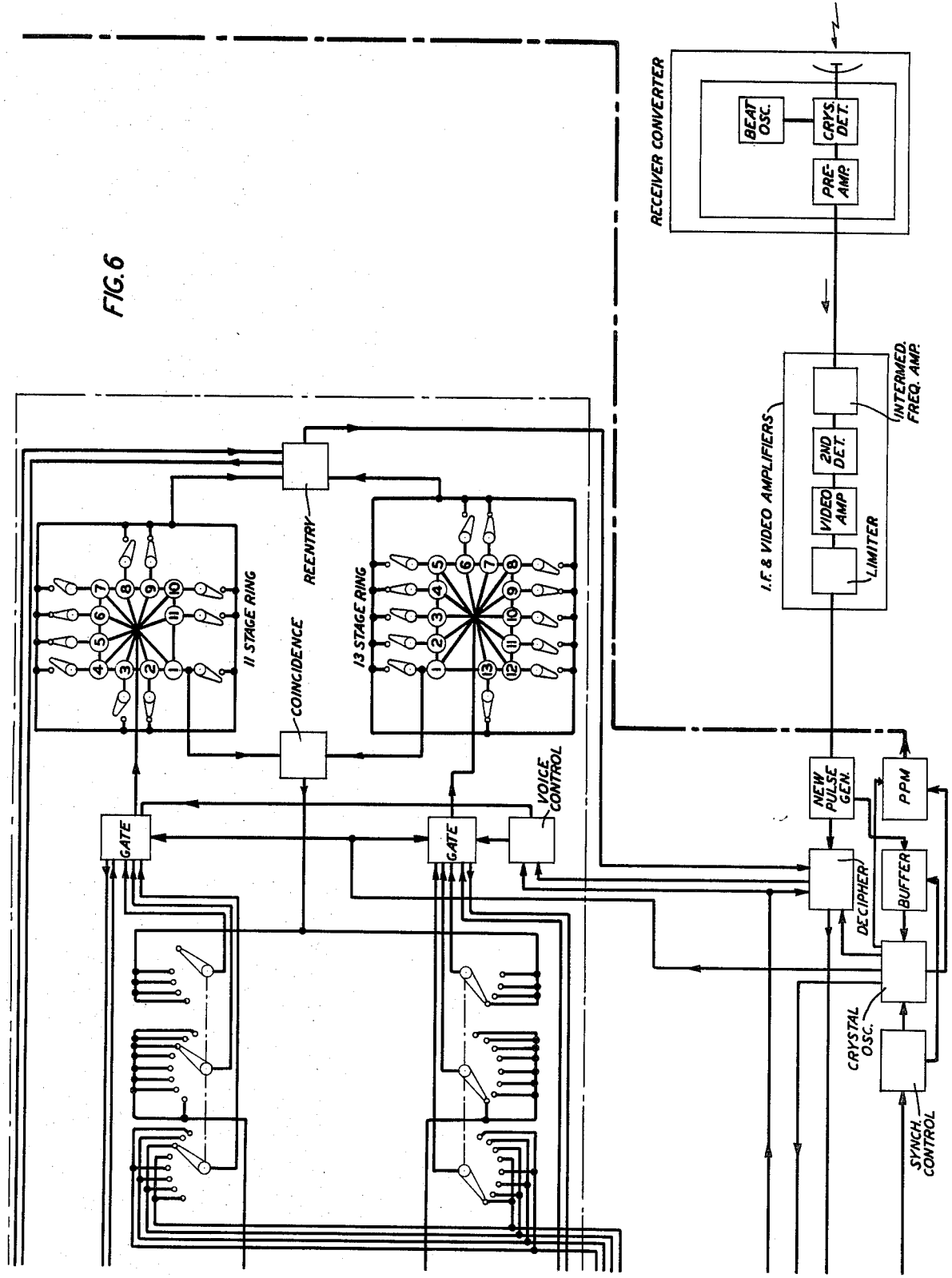
Figure 7:
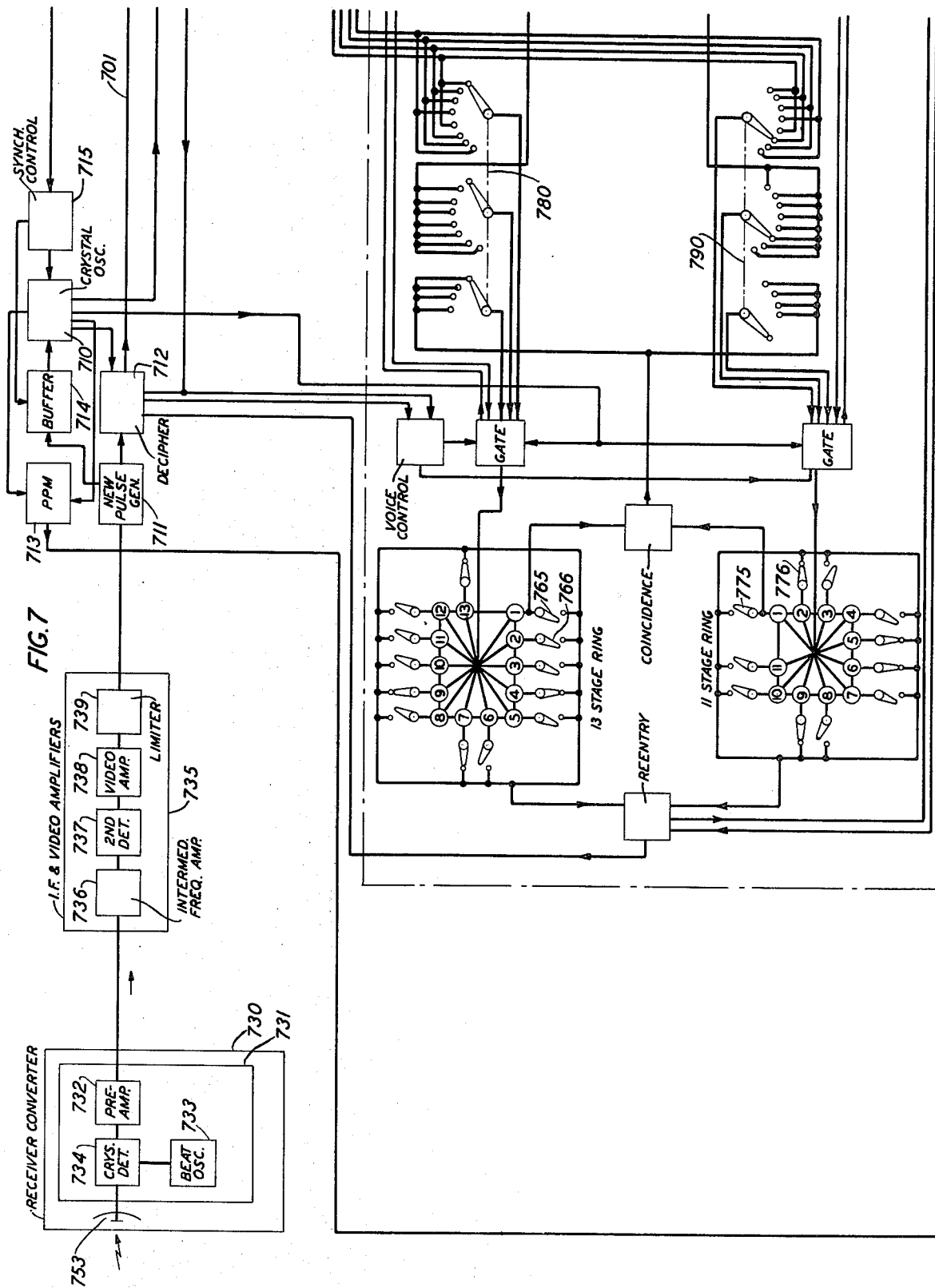
Figure 8:
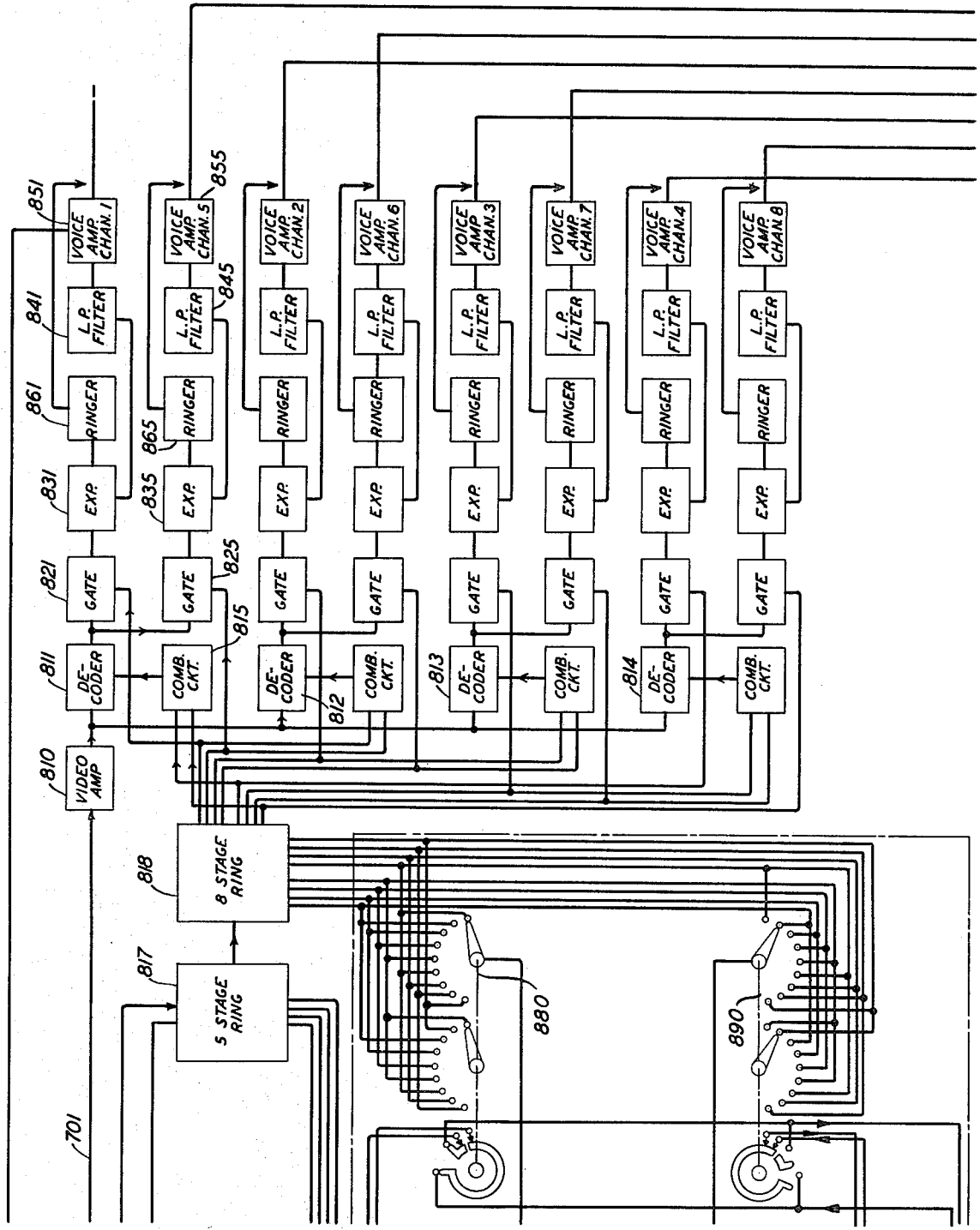
Figure 9:
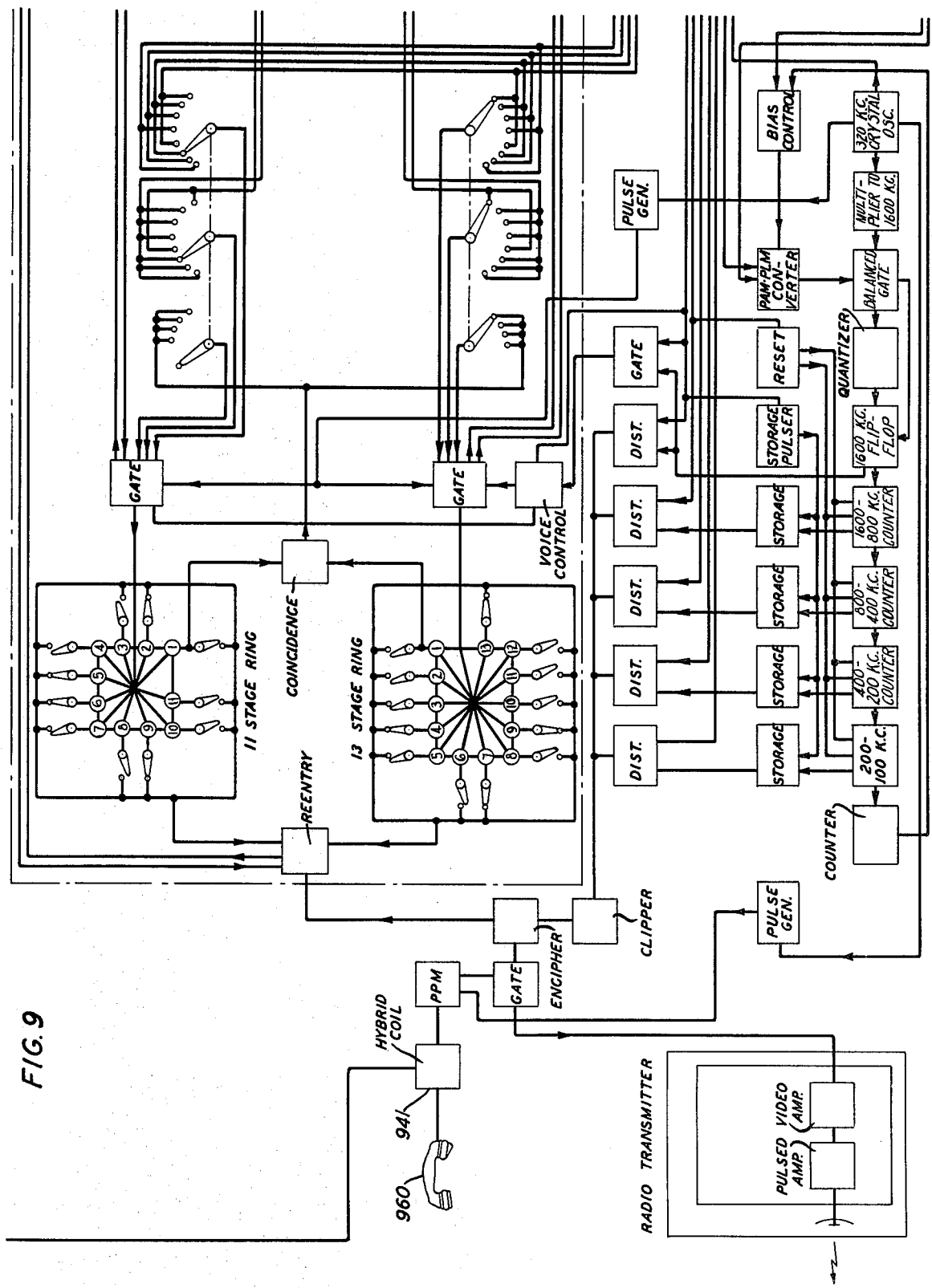
Figure 10:
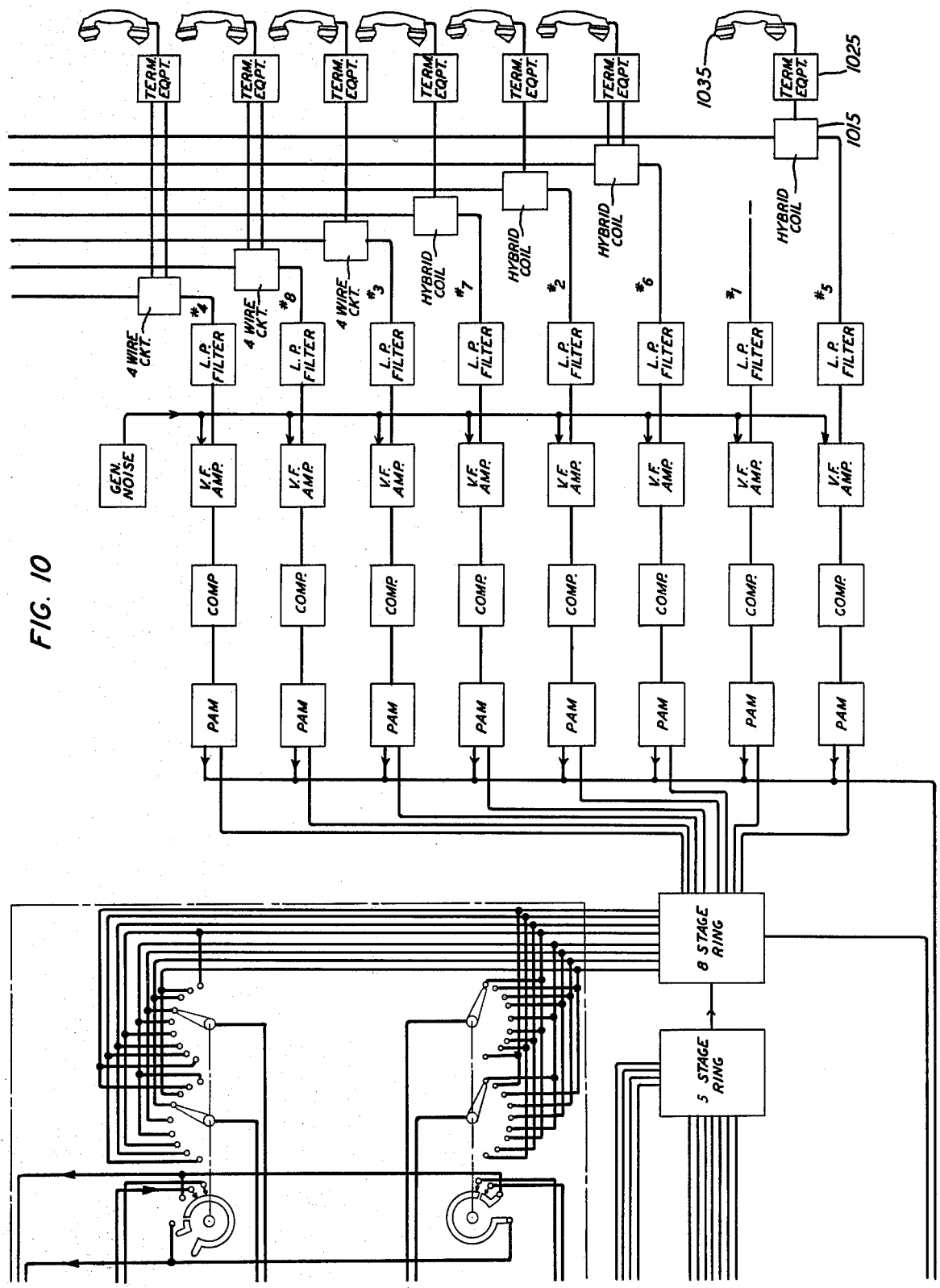

FIGS. 3 through 10 when arranged adjacent to one another as shown in FIG. 2 show in outline form the various elements of an exemplary system and the manner in which they are interconnected and cooperate. FIGS. 3 and 4 show the transmitting equipment at terminal A and FIGS. 5 and 6 show the receiving equipment at terminal A. FIGS. 7 and 8 show the receiving equipment at terminal B. FIGS. 9 and 10 show the transmitting equipment at terminal B. No relay repeater stations have been shown between the terminals at FIGS. 3 to 10, inclusive. It is to be understood, however, that any suitable or desirable number of relay repeater stations of a type such as that described in detail in the above-identified copending application of Anderson-Edson Ser. No. 675,902, may be interposed between the transmitting and receiving terminals. It is also to be understood that in case only one-way circuits are required between the transmitting and receiving terminal that FIGS. 5, 6 and 9 and 10 may be omitted.

At the left-hand side of FIG. 3 seven handsets 310, 330, etc. are shown. These handsets are intended to illustrate both a source of suitable signals and a receiving instrument capable of receiving and responding in the proper manner to the corresponding types of signals. These devices 310, 330, etc. are also shown to be similar for simplicity. It is to be understood however that many other suitable types of transmitting and receiving equipment such as enumerated above may be employed for the source of signals to be transmitted and for the receiver to automatically receive and respond to the signals applied to it.

The transmission path from the place of origin of the signals 310 may extend through any suitable type of terminal equipment 311. This terminal equipment may include any type of transmission path enumerated above and may include manual and automatic switching equipment, gain control regulators, and other compensating equipment, suitable amplifiers and repeaters, etc.

employed in the respective types of transmission systems and employed in the terminals thereof and between the systems of the various types.

When the signals arrive at terminal A over a four-wire circuit, four-wire terminal equipment 312 is provided at terminal A. As shown in FIG. 3 the incoming paths 331, 332, 335, 336 and 337 are four-wire circuits. Incoming paths 333 and 334 are shown as two-wire circuits. When the direction of transmission over the voice frequency channel is separated, i.e., a so-called "four-wire circuit", the signals to be transmitted over the system described herein are conveyed to the transmitting equipment while the signals received from the transmitting equipment are transmitted over an east to west path as viewed in FIG. 3. When the directions of transmission of the incoming channel are not separated, i.e., the channel is a "two-wire circuit" as is paths 333 and 334, the transmission and reception pass through and are separated by the hybrid coils 338 and 339 respectively employed to terminate these circuits. The channels for transmission in the opposite directions may be then connected to the appropriate circuits and apparatus.

From the terminating equipment the incoming signals pass first through a low-pass filter designated 313 in the case of channel 5, which limits the frequencies which may be transmitted over the system to those frequencies which the system is arranged to transmit.

The frequency range of a system of the type described herein is largely controlled by the sampling rate. In other words each of the channels has to be sampled at least twice for each cycle of the highest frequency component desired to be transmitted. For example if the sampling rate is 8,000 cycles per second, the highest possible frequency which may be transmitted from each of the channels is about 4,000 cycles. However, to insure suppression at unwanted frequencies above 4,000 cycles the filters 313 are arranged to cut off at a somewhat lower frequency around 3,000 to 3,500 cycles. This frequency range is adequate for telephone or voice communication circuits. However, in case it is desired to extend this frequency range it is only necessary to sample the channels more rapidly and make corresponding changes in the frequency range of the filters.

The signals are conveyed from the low-pass filter 313 to a voice amplifier 314 and then through a compressing network 315. The compressors 315 include some non-linear circuit devices such as rectifiers or "thyrite" and operate as an instantaneous compressor of the signal amplitude. Copper oxide rectifiers are employed in the exemplary system described in detail herein. In other words the output of the compressor does not rise or increase as fast as the input. The exact relationship between the magnitudes of the input and output of the compressor may be controlled by suitable design. After the noise and signals have been compressed they are ready for application to the multiplex and coding equipment.

The operation of this equipment may be more readily understood by first referring to the control oscillator 410 in FIG. 4 which in the exemplary system described herein operates at a fundamental frequency of 320 kilocycles per second.

Inasmuch as this oscillator controls the timing and rate of operation of the system it is desirable that it have a high degree of stability so that a crystal-controlled oscillator is preferred.

The crystal oscillator 410 is employed to simultaneously control a number of different circuits and elements of the system. The 320 kilocycle output from oscillator 410 is fed to a five-stage ring circuit 318 which operates as a distributor and steps one stage or position for each cycle of the 320 kilocycle current from oscillator 410. The five-stage ring is illustrated by 318 in FIG. 3. By means of the five-stage ring, five different output pulses are obtained in succession with each pulse one-fifth of the length of a total cycle or revolution around the ring.

Since the five-stage ring is stepped one stage for each cycle of the oscillator it operates at one-fifth of the 320 kilocycles per second or 64,000 revolutions or 64 kilocycles per second. This frequency is applied to an eight-stage ring 317. The eight-stage ring is arranged so that each stage gives an output pulse which has a length substantially one-eighth of the total period or cycle of the eight-stage ring. Thus pulses in each of the eight output leads from the eight-stage ring occur at one-eighth of 64,000 or 8,000 times a second. These pulses are thus one-eighth of 125 microseconds or approximately 15.6 microseconds long.

The output pulses from the different stages of the eight-stage ring are applied to different pulse amplitude modulators individual to incoming channels similar to the modulator 316 of channel 5. The compressed signal wave from the compressor 315 is also applied to the pulse amplitude modulators (PAM) 316. These modulators are arranged to pass the input signals during the time a pulse from the corrresponding stage of the eight-stage ring is applied to them from the respective stage of the eight-stage ring. As a result each one of these modulators will pass a pulse during the time interval assigned to it. The amplitude or magnitude of the corresponding pulse is a function of the instantaneous amplitude of the respective speech or other complex wave applied to this modulator during the respective pulse interval. Inasmuch as these output pulses all occur in succession, the outputs of the eight-pulse amplitude modulators are all connected together to a pulse converter 426. In this manner the input complex waves are sampled in succession and transmitted to the coding equipment shown in FIG. 4.

The pulse converter 426 operates to convert each of the pulse amplitude modulated pulses to a pulse length modulated pulse. In other words, converter 426 changes each of the pulses applied to it which have a constant length or width but which may have different amplitudes into pulses having a constant amplitude but different widths or lengths. The widths or lengths of the output pulses are functions of the amplitudes of the input pulses. Consequently the length or width of the converted pulse from the pulse converter 426 is a function of the magnitude of the incoming complex or speech wave at the instant it is sampled.

A portion of the output of the 320 kilocycle current from oscillator 410 is employed to control a frequency multiplier 411. The frequency multiplier 411 operates under control of the 320 kilocycle current to generate a frequency of 1600 kilocycles. The 1,600 kilocycles together with the pulse length modulated signal from the pulse converter 426 are applied to the balanced gate 412. The pulse length modulated signal operates to condition the balanced gate 412 so that for the duration of the pulse from converter 426 the balance gate 412 will transmit the 1,600 kilocycle current to the quanticizer 413. However, the balance gate 412 will not transmit 1,600 kilocycles in the absence of the pulse from the converter 426. As a result the 1,600 kilocycles will be passed through the balanced gate 412 for a length of time which is a function of the amplitude of the complex wave at the time of sampling. This means that the number of half cycles transmitted through the balanced gate 412 is also a function of the amplitude of the complex wave at the corresponding instant of sampling.

Inasmuch as the length of the pulse from the converter 426 bears no fixed relationship to the 1,600 kilocycle current it may end any time during any portion of a cycle of the 1,600 kilocycle current. As a result the final half cycle from the balanced gate 412 may be cut short so that it may not properly control the succeeding circuits. In order to avoid this difficulty, quantizer 413 is provided which lengthens such short pulses so that they will be substantially a full half-cycle long. Thus the output of the quantizer 413 is always an integral number of half cycles of the 1,600 kilocycle current which number represents the amplitude of the complex wave at the time of sampling.

These half cycles are then employed to control a binary counter comprising five stages 414, 415, 416, 417 and 418. Each of the stages comprises a double stability circuit similar to the Eccles-Jordan trigger circuits. The first stage 414 operates at the frequency of the incoming half cycles and responds to the half cycles, that is each half cycle changes the circuit from one position of stability to the other. The second stage 415 counts the number of times the first stage changes in one direction, that is the second stage changes from one position of stability to the other half as often as the first stage. Each of the succeeding stages is thus controlled by the preceding stage and operates at half the frequency of the preceding stage. In this manner it is possible to count 32 half cycles of the 1,600 kilocycle frequency before the counter is returned to its initial condition. Provision has been made to stop the operation of the counter at the count of 31 so that it will not count beyond 31.

At the end of the count and before the pulses representing the next sample are applied through the balanced gate 412, a pulse is received from the five-stage ring 318 by the storage pulser 428.

At the same time a pulse is applied to distributor unit 431 and gate 430. The distributor 431 is also connected to the first stage of the counter 414. Dependent upon the position of first stage a marking or a spacing pulse will be transmitted over conductor 470 at this time. A pulse of spacing or marking character similarly dependent upon the condition of the first stage of the counter 414 will also be transmitted through the gate 430 to the keying circuit which will be described hereinafter.

The pulse applied to the storage pulser 428 at this time causes the storage pulser 428 to condition the storage devices 422, 423, 424 and 425 so that they will in effect store the condition of the succeeding counting stages. These storage devices each comprises a condenser upon which a charge is stored if the counter stage is in one condition but upon which no charge is stored if the counter is in the opposite condition.

The outputs of the storage devices 422 through 425 are connected to distributor elements 432 through 435. Each of these distributor elements is also connected to the succeeding one of the stages of the five-stage ring so that they will receive pulses in succession from the five-stage ring 318. In this manner the distributor stages 431 through 435 are energized in sequence from the five-stage ring and depending upon the condition of the corresponding stage of the counter at the end of the count an "on" or "off" pulse is transmitted over conductor 470. These five pulses then comprise a permutation code group of pulses which represent any one of the 32 different possible conditions of the counter stages 414 to 418, inclusive. It should be noted that 0 to 31 is in effect 32 amplitude conditions which may be represented by the five pulses as pointed out above.

An additional counter 419 is provided which comprises two counter stages and is controlled from the final counter stage 418. This counter counts the number of times stage 418 changes from its operated condition to its normal condition.

Stage 418 changes from the "off" to the "on" condition on the 16th count or 16th half cycle received from the quantizer 413. In other words if the amplitude of the sample is less than half of the total possible amplitude which the sample may assume, counter 418 will not be changed from its "off" to its "on" condition. On the other hand if the sample has a magnitude which is greater than half of the possible magnitude which the sample may assume the counter stage 418 is changed from its "off" to its "on" condition, that is, from its normal to its operated condition.

Thus the number of times the counter stage 418 changes from its normal to its operated condition indicates the number of samples which are greater than half of the total possible amplitude of the sample. Counter 419 in operating will count the number of times this occurs and send a pulse to the bias control circuit 420 every time counter 418 changes from its "on" to its "off" position 4 times. A pulse is also sent from the eight-ring distributor 317 to the bias control circuit 420. If the samples on the average are properly centered in the center of the total possible magnitude which the system is capable of transmitting the counter stage 418 will be operated from its normal to its operated position half of the time on the average and thus 4 times during each complete multiplex cycle. As a result counter 419 will transmit 1 pulse to the bias control circuit. The eight-stage ring will likewise transmit one pulse during each multiplex cycle. This bias control circuit operates to control the length of the pulse from the pulse converter 426. This bias control circuit 426 is arranged so that each of the pulses received from the eight-stage ring 317 tends to increase the length of the pulse length modulated signal while each of the pulses received from the counter tends to reduce the length of the pulse modulated signal. As a result if the samples as counted by the counter are on the average more than half the total possible amplitude of the signals more pulses will be received from counter 419 than will be received from the eight-stage ring 317. As a result the bias will be changed so as to reduce the length of the pulse modulated signals so that on the average it will be half the total possible variation in length. On the other hand if the count is less than 16 on the average, fewer pulses will be applied to the bias control circuit 420 from the counter 419 than will be received from the eight-stage ring 317. As a result the length of the pulse length modulated signals will be increased until the average length is substantially half the total possible variation in length. In this way the magnitudes of each of the samples is properly centered in the counting range of the counter so that the system is constantly maintained in a condition for transmitting the maximum possible amplitude variation of applied signals without serious distortion or error.

The signals from the distributor are transmitted over connector 470 to an amplifier or clipper 437 which may shape the signals in any desired manner. In the exemplary system described herein the amplitude of each of the pulses is made substantially the same and they have substantially the same wave shape.

The pulses are then suitable for transmission either with or without further amplification or shaping to the receiving equipment and may be so transmitted. If they are so transmitted they should be applied to conductor 701 of FIGS. 7 and 8 at the receiver. It is within the scope of the present invention to apply the output from either conductor 470 or 477 over any suitable transmission medium such as a radio channel, a coaxial cable, a wave guide or other suitable transmission medium or path to conductor 701 at the receiver. This transmission path may include suitable amplifiers, pulse shaping and reforming apparatus, gating apparatus, etc.

RECEIVING AND DECODING EQUIPMENT

The receiving station is provided with a control oscillator 710 similar to the oscillator 410 at the transmitting station. In the specific embodiment described herein in detail, oscillator 710 operates at the same frequency as oscillator 410.

Oscillator 710 is employed to drive or control the five-stage ring or distributor circuit 817 similar to the five-stage ring 318 at the transmitting station. A pulse from one of the stages of the five-stage ring is employed to control or drive the eight-stage ring 818 similar to the eight-stage ring 317 at the transmitting station. The oscillator 710 and the five-stage and eight-stage rings at the receiving station operate continuously and are in synchronism with the corresponding equipment at the transmitting station. In other words, stage 1 of the five-stage ring is in its actuated condition at both stations substantially simultaneously, likewise each of the succeeding stages of both the five-stage rings. The eight-stage rings are controlled from the five-stage rings and must be properly phased at the two ends of the system but stage 1 for example, is not in the actuated condition at the same time at both ends of the system as will be explained hereinafter. It is of course also understood that the equipment at the receiving station lags behind the equipment at the transmitter station by a fixed increment of time. Thus the pulse from stage 1 of the five-stage ring at the receiving station lags the pulse from stage 1 of the five-stage ring at the transmitting station by the delay between the stations; likewise each of the succeeding stages of both rings. This time increment includes any or all time delays interposed by amplifiers, repeater stations and equipment, as well as the time delay for the transmission medium or radio paths employed for conveying the signals between various stations of the system. This fixed delay time increment also includes the delay in the pulse reforming, reshaping and amplifying circuits at the receiving station. Since this delay is fixed in any given system and does not present any synchronizing problem in the exemplary system, described herein, no further consideration will be given to it herein.

The manner in which the synchronism described above is obtained will be described hereinafter. For the purpose of describing the decoding equipment it will be assumed that the various circuits referred to above are maintained operating in synchronism and the manner in which synchronism is secured will be described later.

It is also assumed for the purpose of description that either the output of the distributors appearing on conductor 470 or the output of a pulse-shaping amplifier 437 appearing on conductor 477 is conveyed through the equipment to the conductor or lead 701 at the receiving station. The manner in which these signals are conveyed from one conductor to the other may include open-wire lines cable circuits, coaxial cables, wave guides or radio paths, the only requirement being that each of the pulses of a given character applied to lead 470 be conveyed and appear as a pulse of the same or of an opposite character and of a suitable polarity upon lead 701. These pulses then are in the same code groups and follow one another in succession on lead 701 in the same manner as on lead 470. It is of course understood that the pulses may be suitably shaped, amplified and otherwise controlled between these two places in any desired manner so long as the pulses applied to lead 701 are of the same character and follow one another in the same order as appearing on lead 470.

The received pulses are transmitted over lead 701 to video amplifier 810 where they are amplified and otherwise shaped or reformed if desired. The output of this video amplifier is then applied to a group of four decoding circuits 811, 812, 813 and 814. Decoding circuit 811 is provided for channels 1 and 5 and each of the other decoding circuits decode the pulse group for two of the other channels. The decoding circuits likewise receive pulses from the eight-stage ring through the combining circuits such as 815 for decoder 811. Similar combining circuits are provided for each of the other decoders. The combining circuit 815 is supplied by pulses from two of the stages of the eight-stage ring. Under the assumed condition combining circuit 815 is supplied with pulses from the first and fifth stages of the eight-stage ring because these pulses are so timed that they coincide with the reception of the groups of pulses from the first and fifth channels. The combining circuit 815 then supplies pulses to the decoder 811 at both of these times so that the groups of five pulses conveying the information for both channels 1 and 5 are decoded by decoder 811. Decoder 812 is similarly supplied with pulses from stages 2 and 6 of the eight-stage ring for permitting this decoder to receive and decode the pulses for channels 2 and 6. The other decoders are similarly supplied with appropriate pulses for decoding the information for the other channels.

The output of decoder 811 is applied to two gate circuits 821 and 825. These gate circuits are supplied with other pulses from the eight-stage ring, from stage 2 for gate 821 and from stage 6 of gate 825, and serve to separate the decoded signals decoded by the decoder 811 and direct them to their proper channels. The output of the gate circuits 821 and 825 then is transmitted through the expandor circuits 831 and 835, respectively and applied to the respective low-pass filters 841 and 845. The low-pass filter removes the high frequency components and in effect permits only the voice or low frequency currents to be transmitted through them, thus in effect regenerating speech or other waves similar to those impressed upon the system at the transmitting station.

The low frequency voice or other waves are then amplified by the amplifiers 851 and 855. As pointed out hereinbefore the first channel is not employed for speech purposes but reversed for synchronizing as will be described hereinafter. The output, however, of the voice amplifier 855 of the fifth channel is applied to the hybrid 1015 and then through the terminal equipment 1025 to the receiver 1035 at the other terminal of the fifth channel.

For transmission over the fifth channel in the opposite direction similar circuits and apparatus are provided as shown in FIGS. 10, 9, 6 and 5 to the receiving equipment 310 associated with the transmitter 310. Thus a two-way circuit is provided between each of these devices. It is also possible to transmit ringing current over the system in the same manner as other signals. At the receiving station, however, special low frequency receiving or ringing circuits 861 and 865 are provided for responding to the ringing current and applying ringing current directly to the line extending from hybrid coil 1015 instead of causing this ringing current to first pass through the low-pass filter and voice-frequency amplifier.

The message contained in the pulse code groups of signals transmitted between the conductors 470 and 477, and 701, while in the form of code groups may be still at least in part understood with difficulty when received by an ordinary radio receiver. This is particularly true if only one or two channels are transmitting speech currents and the remainder of the channels idle or perhaps when the channels are overloaded. While the information on the coded pulses are less intelligible when received by an ordinary radio receiver than the usual voice amplitude modulation or frequency modulation waves, the system still does not provide sufficient privacy in the communication between the terminals of the system and in the case of radio paths between the transmitting and receiving station, probably does not provide as great a degree of secrecy as a line or cable circuit.

In order to improve the privacy or secrecy of the system to secure secrecy equal to or surpassing the usual types of signals applied to transmission lines and cables, ciphering equipment has been provided at the transmitting station and deciphering equipment at the receiving station. This equipment comprises a group of circuits and other equipment arranged to generate key pulses in a substantially random manner which are reproducible at the receiving station. These random pulses are then combined with the coded pulses, first at the transmitting station to cipher the signals transmitted therefrom and then at the receiving station to dicipher the signals. The equipment for generating these pulses is called herein a "keyer".

Cipher and Decipher Circuits and Apparatus

A keying unit is employed to generate a series of pulses of any one of a plurality of different signaling conditions such as marking pulses or spacing pulses, "off" pulses or "on" pulses, and the like. While in the general case it is not necessary that these pulses be generated at the same rate as the signaling or coded pulses described above, they are so generated in the exemplary system described herein. It is to be understood however that this invention is not limited to arrangements in which the keying pulses are generated at the same rate as the intelligence conveying impulses.

The keyer employed in the exemplary embodiment of the invention described in detail herein consists essentially of a plurality of ring circuits driven from the 320 kilocycle oscillator 410. In the specific embodiment described herein two ring circuits are employed. Persons skilled in the art however will understand that any suitable number of ring circuits may be employed. The keyer described herein comprises a thirteen-stage ring and an eleven-stage ring. It is to be understood that the rings may comprise any number of stages but it is desirable that the stages of each ring be different from the number of stages of all the other rings. In addition it is also desirable that the number of stages in any ring be a prime number.

Each of the stages of each of the rings comprises a double stability circuit employing two electronic discharge devices. A plurality of certain of the devices may be enclosed in a common envelope. Thus two of such devices are frequently enclosed in a common envelope. However, such an arrangement comprises in effect two electronic discharge devices. Double stability circuits employing electronic discharge devices are sometimes called Eccles-Jordan trigger circuits. The double stability circuits are arranged so that current flows through one or the other of the tubes but not both. Furthermore when current starts to flow through one tube it continues to flow through that tube until interrupted by the application of some potential or signal to the circuit. One of the tubes normally conducts current for the greater portion of the time so when the circuit is in this condition it is said to be in its normal position or condition. When the other tube is conducting the circuit is said to be in its operated or actuated condition. The stages of each ring are arranged in a ring or sequence so that on the application of a pulse to the ring an operative stage is returned to normal and the succeeding stage actuated to its operated position. Means are also provided to insure that only one stage in each ring is conductive or operative at a time.

A plurality of switches, such as 465, 476, etc., are provided, one for each stage to permit the connections between the stages of each ring to be changed at will so that as the rings are advanced stage by stage, as described hereinafter, different series of pulses may be obtained in accordance with the different positions of the switches. In the exemplary system described herein each of the switches may be set in either one of two positions so that there will be transmitted to an output circuit common to each ring a pulse of one character say an "on" or marking pulse when the respective stage is operated and the switch operated to one of its positions. A pulse of opposite character however, that is an "off" pulse or spacing pulse is transmitted to the common output circuit each time the respective stage is actuated when the switch is operated to its opposite position.

Thus in the thirteen-stage ring and the eleven-stage ring there are a total of 24 switches which may be operated independently to either one of two positions. This makes a total of 224 possible permutations of the settings in these switches.

As pointed out above both of the rings are driven from the 380 kilocycle oscillator 410. A portion of the output of oscillator 410 is employed to control the pulse generator 429. The ouptut of the pulse generator 429 is applied to gate circuits 464 and 474. These gate circuits are arranged to transmit the pulses from the pulse generator 429 to the thirteen-stage ring and the eleven-stage ring respectively unless prevented from doing so by other pulses or conditions. These other conditions are determined by the eight-stage ring and the five-stage ring of FIG. 3 through a plurality of switches 325, 326, 480 and 490.

The first pulse of certain of the code combinations when of one character will cause a gate circuit to suppress a selected driving pulse for one or the other or both of the ring circuits. If this pulse is of the opposite character the transmission of the selected driving pulse will not be suppressed. The selection of the code combinations and the time at which the selected pulse becomes effective is made by switches 325, 326, 480 and 490. Switch 325 comprising switch arms 319, 320 and 321 selects the particular group of pulses and switch 480 comprising switch arms 461, 462 and 463 selects the pulse interval of the group during which a driving pulse to the thirteen-stage ring may be suppressed. Switches 326 and 490 are employed to make similar selections for the control of the eleven-stage ring. Thus, depending upon the setting of all of these switches and the conditions of the various rings, a pulse will be transmitted or not transmitted by the gate circuits under the joint or combined control of all these factors. Inasmuch as the first pulse of each code group will be of either marking or spacing character in a substantially random manner, due in part to the random character of speech waves and also due in part to the random character of the low level noise added to the speech or other complex waves to be transmitted, stepping or advancement of the thirteen- and eleven-stage rings will also be of a totally unpredictable and essentially random character.

A coincidence circuit 468 is also provided for suppressing the transmitting of a pulse by one or the other of the gate circuits 464 or 474 depending upon the setting of the switches 463 or 473. The transmission of a pulse by the gate circuit is suppressed only when both rings are simultaneously in their number 1 position.

The coincidence circuit is provided to obtain the maximum number of different settings of the various switches and thus the maximum number of different possible settings of the switches of the ring circuits. By thus employing a coincidence circuit the condition of the rings and also the condition of the switches associated with each stage of the ring must be identical at both ends to recover the message of the receiving station of the system. Without the coincidence circuit the switches associated with each of the stages of each of the rings need only be set in the same sequence. However, by employing a coincidence circuit such a setting is not sufficient for proper operation of the system. Instead with a coincidence circuit it is necessary that the corresponding switches of each stage of each ring at both ends of the system have the same positions.

The output circuits of each of the ring circuits are combined or added together by a reentry circuit 469. This circuit is arranged to transmit a pulse of one character, say marking or "on" character, when the pulses supplied to it from the thirteen-stage ring and the eleven-stage ring are both the same character, that is when they are both "on" pulses or both "off" pulses. In case the two pulses supplied to the reentry circuit are of opposite character it is arranged to transmit pulses of the opposite; i.e. spacing or "off" character. This reentry circuit may be arranged to transmit pulses opposite in character to the character described above in response to the various signal conditions applied to it as described above. The output of the reentry circuit together with the output of the coding circuits are simultaneously applied to an enciphering circuit 438 which accomplishes substantially the same results as the reentry circuit 469 except that unlike pulses produce marking pulses and like pulses produce spacing pulses. The enciphering circuit 438 after combining the two sets of pulses as described above transmits them to the amplifier and gate circuit 439.

The gate 439 is supplied from the 320 kilocycle oscillator 410 through the pulse forming or generating circuit 436 and a pulse position or time modulator circuit 444. Circuit 444 will be described hereinafter. The pulses from the 320 kilocycle oscillator are supplied at the rate of 320,000 pulses per second and are transmitted through the gate 439, under control of the ciphered pulses, to the radio system 450 which is frequently located on a radio tower and in the specific embodiment described herein comprises a video amplifier 451 and a pulsed oscillator or pulsed amplifier 452. The high frequency radio signals are then radiated from the antenna and/or other directing equipment 453.

These signals may then be transmitted through any number of intermediate relay repeater stations to the receiving terminal where they are received by the directive antenna system 753. The signals together with current from the beating oscillator 733 are applied to the crystal detector 734 which reduces the carrier frequency of the incoming signals after which the lower or intermediate frequency amplifier 732 amplifies the pulses or spurts of intermediate frequency and transmits them to another intermediate frequency and video amplifier 735. The radio equipment 731 is usually located on a tower near the directive antenna system 753. All of this equipment is designated 730 on FIG. 7.

The amplifier 735 includes intermediate frequency amplifier 736, the second detector 737, video amplifier 738 and a pulse limiting or shaping amplifier and equipment 739.

The radio equipment including transmitting equipment 450, receiving equipment 730 and 735 and all of the components thereof mentioned above may be of any suitable design and include any and all suitable types of apparatus and equipment. The exemplary system described herein makes use of the radio equipment of the AN/TRC-6 equipment supplied to the Signal Corps and described in War Department Technical Manual TM11-631 which manual is hereby made a part of the present application as fully included herein.

It is understood of course that any other suitable equipment may be employed for transmitting the signals from the gate circuit 439 to the new pulse generator 711 to be described hereinafter. This other equipment may include open-wire line circuits, cable circuits, coaxial circuits, wave guides or other transmission structure or media arranged to have a sufficiently wide frequency band to transmit the individual pulses described above.

At the receiving station the output of the radio amplifier 735 or the output of any other transmission apparatus comprises pulses similar in character to those delivered by the gate circuit 439. The new pulse generator 711 generates new pulses under control of the received pulses, which new pulses have lengths which are independent of the received pulses and most suitable for controlling the receiving equipment.

The receiving station has a keying circuit for generating key pulses similar to those generated by the key equipment at the transmitting station. The switches 765, 766, etc. of course are set in the same condition as the corresponding switches 465, 466, etc. of the thirteenth-stage ring at the transmitting station. Likewise, switches 775, 776, etc. of the eleven-stage ring at the receiving station are set in the same condition as the switches 475, 476, etc., of the eleven-stage ring at the transmitting station. Likewise, switches 880 and 780 are set in the same position as corresponding switches 325 and 480 at the transmitting station. The same applies to switches 790 and 890 and switches 490 and 326. With these switches all set in the same positions at the two ends of the system and with the key equipment as well as the synchronizing equipment properly synchronized at both ends of the system, the key equipment at the receiving station supplies a key to the deciphering circuit 712 which is identical with the key which the key equipment at the transmitting station supplied to the enciphering circuit 438.

The deciphering circuit 712 at the receiving station combines the pulses from the new pulse generator and the key pulses from the key circuit and recovers the coded pulses substantially in the same manner as the enciphering circuit combines the code pulses and the key pulses to form the enciphered pulses.

The deciphered code pulses are then transmitted over conductor 701 through the video amplifier 810 to the decoding equipment and the complex signalling waves recovered in the manner previously described herein.

Synchronizing

In the foregoing description it has been assumed that the receiving station was synchronized accurately with the equipment at the transmitting station. In other words, it has been assumed that, except for the delays pointed out above, the five-stage ring at each station has the same stage actuated at each station and that the eight-stage rings are properly coordinated at the two ends of the system, although not with the same stages simultaneously actuated as will be pointed out hereinafter. In addition, it has been assumed that the keyers are similarly conditioned and that the same stages of the eleven-stage and thirteen-stage rings in the keyers at the two ends of the system are similarly actuated at all times.

Persons skilled in the art will, of course, appreciate that when power is first applied to the two ends of the system the equipment at both the transmitting and receiving stations will not be so synchronized unless by mere accident which would not occur very often.

One of the objects and features of the present invention is to provide equipment and circuits to automatically cause the equipment at the receiving end to come into proper synchronism or phase with the equipment at the transmitting station. In order for this to be accomplished it is necessary that the eight-stage ring separate the incoming pulses into the proper code groups of five pulses so that each of the pulses comprising a code group are delivered to the proper decoding equipment. In addition, it is necessary that the five-stage and eight-stage rings be properly synchronized and phased so that they may properly drive the keyer equipment at the receiving station and thus maintain this equipment in proper synchronism and phase with the keyer equipment at the transmitting station. In other words, it is necessary to have both the multiplex equipment and the key equipment at both stations in proper phase in order to decipher and decode the received signal pulses and then distribute the resulting signals to the proper channels so that the complex wave or speech current may be reconstructed and transmitted to the proper destination. Considering the multiplexing and decoding equipment first, it should be pointed out that 40 pulse intervals, that is eight times five, comprises a complete cycle or frame of the entire multiplex system. In other words, five pulses each of which may be of either a marking or a spacing character are transmitted for each of the eight channels, the pulses of each channel comprising a code combination. Then the cycle is repeated with code groups of pulses again transmitted from each of the eight channels and so on. This means that there are 40 different possible relative positions between the multiplex equipment at the receiving station and the multiplex equipment at the transmitting station. In order to properly synchronize this equipment at the receiving station with the equipment at the transmitting station, it must be possible to recognize the correct one of the 40 relative positions and then maintain the equipment at the receiving station in this particular orientation.

If the equipment at the receiving station were initially caused to run slightly faster or slightly slower than the equipment at the transmitting station, then over a period of time the equipment at the receiving station would occupy each one of the 40 different possible periods of time. For example, if the oscillator at the receiving station were to operate at one cycle per second slower than the oscillator at the transmitting station, then in 40 seconds the equipment at the receiving station would have been in each one of the 40 possible positions relative to the corresponding equipment at the transmittion station. Furthermore, if some distinctive signal were applied to one of the channels of the system and then this signal recognized at the receiving station on the channel in question, then this signal could be employed at the receiving station to change the rate of operation of the receiving equipment so that the equipment at the receiving station could be maintained in synchronism with the equipment at the transmitting station.

It is, of course, apparent that the signaling pulses have a relatively large frequency component of 320 kilocycles, which may be obtained from the received pulses and employed to lock or maintain the crystal oscillator at the receiving station in accurate frequency and phase relationship with the incoming pulses and thus with the oscillator equipment at the transmitting station. However, this frequency component cannot be employed to determine when the multiplex equipment, that is, the five-stage and eight-stage ring, are in the proper phase or orientation in the system. However, by employing a distinctive signal to indicate when the multiplex equipment is in proper synchronism at the two ends of the system, this signal may then be employed to control the injection of the 320 kilocycle component from the received pulses into the crystal-controlled oscillator circuit which will thereafter maintain the equipment at the two ends of the system in proper synchronism.

There is, however, the additional requirement that the key equipment at the two ends of the system also be in actual synchronism. For the keying equipment to be in synchronism at the two ends of the system, it is first necessary that the corresponding keys associated both with the eleven- and thirteen-stage ring output circuits as well as the keys associated with the driving circuits for these rings be set in identical positions at the two ends of the system. If they are not so set, it is impossible to obtain the same key at both the transmitting and receiving stations. Consequently, it will be impossible to properly decipher the signals at the receiving station and thus impossible to drive the key equipment at the receiving station in the same manner as it is driven at the transmitting station.

When the keying equipments at the two ends of the system are not in synchronism, the signals on each of the voice frequency channels sound substantially the same as the signals on the high frequency radio channel when received with an ordinary amplitude or frequency modulation radio receiver. In other words, they appear as noise and the noise is of a considerable magnitude or volume. This noise is due to the fact that the key pulses are essentially random in character and when combined with the code pulses produce substantially random enciphered pulses. Such random pulses appear and sound like noise. When the receiving equipment is out of synchronism the pulses applied to any receiving channel are likewise a random character and hence also appear as noise.

This characteristic of the system including the keying equipment has been employed in the synchronizing of the system by employing the change from high level noise on the low frequency channels at the receiving station when the systems are not in synchronism to a low level of noise when the systems become synchronized. Thus by setting aside one channel and applying nothing but low level noise to this channel at the transmitting station and then at the receiving station automatically measuring the level of noise received on the corresponding channel it is possible to cause the systems to become automatically synchronized. The keying equipment, however, has to be properly conditioned so that the high level noise will always be presented on the selected channel at the receiving station so long as the equipment at the receiving station is not properly synchronized with the equipment at the transmitting station. This is accomplished by appropriate setting of the switches associated with the stepping circuits of the keying equipment. If for example, one of the switches associated with the selection of the channel time during which a keyer stepping pulse may be suppressed, as will be described hereinafter, is always set in the zero position at both ends of the system, the predetermined channel No. 1, for example, will always have high level noise at the receiving station, unless the equipment at both stations is properly synchronized.

In the keyer circuit there are 143 possible different relative positions between the eleven- and thirteen-stage rings at the two ends of the system, in other words, 11 times 13 different possible relative positions between these rings of the transmitting and receiving keyers. However, all of these different positions are not entirely independent one from the other because it can be shown that if the sequence of the setting of the keys were the same for each ring, although displaced in stages one from another, the equipment at the receiving station would operate properly with the equipment at the transmittion station, even though the switches at the two ends were not identical on each stage. For example, let us assume that in the eleven-stage ring at the transmitting end the keys individual to the odd stages are operated in one direction, say up, and that the keys of the even stages are in the opposite direction, down. This means that the keys are all alternate except for stages eleven and one which are both odd and thus have both keys actuated in the same direction. Without the coincidence circuits it is possible to operate the keys at the receiving station so that the system would operate properly if the same sequence were maintained, that is, the keys operated alternately, but some place in the circuit two successive keys would have to be actuated to their upper position. If this occurred for stages 5 and 6, for example, then the equipment would operate satisfactorily with stage 6 of the receiving ring actuated at the same time that stage 1 of the transmitting ring was actuated. Thereafter the two rings would stay in corresponding relative positions and deliver the proper corresponding output pulses to their respective output circuits. Consequently, even though the switches at the receiving keyer were set differently from the switches at the transmitting keyer the system would operate properly. Thus, the 143 different positions are not all independent or unique relative one to another and in order to avoid this difficulty there was provided the coincidence circuit which delays one ring every time one of the stages, say, the No. 1 stages, are simultaneously actuated. This reduces the number of different relative positions between the transmitting and receiving keyers to 78. However, each one of these 78 positions is unique so that the switches at the two ends have to correspond stage for stage throughout both rings of both keyers.

During the time the multiplex equipment is searching through these relative positions in the manner described above, the key equipment at the receiving station will also be operated in a random manner through the various relative positions which it may assume relative to the key equipment at the transmitting station. The change in the relative positions of the key equipment at the two ends of the system at this time is due to the fact that different driving pulses due suppressed and also are to the fact that the driving pulses are supplied to the two keying generators at different rates. However, once the receiving key equipment has been actuated to the orientation corresponding to that at the transmitting equipping and at the same time the multiplex equipment is in the proper orientation, the keying equipment at the receiving station will thereafter be maintained in synchronism with the keying equipment at the transmitting station because it will receive the stepping or driving pulses at the correct instants of time and will have these driving pulses suppressed at the proper instants of time relative to the received signals and relative to the proper orientation of the multiplex equipment. At this time the noise level of all of the channels will change from a high value to a low value and the equipment responsive to this change in channel 1 will then lock the receiving oscillator in synchronism with the incoming signals and thus maintain the entire receiving equipment in synchronism with the transmitting equipment at the transmitting station.

Such an arrangement is particularly advantageous in systems of the type described herein operating over radio paths because it will automatically synchronize itself after each interruption of the transmission path, as frequently happens on radio paths. Thus the channel time lost due to channel interruption and loss of synchronism due to other extraneous interfering currents is reduced to a minimum.

ORDER WIRE CIRCUIT

In addition to the regular communication channels provided as described above, it is usually desirable to provide a service channel which is frequently called an "order wire" to permit the attendants at the terminals and also at the intermediate repeater stations when such are provided to communicate with each other for maintaining the system in proper adjustment and operating condition. In order to provide such an order wire circuit means have been provided for employing the entire array of enciphered pulses analogous to a carrier current and for time or position-modulating these pulses in accordance with signals desired to be transmitted over the order wire channel. The time or position modulation of the entire array of enciphered pulses which occur in a random manner in somewhat analogous to phase modulation of a carrier current.

The handset 460 represents a source of order wire signals. Any other suitable source other than the handset may be employed and as is described in detail in the above-identified application of Anderson-Edson 10-14 any suitable communication path may be interposed between the actual source of the signals and the order wire equipment described herein. The order wire signals from the handset 460 for example may be transmitted through a hybrid coil 441 or they may be transmitted directly to a pulse position modulation circuit 444 as described in detail hereinafter. These order wire signals are employed in the pulse position modulation circuits to vary the time of occurrence of the pulses from the 320 kilocycle oscillator in accordance with the order wire signals to be transmitted. In other words, the pulses from the pulse generator 436 are equally spaced one from another and occur in regular succession under control of the output of the 320 kilocycle oscillator. The pulse position modulation system and circuits 444, however, vary the time of occurrence of these pulses so that they are irregularly spaced in time by a small amount in accordance with the order wire signals. These modulated pulses are supplied to the gate circuit 439 which transmits them or suppresses them, under control of the enciphering circuit 438 as described above, with the result that the pulses from the gate circuit 439 occur in accordance with the currents of the pulses from the enciphering circuit 438. In other words, the character of each pulse whether it may be marking or spacing is controlled by the enciphering circuit 438. However, the time of occurrence of these pulses is controlled by the order wire signals. It should be pointed out that the time of occurrence of the pulses is limited to a given pulse interval. If the pulses were not so limited the order wire circuit might cause the pulses to be advanced or retarded into a pulse interval assigned to another pulse and thus add noise or distortion to the signals represented by the ciphered pulses. The radio equipment described above is capable of transmitting the pulses when they are both enciphered and position modulated so that similar pulses which are both ciphered and time or position modulated are delivered to the new pulse generator 711. The new pulses from the new pulse generator 711 are similarly modulated. These new pulses have been supplied to the deciphering circuits 712 where they are deciphered and then sent to decoder to be decoded in the manner described above. The new pulses from the new pulse generator 711 are employed to control the phase of an alternating current which is also supplied to the pulse position demodulation circuits 713. This demodulator circuit is also supplied by a reference current from the oscillator 710. The pulse position demodulator circuit 713 compares the current controlled by the pulses from the new pulse generator 711 with the reference current and derives the order wire signals from them and transmits them to the corresponding order wire receiving device 960 through the hybrid coil 941 when it is necessary or desirable to employ such a hybrid coil. In case it is unnecessary to employ a hybrid coil the connections to this coil are changed so it is used as an output transformer from which the signals are transmitted to the receiving device 960 of the order wire circuit.

The opposite direction of transmission over the order wire circuit is provided over the circuits operating in the opposite direction in the same manner as described above for the transmission of signals from the handset 460 to the handset 960.

It is thus apparent that it is possible to transmit the coded pulses from the transmitting station to the receiving station without first enciphering them or time position modulating them. It is also possible to encipher these signals without time position modulating them when it is desired and then convey the ciphered pulses to the receiving station or it is possible to perform all of these functions simultaneously.

DETAILED DESCRIPTION

FIGS. 5, 6, 9, 10 and 12 through 48, inclusive, show in detail the circuits at the transmitting and receiving terminals of an exemplary system embodying the present invention. FIGS. 12 through 31 show in detail the equipment at one terminal for terminating seven incoming voice frequency channels a synchronizing channel and an order wire channel. The transmitting equipment required to convert or translate signals incoming from the seven voice channels and the synchronizing channel into code groups of pulses representing these signals is also shown in detail as is the equipment for generating the cipher key for enciphering the pulse code groups before they are transmitted. FIGS. 32 through 48, inclusive, show the the corresponding receiving equipment at the receiving terminal of the system for deciphering the pulses and then decoding them and finally deriving from them signaling waves similar to those applied to the system at the first terminal.

A transmission path in the opposite direction is shown in outline form in FIGS. 9 and 10 at the second terminal and in FIGS. 5 and 6 at the first terminal. Inasmuch as the equipment represented by FIGS. 9 and 10 at the second terminal is substantially the same and operates in substantially the same manner as the corresponding equipment shown in detail in FIGS. 12 and 31 at the first terminal, and inasmuch as the equipment shown in outline form in FIGS. 5 and 6 at the first terminal operates in substantially the same manner and substantially the same as the equipment shown in FIGS. 32 through 48, inclusive, there is no object in duplicating the description of this equipment in any greater detail for the transmission in the opposite direction; the interconnections between the transmissions in both directions being clearly shown in detail at both terminals.

Control Equipment

The operation of the complete system may be more readily understood if the operation of some of the common control equipment is described first so that its operation will be readily understood when reference to it is required in order to explain and understand the operation of the other elements of the system.

Figure 24:
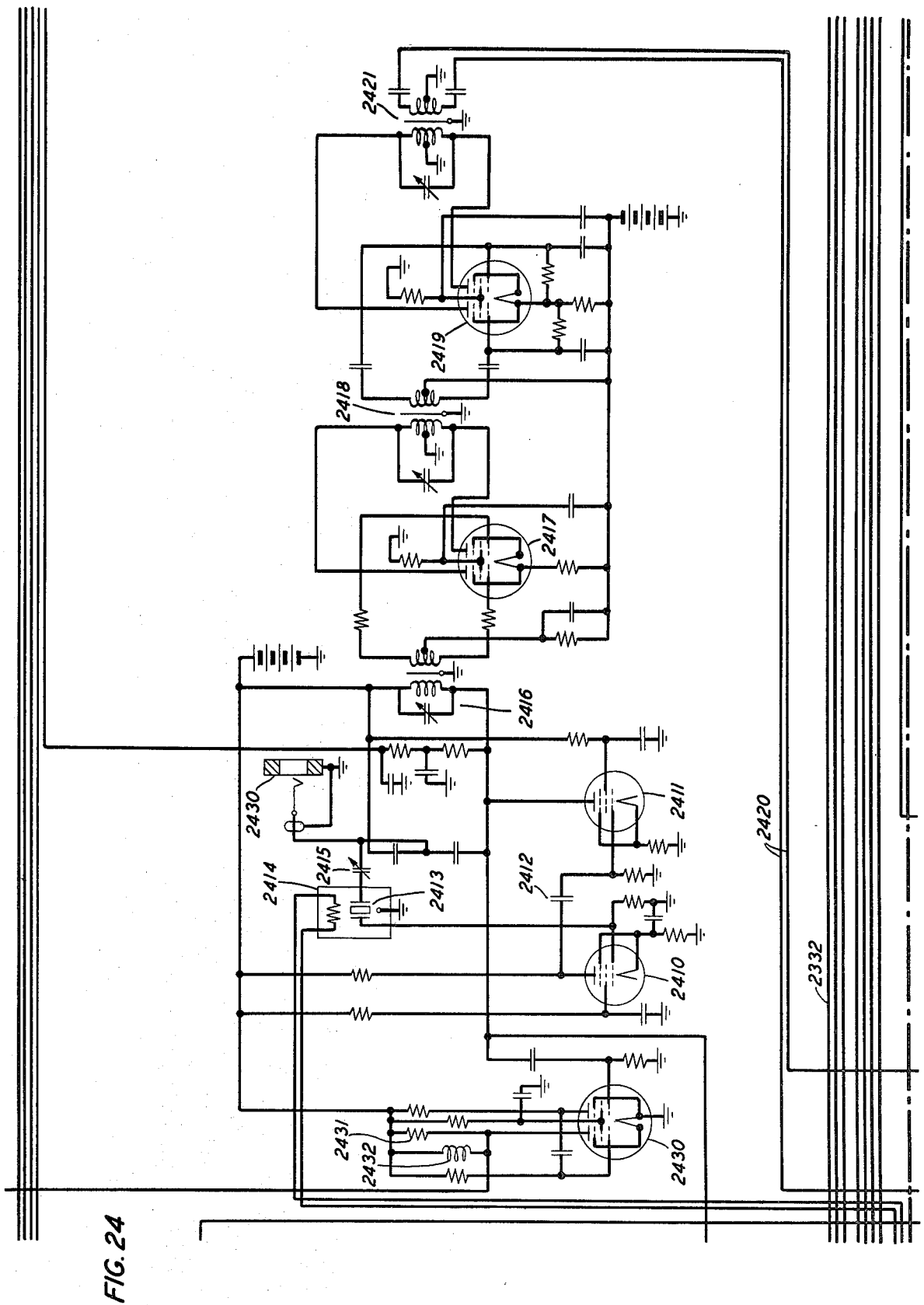
Figure 25:
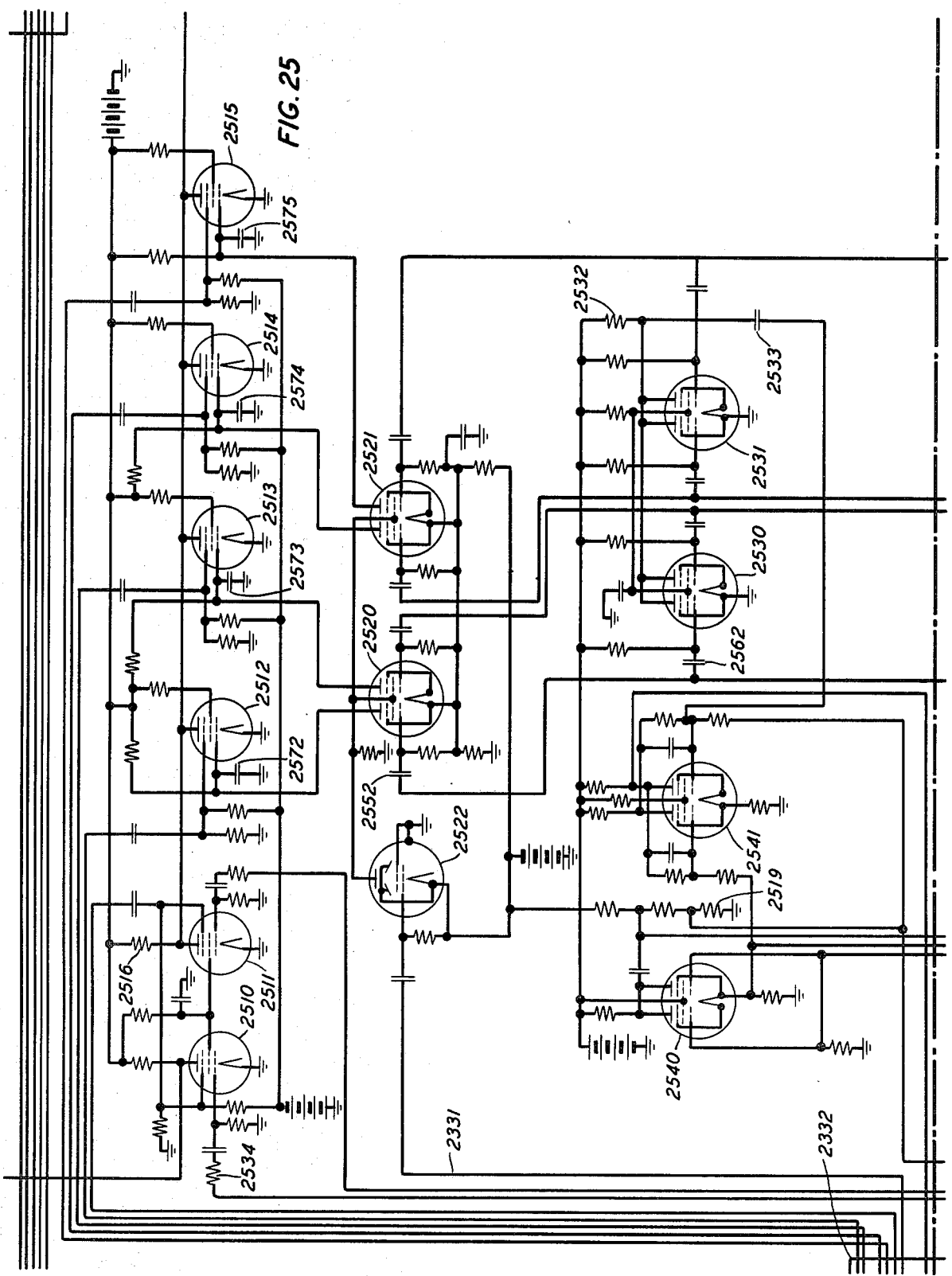
Figure 26:
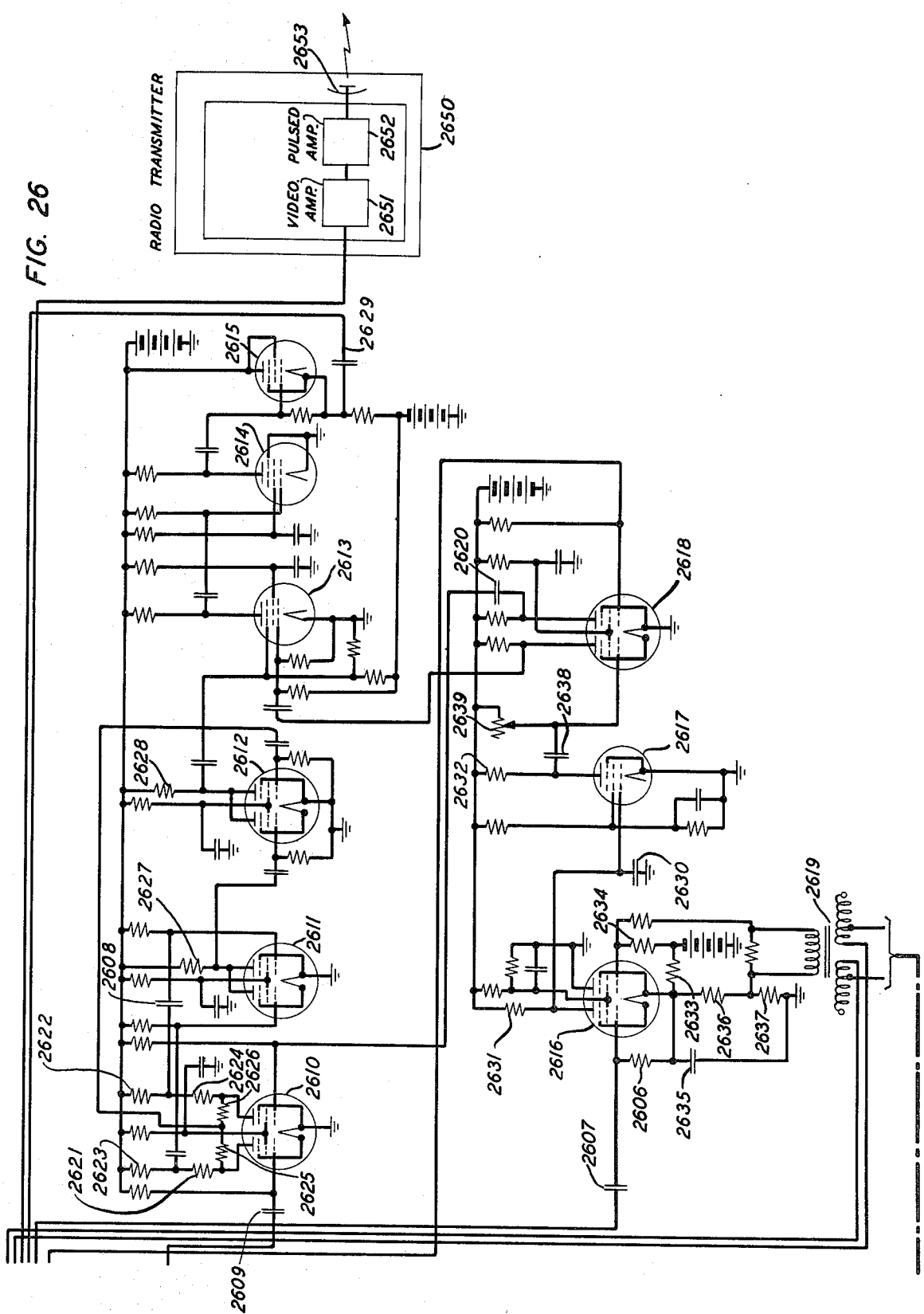

The operation of the complete system is under control of an oscillator shown in FIG. 24. Inasmuch as this oscillator controls the timing and operation of the complete system and inasmuch as the receiving equipment must be maintained in synchronism with the equipment at the receiving station, it is desirable that this oscillator have a high degree of stability.

In the exemplary system described herein the oscillator comprises tubes 2410 and 2411. The output of tube 2410 is coupled to the input of tube 2411 through condenser 2412, while the output of tube 2411 is fed back through the crystal 2413 to the input of tube 2410. The crystal 2413 is operated at a constant temperature in oven 2414 in the well-known manner to maintain its frequency characteristics substantially constant and independent of the ambient temperature. The crystal 2413 operates at its series resonant point so that the small series condenser 2415 may be employed to make small adjustments in the frequency of the output wave. As pointed out hereinbefore, in the exemplary embodiment described herein this oscillator oscillates at a frequency of 320 kilocycles per second. This oscillator is employed to control a number of different circuits.

Transformer 2416 together with the impedance connected in shunt with it forms the load impedance for tube 2411 and is tuned to 320 kilocycles. As a result a balanced 320 kilocycle voltage is applied to the grid of both sections of tube 2417 which operates as a fifth harmonic generator. The output impedance of this harmonic generator is tuned to 1600 kilocycles by transformer 2418. As a result the fifth harmonic of 320 kilocycles or 1600 kilocycles is applied to both grids of tube 2419 which operates as an amplifier. The output of this tube is applied to conductors 2420 as a balanced 1600 kilocycle voltage through transformer 2421 which is tuned to 1600 kilocycles. The tuned transformer 2418 and 2421 together with the fifth harmonic generator tube 2417 and amplifier tube 2419 produce and amplify the fifth harmonic of the 320 kilocycle voltage obtained from one tube 2411 through transformer 2416 and suppress or eliminate the fundamental and all other harmonic frequencies of this oscillator.

A portion of the output of tube 2411 is coupled through the network comprising resistors 2310 and capacitors 2311 to the grid of the right-hand section of tube 2312. The coupling network comprising resistors 2310 and capacitors 2311 is employed to prevent the operation of the circuits of tube 2312 from interfering with the operation of the oscillator and to control the phase of the 320 kilocycle voltage applied to the control grid of the right-hand section of tube 2312. The grid of the right-hand section of tube 2312 remains positive for about 1 microsecond.

Figure 49:
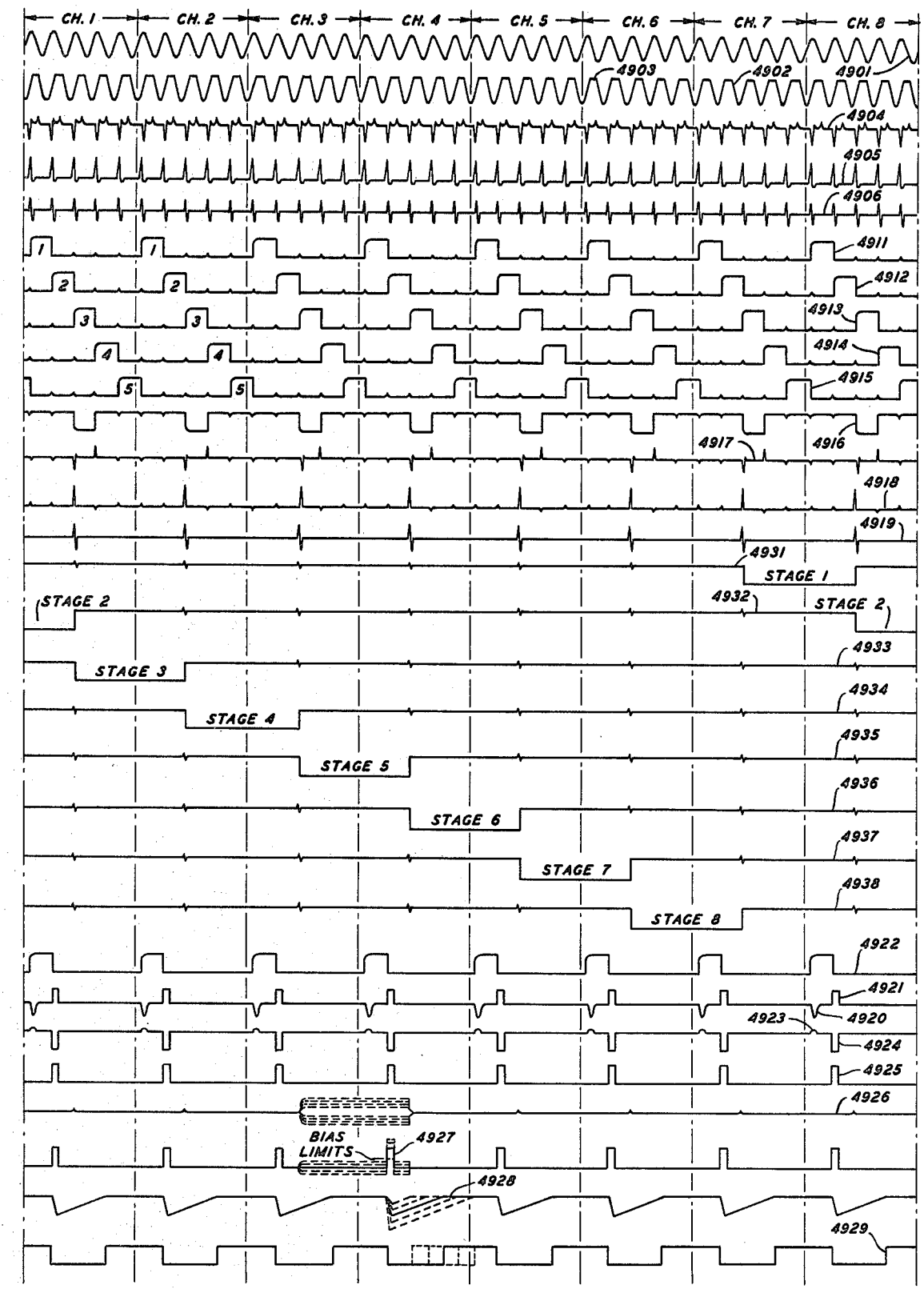

Curve 4901 of FIG. 49 shows the wave form of the output of oscillator tube 2411 and curve 4902 shows the wave form of the potential of the control grid of the right-hand section of the tube 2312. It should be noted that the top of the curve is cut off flat for about 1 microsecond, as shown at 4903, due to the low grid to cathode impedance caused by the positive potential on the control grid of this section at this time.

The plate circuit of the right-hand side of tube 2312 includes inductance coil 2313 which differentiates the voltage wave which appears in the plate circuit as a result of the wave applied to the control grid. Due to the differentiating action the voltage across 2313 appears as a sharp negative pulse at a time corresponding to the beginning of the flat top at 4903 of curve 4902, FIG. 49, and a sharp positive pulse at the end of the flat top. The voltage across the coil is applied to the grid of the left-hand section of 2312 through the coupling condenser 2314.

The positive pulse at the end of the 1 microsecond is suppressed by low grid impedance of the left-hand section of tube 2313 when this control grid is positive.

Due in part to the action of the inductance 2313 at the beginning of the positive microsecond pulse applied to the control grid of the right-hand section of tube 2312 a large negative pulse is applied through the coupling condenser 2314 to the grid of the left-hand section of tube 2312. This negative pulse applied to the grid of the left-hand section of tube 2312 is amplified and produces a sharp pulse in the plate circuit of this section of tube 2312. Curve 4904 shows the wave form of the sharp negative pulses applied to the grid of the left-hand section of tube 2312 and curve 4905 shows the wave form of the amplified positive pulses in the plate circuit of this section of tube 2312.

Figure 23:
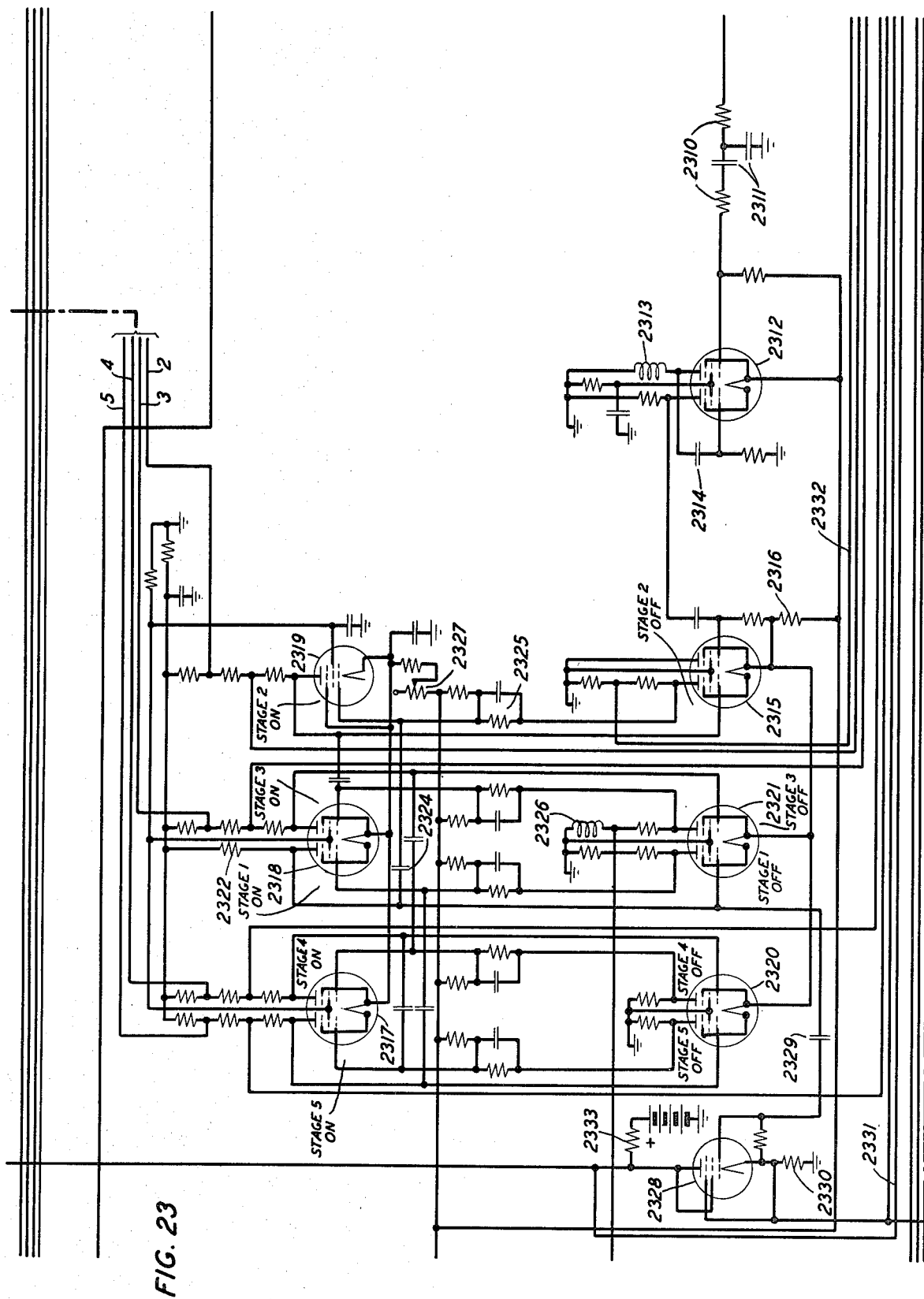

This positive pulse is applied to the grid of the right-hand section of tube 2315. The right-hand section of tube 2315 operates as a cathode follower and causes a positive pulse to appear across the cathode resistor 2316 in response to the positive pulse applied to its grid. The right-hand section of tube 2315 operates as a driver tube for a five-stage ring circuit as shown in FIG. 23.

The five-stage ring circuit comprises tubes 2317, 2318, 2319, 2320, 2321 and the left-hand section of tube 2315. Each of the five-stages comprises two tubes sometimes called an "on" tube and an "off" tube. Stage 1 comprises an "on" tube which is the left-hand section of tube 2318 and an "off" tube which is the left-hand section of tube 2321. Stage 2 comprises the "on" tube 2319 and the left-hand section of tube 2315 as the "off" tube. Stage 3 comprises an "on" tube which is the right-hand section of tube 2318 and an "off" tube which is the right-hand section of tube 2321. Stage 4 comprises an "on" tube which is the right-hand section of tube 2317 and an "off" tube which is the right-hand section of tube 2320 while stage 5 comprises an "on" tube which is the left-hand section of tube 2317 and an "off" tube which is the left-hand section of tube 2320.

These pairs of tubes and their associated equipment in each stage are arranged in the form of a double stability circuit some forms of which are sometimes called Eccles-Jordan trigger circuits. The double stability circuits are arranged so that the circuit is stable in either one of two conditions or positions. One condition of stability is with one tube conducting and the other tube non-conducting, while the other condition of stability is with the first tube non-conducting and the other conducting. In the exemplary system described herein the tube which is normally conducting is called the "on" tube while the tube which is normally non-conducting is called the "off" tube.

The cathodes of all of the "off" tubes are provided with a common cathode resistor 2316 which is also the cathode resistor of the driver section of tube 2315. The potentials applied to the various tubes are such that only one of the "off" tubes of the ring may be conducting at any one time. If more than one should attempt to become conducting due to some trouble or stray condition the potential drop across the cathode resistor 2316 would rise and thus extinguish one or both of the conducting tubes after which only one of the "off" tubes will conduct.

The potentials supplied to these tubes are also such that some one of the "off" tubes will start to conduct upon application of power to the system and thus cause all the other "off" tubes to remain non-conducting whereas all but one of the "on" tubes will be conducting and the "on" tube associated with the conducting "off" tube will be non-conducting. The particular stage which starts in the operative or actuated condition will be determined by various small differences in the tubes and circuit elements of the various stages.

Let us assume for the purpose of illustration that the stage number 1 first becomes actuated to its operative condition, that is, the left-hand section of tube 2321 becomes conducting while all of the other "off" tubes remain non-conducting and the left-hand section of tube 2318 remains non-conducting while all of the other "on" tubes become conducting. Then upon the application of a positive pulse to the common cathode resistor 2316 from the control oscillator through tube 2312 in the manner described above, the potential of the cathodes of tubes 2320, 2321 and 2315 rises or becomes more positive. This is equivalent to a negative pulse applied to the grid of the left-hand section of tube 2321 which interrupts the current flowing in its anode circuit. As a result the potential of the anode of the left-hand section of tube 2321 rises and becomes more positive. The anode of this section being connected to the control grid of the left-hand section of tube 2318, it likewise tends to become more positive and current is caused to flow in the anode circuit of this section of tube 2318. When current flows in the anode circuit of the left-hand section of tube 2318, it produces a potential drop across the resistor 2322 and thus lowers the potential of the anode of this tube and the control grid of the left-hand section of tube 2321 thus insuring that tube 2321 will be maintained in its non-conducting condition while tube 2318 is in its conducting condition.

The anode of the "on" tube of stage 1, namely the left-hand section of tube 2318, is coupled through a coupling condenser 2324 to the control grid of the "on" tube of stage 2. Consequently when the left-hand section of tube 2318 becomes conducting a negative pulse applied to the grid of tube 2319 causes the tube to become non-conducting with the result that the anode potential becomes more positive. The anode of this tube is connected to the control grid of the "off" tube of stage 2, that is the left-hand section of tube 2315, which likewise becomes more positive and causes this section to become conducting. This section in becoming conducting applies a negative potential to the grid of tube 2319 through the coupling network 2325 which maintains tube 2319 non-conducting until the next driving pulse applied to the common cathode resistor 2316.

Thus the application of a positive pulse from the oscillator to the common cathode resistor 2316 restored the stage 1 of the five-stage ring to its normal or unoperated position or condition and causes stage 2 to be actuated to its operated or "on" position. In a similar manner each of the succeeding positive pulses applied to the common cathode resistor 2316 restores the actuated stage, i.e., turns off the "off" tube and turns on the "on" tube and actuates the succeeding stage to its operative condition i.e., turns off the "on" tube and turns on the "off" tube or section. Since one positive pulse is applied to the common cathode resistor 2316 for each cycle of the 320 kilocycle current generated by the controlling oscillator, each stage will be actuated for substantially a complete cycle of the controlling frequency and then off for 4 cycles during which each of the other stages are turned on for one cycle. Output currents or potentials are obtained from each of the stages for controlling various other circuits as will be described hereinafter. Lines 4911, 4912, 4913, 4914 and 4915 of FIG. 49 show the wave shape of the pulses obtained from the "on" tubes of each of the respective stages 1 through 5 of the five-stage ring circuit.

Figure 22:
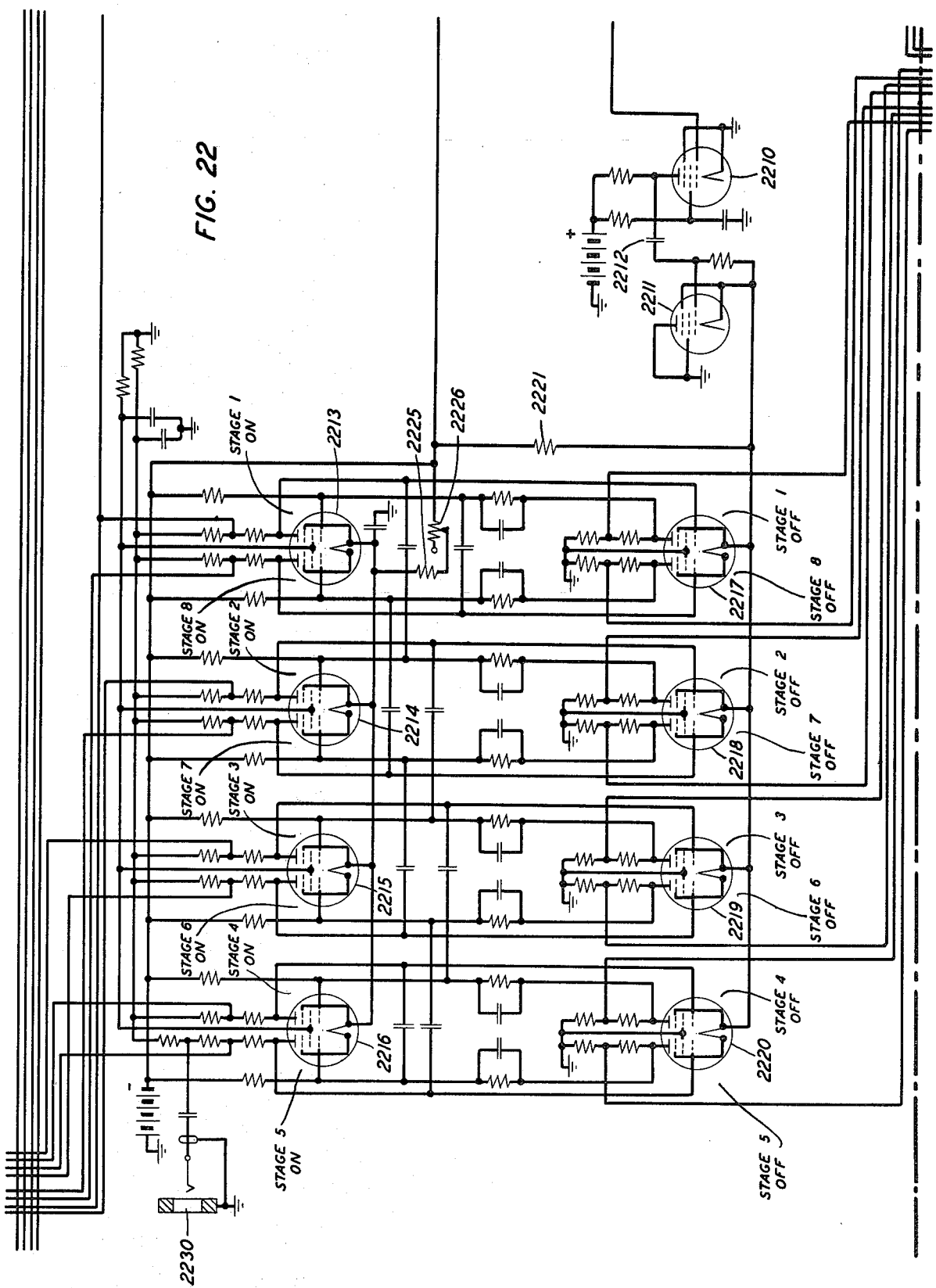

FIG. 22 shows an eight-stage ring distributor or electronic switch similar to the five-stage ring shown in FIG. 23. Each stage comprises an "on" tube and an "off" tube. Two "on" tubes and two "off" tubes are included in a single envelope as shown in FIG. 22, thus the "on" tubes are illustrated at 2213 through 2216, respectively. The right-hand section of 2213 comprises the "on" tube of stage 1 and the left-hand section the "on" tube for stage 8. The right hand section of tube 2214 is the "on" tube for stage 2 and the left-hand section the "on" tube for stage 7, etc. The off tubes comprise tubes 2217 through 2220. All of the "off" tubes have a common cathode resistor 2221 similar to the common cathode resistor 2316 for all of the "off" tubes of the five-stage ring.

The input or control grid of tube 2210 is connected to the output circuit of the off tube of stage 3 of the five-stage ring, that is to the output circuit of the right-hand section of tube 2321. The right-hand section of this tube has an inductance 2326 connected in series with its anode. When this section starts to conduct, that is when stage 3 of the five-stage ring is actuated to its operated condition a negative pulse is generated across the inductance 2326. When this stage is restored to its off condition a positive pulse will be generated across the inductance 2326. Graph 4916 of FIG. 49 shows the manner in which the potential of the anode of the right-hand section of tube 2321 varies with time. Each time this off tube conducts its anode potential falls as shown by the curve. Graph 4917 shows the short positive and negative pulses across inductance 2326.

These pulses are applied to the control grid of tube 2210. Due to the positive bias voltage applied to this tube through the direct current connection between its grid and the plate of tube 2321, the grid circuit attenuates or suppresses the positive pulses applied to it. The tube however amplifies the negative pulses which due to the inverting action of the tube appear as positive pulses in the output circuit of the tube as shown by graph 4918 of FIG. 49. These pulses are applied through the coupling condenser 2212 to the control grid of tube 2211. Tube 2211 operates to cause a corresponding positive pulse to appear across the common cathode resistor 2221 in response to each positive pulse applied to its control grid. Graph 4919 shows the manner in which the voltage across the cathode resistor 2221 varies with time. This positive pulse causes the conducting "off" tube to be turned off and the corresponding "on" tube to be turned on in an analogous manner to the manner in which the five-stage ring is advanced as described above. Due to the "on" tube starting to conduct the succeeding stage is actuated to its operated position, that is with the "off" tube turned on and the "on" tube turned off.

The above conditions then prevail until another negative pulse from stage 3 of the five-stage ring is applied to the control grid of tube 2210. This negative pulse is then changed into a positive pulse as described above and applied to the cathode resistor 2221 to cause the eight-stage ring to be advanced to the next stage. Thus each stage of the eight-stage ring is turned on for one complete cycle of the five-stage ring. Then the next stage of the eight-stage ring is turned on for its succeeding cycle or revolution of the five-stage ring. It should be noted that each of the stages of the eight-stage ring is turned on for ⅛ of the time and turned off for ⅞ of the time during which time each of the 7 other stages are turned on for ⅛ of the time. As pointed out above the frequency of the control oscillator is 320 kilocycles per second. Each cycle of the five-stage ring requires 5 of these cycles of the 320 kilocycle current so that the five-stage ring operates at a rate of 1/5 of 320 or 64 kilocycles per second. The eight-stage ring operates at a rate which is ⅕ of the rate of the five-stage ring or a rate of 8,000 revolutions or cycles per second. Each of the stages of both the five-stage and the eight-stage ring provide output circuits which are employed to control other circuits and equipment as will be described hereinafter. Graphs 4931 through 4938 of FIG. 49 show the way of the voltage of the anodes of the "off" tubes of the corresponding stages 1 through 8 vary with time. It should be noted that the oscillator shown in FIG. 24 and described above, as well as both the five-stage ring and the eight-stage ring continuously operate in the manner described above independently of character of any of the signals transmitted or received by the system.

In addition to the above-described continuously operating circuits a continuously operating noise generating circuit is provided which comprises a gas tube 1910. This tube is continuously passing current and is in an ionized condition. One of the electrodes of this tube is connected through the coupling condenser 1911 to the control element of the right-hand section of tube 1912. This section of tube 1912 amplifies the noise currents or voltages produced within the tube 1910 due to a gaseous conduction therein. Sufficient current is passed through the tube 1910 to cause a desired amount of noise to be generated in its circuit. This noise of course is of a random nature and of a wide frequency range. The frequency range of this noise is largely limited by the frequency of the equipment connected to the tube. In order to secure a wide frequency range of output noise the amplifier comprising tube 1912 and 1913 is designed to amplify and pass a wide frequency range. The noise after being amplified by the right-hand section of tube 1912 is applied through the coupling condenser 1914 to the control element of the left-hand section of tube 1912. These noise pulses are then amplified by a two-stage amplifier comprising tube 1913. The left-hand section of tube 1912 is provided with two bias resistors 1915 and 1916. Bias in this tube is adjusted by means of these resistors so that the positive noise peaks just cause grid current to flow in the grid circuit of the left-hand section of tube 1913 and negative noise peaks just drive the left-hand section of tube 1913 to cut-off. The second stage of this amplifier comprising the left-hand section of tube 1913 operates in part as a cathode follower so that the noise voltage may be taken off the cathode resistor 1917 and applied to other circuits. Due to the fact that it is desirable to have the output of the amplifier 100 percent random, the output should have no repetitive frequency components such as 60 cycle or other frequencies. It is therefore desirable to shield this amplifier and to employ filters to filter all undesirable variations of the anode supply voltages. A portion of the noise voltage is also taken off the plate circuit and applied to an alarm circuit as will be described hereinafter. The noise voltages generated are then applied to the incoming voice frequency channels over the connection 1918 as will be described hereinafter.

Voice Channel Terminations

Figure 21:
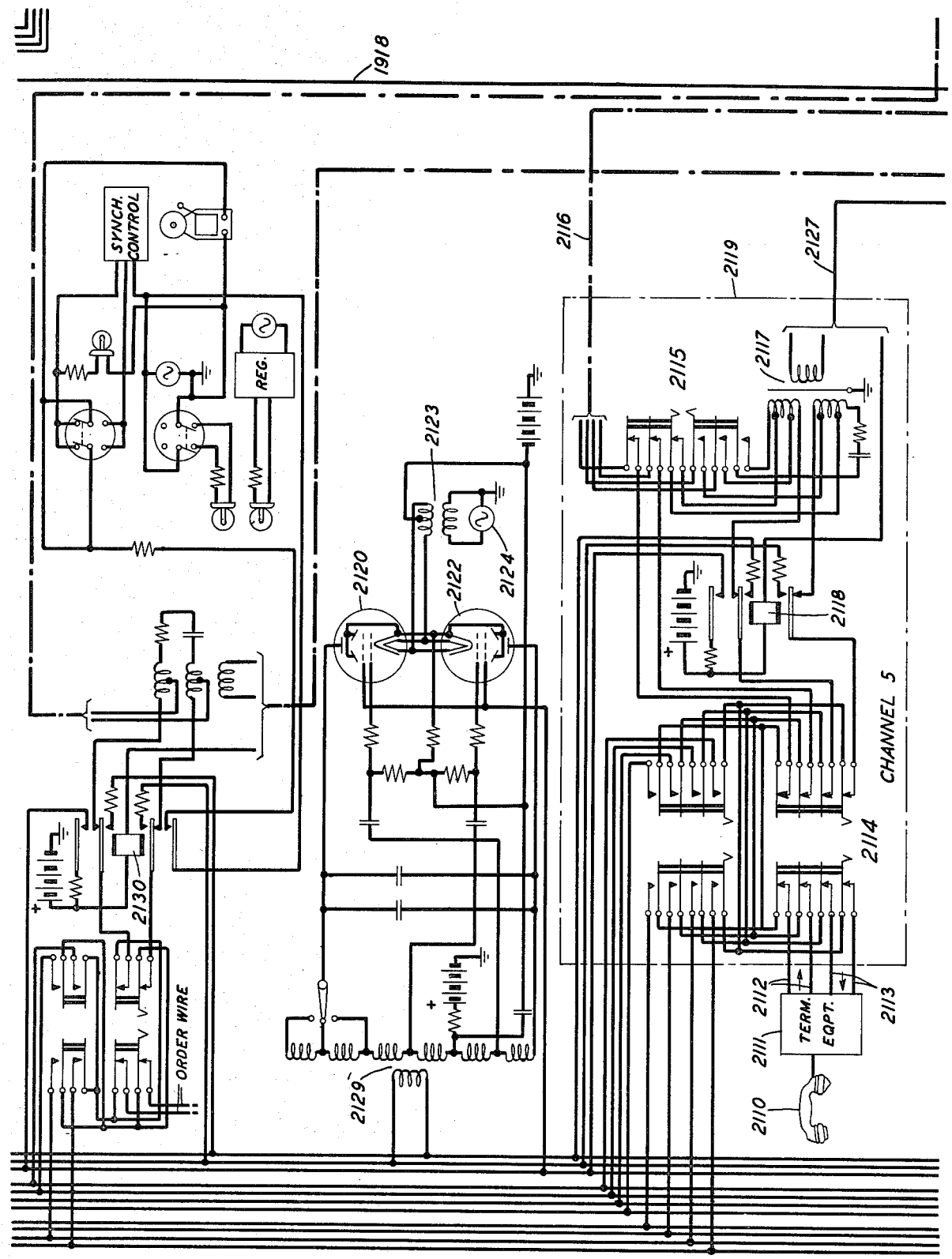

Handset 2110 of FIG. 21 represents the source of signals and the apparatus responsive to the received signals. This handset is connected to the terminal equipment 2111 which may be any of the types of equipment mentioned above with respect to terminal equipment 311. As shown in FIG. 21 the transmission path from terminal equipment 2111 to the terminating equipment 2119 is a so-called four-wire circuit. That is one pair of conductors or transmission path 2112 is employed for transmitting signals to the terminating equipment 2119, while another pair 2113 comprises the communication path for transmitting signals from the terminating equipment 2119 to the terminal equipment 2111.

Figure 27:
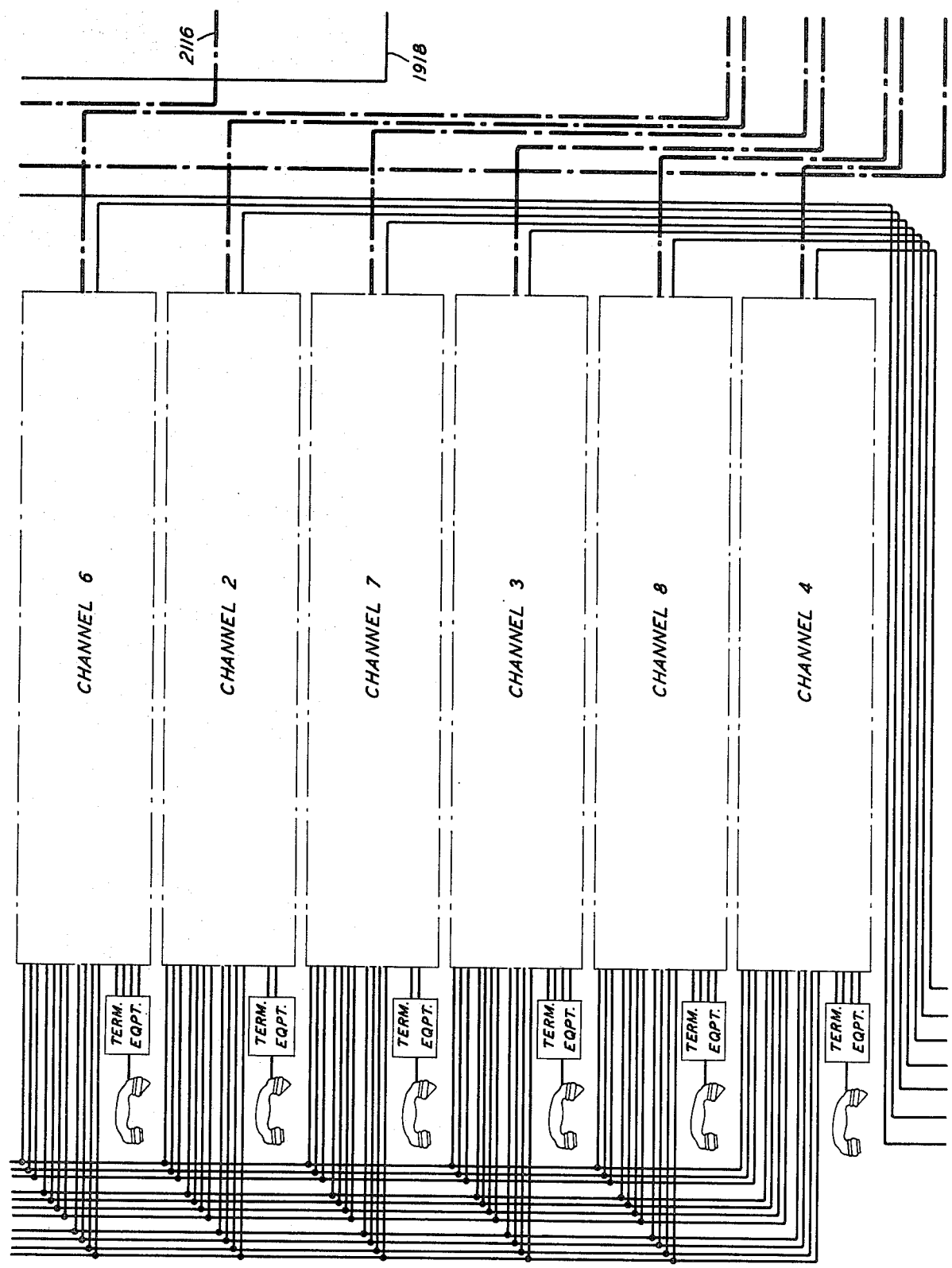

The other seven channels, together with their signal sources and responsive devices which may be similarly connected over four-wire or two-wire circuits to the terminal equipment and the terminating equipment are shown at FIG. 27. Inasmuch as equipment for terminating each of the voice frequency channels at the multiplex terminal is substantially the same as that shown in detail within the rectangle 2119, there is no need to repeat this detailed disclosure.

Figure 28:
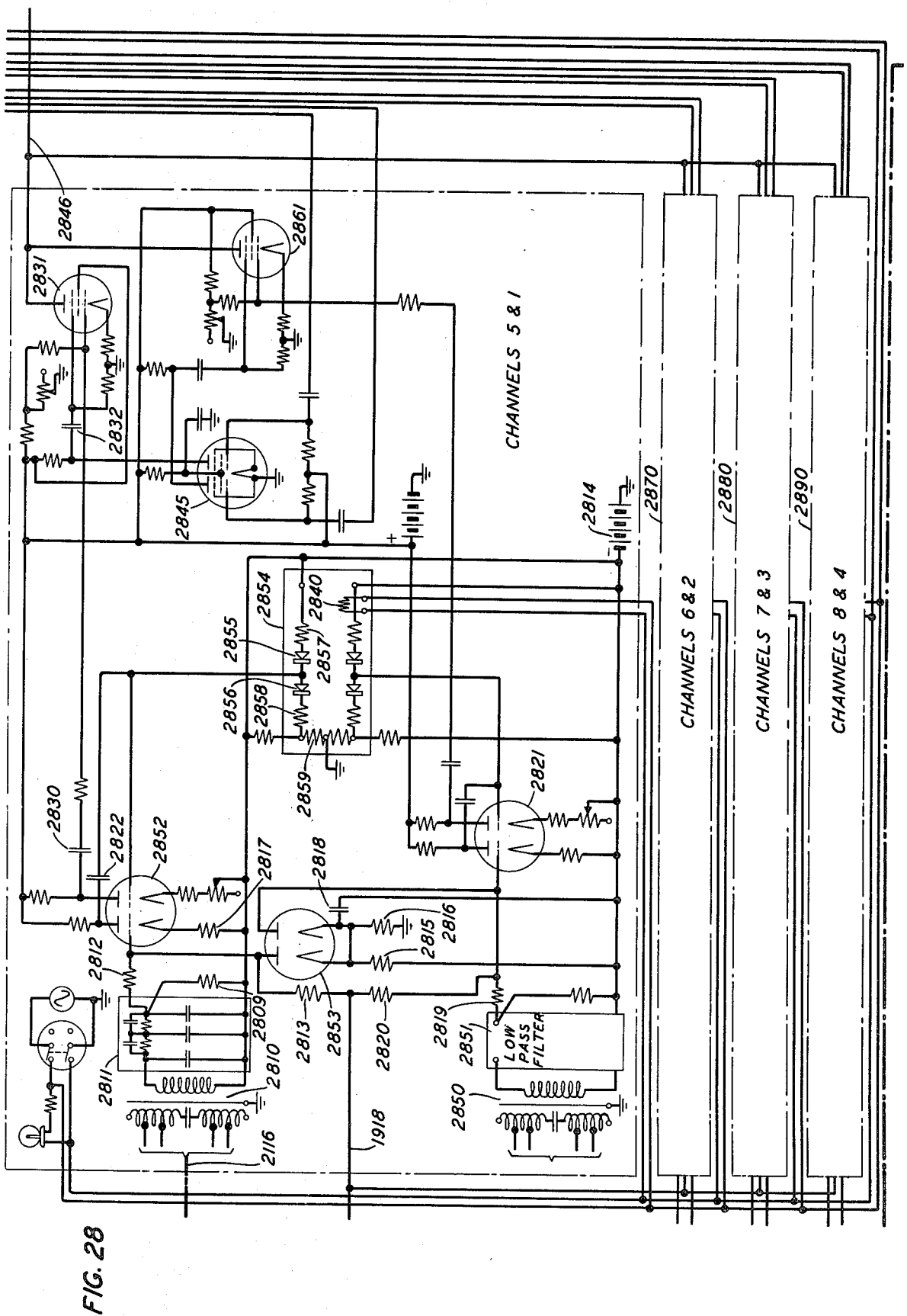

The transmitting pair 2112 extends through both sides of the splitting key 2114 and through the switching key 2115 to conductor 2116 which extends to the input transformer 2810. The switching key 2115 is operated to the position shown in FIG. 21 when the incoming channel is a four-wire channel as shown in FIG. 21. The channel shown in FIG. 21 is designated channel number 5. The apparatus individual to channel number 5 is associated with similar equipment individual to channel number 1 as shown in FIG. 28. However, inasmuch as channel number 1 is employed for synchronizing purposes and never employed for speech and other communications, it has not been equipped with terminating equipment for incoming channels. It would be so equipped if it were employed for communication and some other channel were employed for synchronism.

In case the incoming channel is a so-called two-wire channel which is capable of transmitting signals in both directions switching key 2115 will be operated to the position opposite to that shown in FIG. 21. With the key 2115 so operated windings of the hybrid coil 2117 are connected to the pair of conductors 2113. The hybrid coil serves to separate the direction of transmission and causes the signals transmitted from 2110 to be conveyed from pair 2113 to the conductors 2116, extending to the input coil 2810. In this case the transmitting pair 2112 is not employed. The signals to be transmitted to the receiving device 2110 are applied to the receiving pair 2113 from conductors 2127 through coil 2117 which operates as an output coil or four-wire termination and as a hybrid coil or two-wire termination.

As shown in FIG. 27 channels 2 and 7 are represented as being arranged for two-wire terminations for terminating incoming two wire voice frequency channels, while channels 3, 4, 6 and 8 are shown as terminating four-wire voice frequency circuits. It is to be understood of course that all of these channels may cooperate with either two-wire to four-wire circuits by properly positioning or operating keys similar to key 2115.

INSTANTANEOUS AMPLITUDE COMPRESSION

The input signals are applied to the input transformer 2810. These signals are conveyed from the terminating circuit of FIG. 21 to the primary of the input transformer 2810 over conductors 2116. The secondary of the input transformer 2810 is connected to the low-pass filter 2811 which in the exemplary embodiment of this invention has a cut-off frequency of approximately 3,000 cycles per second. The low-pass filter may be of any suitable type or design which is suitable for insertion between the secondary of the input transformer 2810 and the input of the voice frequency amplifier tube 2852.

The output of the filter 2810 is connected through resistor 2812 to the grid of the left-hand section of tube 2852. The grid of this tube is also connected through the high resistance 2813 to lead or conductor 1918 extending to the noise generation circuit of FIG. 19. This lead 1918 extends to the cathode circuit of the left-hand section of tube 1913. As a result this lead has a direct current voltage impressed upon it due to the direct current flowing through resistor 1917 in addition to the noise currents. The positive bias of the grid of the left-hand section of tube 2852 above the negative battery potential of battery 2814 is approximately 9.6 volts. This potential is obtained from resistors 1917, 2813, 2812 and 2809. It should be noted that in exemplary circuit resistor 2809 is shunted by the direct current resistance of the low-pass filter in series with the output winding of transformer 2810.

The control grid of the left-hand section of tube 2852 is also connected to the anode of the left-hand diode of tube 2853. The cathode of this diode is biased by means of the voltage dividing resistors 2815 and 2816 to a positive voltage of about 21 volts with respect to the negative terminal of battery 2814. The left-hand diode of tube 2853 thus serves to limit the maximum amplitude of the incoming voltage to 21−9.6 or 11.4 volts. When the incoming voltage exceeds this value the diode starts to conduct current and when thus conducting current it has a much lower impedance than resistor 2812. Consequently the voltage of the grid of the left-hand section of tube 2852 is limited to approximately 11.4 volts above a no signal voltage. The cathode of the left-hand section of tube 2852 is biased by means of resistor 2817 so that the net effective grid bias of this section of the tube 2852 is in substantially the middle of the operating range of the tube. The signal voltages applied to the control element of the left-hand section of tube 2852 are limited to a frequency range of a few cycles per second to 3 or 4 kilocycles per second and are also limited in total possible amplitude variation and they have added to them a noise voltage. The condenser 2818 is connected from the cathodes of the diodes of tube 2853 to ground to suppress any crosstalk which otherwise may be present between the channels due to the common cathode resistors 2815 and 2816.

Channel 1 is similarly provided with an input transformer 2850, input filter 2851, resistors 2819 and 2820 and the input tube 2821. The right-hand section of tube 2853 is employed to limit the peak voltage applied to the left-hand section of tube 2821. Thus both channels have their inputs similarly limited and noise from the noise generator is similarly applied to them.

The output of the left-hand section of tube 2852 is coupled through coupling condenser 2822 to the grid of the right-hand section of tube 2852. The grid of the right-hand section of tube 2852 is also connected to the mid-point of a non-linear circuit. This non-linear circuit comprises non-linear devices such as 2855 and 2856. These devices may be any suitable non-linear devices. In the exemplary system described herein these devices are copper oxide rectifiers although other devices may work equally well. These devices are enclosed in a constant temperature oven 2854 so that their characteristics will remain substantially constant and independent of variations in the ambient temperature of the device. The oven is provided with a heater resistance 2804 which is controlled by a thermostat element not shown.

Two of these non-linear devices are employed per channel, one for each polarity, so that both halves of the wave will be similarly compressed. The series resistors 2858 and 2857 are employed to control the degree of non-linearity or degree of compression desired, the lower the value of these resistors the greater the compression or reduction in change of amplitude of the applied signal.

The rectifiers are such that their resistance in the conducting direction decreases as the current in them increases. Thus a 400 to 1 change in the amount of current flowing through a rectifier unit results in only a 16 to 1 change in the voltage across the rectifier. It is this property of these devices together with the equivalent series impedance in the output circuit of the left-hand section of tube 2852 that results in the compression of the signals applied to the grid at the left-hand section of tube 2852. FIG. 56 shows the manner in which the output of the compression circuit and apparatus varies with the input. The impedance of the plate circuit of this tube is large compared to the resistance of the copper oxide rectifiers. Consequently the current from the plate of the left-hand section of tube 2852 which flows into the rectifier is nearly independent of the rectifier resistance. As a result, the currents flowing into the rectifier circuit are substantially directly proportional to the voice or signal voltages applied to the grid of the left-hand section of tube 2852. However, the voltages appearing across the rectifier are not directly proportional. Instead the voltage rises much more slowly across the rectifier than the voltage applied to the grid of the left-hand section of tube 2852.

A small direct current bias is applied to the rectifiers due to resistance 2859. This bias is employed to make minor adjustments in the characteristics of the rectifiers so that each of the units is substantially the same. By adjusting this bias as well as resistances 2857 and 2858 the amount of compression for both halves of the applied voltage as well as for the various channels may be made substantially the same.

The compressed signal voltage applied to the grid of the right-hand section of tube 2852 is amplified by this section and applied through the output coupling condenser 2830 to the control grid of tube 2831.

Each of the other channels is provided with similar equipment represented in FIG. 28 by the rectangles 2870, 2880 and 2890, each rectangle representing similar equipment for two of the input voice frequency channels.

Time Division Multiplex and Sampling

Tube 2831 serves as a gate tube or distributor switch for channel 5. Tube 2861 operates in a similar fashion for channel 1. Each of the other channels is provided with a similar tube. These tubes are biased due to a negative voltage applied to their suppressor grids so that no current normally flows in their output or plate circuits.

The right-hand section of tube 2845 has its output circuit connected to the suppressor grid of tube 2831 through the coupling condenser 2832. The other section of tube 2845 is similarly connected to the suppressor grid of tube 2861. Both sections of tube 2845 are normally biased to a conducting condition. The control grids of the two sections of this tube extend to different stages of the eight-stage ring. The right-hand control grid is coupled to the output or anode circuit of the "off" tube of stage 5, that is to the anode circuit of the left-hand section of tube 2220. When the number 5 stage of eight-stage ring is actuated to its operated position or condition the left-hand section of tube 2220 conducts thus causing a negative potential pulse to be applied so the control grid of the right-hand section of tube 2845. As a result the current flowing in the output circuit of this tube is reduced and its anode potential rises. Consequently a positive pulse is applied to the suppressor grid of tube 2831 thus allowing this tube to conduct and pass current in its output circuit.

As described above the control grid of tube 2831 is connected to the output of the right-hand section of tube 2852. Consequently the control grid of tube 2852 follows the compressed signal wave. The amount of current flowing in the output circuit of tube 2831 during its conducting interval is therefore a function of the compressed signal wave to be transmitted over the system. See the dotted portions of curve 4926 of FIG. 49.

When stage 5 of the 8-stage ring is again restored to its off or normal condition the potential of the anode of the left-hand section of tube 2220 rises and thus allows the right-hand section of tube 2845 to again conduct. With the right-hand section of tube 2845 conducting the potential of the suppressor grid of tube 2831 is again restored to its bias value so that tube 2831 ceases to pass plate current. In a similar manner the left-hand section of tube 2845 is controlled from stage 1 of the 8-stage ring and controls the gate tube 2861 in the same manner as described for channel number 5. Each of the other pairs of channels are provided with tubes similar to tubes 2831, 2861 and 2845 which are connected to the corresponding stages of the 8-stage ring so that each one of the gate tubes passes the portion of the signal wave to be transmitted during the time the corresponding stage in the 8-stage ring is operated to its actuated position, that is during approximately 15.6 microseconds of each 125 microsecond frame period.

Figure 29:
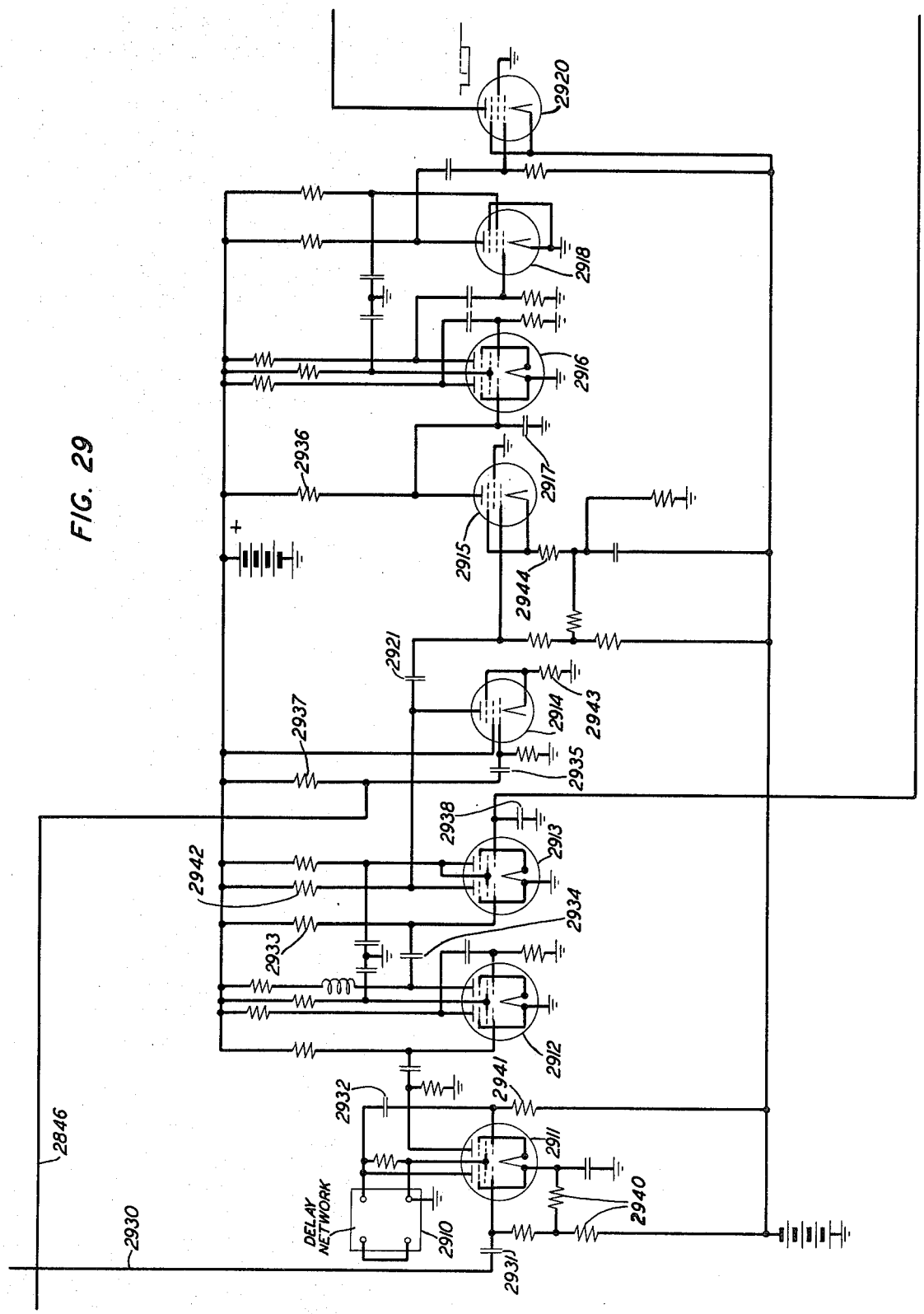
Figure 30:
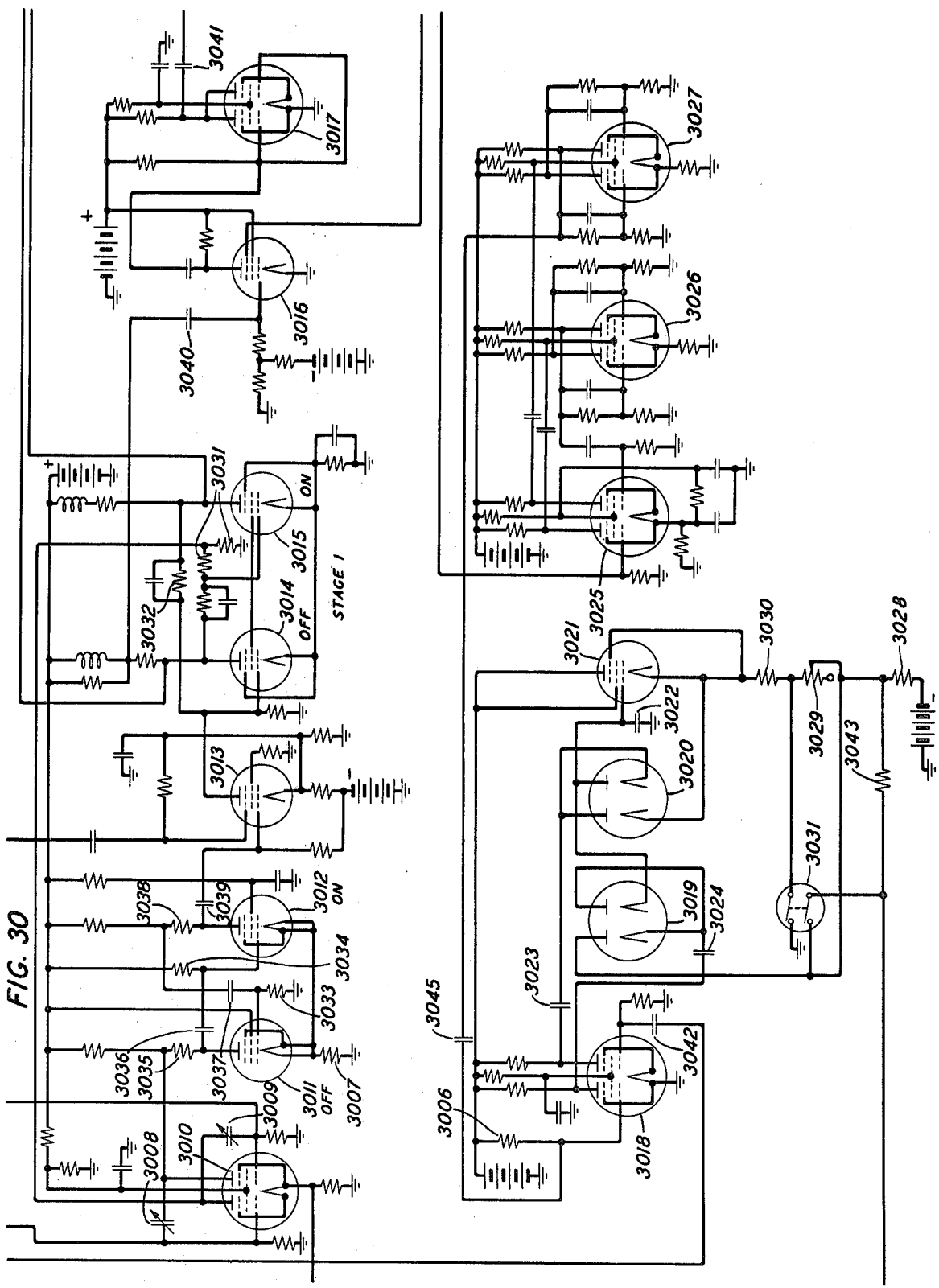
Figure 31:
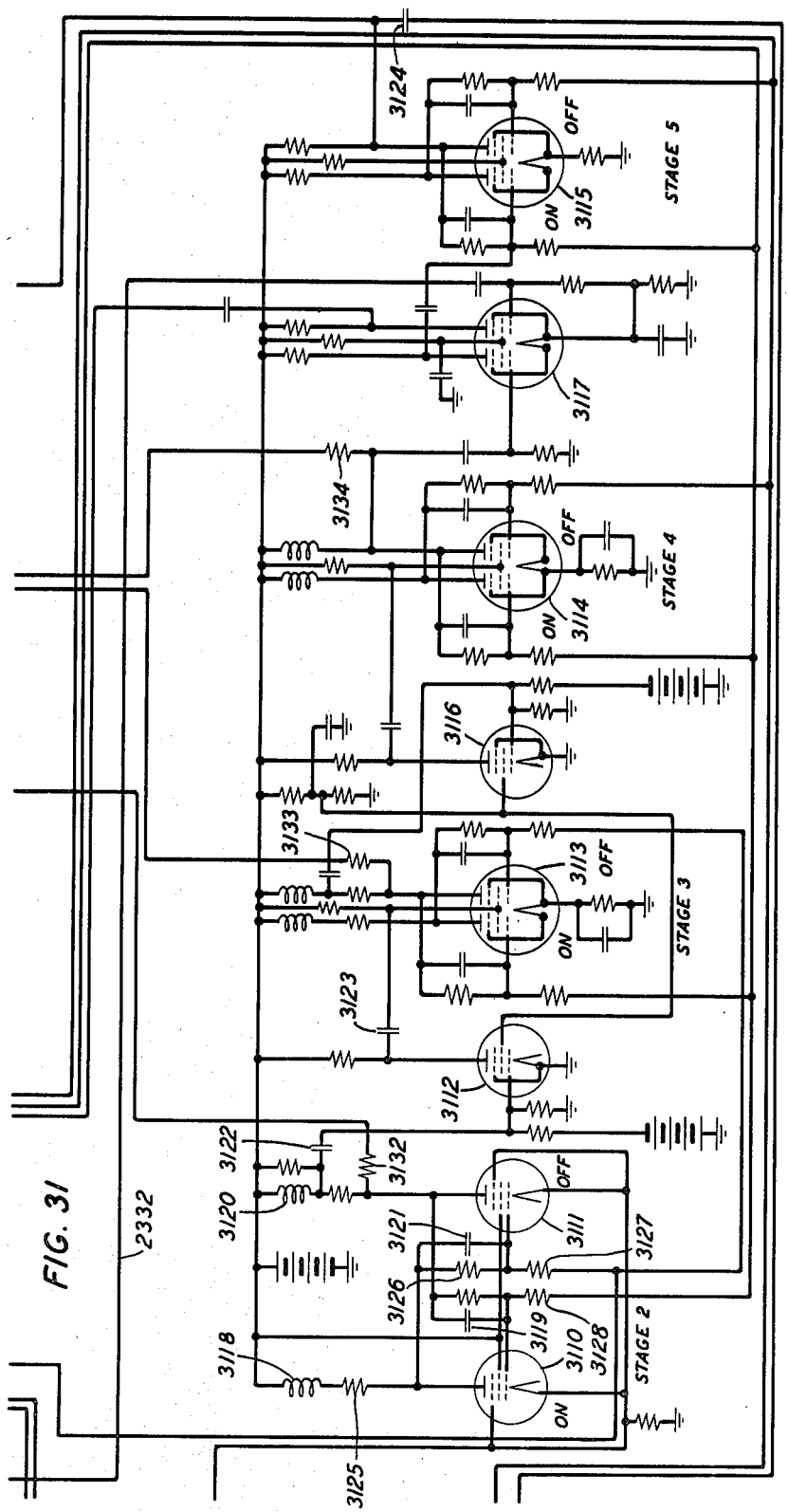
Figure 32:
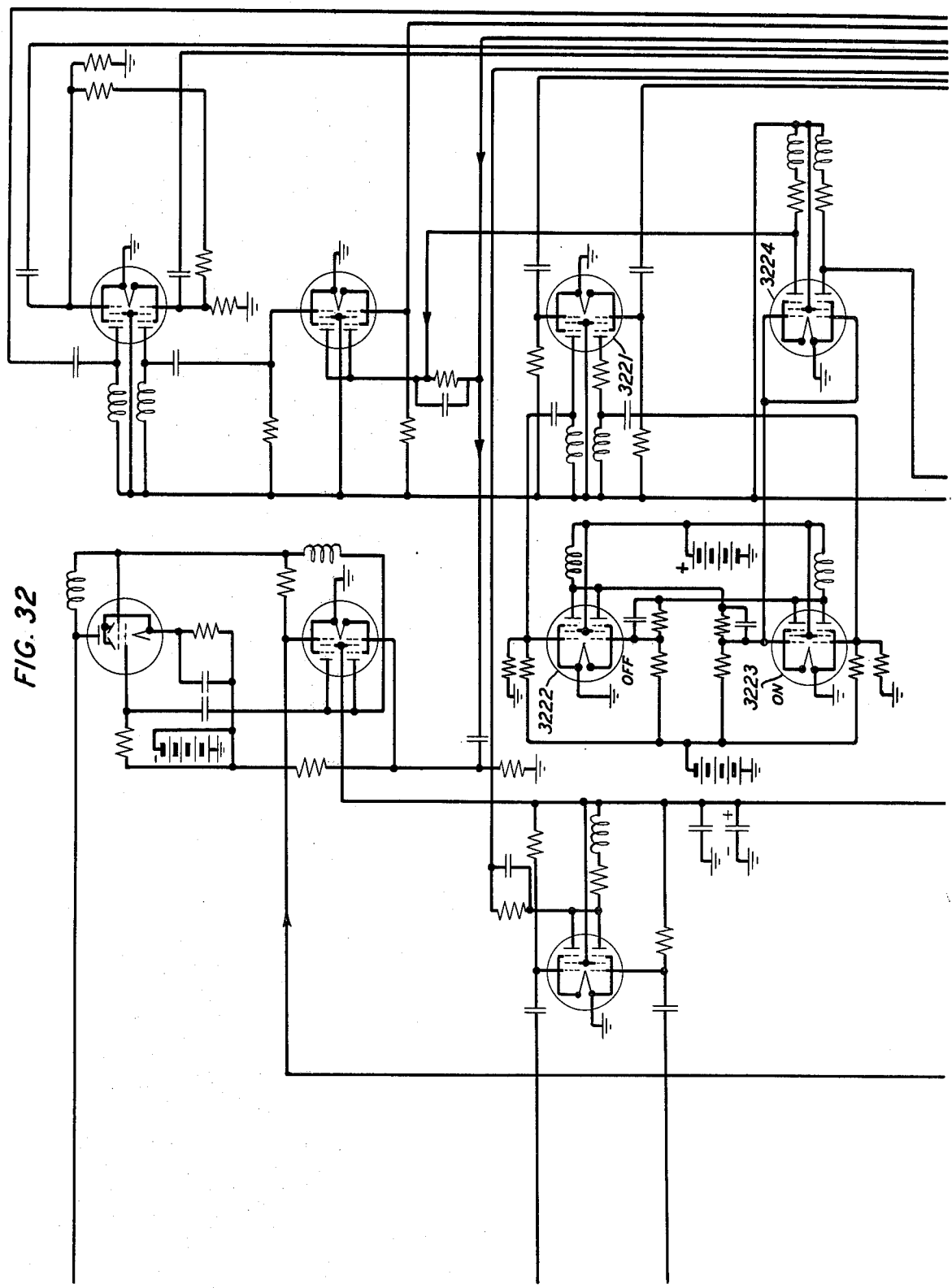
Figure 33:
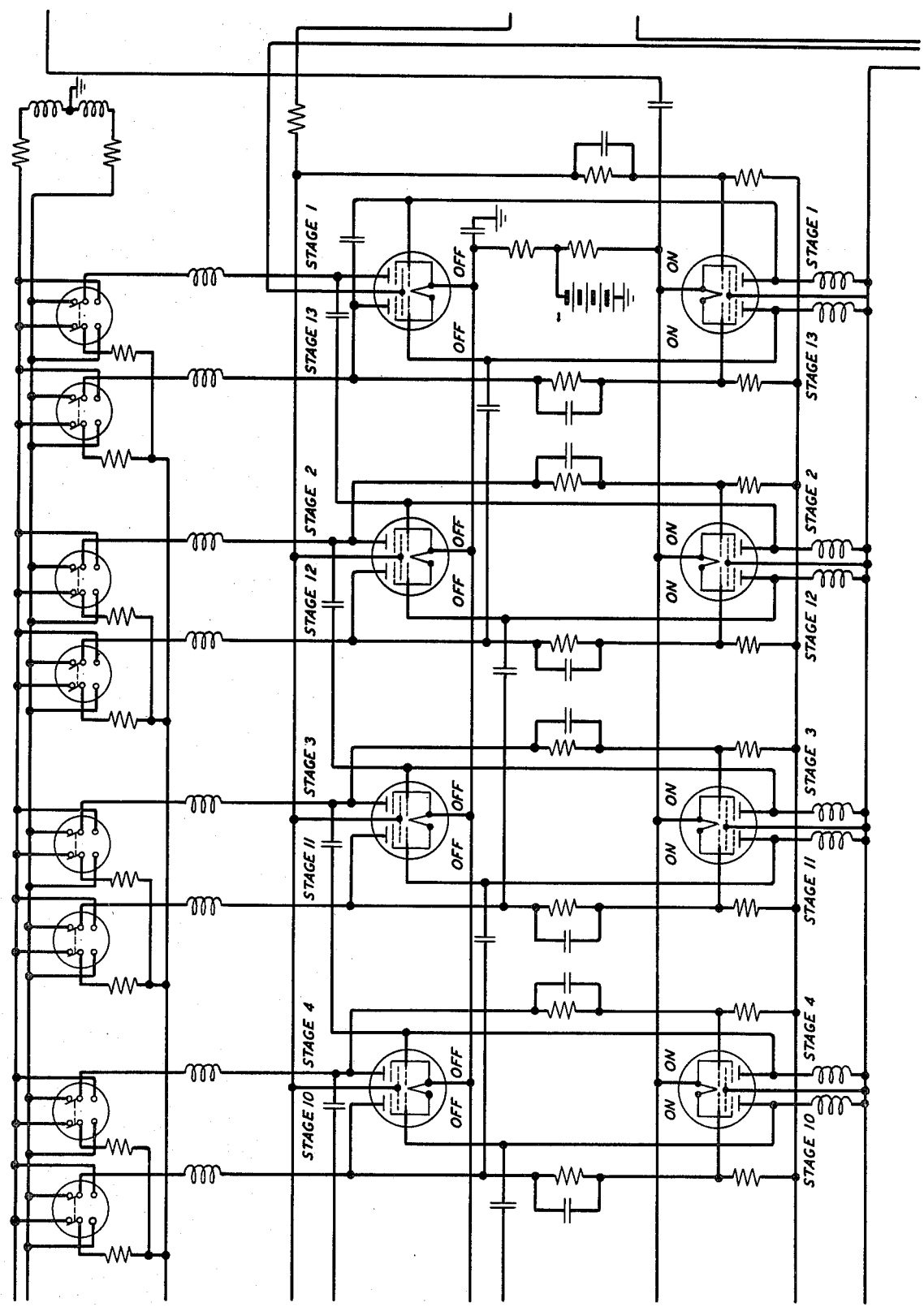
Figure 34:
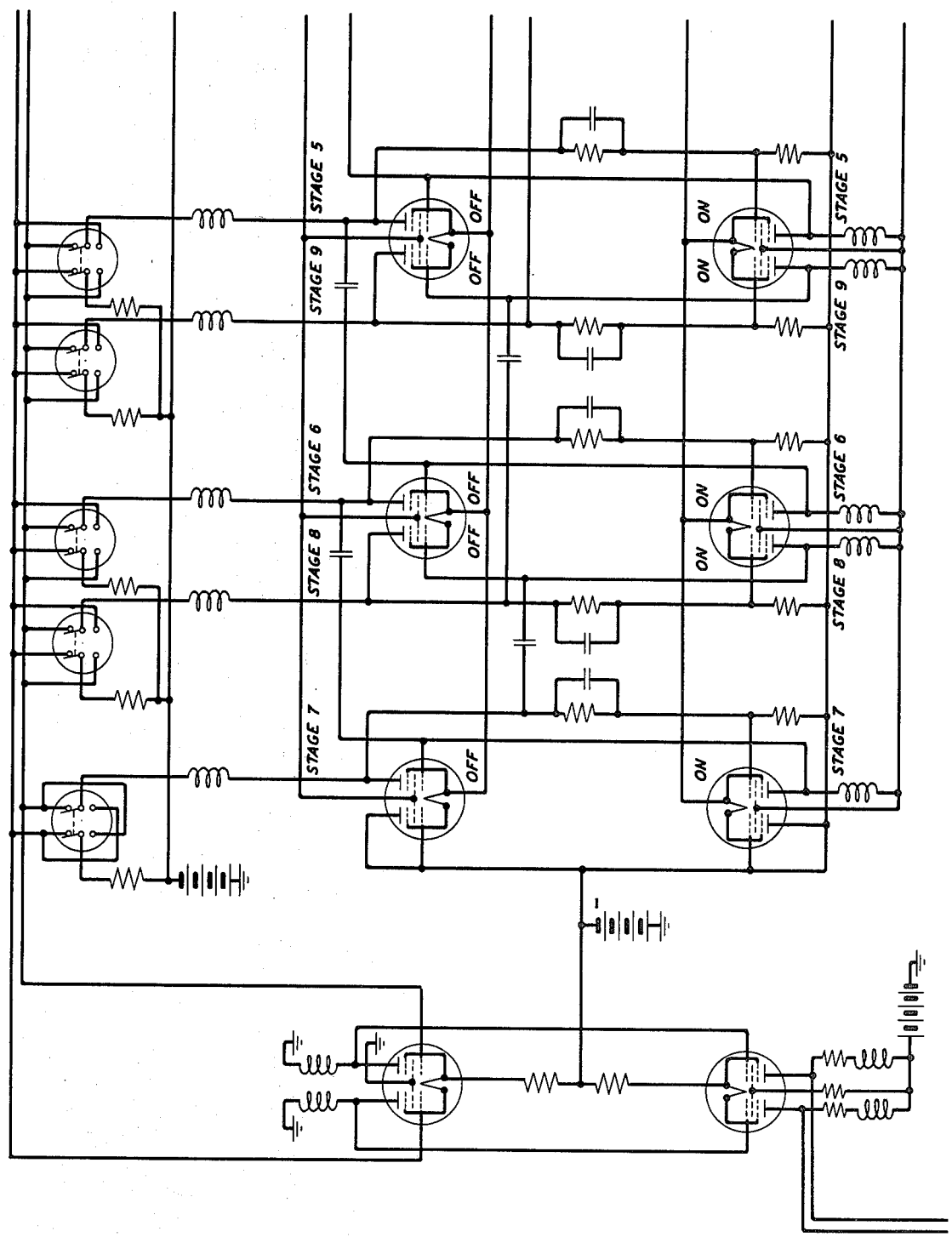
Figure 35:
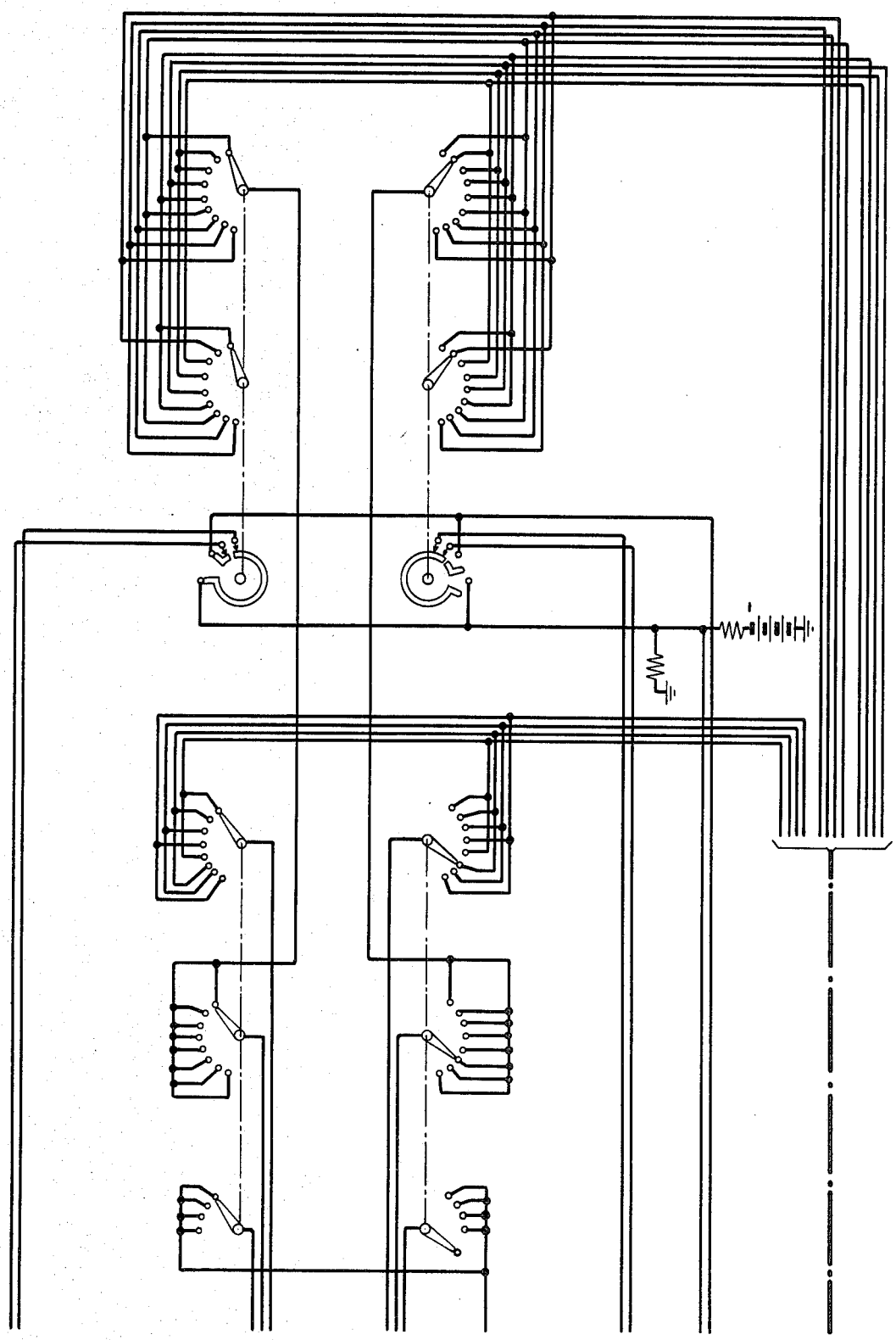
Figure 36:
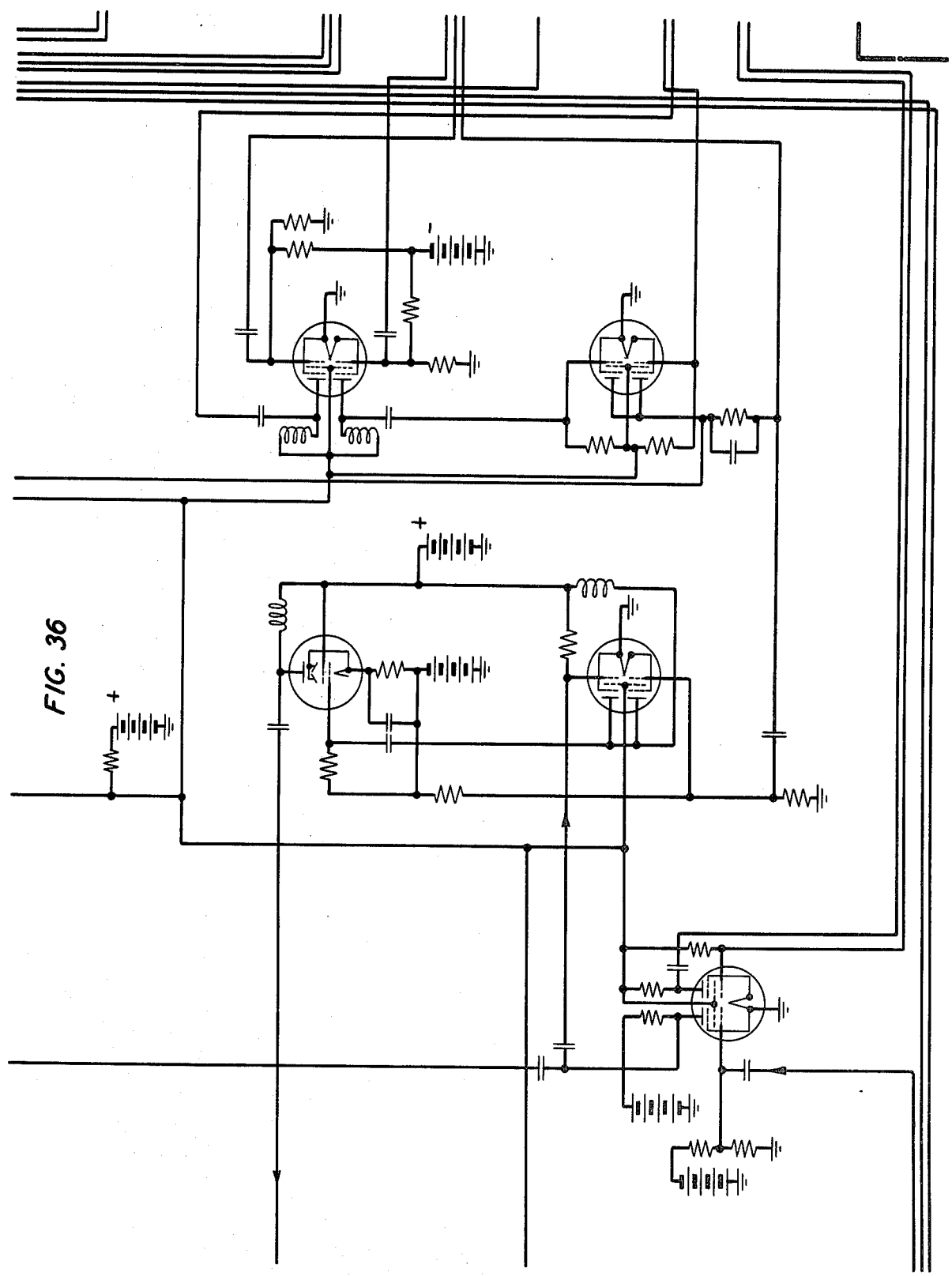
Figure 37:
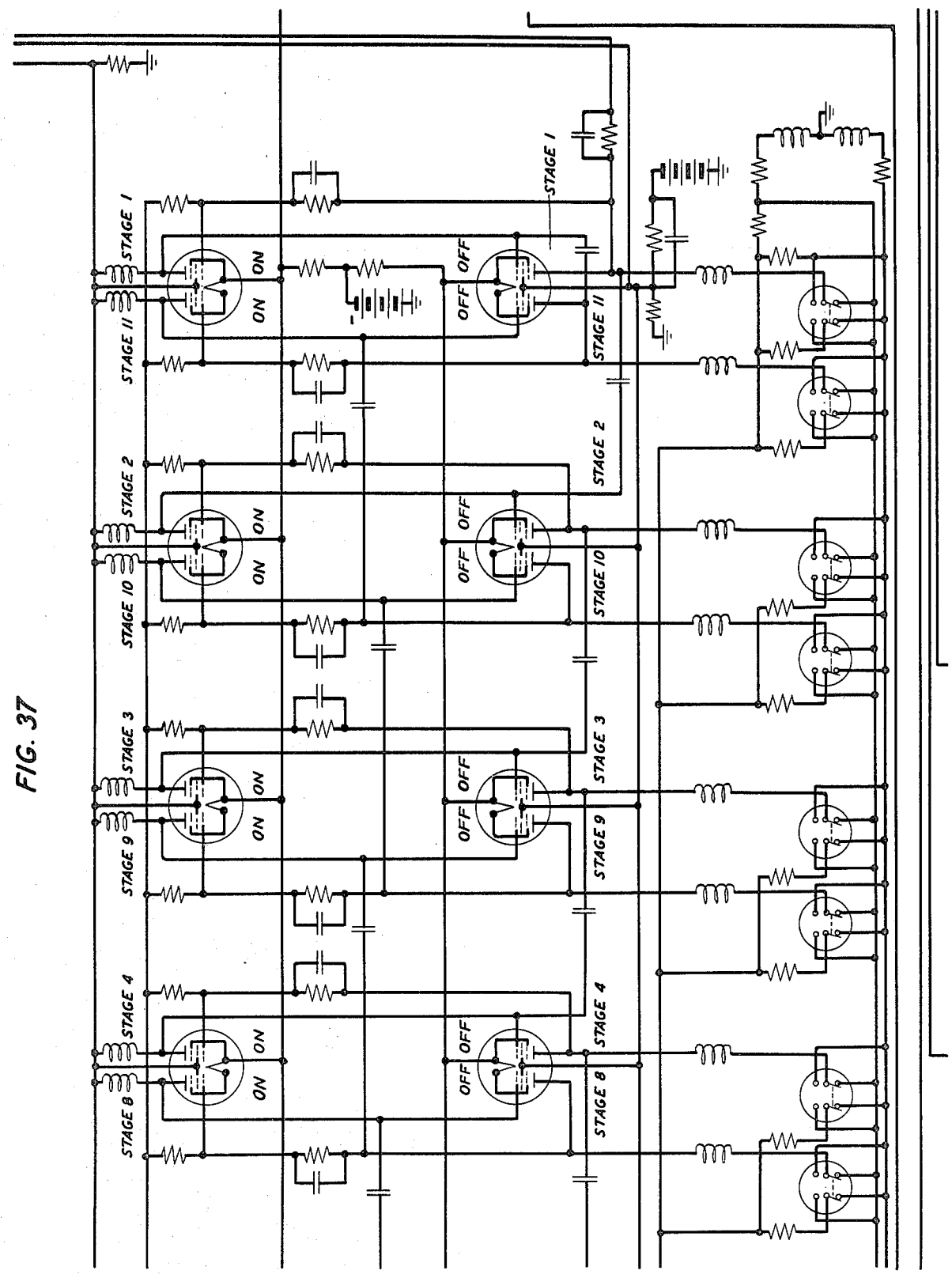
Figure 38:
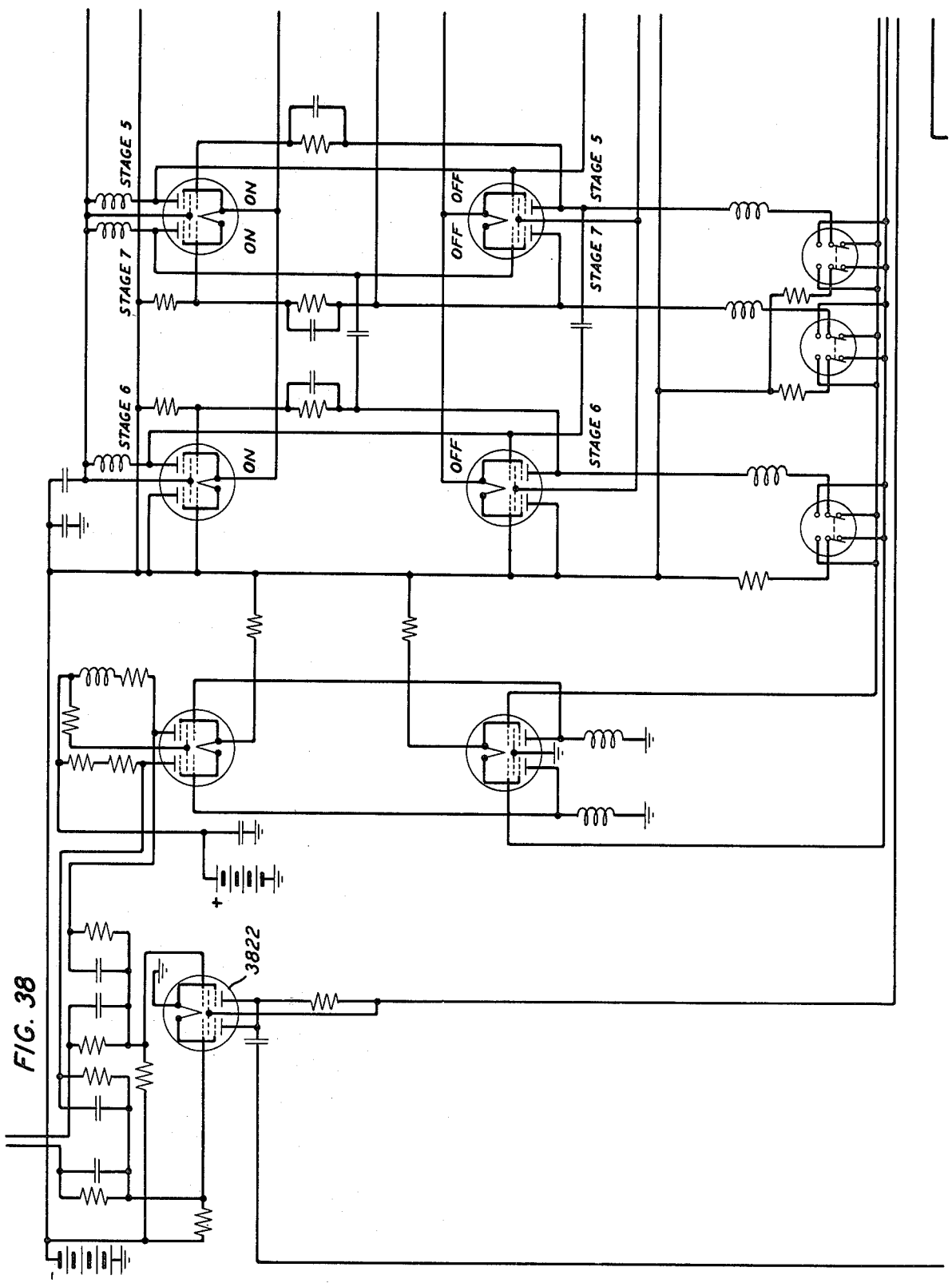
Figure 39:
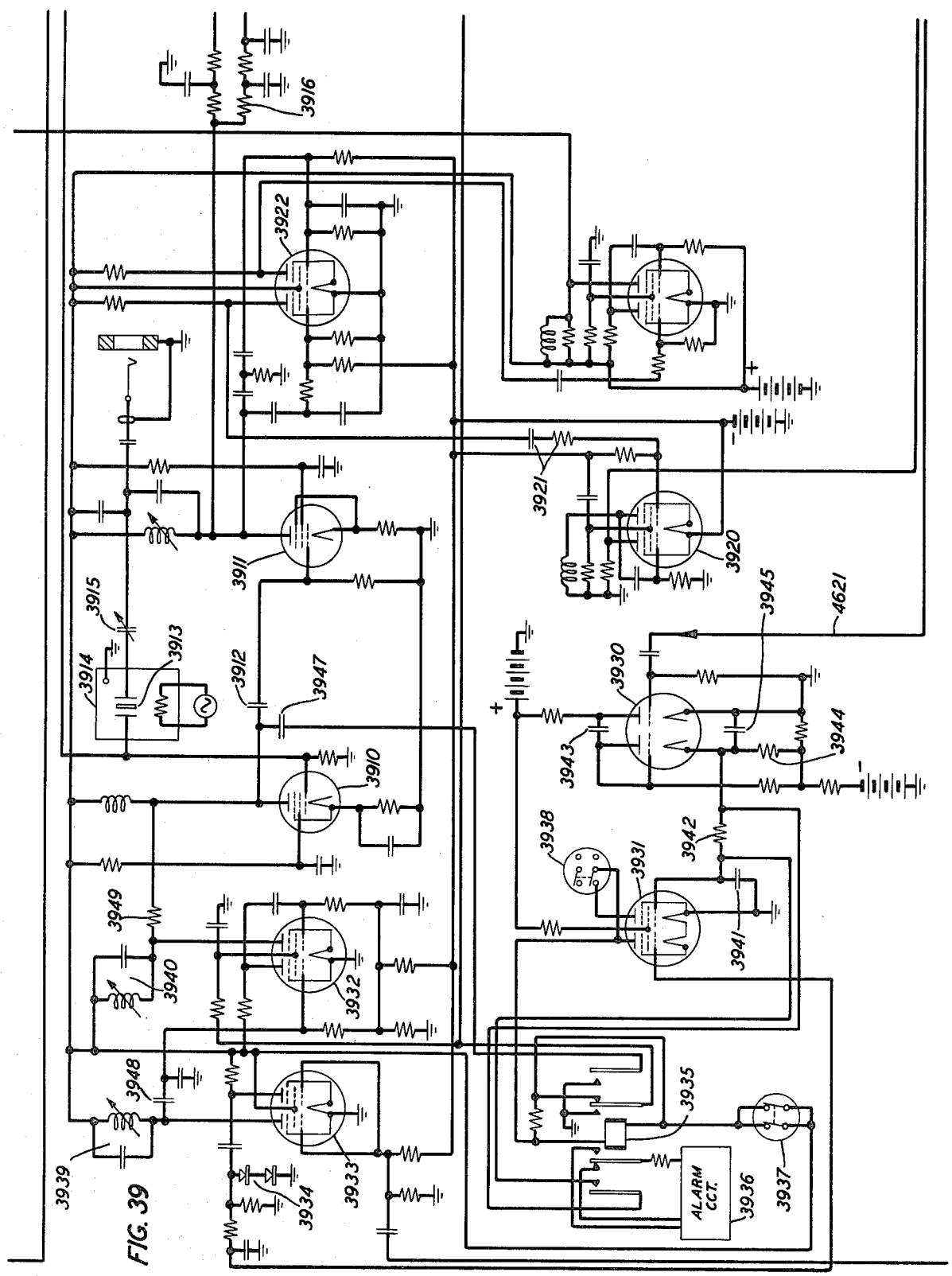
Figure 40:
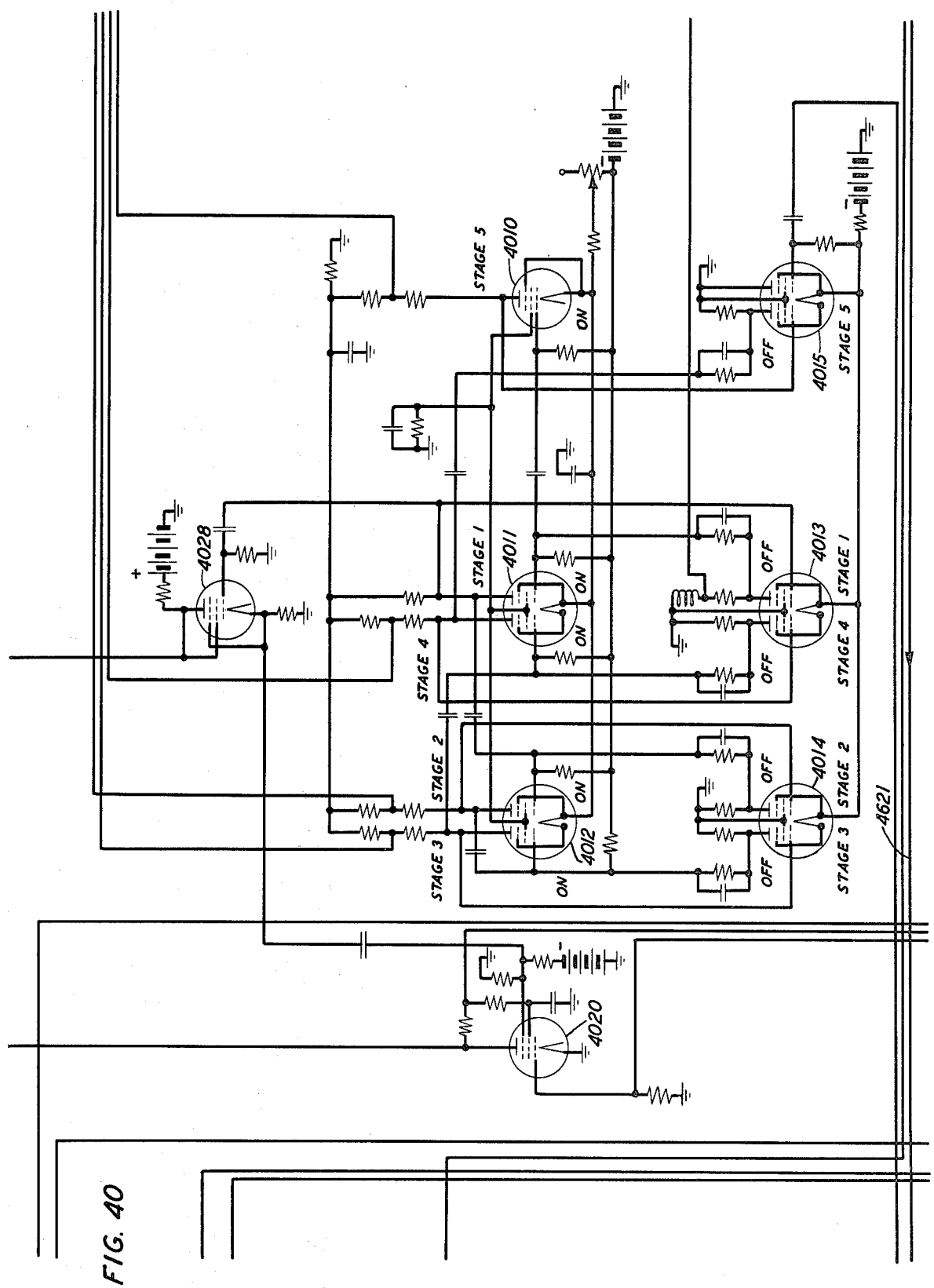

The output circuits or anodes of each of the tubes 2831, 2861 and the corresponding tubes of the other 6 channels are all connected in parallel to lead 2846 extending to FIG. 29.

Converting to Pulse Length Modulation

FIG. 29 discloses equipment for sampling each of the amplitude modulated pulses in succession and then converting the amplitude of the sample so obtained into a pulse having a width or length which is a function of the amplitude of the sample and thus a function of the instantaneous amplitude of the complex wave at the instant of sampling.

Each time the No. 1 stage of the 5-stage ring is actuated to the operating condition the "on" tube, that is, the left-hand section of tube 2318 is turned off thus causing its anode to rise in potential. During the time this section is turned off its anode will be at a high positive potential. When this section is turned on again when the first stage is restored to normal the potential of the anode of the left-hand section of tube 2318 falls to a low value. Thus, each time the first stage of the 5-stage ring is actuated, a positive pulse is generated in the anode circuit of the "on" tube, that is, the left-hand section of tube 2318. The anode of the left-hand section of tube 2318 is coupled through coupling condenser 2329 to the control grid of tube 2328. Tube 2328 which is arranged to operate in part as an amplifier tube and in part as a cathode follower tube, that is tube 2328 operates similar to a phase inverting tube. The positive pulse applied to its control grid is repeated as a positive pulse across the cathode resistor 2330. The application of a positive pulse to the grid of tube 2328 also causes a negative pulse to be repeated across the anode resistor 2331 which negative pulse is employed for other purposes as will be described hereinafter. Thus tube 2328 serves as a buffer tube between tubes of the first stage of the 5-stage ring and the various utilization circuits. Due to the fact that numerous circuits are controlled at the time of the first pulse of the 5-stage ring and thus by stage 1 of the 5-stage ring it is necessary to provide a buffer amplifier so that sufficient power is provided for all of the other circuits without withdrawing excessive amounts of power from the tubes of the 5-stage ring which might interfere with the operation of the tubes in the ring circuit.

The pulse appearing across resistor 2330 is applied over lead 2930 and through condenser 2931 to the grid circuit of the left-hand section of tube 2911. The output of the left-hand section of tube 2911 is connected to a delay line 2910 which is terminated by a short circuit at the far end. This delay line comprises any known type of delay line or delay network and is designed to provide a delay of one-half a microsecond.

The application of a positive pulse to the grid of the left-hand section of tube 2911 causes a negative pulse to be applied to the delay line or network 2910. The negative pulse travels down the delay line and at the far end is reflected as a positive pulse due to the short circuit termination at the far end of the line. One microsecond after the beginning of the negative pulse applied to the line the reflected pulses will arrive back at the input terminals of the delay line and effectively cancel the remainder of the negative pulse.

At the end of the positive pulse applied to the grid of the left-hand section of tube 2911 the negative pulse from the anode of tube 2911 is ended so that it no longer neutralizes the reflected positive pulse from the delay network. As a result the remainder of the reflected pulse appears as a one-microsecond positive pulse at the input terminals of the delay network 2910.

As a result of the application of the positive pulse from stage 1 of the 5-stage ring to the left-hand section of tube 2911, first a negative pulse of one microsecond is applied through the coupling condenser 2932 to the control grid of the right-hand section of tube 2911. At the end of the positive pulse from stage 1 of the 5-stage ring a positive pulse one microsecond long is applied to the control grid of the right-hand section of tube 2911 through the coupling condenser 2932.

It should be noted that the duration of this pulse is accurately timed by the delay network 2910 and is not materially affected by any of the other constants including the tube constants of the circuit or voltages applied to the circuit.

The above-described operation of the functioning of the circuits including the delay line is illustrated by graphs in FIG. 49. Curve or graph 4922 shows the positive pulses applied to conductor 2930. Pulse 4920 illustrates the negative pulse applied to the grid of the right-hand section of tube 2911 at the beginning of each of the pulses 4922. Pulse 4921 illustrates the positive pulse of one microsecond duration occurring at the end of each of the pulses 4922 due to the action of the delay network 2910.

Delay network 2910 may be of any suitable form. This delay network usually comprises one or more network sections of reactive elements. Suitable types of delay lines or networks are well known in the art. This delay line may also include coaxial lines, wave guides or other suitable transmission media or paths which will provide delay of substantially one-half a microsecond. That is, it requires a half a microsecond for a disturbance or current or voltage change to travel down the line and a second half-microsecond for the reflected disturbance or current or voltage change to travel back down the line and return to the input of the line.

The right-hand section of tube 2911 is biased substantially to cut-off by means of the cathode resistors 2940 and grid resistor 2941 so that the negative pulses applied to the control grid of this section are suppressed. These pulses as they appear in the plate circuit are illustrated by the various small pulses 4923 of FIG. 49.

The positive pulses, however, applied to the control grid of this section of tube 2911 are amplified and produce large negative pulses in the output section of this tube as illustrated by pulses 4924. These pulses are then repeated and shaped by both sections of tube 2912. The pulses are again repeated and inverted and further shaped by the left-hand section of tube 2913 so that they have, in the absence of an applied modulating complex wave, substantially the wave form shown at 4925 of FIG. 49 in the anode circuit of the left-hand section of tube 2913.

These accurately timed carefully shaped pulses of one microsecond are then employed to sample the pulse amplitude modulated wave obtained from sampling the complex signalling waves applied by the respective incoming voice frequency channels.

The left-hand section of tube 2913 is normally biased by means of the grid bias resistor 2933 so that the left-hand section of tube 2913 is conducting in the absence of pulses applied to its grid. As a result the anode of this section is at a reduced potential except when the negative pulse is applied to its grid through the coupling condenser 2934 at which time the plate current is cut off and the anode of the left-hand section of tube 2913 rises to a relatively high positive voltage with respect to ground. The reduced anode potential when the tube is conducting is well above the knee of the plate current-plate voltage characteristic so that the plate resistance of the tube is high and the anode current is substantially independent of the anode voltage. Hence the positive pulse in the anode circuit as shown by 4925 of FIG. 49 is of substantially constant amplitude. Tube 2914 operates as a linear amplifier and the plate current will follow the voltage wave applied to the control grid. This tube is stabilized by negative feedback through cathode resistor 2943. The anode of tube 2914 is connected in parallel with the anode of the left-hand section of tube 2913. The control grid of tube 2914 is connected through the coupling condenser 2935 and over lead 2846 to the output of the multiplex and pulse amplitude modulation tubes 2831 and 2861 and corresponding tubes of channels 2, 3, 4, 6, 7 and 8. As a result the grid of tube 2914 follows the amplitude of the signals of complex wave form in each of the channels for the time intervals assigned to that channel. Graph 4926 illustrates the potential of grid of tube 2914 if it is assumed that channel 5 is the only channel being modulated. As is illustrated in FIG. 49 the dotted portions of graph 4926 are intended to represent the variation in amplitude of this grid potential due to the variation in amplitude of the complex wave applied to channel 5.

If other channels are modulated the graph 4926 will show different values similar to those in channel 5 in response to the signals applied to the respective channels during the time intervals assigned to these other channels. The voltage that appears across anode resistor 2942 common to tube 2914 and the left-hand section of tube 2913 is composed of the voltage drop produced by the anode current of tube 2914 flowing through the resistor superimposed on the constant amplitude pulse from the anode of the left-hand section of tube 2913. The anode current of tube 2914 and hence the portion of the voltage across resistor 2942 due to this current follows the voltage applied to the control grid of tube 2914. Thus with the amplitude modulated pulse shown by graph 4926 of FIG. 49 applied to the control grid of tube 2914 the voltage across resistor 2942 is composed of a one-microsecond constant amplitude positive pulse superposed on an amplitude modulated pulse. As a result the peak voltage reached in the one-microsecond interval will depend on the amplitude of the sample of the signal in the corresponding channel. Thus a positive pulse having a duration accurately timed to one microsecond and varying in peak voltage under control of the applied signal is supplied to the control grid of tube 2915 during the time interval assigned to each of the incoming channels. This pulse of varying amplitude is in effect a sample of the magnitude of the complex wave of the respective channels. When the magnitudes of the respective channels are low at the time of occurrence of the one-microsecond pulse the amplitude of this pulse will be low and when the amplitude of the signals in the respective channels are high at the time of occurrence of the one-microsecond pulse the magnitude of this pulse will be high. Graph 4927 represents these pulses of varying magnitude. It should be noted that these short one-microsecond pulses occur near the end of the interval assigned to the respective channels so that any transients have had time to die out and the amplitude modulated pulse has had time to build up to its full value before being sampled by the one-microsecond pulse.

A pulse of one-microsecond duration having a peak voltage which is a function of the complex wave at the time of the pulse is thus applied to the grid of tube 2915 through the coupling condenser 2921. Tube 2915 provided with a high resistance 2936 connected in its anode circuit is biased so that the anode current is cut off in the absence of a pulse applied to the grid. The bias is sufficiently high so that tube 2915 will conduct only during the one-microsecond interval and the current that flows in the anode circuit during this interval is proportional to the differential in the peak voltage of the one-microsecond pulse applied to the grid. To aid in the operation, the tube is stabilized by negative feedback through cathode resistor 2944. In addition tube 2915 has a capacitor 2917 connected to its anode circuit. The time constant of anode resistor 2936 and capacitor 2917 is such that the condenser discharges to its steady state potential in the interval between the pulses applied to tube 2915. The steady state potential of condenser 2917 is determined by the impedance of the grid of the left-hand section of tube 2916 when the grid is conducting.

Upon the application of the positive one-microsecond pulse to the grid of tube 2915, tube 2915 conducts and charges condenser 2917 negatively. The amount of charge given to condenser 2917, and hence the voltage developed across the condenser, in response to each pulse applied to the control grid of tube 2915 is proportional to the plate current and thus is dependent upon the peak voltage of the pulse applied to the grid or control element of tube 2915. Thus, for a pulse of relatively high peak voltage condenser 2917 will have a very large amount of charge given to it. On the other hand for a pulse of low peak voltage applied to the control grid of tube 2915 condenser 2917 will have a relatively small quantity of charge given to it.

At the termination of each of the pulses applied to the grid of tube 2915 this tube is restored to its cut-off condition at which time condenser 2917 starts to discharge through the high anode resistor 2936 of tube 2915 and the voltage across the condenser starts to rise toward the plate battery potential.

Condenser 2917 will continue to discharge until its upper terminal reaches the potential at which the grid of the left-hand section of tube 2916 starts to conduct. Thereafter the low impedance of the grid to cathode circuit of the left-hand section of tube 2916 will prevent any further appreciable rise in the potential of the upper terminal of condenser 2917.

The discharging of condenser 2917 from its lowest charge point to the time at which the control grid of the left-hand section of tube 2916 prevents any further rise in potential is in accordance with the well-known exponential discharging curve or law. However, due to the fact that the change in potential upon the upper terminal of condenser 2917 is only a very small fraction of the total battery potential applied to the discharging circuit the curve will be substantially linear over the portion of the curve employed. As a result of this uniform discharge rate it will require a longer time for condenser 2917 to be fully discharged after a pulse of high peak voltage has been applied to the grid of tube 2916 than after a low peak voltage pulse has been applied to the grid of this tube.

Curve 4928 shows a typical wave form of the potential of the upper terminal of condenser 2917. As is illustrated by the dotted lines, the quantity of charge given to condenser 2917 determines the length of time required to discharge this condenser.

The upper terminal of condenser 2917 is connected to the grid of the left-hand section of tube 2916 as pointed out above. When condenser 2917 is discharged and its upper terminal reaches its steady state voltage, current flows in the anode circuit of the left-hand section of tube 2916. However, during the time condenser 2917 is charged and is being discharged the anode current of the left-hand section of tube 2916 is substantially cut off and remains so until the voltage on the discharging condenser reaches the value at which the left-hand section of tube 2916 starts to conduct. At this time anode current begins to flow in the left-hand section of tube 2916 and continues to flow until the next pulse charges condenser 2917 and cuts off the tube. Since the time required for the condenser to reach the voltage at which the tube conducts depends upon the charge given to the condenser a positive pulse of substantially constant amplitude but varying in length or time is generated in the output circuit of this tube. The time of occurrence of the trailing edge of the pulse is fixed by the time of occurrence of the one-microsecond pulse but the time of occurrence of the leading edge is determined by the time required for the condenser to discharge to the grid voltage at which the left-hand section of tube 2916 conducts. This pulse is longest for samples of a complex wave having a large positive value and shorter for a complex wave having a smaller positive magnitude or a negative magnitude. It should be noted that since the one-microsecond pulses never have their peak voltages reduced to zero, the pulse of variable time duration never has its duration reduced to zero. As shown in graph 4928 by the dotted lines the pulse as applied to the left-hand section of tube 2916 is always present even when pulses of minimum amplitude are applied to the control grid of tube 2915. The length of this pulse varies between about 3.1 and 12.4 microseconds.

The pulse of varying time duration thus caused to flow in the output circuit of the left-hand section of tube 2916 is amplified and shaped by the right-hand section of tube 2916 and by tubes 2918 and 2920. These three stages, in addition to amplifying and properly shaping the pulse serve to invert it so that a negative pulse of varying length flows in the output circuit of tube 2920 and is applied to the cathode of the balanced gate tube 3010. The wave form of these pulses is shown by graph 4929.

Counting and Coding

Both sections of tube 3010 are biased so that this tube is substantially completely cut off except when the negative pulse is applied to the cathodes of both sections of this tube.

The control grids of the balanced gate tube 3010 are supplied with 1600-kilocycle current over conductors 2420 from the standard frequency oscillator, as described above. These control voltages applied to the control grids of both sections of tube 3010 are substantially 180 degrees out of phase one with the other. Adjustable capacitors 3008 and 3009 serve to neutralize or balance the grid to plate capacitances of the tube so that negligible transmission exists during the time that plate current is cut off. Tube 3010 serves to turn on and off the 1600-kilocycle current or voltage to the counter stages which are employed to count the half-cycles in the 1600-kilocycle current transmitted through the gate tube 3010 during the application of each of the negative control pulses to its cathode.

The counter employed is sometimes called a binary counter and employs a plurality of so-called double stability circuits. A double stability circuit is employed for each of the counter stages and each stage controls the succeeding stage. A 5-stage counter is shown in the drawing which is capable of counting from zero to 31 half-cycles of the 1600-kilocycle current. The first stage comprises tubes 3014 and 3015 which respond to the input 1600-kilocycle current. This counter stage is turn controls a second stage of the counter comprising tubes 3110 and 3111. The third stage comprises tube 3113 and the fourth stage, tube 3114 and the fifth stage, tube 3115. Tubes 3113, 3114 and 3115 each comprise two sections which are connected to form a double stability circuit similar to that formed by the separate tubes of the first and second stages of the counter. Each of the counter stages as pointed out above comprises in effect two tubes one of which is referred to as the "on" tube and the other as the "off" tube. With the counter in its normal or zero position all of the "on" tubes are conducting or passing anode current while all of the "off" tubes are substantially cut off, that is their anode currents are substantially zero.

Each stage of the counter is employed to control the succeeding stage which is connected to run at half the frequency or twice the period of the preceding stage.

In order to improve the reliability and operation of the counter each stage is coupled to the succeeding stage through one or more stages of a buffer amplifier which is employed to properly shape the pulses received from one stage of the counter so that they will be able to more reliably control the succeeding stage and also to prevent excessive loading of the preceding stage and at the same time provide sufficient power to accurately control the succeeding stage.

Figure 50:
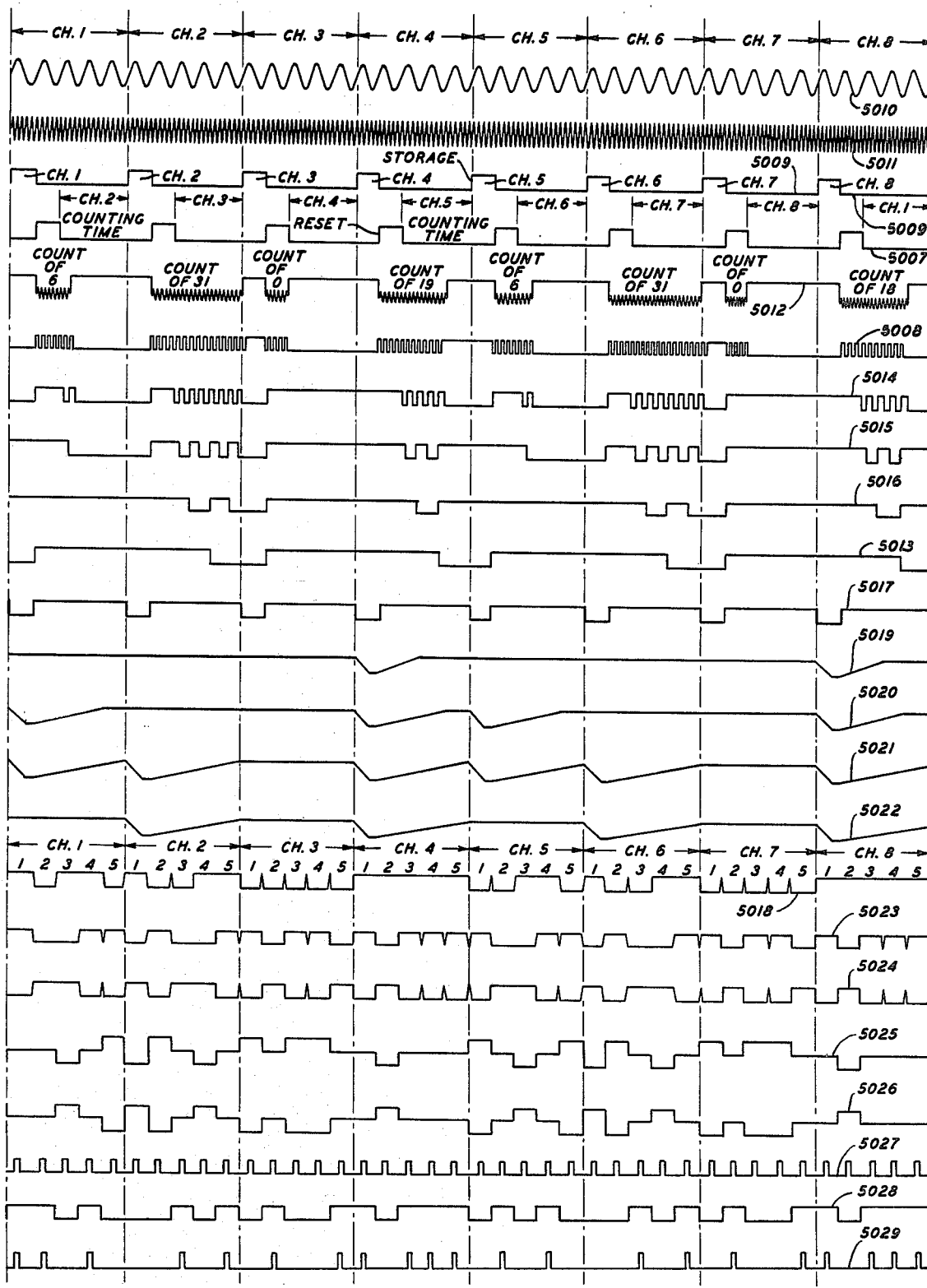
Figure 51:
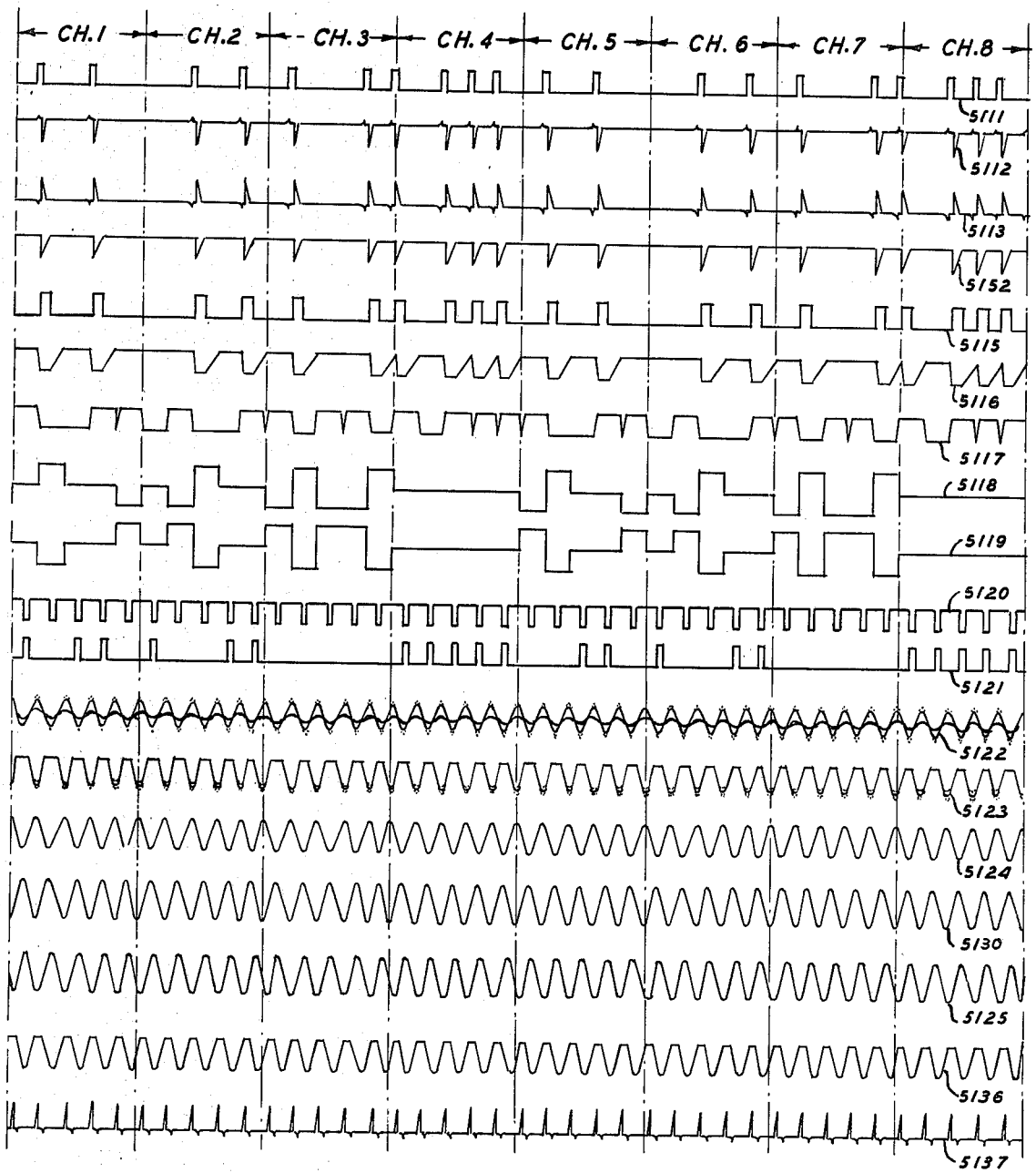
Figure 52:
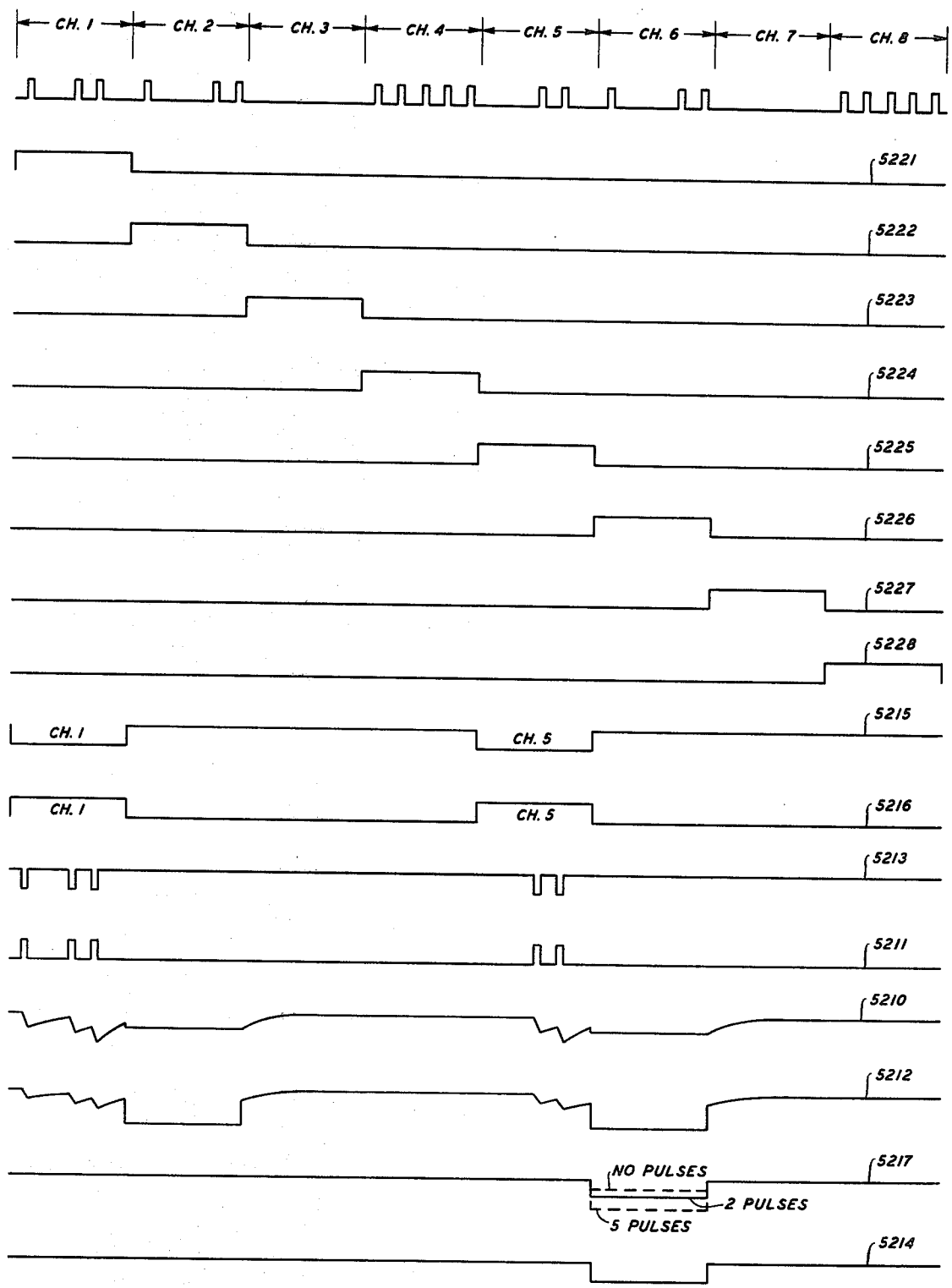

The operation of the counting and coding equipment may be more readily understood from the following description by reference to FIG. 50 which shows graphs of the potential or current wave forms at various places in the system.

Graph 5010 illustrates the controlling 320-kilocycle wave which is similar to graph 4901 of FIG. 49 and graph 5011 shows the wave form of the 5th harmonic of the control frequency namely 1600 kilocycles which is employed to control the counter. Graph 5012 shows the wave form of the potential of the cathodes of tube 3010. The 1600-kilocycle current is transmitted through the gating tube 3010 superimposed upon the gating pulse from tube 2920. With this addition curve 5012 is similar to curve 4929 showing the varying length gate pulses supplied to the balanced gate 3010, though curve 4929 shows in full lines the fixed gate lengths corresponding to no signal input while curve 5012 shows varying lengths of gates for certain assumed signal amplitudes.

The balanced gate 3010 is biased so that when the negative gating pulse is not applied to its cathode substantially no current flows in its output circuits. However, when the negative gating pulse is applied to the cathode of both sections of tube 3010 the bias is such that pulses of current flow in the output circuits of these tubes during the positive peaks of the controlling 1600-kilocycle current applied to the respective grids of the sections of this tube. Since the 1600-kilocycle voltage is applied to the two grids in opposite phase the two plates take current during alternate half-periods of the 1600-kilocycle wave.

The negative potential pulses from the left-hand section of tube 3010 are applied directly to the grid of tube 3015 of the first stage of the counter. The negative pulses from the right-hand section of the tube 3010 are applied to the grid of tube 3014 in the first stage of the counter through a pair of quantizing tubes 3011 and 3012 and the buffer amplifier 3013.

The quantizing tubes 3011 and 3012 are connected in a single stability circuit arrangement whereas each pair of counting tubes of each stage is connected in a double stability circuit arrangement. In other words, each stage of the counter is arranged so that the tubes may remain in either one of the two conductive conditions until changed by the application of a signal. In the case of the quantizer tubes the circuit is arranged so that the tubes will remain indefinitely in only one conductive condition and if this condition is disturbed the circuits are further arranged that they will assume a second conductive condition for a short period of time only. In the quantizer as in the counters one of the pair of tubes, for convenience, is called an "on" tube and the other an "off" tube. The "off" tube of the quantizer comprises tube 3011 and tube 3014 comprises the "off" tube of the first stage of the counter, the other tubes 3012 and 3015 comprising the "on" tubes of the quantizer and the first stage of the counter, respectively.

When the gating pulse from tube 2920 terminates at such an instant of time that a short negative pulse flows in the output circuit of the right-hand section of tube 3010, the quantizer operates to lengthen this pulse to a normal length pulse so that the counter may be accurately controlled by it.

For the purpose of illustration it will be assumed that a sample has been obtained from channel 5 as illustrated by the curves of FIG. 49 and that the count will be 19 for the sample thus obtained in this channel as illustrated by the negative pulse for channel 5 shown by graph 5012 of FIG. 50 which is applied to the cathode of the gating tube 3010.

As pointed out above the sampling pulse is accurately controlled by the termination of the pulse from stage 1 of the 5-ring circuit described above. This pulse in turn is accurately controlled from the 320-kilocycle current and inasmuch as the 1600-kilocycle current is also controlled by the 320-kilocycle current the sampling pulse and consequently the beginning of the gate pulse occurs each time at the same relatively phased relationship to the 1600-kilocycle current. While it is immaterial what the actual relative phase may be it will be assumed for purposes of illustration that the beginning of the gating pulse occurs at such a time relative to the 1600-kilocycle current that the first pulse flowing through either section of the gate tube after the beginning of the gating pulse will be a negative pulse obtained from the left-hand section of tube 3010. This negative pulse is applied to the grid circuit of the "on" tube 3015 of the first stage of the counter. If this tube is already nonconducting, application of the negative pulse to its grid will produce no effect. However, if on the previous count the "on" tube of the No. 1 stage was left conducting the application of the negative pulse to the grid through the coupling resistors 3031 will interrupt the current flowing in this tube and thus causes the anode to rise in potential. The anode of tube 3015 is coupled through resistor 3032 to the grid of the "off" tube 3014. Consequently, when the anode potential of tube 3015 rises it causes the potential of the grid of tube 3014 to rise with the result that the "off" tube 3014 of the first stage begins to conduct. Tube 3014 in conducting current causes a potential drop across its anode impedance with the result that its anode falls in potential causing the grid of tube 3015 to be maintained at a lower potential and thus maintaining tube 3015 cut off or nonconducting while tube 3014 continues to conduct current between its anode and cathode.

At the end of the first pulse through the gate circuit, which pulse flows through the left-hand section of tube 3010 as described above, the first stage of the counter must be in its actuated condition with the "on" tube 3015 off or nonconducting and the "off" tube 3014 on or conducting. The next pulse through the gating tube 3010 after the application of the gating pulse to its cathode will be a negative pulse from the plate of the right-hand section of this tube. This pulse is applied to quantizing tubes 3011 and 3012.

The grid of tube 3012 is connected to positive battery through resistance 3034 so that in the rest condition this tube draws plate and screen current. This current flowing through the cathode resistor 3007 maintains the cathode of tube 3011 positive with respect to its grid so that plate current in tube 3011 is negligible. The grid of tube 3011 returns to ground through resistor 3033.

The negative pulse from the anode of the right-hand section of the gate tube 3010 is applied to the grid of the "on" quantizing tube 3012 through resistor 3035 and condenser 3036. This negative pulse will interrupt the current flowing in the anode-cathode circuit of tube 3012 and thus cause the anode of this tube to rise in voltage. As a result a positive voltage is applied to the grid of the "off" quantizing tube 3011 through the coupling condenser 3037. Tube 3011 thereupon starts to conduct current which causes its anode to fall in potential and apply an additional negative voltage to the grid of tube 3012 through the coupling condenser 3036 thus maintaining tube 3012 in the non-conducting condition. After a period of time determined principally by the constants of the anode resistor 3035, the coupling capacitor 3036 and the grid resistor 3034, the grid potential of tube 3012 will rise sufficiently to permit plate current to flow. This results in a reduction of the potential on the grid of tube 3011 and a quick restoration of the rest conditions. The time constants have been so chosen that the current is cut off in tube 3012 for about 0.2 microsecond. The length of this pulse varies slightly with variations of the length of the pulse from the right-hand section of tube 3010 but this does no harm.

When the "on" tube 3012 is turned off in the manner described above and its anode becomes more positive, a positive pulse is applied to the control grid of tube 3013 through the coupling capacitor 3039. Amplifier tube 3013 is normally biased so that substantially no current or only a small current flow in its output circuit. In response to the application of a positive pulse to its grid an appreciable current flows in the output circuit of this tube thus causing a potential drop across resistor 3032 and reducing the anode potential of tube 3013 and also the grid potential of the "off" tube 3014 of the first stage of the counter. The negative pulse thus applied to the grid of tube 3014 is maintained for a time dependent upon the time constant of the circuit including the condenser 3036 as described above and is nearly independent of the time at which the gate pulse from tube 2920 terminates. If this pulse gate should terminate during the middle or any other part of the negative pulse from the right-hand section of tube 3010 and thus tend to shorten this negative pulse, the quantizer operates to lengthen the effective pulse in the manner described above so that either a full length negative pulse is applied through the tube 3013 to the control grid of the "off" tube 3014 or if the pulse coming through the gate is too short the quantizer fails to operate and no pulse is supplied. This insures unambiguous operation of the counter system.

This negative pulse applied to the control grid of the "off" tube 3014 interrupts the current flowing through this tube which in turn causes current to flow through "on" tube 3015.

Tube 3015 then continues to conduct and tube 3014 remains cut off until the third pulse is received through the gate tube 3010. This third pulse will again be a negative pulse from the left-hand section of tube 3010 which is applied to the control grid of tube 3015 and serves to turn off this tube and turn on tube 3014.

The first stage of the counter continues to respond in the manner described above to the negative pulses obtained alternately from the two sections of the gate tube 3010 so long as the negative gating pulse is applied to its cathodes.

The gating pulse may terminate at any time and if it should terminate during the time a negative pulse is being obtained from the left-hand section of tube 3010 this pulse will be shortened. If the pulse is sufficiently shortened tube 3015 may remain conductive and tube 3014 nonconducting. On the other hand this pulse while being shortened may still be long enough to cause tube 3015 to be rendered nonconducting and tube 3014 conducting. Such a condition indicates that the length of the gating pulse is close to the dividing line between amplitudes or times represented by different counts so that the amplitude may be represented equally well by either count of the counting circuit, that is, one more or one less.

If the gating pulse terminates during the time a negative pulse is being obtained from the right-hand section of the gating tube 3010 so that this pulse is shortened the quantizing tubes operate in the manner described above either to suppress the pulse altogether or to lengthen it so that a full length pulse is applied to the grid of tube 3014 to turn that tube off and tube 3015 on and thus insure proper operation of the counter in the manner described hereinafter.

When desired, quantizing tubes and circuits similar to those described above may be connected between the left-hand section of tube 3010 and the control grid of tube 3015. As will appear hereinafter the pulses from the left-hand section of tube 3010 merely reverse the first stage of the counter whereas the pulses from the right-hand section of tube 3010 control all of the stages of the counter. Consequently if is more essential to the proper operation of the counter that the pulse from the right-hand section of gate tube 3010 always be a full length pulse.

The tubes of the first stage of the counter are coupled through the shaping tubes 3016 and 3017 to the second stage of the counter comprising an "on" tube 3110 and an "off" tube 3111. The second stage of the counter as well as the succeeding third, fourth and fifth stages of the counter are maintained inoperative during the first portion of the length modulated gate pulse due to the fact that negative bias is maintained upon the suppressor grid of the coupling tube 3016 by the reset equipment which will be described hereinafter. The "on" tubes of the second, third, fourth and fifth stages of the counter are reset to the "on" or conductive condition while the "off" tubes are blocked or rendered nonconductive by the reset equipment as will be described hereinafter.

The graph 5007 shows the resetting pulses and the time during which they reset the counter and maintain it in the zero position. This resetting pulse, shown in graph 5007, is controlled from the second stage of the 5-stage ring circuit described above so that during the time the second stage is in its "on" or actuated condition the reset pulse occurs and resets the second, third, fourth and fifth counter stages to zero and at the same time blocks the coupling tube 3016.

Inasmuch as both the 1600-kilocycle current supplied through the gate tube 3010 to the first stage of the counter comprising tubes 3014 and 3015 as well as the 5-stage ring and thus the reset pulse are all controlled from the 320-kilocycle current, the reset pulse always ends with the same definite phase relationship of the 1600-kilocycle counting current supplied to the first stage of the counter. Large variations of phase can be tolerated without degrading the quality of the operation.

The last pulse to the first stage of the counter before the end of the reset pulse renders the "on" tube 3015 conductive. Shortly thereafter the reset pulse ends and removes the negative biasing or controlling pulse from the suppressor grid of the coupling tube 3016, thus rendering this tube operative for transmitting pulses through it from the first stage of the counter to the second stage. In addition the counter is rendered operative to count the succeeding pulses delivered to it.

The first pulse from the gate tube 3010 after the termination of the reset pulse is applied to the grid of the "on" tube 3015 thus turning this tube off and turning on the "off" tube 3014. This corresponds to a count of one.

The operation may take place just after or just before the end of the reset pulse. When the "off" tube 3014 starts to conduct its plate potential falls due to current flowing through its anode resistor and as a result a negative pulse is applied to the grid of the coupling tube 3016. This tube is normally biased to cut-off so that this negative pulse is not amplified by tube 3016. Thus the first stage of the counter has been operated to its number 1 position or actuated condition while the remaining counters remain in their zero or normal condition thus indicating a count of 1.

The next pulse through the balanced gate 3010 is applied to the grid of tube 3014 through the quantizing tubes 3011 and 3012 and the buffer amplifier 3013. This pulse interrupts the anode current flowing in the "off" tube 3014 which in turn causes the "on" tube 3015 to start to conduct. When the current is interrupted through the anode circuit of tube 3014 this anode will rise in potential and cause a positive pulse to be applied to the control grid of the coupling tube 3016 through the coupling condenser 3040. This pulse is amplified and shaped by the coupling tubes 3016 and 3017. Each of these tubes inverts the pulse so that a corresponding and properly shaped positive pulse is obtained from the output circuit of tube 3017. This pulse is applied through the coupling condenser 3041 to the cathodes of tubes 3110 and 3111 of the second stage of the counter.

The application of a positive pulse to both cathodes of the second stage counter tubes causes either of the tubes which may be conducting to cease to conduct. Under the specific conditions assumed, tube 3110 is conducting before the application of this positive pulse and the tube 3111 is nonconducting. Consequently, the application of the positive pulse to the cathodes of these tubes at this time interrupts the current flowing in the anode circuit of tube 3110. The positive pulse applied to these cathodes is of short duration and terminates before the energy stored in the plate inductance 3118 and capacitor 3121 is all dissipated. The energy stored in the inductance 3118 tends to cause a current to flow from positive battery through inductance 3118, resistors 3125, 3126, 3127, and 2519 to ground. There is no similar current flowing through resistor 3128 at this time. Consequently, the grid of tube 3111 will be more positive than the grid of tube 3110. As a result, upon termination of the positive pulse applied to the cathode of tubes 3110 and 3111 tube 3111 instead of tube 3110 now starts to conduct and in conducting prevents tube 3110 from passing anode current. Thus at the termination of the second pulse from the balanced gate tube which is a full length pulse due to the action of the quantizer circuit described above, the first stage of the counter is returned to its initial or zero position while the second stage of the counter is actuated to its number 1 or operated condition. The remaining stages are still in their initial or zero condition. Thus the counter indicates a count of 2.

It should be noted that when tube 3111 starts to conduct a negative pulse is applied to the grid of tube 3112 through the coupling condenser 3122. This pulse does not affect the succeeding stage of the counter, first because tube 3112 is biased so that this pulse is not amplified by the tube and second because the positive pulse in response to it would be applied to the screen of the both sections of the third stage of the counter tube 3113. A positive pulse applied to both sections of this tube is ineffective to advance or change the conditions of these sections. Instead it tends merely to maintain the circuits in their previous condition.

The next pulse from the balanced gate 3010 is applied to the grid of the "on" tube 3015 turning this tube off and turning on the "off" tube 3014 of the first stage of the counter. When the "off" tube 3014 is turned on the negative pulse applied to the grid of the coupling tube 3016 is not amplified by this tube and is thus not transmitted to the second stage of the counter. If this pulse were transmitted to the second stage of the counter it would not be effective to advance the counter because it would be in the wrong direction. In other words, it would tend to maintain the counter in its previous condition. At the termination of this pulse both the number 1 stage and the number 2 stage are actuated to their number 1 or operative positions. The remaining stages are still maintained in their zero condition. Thus the counter indicates a count of 3.

Upon the reception of the fourth pulse to the gate tube 3010 the "off" tube 3014 is again turned off and the "on" tube 3015 turned on in the first counter stage. When tube 3014 is turned off a positive pulse is again applied through the coupling tubes 3016 and 3017 to the cathodes of the tubes 3110 and 3111 of the second counter stage. At this time the "off" tube 3111 is conducting. Upon the application of the positive pulse to the cathodes of tubes 3110 and 3111, tube 3111 ceases to conduct and at the termination of this positive pulse applied to the cathodes of tubes 3110 and 3111 the energy stored in inductance 3120 and condenser 3119 cause tube 3110 to start to conduct instead of tube 3111. Tube 3110 in conducting at this time maintains tube 3111 nonconducting.

When tube 3111 ceases to conduct a positive pulse is applied to the control grid of the coupling tube 3112 through the coupling condenser 3122. This positive pulse is amplified by coupling tube 3112 and applied as a negative pulse through the coupling condenser 3123 to the screens of both sections of tube 3113, comprising the third stage of the counter. The negative pulse applied to the screen interrupts the current flowing through the conducting section of this tube which as the left-hand section under the assumed conditions. At the termination of this pulse the opposite section starts to conduct due to energy stored in the inductance in its plate circuit and the capacity from the plate to the grid of the other sections. Thus at the end of the fourth pulse from the gate tube 3010 the first and second stages of the counter are returned to their initial conditions and the third stage is actuated to its "on" or operative condition, thus indicating a count of 4.

The succeeding pulses received through the gate tube 3010 are counted by the counter stages in the manner described above. The first stage counting the individual pulses, the second stage counting the operation of one of the tubes of the first stage, and so on. If it is assumed that the instantaneous amplitude of the fifth channel, when sampled in a manner described above, is of such a magnitude that it will be represented by the count of 19; at the end of the count when the gate tube 3010 ceases to pass current the fifth counter stage, namely tube 3115, will have been actuated so that the "off" tube or righthand section is conducting while the "on" tube or left-hand section will be nonconducting. The left-hand sections of tubes 3113 and 3114 of stages 3 and 4 of the counter will be conducting and the other sections of these tubes nonconducting. Thus these stages will have been returned to their normal or initial condition. The "off" tube 3111 of the second stage and the "off" tube 3014 of the first stage will be conducting while the other tubes of these stages will be nonconducting, thus indicating a count of 19.

Thereafter the circuits of the counter remain in the condition described until reset, as will be described hereinafter. It should be noted that the output of the "off" tubes or sections 2, 3, 4 and stages 5 of the counter, that is the anodes, are connected through coupling condensers to the grids or control elements of two different series or groups of tubes. The anode of tube 3111 is connected throught resistor 3132 and the coupling condenser 2562 to the control grid of the left-hand section of tube 2530 and through the coupling condenser 2552 to the grid or control element of the left-hand section of tube 2520. The anodes of the off tubes or sections of the third, fourth and fifth counter stages are likewise connected to the control grids of other sections of tubes 2530, 2531, 2520, and 2521.

Thus the potentials of all these control elements or grids follow the potential of the anodes of the off sections of the second, third, fourth and fifth counter stages. Likewise, the current flowing in the anodes of tubes 2530 and 2531 similarly follow the condition of the corresponding counter stage. However, tubes 2530 and 2531 are all normally conducting and have a common anode resistor 2532 which is coupled to the control element of the right-hand section of 2541. The common anode resistor 2532 has a sufficiently high resistance to limit the anode currents of the sections of these tubes so that as long as any one of the sections of tubes 2530 or 2531 remains conducting, a low potential is maintained upon the control element of the right-hand section of tube 2541 thus maintaining the currents of the tubes in their normal condition. It should be pointed out that each time the "off" sections or tubes of each of the counter stages becomes conducting its anode potential falls, i.e. becomes less positive, and thus the grids or control element of the corresponding sections of tubes 2530 and 2531 become more negative, thus interrupting the flow of current in the cathode-anode path of the corresponding section.

The control grids of the corresponding sections of tubes 2520 and 2521 likewise vary dependent upon the conduction or nonconduction of the "off" tubes of the second, third, fourth, and fifth counter stages. When any one of these counter stages becomes conducting, its anode potential falls and, as a result, the grid potential in the corresponding section of tubes 2520 and 2521 likewise becomes more negative. The change in grid potentials of tubes 2520 and 2521 at these times, however, produces no useful effect because the screen potential applied to all these sections is maintained at a relatively low value due to the fact that the storage control tube 2522 is normally biased so that it is conducting and, as a result, its anode and thus the screens of both sections of tubes 2520 and 2521 are at a negative potential relative to their cathodes.

After the end of the count, the No. 1 stage of the 5-stage ring will be actuated and cause a positive potential to be applied to the grid of tube 2328. This tube amplifies the positive potential and causes a negative pulse in response thereto to flow in its output circuit. This negative pulse, graph 5017, is applied over conductor 2331 to the control grid of tube 2522, thus interrupting the flow of current in the anode-cathode path of this tube. As a result, the potential of the anode of this tube rises to a more positive potential raising the potential of the screens of all the sections of the tubes 2520 and 2521. At this time the counter has been set under the assumed conditions to represent the count of 19, that is with "off" sections of the first, second and the fifth counter stages conducting, that is, tube 3111 and the right-hand section of tube 3115 are both conducting. The "off" sections of the third and fourth counter stages have been left in a nonconducting condition. As a result, a relatively low or negative potential will be applied to the grid of the left-hand section of tube 2520 and the right-hand section of tube 2521, while a relatively high positive potential will be applied to the grids of the right-hand section of tube 2520 and the left-hand section of tube 2521.

Consequently, when a negative pulse is applied to the control grid of tube 2522, as described above, and the screens of all the sections of tubes 2520 and 2521 rise in potential, the left-hand section of tube 2520 and the right-hand section of tube 2521 will not conduct the current. However, the opposite sections of these tubes, that is the right-hand section of tube 2520 and left-hand section of tube 2521, will conduct. This action charges the storage condensers 2573 and 2574. However, the storage condensers 2572 and 2575 are not charged. Consequently, the control grids of tubes 2512 and 2515 remain substantially at cathode potential while the potential of the control grids of tubes 2513 and 2514 is reduced to a more negative value.

It should be noted that the control grids of tubes 2510 and 2511 are connected through appropriate coupling condensers and resistors to the anodes of the respective tubes of the first stage of the counter.

All of the tubes 2510, 2511, 2512, 2513, 2514, 2515 are biased so that they do not normally conduct current. Both the control grid and suppressor grid of each of these tubes is arranged so that a positive potential has to be applied to both of them before the tubes conduct current. The application of positive potential to the control grid of any of the tubes in the manner described above will not cause any current to flow in their anode-cathode circuit. Current can flow in the anode-cathode circuits of these tubes only if a positive potential or pulse is applied to their suppressor grids as well as their control grids.

The suppressor grids of tubes 2510 and 2511 are coupled to the cathode of tube 2328 and thus receive a positive potential or pulse during the time the No. 1 stage of the 5-stage ring is actuated. The suppressor grid of tube 2512 is connected through appropriate coupling resistor and condenser network to the anode of the "on" tube of the No. 2 stage of the 5-stage ring. Consequently, when the No. 2 stage is actuated, that is, with its "on" tube cut off, a positive pulse is applied to the suppressor grid in tube 2512. In a similar manner, a positive pulse is applied to the suppressor grid of tube 2513 during the time the third stage of the 5-stage ring is actuated. Likewise, pulses are applied to the suppressor grids of tubes 2514 and 2515 when the respective fourth and fifth stages of the 5-stage ring are actuated. In other words, tubes 2510 and 2511 and each of the succeeding tubes 2512 through 2515 receive a positive pulse on their grids in succession. This pulse is approximately 3.1 microseconds long so that during each cycle of the 5-stage ring each of these tubes will be actuated in succession. If the control grids of the correponsing tubes are negative, no pulse flows in the output circuit of the respective tubes upon the application of positive pulses to the suppressor. However, if the control grids are positive due to the application of a positive potential to their grids in a manner described above, then a pulse of current will flow in the output circuit. The anodes or ouptut circuits of tubes 2511 through 2515, inclusive, are all connected together to the common anode resistor 2516 and also through the coupling condenser 2609 to the control grid of the left-hand section of tube 2610.

It should be noted that the control grid of tube 2511 is connected to the "on" tube 3015 of the first stage of the counter. Consequently, with this tube not conducting under the assumed conditions, its anode will be at a relatively high positive potential so that the control grid of tube 2511 will likewise be at its more positive value. Consequently, when the No. 1 stage of the 5-stage ring applies a positive pulse to the suppressor of tube 2511 a pulse flows in the output circuit thereof and appears as a negative pulse on the control grid of the left-hand section of tube 3610. When the No. 2 stage of the 5-stage ring applies a pulse to the suppressor of tube 2512, the pulse will likewise flow in its output circuit because condenser 2572 was not charged by the storage tube 2520 and so the grid of tube 2512 is slightly positive. However, when the No. 3 and No. 4 stages of the 5-stage ring apply pulses successively to the suppressor grids of tubes 2513 and 2514 no output current flows in their anode-cathode circuit. Consequently, the negative pulse is not applied to the control grid of tube 2610. This is due to the fact that the upper terminal of the condensers 2573 and 2574 have been charged due to the operation of the right-hand section of tube 2520 and the left-hand section of tube 2521, as described above. As pointed out above, condenser 2575 was not charged so when the fifth stage of the 5-stage ring applies a pulse to the suppressor of tube 2515, a pulse flows in the output circuit thereof and is supplied to the control grid of tube 2610.

It is thus apparent that the setting of the five respective stages of the counter at the end of the count controls the pulses transmitted. That is, the first pulse of any code group is controlled by a setting of the first stage of the counter at the end of the count, the second pulse by the second stage, etc. Thus, for the count of 19 the first and second stages are actuated to their operated positions with the third and fourth stages restored to normal, and the fifth stage operated to the actuated position. Consequently, negative pulses are applied to the control grid of the left-hand section of tube 2610 during the time the first, second and fifth stages of the 5-stage ring are actuated to their operated condition, while no negative pulse but rather positive potentials or pulses are applied to the control grid of the left-hand section of tube 2610 during the time the third and fourth stages of the 5-stage ring are actuated to their conducting conditions.

The coding operation as described above is illustrated in FIG. 50 for count of 19 in which the gate pulse applied to the cathode of tube 3010 is illustrated as the pulse designated channel 5 of graph 5012. Line 5008 shows the potential of the anode of the "on" tube 3015 of the first stage counter. Graph 5014 shows the potential of the anode of the "off" tube of the second stage counter and graphs 5015, 5016 and 5013 similarly show the potential of the "off" sections of the succeeding third, fourth and fifth stages of the counter. The graph 5018 shows the pulses applied to the grid of tube 2610, while the graphs 5019 through 5022 show the potential of the grids of the respective distributor tubes 2512 through 2515, inclusive.

As illustrated in FIG. 50, at the completion of the No. 1 pulse, that is when the No. 1 stage of the 5-stage ring is restored to its normal condition and the No. 2 stage is operated to its actuated position or condition, a negative pulse is applied to the control grid of the reset tube 2540. This reset pulse comes from the anode of the left-hand section of tube 2315 when the No. 2 stage of the 5-stage ring is actuated to its "on" condition. When the 5-stage ring is actuated to its second position, i.e., its No. 2 stage, actuated curent flows in the output circuit of the "off" tube of this stage, i.e., the left-hand section of tube 2315. Consequently, the potential of the anode of this section becomes more negative, thus applying a negative potential to the grid of the right-hand section of tube 3117 over conductor 2332.

The right-hand section of tube 3117 amplifies this pulse and inverts it so that positive potential is applied to the control grid of the reset tube 2540 in response thereto. The positive potential applied to the grid of tube 2540 is illustrated by the line 5007 of FIG. 50, and occurs at the time the No. 2 stage of the 5-stage ring is actuated and thus at the time the No. 2 pulse of the code group is being transmitted.

The application of a positive pulse to the grid of tube 2540 causes the positive pulse to be repeated in its cathode circuit and a negative pulse to appear in its anode circuit. The cathode of tube 2540 is connected to the control grids of the "on" sections or tubes of the second, third, fourth and fifth stages of the counter, while the anode of tube 2540 is similarly connected through appropriate coupling networks to the control grids of the "off" sections or tubes of these stages of the counter. Consequently, upon the application of positive reset pulses to the control grid of tube 2540 a positive pulse is applied to each of the "on" sections of the second, third, fourth, and fifth stages of the counter and a negative pulse to each of the "off" sections of these stages of the counter. These reset pulses cause the said stages of the counter to be reset in their initial condition with the "on" tubes conducting and the "off" tubes nonconducting. It should be noted that the reset pulses are of a sufficient duration to insure that the last four stages of the counter are properly reset to their normal or zero condition.

During the application of a positive reset pulse to the control grid of the reset tube 2540 the corresponding negative pulse from the anode of this tube is applied to the suppressor grid of the repeater tube 3016 which negative pulse blocks this tube and prevents any actuating pulses to be applied to the last four counter stages and thus further insuring proper resetting of the counter.

When the 5-stage ring advances from its No. 2 position to its No. 3 position the negative pulse from the "off" tube of stage 2 is terminated thus restoring the reset tube 2540 to its normal condition and releasing the counter so that it will be available to count the half-cycles of the 1600-kilocycle current transmitted through the gate tube 3010 during the time the next gate pulse is applied to its cathode. This gating pulse will have a duration which is a function of the sample obtained in the next or No. 6 channel.

Thus while the counter is determining the code which will represent the magnitude of the sample in the No. 6 pulse the remaining pulses of the code representing the magnitude of the sample obtained from the fifth channel are transmitted.

The character of the last four pulses of the code combination is stored upon the storage condensers 2572 through 2575 so that the proper code combination will be transmitted at this time. Thereafter during the next cycle of the 5-stage ring the code combination representing the magnitude of the sample from the sixth channel will be transmitted.

It should be noted from the graphs 5019 through 5022 inclusive of FIG. 50 which show the potential of the upper terminal of the storage condensers upon the completion of the storage pulse during the No. 1 pulse interval as shown by graph 5009 these condensers start to discharge through the associated high resistance grid resistors. The discharging time of these condensers is sufficiently long that they do not discharge sufficiently during the remainder of the cycle of the 5-stage ring then in progress to cause improper pulses to be transmitted. In other words, if the condenser 2575 had been charged by the storage pulse during the No. 1 pulse interval the upper terminal of this condenser would still be sufficiently charged at the time the No. 5 pulse is transmitted so that tube 2515 would not pass current in its anode circuit.

However, if during the time of the next storage the upper terminal of this condenser is not again charged it will have fully discharged by the time the fifth pulse of the next code combination is to be transmitted so that a pulse of current will flow in the output circuit of tube 2515 at this time.

The discharging time of the other condensers 2574 through 2572 is progressively shorter than the discharging time of condenser 2575 so that these condensers are discharged in a similar manner such that the proper pulses as determined by the setting of the corresponding counter stages at the end of each count are transmitted.

In the manner described above each of the input channels is sampled in turn and the magnitude of the sample converted into a permutation code group, which code group is then transmitted during the time the succeeding channel is being sampled and the character of the pulses of the corresponding code group determined. After a sample has been obtained from each of the channels and the corresponding code group transmitted in succession a second sample will be taken from each of the channels in turn and these samples are likewise coded and transmitted so that a continuous stream of pulses is emitted representing the instantaneous amplitudes of complex waves applied to the incoming channels. As pointed out above, each of the channels is sampled at a rate of 8,000 times a second.

The operation of the coding may be more fully understood by reference to FIG. 55. FIG. 55 shows two sine waves, 5510 and 5520, which it is assumed, are applied to some one of the incoming channels, say channel 5 as described above. It should be noted that curve 5520 represents substantially the maximum amplitude acceptable by the coder, while curve 5510 represents a much smaller amplitude. The vertical lines 5505 represent the sampling times or intervals at which the various applied waves are sampled. It is to be understood that the wave need not be regular as shown in FIG. 55. However, the arrangement shown in FIG. 55 lends itself to a clear understanding of the coding operation.

It should also be noted that the sine waves 5510 and 5520 are intended to represent the compressed speech or other complex wave applied to the decoder after they have been compressed in the manner described above. It is also assumed that the applied complex wave is accurately centered between the 15th and 16th counts in the manner to be described hereinafter. Thus at zero time both complex waves have a value which is between the 15th and 16th counts. Consequently, the coder will transmit the code combination representing 15. At the next sampling interval, curve 5520 has risen so that the coder will count 16, and in the next interval will count 17, etc. The code combinations determined by the various counts are shown to the right of FIG. 55 and these code combinations are to be read from left to right. In other words, the first code step at the top of the code group shown to the right of FIG. 55 is transmitted first followed by the second, third, fourth and fifth code group. These pulses have weights of 1, 2, 4, 8 and 16. The weighting of the pulses perhaps is more clearly shown by the fifth pulse of the code groups which is absent or spacing in all of the codes determined by counts up to the 15th and is present in all the codes determined by counts above 15. Furthermore, all of the codes determined by counts from 16 to 31 are duplicates of the codes determined by the counts from 0 to 15 with the addition of the No. 5 pulse, marking.

A code determined by a count of one higher is transmitted for each of the succeeding samples until the sine wave 5520 rises to the value illustrated by the step 5521 at which time the wave rises more slowly so that two code groups representing the same magnitude are transmitted at this time. Each of the next two succeeding samples are also alike with one more count added in determining the code combination to be transmitted and similarly for the next two until step 5522 is reached, at which time three similar code combinations are transmitted. When the peak is reached a large number of code combinations all the same may be transmitted one after another if the complex wave remains substantially constant at this time in the same way as the sine wave 5520 remains relatively constant.

Thereafter during the time the sine wave or other complex wave decreases in value the corresponding code combinations as illustrated in FIG. 55 will be transmitted in response to the instantaneous magnitude of the complex wave at the instant of sampling.

Complex wave 5510 is similarly represented by a series of code combinations. The wave 5510 however rises much more slowly than the wave 5520. Consequently, a greater number of identical code combinations are transmitted in succession because the wave does not rise fast enough to cause the code combinations to change as fast as in the case of curve 5520.

As illustrated in FIG. 55 the successive code combinations never differ by more than one count of the counter or one pulse of the code combination. it is to be understood, however, that in the case of the complex wave, the count may change much more rapidly than the sine wave shown in FIG. 55. The count between successive samples may likewise change more than one unit. As a matter of fact it may go from 0 to 31 in case a high amplitude high frequency wave is applied to anyone of the input channels.

It should be noted that the step wave forms such as 5511 superimposed on curves are in effect the actual wave form represented by the pulses transmitted. The steps of these waves as shown in FIG. 55 are all substantially the same height. Inasmuch as the incoming signals have been compressed prior to the applications of the coder these equal height steps in FIG. 55 do not represent equal changes in the amplitude of complex wave. Instead, the steps near the center of the counting range represent much smaller changes in amplitude of the complex wave as applied to the system than do the steps near the extremes of the counting range.

It is to be noted from graphs 5009 and 5007 that a counting time interval of substantially three pulse intervals is provided. Inasmuch as the counter operates five times as fast as the controlling oscillator this time interval is sufficient for 15 cycles or 30 half-cycles of the 1600-kilocycle current. As noted earlier the zero count is accomplished before the end of the reset pulse and a count of one is reached just after or before the end of the reset time interval. The last count, i.e., 31, is reached just before or after the beginning of the storage time and may result in shortening slightly the first pulse in a code group for the count of 31. This does no harm in the exemplary system since a narrower pulse is finally transmitted. Half of the remaining time is used for resetting the last four stages of the counter. It is not necessary to reset the first stage since it comes into standard phase with respect to the 1600-kilocycle current during the reset time. The remaining time interval is used to store the information obtained by the counter and to send the first pulse. Thus 32 discrete amplitudes, namely 0 to 31, may be recognized by means of the 5-element code, each element of which is controlled by one of the counter stages.

Provision has been made to prevent the counter from counting more than 31. Upon the count of 30 by the counter the "off" section or tube of each of the last four counter stages will be energized or conducting. Consequently, the anodes of these tubes or sections will be at a reduced potential thus causing the control grids of both sections of tubes 2530 and 2531 to be negative, cutting off the current flow in the anode-cathode paths of both sections in both of these tubes. As a result the current flowing through the common anode resistor 2532 falls to a low value so that the drop across this resistor likewise falls to a low value. Consequently, the voltage applied to the control grid of the right-hand section of tube 2541 through the coupling condenser 2533 rises in value.

The two sections of tube 2541 are connected in a double stability circuit so that the circuit and tubes are stable with either section conducting and the other section nonconducting.

The circuits of this tube are normally conditioned with the left-hand section conducting and the right-hand section nonconducting. However, upon the application of a positive pulse or positive potential to the control grid of the right-hand section of this tube in response to a count of 30 by the counter as described above, the right-hand section will start to conduct current in its anode-cathode circuit thus causing the anode of this section to fall in potential. The grid of the left-hand section is coupled to this anode circuit so that the potential of the grid of the left-hand section becomes more negative and interrupts the current flowing through the left-hand section. The right-hand section then remains conducting and the left-hand section nonconducting until reset as described hereinafter. The suppressor grid of the buffer amplifier tube 3013 is connected to the anode of the right-hand section of tube 2541. As pointed out hereinbefore so long as the right-hand section of tube 2541 remains nonconducting its anode is at a relatively high positive potential so that the suppressor grid of tube 3013 is likewise maintained at a more positive potential, thus causing tube 3013 to act as a repeater and repeat the pulses from the anode of tube 3012 to the control grid of tube 3014. However, when the anode of tube 2541 falls in value, that is, becomes less positive in response to a count of 30 by the counter as described above, the suppressor grid of tube 3013 will likewise become less positive and cut off or block tube 3013 so that this tube will no longer repeat the pulses from the anode circuit of the quantizer tube 3012.

Thus no further pulses are supplied to this side of the counter so that the counter may go to a count of 31 but is maintained in the condition representing the count of 31 which is later transferred to the storage condensers and distributor tubes in the manner described above thus causing the transmission of a code combination having all five pulses marking, i.e., negative as applied to the grid of the left-hand section of tube 2610.

Upon the application of a positive pulse to the reset tube 2540 as described above, a positive pulse from its cathode is applied to the control grid of the left-hand section of tube 2541 thus causing current to flow in this section of tube 2541. Due to the connection between the anode of the left-hand section of tube 2541 and the control grid of the right-hand section, the current flowing through the right-hand section is interrupted at this time and thus both sections of tube 2541 are restored to their initial condition which again applies the proper potential to the suppressor grid of tube 3013 to cause this tube to function as a repeater and repeat the pulses from tube 3012 to the first stage of the counter comprising tubes 3014 and 3015.

BIAS CONTROL

It is of course desirable that the incoming signals be centered in the middle of the coding range so that on the average the counter should count either 15 or 16 in the absence of signals and on the average in the presence of signals, it should count 16 or more as often as it counts 15 or less. In order to insure that the incoming pulses remain substantially centered in the center of the counting range, a group of bias control tubes and circuits has been provided.

If the signals are properly centered in the counting range of the counter, the counter will count 16 or more half the time or four times for one sample of each of the eight channels. Thus four of the eight code combinations per multiplex frame will have 16 or more, whereas the other four should have a count of 15 or less. This means that on the average the final stage of the counter comprising tube 3115 should be operated to its actuated condition just four times during each multiplex frame. The output of the above section of this stage is coupled through condenser 3124 to the control grid of the left-hand section of tube 3025 which operates as a buffer amplifier and repeater.

In order to control the bias it is necessary to count the number of times the final stage comprising tube 3115 is actuated to its No. 1 position during a given interval of time. If this number is over half the total number of times the counter counts it is desirable to shorten the gate pulse applied to the gate tube 3010. If tube 3115 is actuated to its operated position for less than half of the times the counter makes a count then it is desirable to lengthen the gate pulse supplied to the gate tube 3110.

Each time the right-hand or off-portion of the fifth stage comprising tube 3115 becomes conducting its anode potential falls in value and applies a negative potential through the coupling condenser 3124 to the grid of the left-hand section of tube 3025. This tube serves as an amplifier but inasmuch as this grid is already biased substantially to cut-off the negative pulse applied to the control grid of this section at this time produces little or no effect upon its output current.

However, when the fifth stage of the counter is reset before the beginning of the next count the current flow through the right-hand section of tube 3115 will be interrupted when this tube is conducting. Interruption of this current applies a positive potential to the grid of the left-hand section of tube 3025 which potential causes a negative pulse to be produced in the output circuit of the left-hand section of tube 3025 which is applied to the screen of both sections of tube 3026.

Application of a negative pulse to the screen of both sections of tube 3026 causes the conducting section to become nonconducting and the nonconducting section to be conducting. Tube 3026 is arranged in a double stability circuit so that it will remain with either section conducting and the other section nonconducting but will not remain in any intermediate condition or position. This tube therefore is arranged as a counter stage. The anode of the right-hand section of this tube is coupled to the control grid of the right-hand section of the buffer amplifier tube 3025. Consequently, each time the current flowing through the right-hand section of tube 3026 is interrupted a positive pulse is applied to the control grid of the right-hand section of tube 3025 thus causing a negative pulse to be applied to the screens of both sections of tube 3027. Tube 3027 is another counter stage similar to tube 3026. The circuits of this tube are likewise arranged to form a double stability circuit and operate as a counter.

The anode or output of the right-hand section of tube 3027 is coupled through the coupling condenser 3045 to the grid of the left-hand section of tube 3018. Since both tubes 3026 and 3027 act as frequency dividers, their joint effect will be to apply one pulse to the grid of the left-hand section of tube 3018 for every four operations of the last stage 3115 of the counter.

Each time anode current is established in the right-hand section of tube 3027 the left-hand section of tube 3018 is driven negative through condenser 3045. Condenser 3045 and resistor 3006 are so proportioned that the grid potential again becomes positive after a period of about 15 microseconds. A positive voltage pulse is thus formed at the anode of the left-hand section of tube 3018. The constants are so chosen that no significant negative pulse is produced in the plate circuit of tube 3018 when anode current of tube 3027 is cut off.

During the interval between positive pulses from tube 3018 condenser 3024 assumes such a charge that the potentials of the cathode and anode of the left-hand section of tube 3019 are substantially equal. When a positive pulse voltage is applied current flows from anode to cathode of the right-hand section of tube 3019 adding a small charge to condenser 3022 and thus making the grid of tube 3021 more positive. This increases the current flowing to the cathode of tube 3021 and so makes the potential applied to the anode of the left-hand section of tube 3019 more positive. As a result of this variation in the potential of the anode of the left-hand section of tube 3019, condenser 3024 is always restored to such a condition that equal charges are added to the condenser 3022 for each positive pulse from tube 3018. This circuit is sometimes called a staircase counter.

The grid of the right-hand section of tube 3018 is connected to the anode of the "on" section of the first stage of the 8-stage ring through the coupling condenser 3042.

Each time the right-hand section of tube 2213 of the first stage of the 8-stage ring is cut off the potential of the anode of this section rises in value or becomes more positive and thus in effect applies a positive potential to the grid of the right-hand section of tube 3018. A positive potential applied to the grid of this section causes its anode to fall in potential or become negative. When the anode potential of the right-hand section of tube 3018 falls, current flows through condenser 3023 and the right-hand section of tube 3020 to deliver a small negative potential to condenser 3022.

In the interval between pulses condenser 3023 is recharged through the left-hand section of tube 3020. Thus tube 3020 serves as a staircase counter stepping the voltage in a negative sense.

The 8-stage ring supplies 8000 pulses per second to the right-hand section of tube 3018. If the signals are properly centered in the counting range of the counter, there will also be 8000 pulses per second applied to the left-hand section of tube 3018. The charges delivered to condenser 3022 through tubes 3019 and 3020 respectively are of opposite polarity so that an average potential is reached. If less than 8000 pulses per second are received by the left-hand section of tube 3018, the voltage on condenser 3022 tends to become cumulatively more negative; more than 8000 pulses per second makes the voltage more positive. Thus, if the counter counts over 15 four times during each complete multiplex frame the same number of increments of charge will be added and removed during each multiplex frame. The values of the resistors 3030, 3029, and 3028, the value of the capacitors 3023 and 3024 are so related that the potential of the upper terminal of condenser 3022 will remain substantially constant because substantially the same increment of charge is both added and subtracted during each complete cycle of the 8-stage ring. However, if the counter counts beyond 15 more than four times during any multiplex frame more increments of charge will be added to the condenser 3022 than will be removed. Likewise, if the counter does not count up to 15 four times during each cycle, more charge is removed from condenser 3022 than is added so that its potential tends to fall or become less positive.

As pointed out above the cathode of tube 3021 is connected so that its potential follows the potential of the upper terminal of condenser 3022. A portion of this potential is applied to the control grid of the right-hand section of tube 2913, thus causing the potential of this grid to follow the potential of the upper terminal of condenser 3022. Resistor 3043 and condenser 2938 have a long time constant and operate as a filter so the grid of the right-hand section of tube 2913 is maintained at a portion of average potential of the cathode of tube 3021 and thus follows the average potential of the upper terminal of condenser 3022. The output or anode of the right-hand section of tube 2913 is connected to the screen grid of both sections of tube 2913. Thus the potential of the control grid of the right-hand section of tube 2913 controls the anode current flowing through the left-hand section of this tube, except during the application of the negative pulse of one-microsecond duration to the control grid of this left-hand section as described above.

As the potential of the upper terminal of condenser 3022 rises, the potential of the control grid of the right-hand section of tube 2913 also rises so that the current flowing through this section of the tube increases and thus decreases the screen potential applied to the left-hand section of tube 2913, which in turn decreases the current normally flowing through this section of the tube. As a result when the one-microsecond negative pulse is applied to the control grid of the left-hand section of this tube, the total change in anode potential will be reduced. Likewise, when the potential of the upper terminal of condenser 3022 falls in value, the grid of the left-hand section of tube 2913 will become less positive and thus reduce the current flowing in the right-hand section of this tube which in turn increases the current normally flowing through the left-hand section of this tube. Consequently, when the one-microsecond negative pulse is applied to the control grid of the left-hand section of this tube, its anode potential will change more.

It will be recalled that the potential to which the anodes of tubes 2913 and 2914 rises upon the application of a negative pulse to the control grid of the left-hand section of tube 2913 is determined by the magnitude of the signal applied to the control grid of tube 2914. Thus the upper limit of the change in potential of the anodes in tubes 2913 and 2914 is controlled by the signal while the lower limit is controlled by the bias control circuit as described above. If the count on the average is too long the screen potential of tube 2913 is reduced so that it will produce a one-microsecond pulse of somewhat less amplitude which in turn produces a shorter gating pulse thus tending to reduce the count of the counter. Conversely when the counter continues to count low, i.e., less than 15, on the average, the potential of the screen of tube 2913 is increased so that a given signal will produce a pulse of greater amplitude which in turn causes a gating pulse of increased length to be applied to the gating tube 3010 in the manner described above.

In this manner the automatic bias circuit tends to maintain the incoming signals accurately centered around the middle of the counting range, so that the coding equipment, and in particular, the counter thereof, will not distort the applied signals so long as there is additional amplitude range available in the counter.

The negative output pulses from the coding equipment applied to the control grid of tube 2610 are combined with other pulses and ultimately transmitted to the receiving station to secure additional features and advantages which will be described hereinafter. However, these pulses as applied to the control grid of the left-hand section of tube 2610 are suitable for transmission to the distant station without further change. These pulses may be transmitted over any suitable conducting transmission path or medium such as open wire lines, cables, coaxial cables, wave guides, channels of carrier current, radio channels including the highest radio frequencies obtainable. In order to facilitate the understanding of this invention and also in order to describe the operation of such a system in accordance with the present invention, it will now be assumed that the pulses as applied to the control grid of left-hand section of tube 2610 are conveyed to a receiving station and applied as positive pulses to the conductor 4401 in any suitable manner. A specific arrangement for so conveying the pulses and providing many additional features will be described hereinafter. It is to be understood however that the operation of the coding and decoding equipment is not in any way dependent upon or limited to the specific arrangements empolyed in the exemplary system described herein for so conveying these pulses.

RECEIVING STATION

The receiving station is provided with a control oscillator comprising tubes 3910 and 3911 controlled by a mechanical resonator such as a quartz crystal 3913. This crystal is maintained in a constant temperature oven 3914 similar to the arrangement described hereinbefore at the transmitting station. The oscillator tube 3910 is coupled through a coupling condenser 3912 to the input of tube 3911 and the output of tube 3911 is coupled to the input of tube 3910 through the piezoelectric quartz plate 3913, thus providing a high degree of frequency stability for the oscillator at the receiving station similar to that of the transmitting station. The oscillations of the oscillator comprising tubes 3910 and 3911 are maintained in synchronism with the received pulses as will be described hereinafter. For the present, it is assumed that the oscillators are in synchronism and are maintained in synchronism.

The input circuit of the right-hand section of tube 3920 is connected through the coupling condenser and resistance network 3921 to the output of the left-hand section of the buffer amplifier tube 3922. Tube 3922 is provided to supply sufficient power for the operation of tube 3920 without interfering with the operation of the oscillator tubes 3910 and 3911 and thus without affecting the frequency of oscillations. The output of the right-hand section of tube 3920 is coupled through the left-hand section of this tube to the control element of the right-hand section of the driver 4015 of a 5-stage ring at the receiving station. Tube 3920 is employed to differentiate and otherwise shape the oscillations received from the oscillator and cause a sharp positive pulse to be applied to the control grid of the right-hand section of tube 4015 for each cycle of oscillation of the oscillator. The operation of the foregoing tubes and circuits are similar to that described for the respective tubes and circuits at the transmitting station. Thus, graph 5125 represents the wave applied to the grid of the left-hand section of the buffer and isolating tube 3922. Graph 5136 represents the wave form of the voltage on the grid of the right-hand section of tube 3920 and clearly shows the flat top of the positive half-cycle. Graph 5137 represents the differentiated wave 5136 as applied to the control grid of the right-hand section of tube 4015 which functions as the driver tube for the 5-stage ring.

The 5-stage ring at the receiving station comprises tubes 4010 through 4015 which are similar to the tubes of the 5-stage ring at the transmitting station. The various sections of these tubes are arranged in pairs to form double stability circuits, that is, circuits in which current will flow through either one section or the other and continue to flow in that manner until interruption after which current will start to flow through the other section. A pair of tubes or sections of tubes forms one of the stages of the ring. Consequently, the ring is advanced one stage for each cycle of the controlling 320-kilocycle current.

Figure 41:
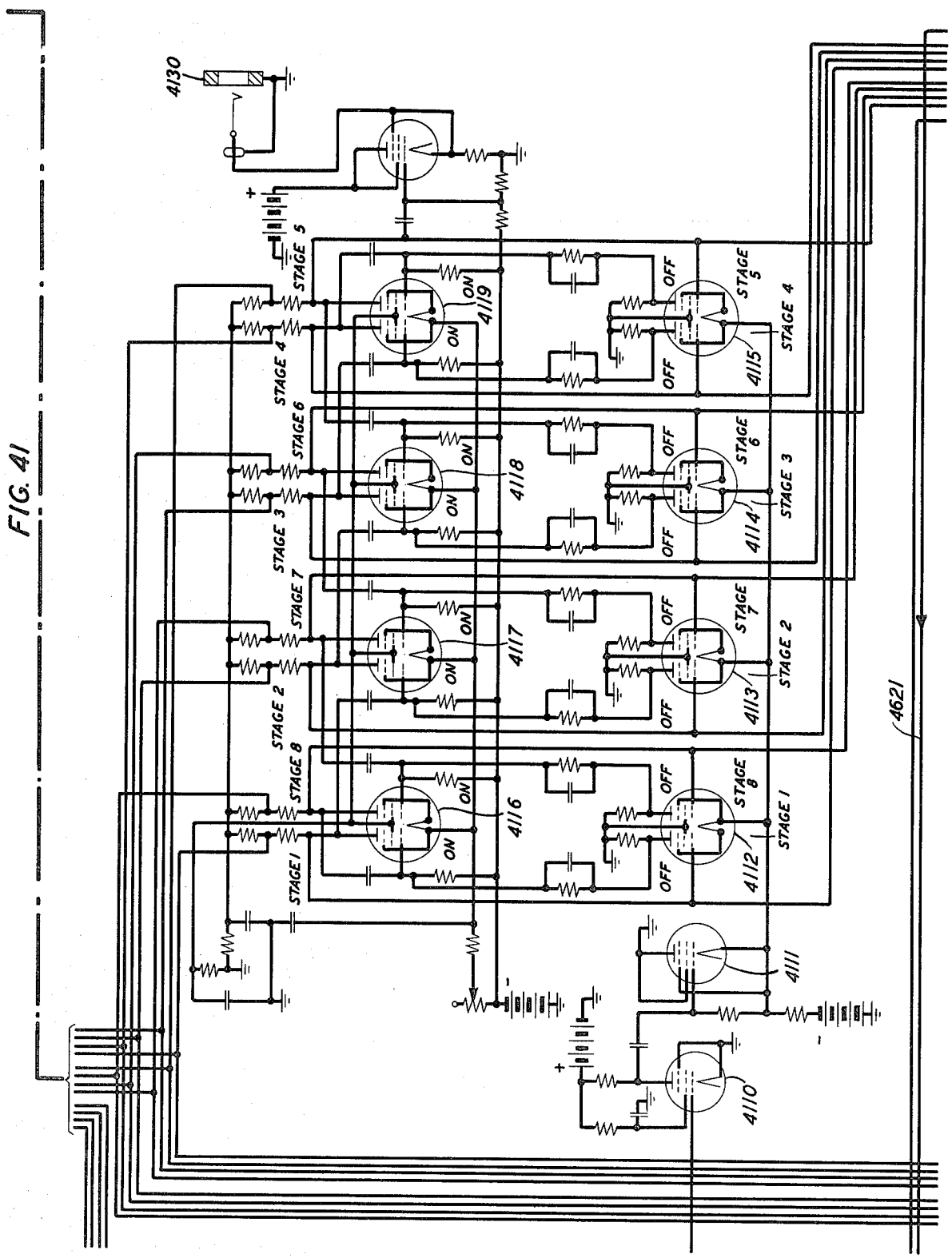

The off-section of stage 1, that is, the right-hand section of tube 4013 is employed to supply pulses for driving the 8-stage ring as shown in FIG. 41. The 8-stage ring at the receiving station is similar to the 8-stage ring at the transmitting station shown in FIG. 22. The output of the 5-stage ring is amplified and shaped by means of tubes 4110 and 4111 similar to tubes 2210 and 2211 at the transmitting station. Tube 4111 applies a sharp positive pulse to the cathodes of tubes 4112 through 4115 inclusive. Tubes 4112 through 4119 inclusive have their sections arranged in pairs which form double stability circuits similar to those of the 5-stage ring. Each of the pairs of tubes form a stage of the 8-stage ring in the same manner as described above at the transmitting station. Furthermore, the circuits are advanced one stage for each complete cycle or revolution of the circuits of the 5-stage ring.

Each of the stages of both the 5-stage and 8-stage ring supply pulses for the operation of various circuits of the system. Furthermore, each of the stages of the respective rings are maintained in proper relation with the corresponding stages at the transmitting station by means of the synchronizing equipment which will be described hereinafter.

Decoding and Distributing Decoded Signals to the Respective Channels

It will now be assumed that the coded signals from the coding distributor comprising tubes 2511 through 2515 for all of eight channels are applied to conductor 4401 in some manner. One manner in which the signals may be conveyed from the transmitter station to the receiving station will be described hereinafter. So long as these signals are of the same character and follow one another in the same sequence as generated by the distributor at the transmitting station the operation of the decoding equipment is independent in the manner in which the signals are conveyed from the transmitter to the receiver.

At the receiving station an 8-stage ring is employed to separate out the groups of five signals which belong to the various channels. This separation is accomplished by means of pulses received from the 8-stage ring which are accurately synchronized with the received pulses and also with the transmitting equipment so that each of the pulses from each stage of the 8-stage ring coincides with the reception of five pulses all of which are associated with the corresponding channel. In order to employ the 8-stage ring to separate the pulses forming the code groups the 8-stage ring is controlled by the first stage of the 5-stage ring at the receiver instead of by the third stage of the 5-stage ring as at the transmitter. The graphs 5221 through 5228 show the wave form at the anodes of the respective stages of the 8-stage ring.

The output of the "on" tube of stage 1 of the 8-stage ring is connected to the control grid of the left-hand section of tube 4410. The output of the "on" tube of stage 5 of the 8-stage ring is connected to the control grid of the right-hand section of tube 4410. These grids will consequently be maintained positive during the time the 8-stage ring is actuated to its first and fifth positions. The anode of both sections of tube 4410 are supplied through a common anode resistance 4412 and coupled to the control grid of the left-hand section of tube 4411. Thus the control grid of the left-hand section of tube 4411 is maintained negative during the time the first and fifth stages of the 8-stage ring are in their actuated condition. Graph 5215 represents the potential wave applied to the control grid of the left-hand section of tube 4411.

With the grid of the left-hand section of tube 4411 maintained negative a positive potential as illustrated by graph 5216 is applied to the control grid of tube 4414 thus permitting tube 4414 to operate as an amplifier tube at these times. During the time the fifth stage of the 8-stage ring is in its actuated condition five code pulses which represent the instantaneous amplitude of the complex wave of the fifth channel are received and amplified by tube 4414. These pulses are positive pulses as applied to the suppressor grid of tube 4414. Consequently, pulses of negative potential are applied to the control grid of tube 4415 and repeated as positive pulses in its output or anode circuit. The left-hand diode of tube 4416 operates as an amplitude limiter and thus limits the amplitude of the pulses so that all of the pulses are of substantially the same height or positive amplitude relative to the negative B battery supply voltage. The amplitude limited pulses are then applied to the grid of tube 4510. Tube 4510 is a pentode tube and is biased so that current does not normally flow in its output or anode circuit. However, upon the application of each of the positive pulses to its control grid a current of accurately predetermined magnitude flows in its output circuit. The magnitude of this current is determined by the tube, by the magnitude of the supplied pulses and also by the setting of potentiometer 4528. Inasmuch as these pulses are all limited in amplitude as described above and inasmuch as each of the pulses is substantially the same duration due to the operation of the pulse-forming circuits described herein, and since tube 4510 is a pentode and operates as a constant current source or generator, the same total quantity of electricity flows through tube 4510 in response to each of the positive pulses applied to its control grid.

Consequently, each of these pulses of current supplies substantially the same predetermined quantity of charge to condensers 4511 and 4512. The cathode of tube 4510 is connected through the cathode resistors 4527 and 4528 to negative battery or negative potential. The plate of tube 4510 together with one terminal of condenser 4511 and one terminal of condenser 4512 are connected to a more positive potential determined by the potentiometer comprising of resistor 4523 and 4524 through the left-hand section of tube 4513. The potentiometer comprising resistors 4523 and 4524 is connected between ground and the source of negative potential. Consequently, the common point between these resistors is more positive than the negative terminal of the B supply which is connected to the cathode of tube 4510. The left-hand diode of tube 4513 is connected so that it normally passes current from the common point of the potentiometer through the anode-cathode circuit of tube 4510 back to the negative source of supply.

The resistors 4523 and 4524 tend to cause condensers 4511 and 4512 to discharge to the normal potential, which is substantially the potential of the common point of these resistors, after each quantity of charge is supplied to these condensers in response to each of the pulses in the manner described above. The time constant of the discharging of condensers 4511 and 4512 is so arranged that during each pulse interval, these condensers are discharged by one-half of the amount of charge supplied to them, that is, during each three-microsecond interval they are discharged by half the amount of charge supplied to them. Thus the first pulse applied to this condenser will supply a definite quantity of charge. This charge will be reduced to one-half this value during the second pulse interval, one-quarter its value during the third, one-eighth during the fourth, and one-sixteenth of its value during the fifth pulse interval, each pulse interval being measured from the trailing edge of the pulse. Likewise, the charge supplied to the condenser in response to a pulse during the second pulse interval will be reduced in value to one-eighth of its value at the end of the code group. The charge supplied by each of the succeeding pulses is reduced by one-half the amount the previous one was reduced.

When pulses of a code combination are thus received in succession each supplies the same amount of charge during its pulse interval which charge is subsequently reduced through the discharging circuit described above in such a way that at the end of a complete code combination the amount of charge still remaining on the condenser is equal to the sum of the charges remaining from each of the pulses received during the code group, and thus the difference between the normal voltage of the upper terminal of condenser 4512 and the voltage of this terminal at the end of each code combination applied to it is a function of or proportional to the magnitudes of the samples applied to the coding equipment at the transmitting station.

Features of this decoding arrangement which may be described herein but not claimed herein and which may be novel are set forth and claimed in a patent application B. H. Oliver-C. E. Shannon, Ser. No. 649,347, filed Feb. 21, 1946.

After the fifth pulse of the code group has been received the 8-stage ring will advance one stage in the manner described above and thus remove the positive potential from the control grid of tube 4414. This effectively blocks this tube and prevents it from repeating further pulses to the control grid of tube 4510 through tube 4415. The 8-stage ring in advancing one position, that is, to its No. 6 position will cause a tube corresponding to tube 4414 to become conducting to repeat the next group of five pulses to the decoding equipment which decodes the pulses of channel No. 6. In addition, the 8-stage ring advancing to its No. 6 position will cause a positive potential to be applied to the control grids of the left-hand sections of tubes 4522 and 4525.

Both sections of tube 4525 are normally nonconducting due to the bias potentials normally applied to this tube. However, upon the application of a positive potential to the control grid of the left-hand section of this tube this section becomes conducting and causes its anode potential to be reduced to a low value near the potential of the negative power supply. The anode of the left-hand section of tube 4525 is connected to the left-hand anode of tube 4513. Consequently, when the anode of tube 4525 is reduced to a low negative value the anode of the left-hand section of tube 4513 is likewise reduced to a low value thus preventing any further current flow through the left-hand diode of this tube. As a result, the upper terminal of condenser 4512 and the right-hand terminal of condenser 4511 are not further discharged during this interval. Instead, they remain at a potential below its normal potential by an amount which is a function of the magnitude of the sample or instantaneous amplitude of the voice frequency wave applied to the coding equipment at the transmitting station.

Graph 5210 illustrates the variation of the potential of the anode of tube 4510 in response to the pulses applied to the grid of tube 4510 illustrated in graph 5211. Graph 5213 illustrates the received pulses applied to the control grid of tube 4415. Graph 5212 shows the corresponding potentials of the anode of the left-hand section of tube 4513. This graph clearly shows that the anode of the left-hand section of tube 4513 is reduced to a low negative value during the time the 8-stage ring is in its No. 6 position.

The potential, which is illustrated by graph 5210, of the upper terminal of condenser 4512 was also applied to the control grid of the left-hand section of tube 4514. This tube is normally cut off due to the fact that the grids of this tube are normally maintained at a potential well below the potential of the cathodes of this tube. The grid of the right-hand section of tube 4514, for example, may be maintained at a potential of approximately 40 volts negative with respect to ground by means of a potentiometer 4517. The upper terminal of condenser 4512 never exceeds approximately 16 volts negative with respect to ground due to the voltage drops across resistors 4523 and 4524. These potentials are sufficient to prevent any substantial current flowing in the output circuits of either section of tube 4514.

Upon the application of a positive potential to the control grid of the left-hand section of tube 4522 current will flow through this section and reduce the potential of its anode to substantially the potential of the negative B battery supply voltage. Consequently the potentials of the cathodes of both sections of tube 4514 are reduced at this time because the cathodes are connected to the anode of the left-hand section of tube 4522 through the resistors 4542 and 4543. Thereupon both sections of tube 4514 start to conduct anode current under the control of the potentials applied to the grids of this tube. In other words, during the time the potential of the upper terminal of condenser 4512 is maintained constant at a potential which is a function of the amplitude of the sample of the incoming wave applied to the coder at the transmitting station and thus a function of the particular code combination transmitted and received over the system, tube 4514 is rendered operative. During this time the left-hand grid is thus accurately controlled by the potential which is a function of the instantaneous amplitude of the complex wave being transmitted.

Pulse Amplitude Expansion

The potential of the grid of the right-hand section of tube 4514 is established by means of potentiometer 4517 and the connected network in the middle of the range of potentials applied to the grid of the left-hand section of this tube. In other words, the potential applied to the grid of the right-hand section of tube 4514 will produce a voltage drop through the cathode resistor 4541 of this section which is an average of the voltage of the cathode of the left-hand section of this tube in response to code combinations representing counts of 15 and 16, and the voltages of the two cathodes of tube 4514 are equal in the absence of a signal. Graph 5214 shows the wave of the cathode of the right-hand section of tube 4514.

When the potential applied to the grid of the right-hand section of tube 4514 is more positive than its mean or average value the cathode of this section will be more positive than the cathode of the right-hand section of the tube 4514, as illustrated by a comparison of graph 5217 which shows the wave at the cathode of the left-hand section of tube 4514 with graph 5214. Consequently, a pulse of current will flow through the nonlinear circuit element which may be a copper-oxide rectifier 4521 and then through the output transformer 4518. Likewise, if the grid of the left-hand section of tube 4514 is more negative than its average or mean value the potential of the cathode of this section will be more negative than the cathode of the right-hand section of tube 4515. As a result, a pulse of current will flow from the cathode of the right-hand section through the output transformer and the copper-oxide rectifier or other non-linear device 4520 to the cathode of the left-hand section of tube 4514. The non-linear devices 4520 and 4521 have characteristics similar to the corresponding compression devices employed at the transmitting station and are similarly maintained at a substantially constant temperature by the constant temperature oven 4519. A change of 16 to 1 of the potential impressed on these devices produces a current change through them of around 400 to 1. The current flowing through these devices causes an expanded output voltage to appear across the output transformer 4518 thus accurately compensating for the compression of the signals at the transmitting station and restoring the output pulses through the output transformer 4518 to an amplitude range similar to the amplitude range of the incoming signal.

At the end of the interval during which the sixth stage of the 8-stage ring is actuated as described above, the positive potential is removed from the control grids of the left-hand sections of tubes 4522 and 4525. At this time the left-hand section of tube 4522 ceases to conduct current and thus restores the cathodes of tube 4514 to a more positive value so that this tube no longer operates as an amplifier tube.

The output of transformer 4518 is connected to a low-pass filter 4610 which is employed to remove all the higher frequency components from the output pulses applied to this transformer and thus in effect recreates the speech wave from the succession of pulses applied to the transformer 4518. The output of filter 4610 is amplified by both sections of tube 4611 and then by the left-hand section of tube 4612. The output of the left-hand section of tube 4612 then extends over conductor 4619 to the terminating equipment associated with the fifth channel and then through the terminal equipment to the ultimately receiving device.

Output transformer 4518 in the exemplary system introduces an appreciable capacitance to ground across the cathode resistor 4541. This capacitance causes the shapes of the beginning and ending of the pulses at the cathode of the right-hand section of tube 4514 to differ by a small amount from what they would be if this capacitance were not present. To make the pulse shapes substantially the same at the two cathodes of tube 4514 a capacitance 4545 about equal to that of transformer 4518 is added between ground and the cathode of the left-hand section of tube 4514. By thus matching the capacitances to ground on the two cathodes of tube 4514 the shapes of the pulses in the two cathodes are made the same. Furthermore, by adjusting potentiometer 4517 to make the amplitudes of the pulses on the two cathodes equal, substantially no current will flow through expanding devices 4520 and 4521 when a potential corresponding to the average of code combinations represeneding counts of 15 and 16 is present on the grid of the left-hand section of tube 4514. The expandor is consequently in a balanced condition so that when no signal current flows through the compressor substantially no current flows through the expandor.

Elements 4520 and 4521 which in the exemplary system described herein comprise copper-oxide rectifier elements have an appreciable capacity in parallel with their non-linear resistance or impedance. The charging and discharging of this capacity at the beginning and end of each pulse applied to them may tend under certain circumstances to cause distortion unless the circuit is arranged so that the effect of the charging current at the beginning of each pulse will be substantially cancelled out by the effect of discharging current at the end of each. In the present instance, the effect of the inherent capacity of these elements is greatly reduced or eliminated by arranging the circuit so that the transient discharging current is able to flow through resistors 4540 and 4541, and the output transformer 4518 when tube 4522 becomes non-conducting and thus cancels the effect of the transient charging current which flows through the transformer when tube 4522 becomes conducting.

When a signal pulse is being transmitted through the exemplary circuit a current will flow between the two cathodes of tube 4514 by way of resistor 4544 and output transformer 4518 and the copper-oxide rectifiers in the intervals when tube 4514 is conducting. If the signal is small the transient portion of this current caused by the charging of the capacitance of the copper-oxide rectifiers may be greater than the current which flows through the same non-linear resistances of these devices. However, when tube 4514 becomes non-conducting the discharging of the capacitance of the copper-oxide rectifiers causes a transient current to flow through transformer 4518 by way of resistors 4540, 4541, 4542, and 4543 in a direction opposite to that of the charging transient. Furthermore, these charging and discharging transients are sufficiently close together in time so that their low frequency components (that is, those components in the voice frequency spectrum) very nearly cancel each other, and the higher frequency components are removed by the low-pass filter 4610. Consequently, the voltage at the output of low-pass filter 4610 is substantially unaffected by the capacitance of the copper-oxide rectifiers.

In this manner by first compressing the signals before coding and transmission and then expanding after transmission and after decoding, it is possible to transmit signals having a larger volume range than would otherwise be possible and thus provide more faithful reproduction of signals transmitted over a communication system. This is particularly true of voice signals. By use of a compressor and expandor a 400 to 1 volume range of signals is transmitted, whereas if the compressor and expandor were not used the volume range in the exemplary system would be only 16 to 1. By means of the compressor and expandor, the difference in amplitude between the values represented by the discrete code combinations is small when the input amplitude is small and is large when the input amplitude is large. In other words, the percentage of error more nearly approaches a constant for both small and large signals applied to the coding equipment.

This extended volume range of signals which may be transmitted over the system provides for greater fidelity and understanding of the signals because the response of hearing to a given percentage error in signal is substantially independent of the volume of the signal.

The left-hand section of tube 4525 also ceases to conduct current at the end of the interval during which the sixth stage of the 8-stage is actuated and thus permits the potential of the anode of the left-hand diode of tube 4513 to rise in value so this section again starts to conduct current and completes the discharging of the condensers 4512 and 4511 to their steady state or normal Value. At a later time when the 8-stage ring is next advanced to its No. 1 position, five more pulses will be applied to the grid of tube 4510 in a manner described above. These five pulses will be from the No. 1 channel and will cause the potential of the upper terminal of condenser 4512 to assume a value represented by the signal applied to the No. 1 channel at the time it was sampled at the transmitting station. During the No. 2 interval of the 8-stage ring the left-hand section of tube 4525 and the right-hand section of tube 4522 will be energized or rendered operative due to a positive potential applied to their control grids. At this time the potential of the upper terminal of condenser 4512 is again maintained constant but tube 4531 is rendered active instead of tube 4514. Consequently, this pulse will be conveyed to an equipment similar to that described above but individual to channel 1 instead of individual to channel 5.

At still a later interval of time the 8-stage ring will again be advanced to its No. 5 position at which time a second code group of five pulses representing the succeeding sample from channel No. 5 will be applied to the control grid of tube 4510 and be decoded by the resistance condenser network connected in the anode circuit of this tube. The decoded pulse is then conveyed to the pulse amplitude expansion equipment associated with channel 5 in the manner described above and applied to the low-pass filter 4610. Pulses are thus applied to low-pass filter 4610 having amplitudes corresponding to the amplitudes of the corresponding samples applied to the coding and counting equipment at the transmitting station. These pulses are applied at the same rate as the samples are taken at the transmitter or at the rate of approximately 8,000 per second. The low-pass filter removes the higher frequency components from these pulses and permits only the low frequency components which convey the intelligence to pass through the filter. This filter thus in effect reconstructs the complex wave which may be a speech wave, telegraph wave, picture wave or other types of signaling wave as pointed out above. It is also evident that between the times successive pulses are applied to the low-pass filter 4610 similar pulses will be applied to similar equipment associated with each of the other channels of the system for reconstructing each of the complex waves applied to each of the channels at the transmitting station. In other words the system including the instantaneous amplitude compression, sampling, coding, transmitting, decoding, distributing and amplitude expansion of the pulses and the reconstruction of the complex wave provides a transmission medium for eight channels each of which is capable of transmitting entirely independent signals from a transmitting point to a receiving point.

It is evident that the fidelity with which complex waves may be transmitted is dependent upon the rate at which the samples are taken, the number of discrete amplitudes recognized in each sample, and the noise limitations of the equipment. It is also evident that the noise in the radio channel is substantially eliminated so long as the presence or absence of received pulses can be accurately recognized. The manner in which the other spurious noise encountered in radio channels is eliminated will be described hereinafter.

As shown in FIG. 55 the code combinations representing the most positive amplitude of the compressed complex wave are the code combinations produced by the largest count of the counter. For example, the count of 19, assumed above in channel 5, is produced by a sample of a magnitude represented by next to the largest step associated with curve 5510 and causes a code combination to be transmitted comprising pulses of current, "on" pulses, or marking pulses in the first, second, and fifth position and pulses of no current, "off" pulses, or spacing pulses to be transmitted in the third and fourth pulse positions. Thus this code combination represents $1+2+0+0+16=19$ in the corresponding binary number.

If it is now assumed that this same code combination, i.e., a positive pulse in the first, second and fifth pulse positions only, is applied to the control grid of tube 4510 it will cause condenser 4512 to be charged negatively to 19 units of charge from its most positive potential, i.e., the totally discharged condition. In other words, the potential on condenser 4512 at this time will correspond to the next to the lowest step associated with curve 5510 instead of next to the highest step. Similarly the code combinations which represent the more positive values of the samples at the transmitter will cause the condenser 4512 at the receiver to be more negative and the codes which represent the less positive values of the smples at the transmitter will cause condenser 4512 to be charged less negatively at the receiver.

If on the other hand a code combination comprising a positive pulse in the third and fourth pulse positions only is applied to the control grid in response to the code group representing a count of 19 by the counter at the transmitter, condenser 4512 at the receiver will be charged negatively by 12 units only. However, when condenser 4512 is charged 12 units negative with respect to its most positive potential, i.e. completely discharged, it has a potential which is $31-12$ or 19 units positive with respect to its most negative potential. If each of the code combinations are transformed in a similar manner the potential of the upper terminal of condenser will be more positive (less negative) when the voice frequency wave is more positive and less positive (more negative) when the applied voice frequency or other complex wave is less positive.

The above type of transformation of the code groups occurs frequently and are sometimes called a signal inversion or a complementary code group.

The output of the decoding circuit is of opposite polarity or phase when the different code groups are applied to it as described above. The two wave forms will be otherwise identical and similar to the wave form sampled at the transmitter. Such a phase or polarity of the output of the decoder is of no consequence because it cannot be detected by the ear for speech waves and is generally unimportant for other types of signals. Furthermore, the polarity of the voice at the output of the voice amplifier is arbitrary, being determined for example by the connections to the windings of transformer 4518 for channel 5.

Ringing

It is possible to transmit supervisory signals such as ringing current over each of the channels as well as voice frequency or other signaling currents. When it is desired to transmit ringing current over the system from the transmitting terminal, ringing current is applied to the incoming channel from terminal equipment 2111, for example, and this ringing current is then conveyed through the equipment in the same manner as voice frequency currents. It should be noted that ringing current is of a low frequency and thus will pass through low-pass filter 2811. The ringing current has noise added to it and is limited in amplitude and then compressed in the same manner as the normal signaling currents or complex wave. Ringing current is then coded in the same manner as other signaling currents and transmitted over the system to the receiving station. At the receiving station the code pulses representing ringing current are employed to control the circuits in the same manner as other signaling pulses and are decoded by the same equipment. The ringing current pluses which are transmitted through the amplitude expanding equipment, low-pass filters, and voice amplifier are not used to control the ringing equipment. Instead, the ringing equipment is controlled by means of the ringing voltage which appears at the two anodes of tube 4514. This voltage is not influenced by the expanding action of the copper oxide rectifiers. When the ringing current pulses are decoded and applied to the grid of the left-hand section of tube 4514, they will cause an appreciable voltage of the ringing frequency to appear across condenser 4526. Appreciable signaling voltages do not appear across this condenser because they are of higher frequency. Consequently, condenser 4526 appears as a substantial short circuit to these higher frequencies. Condenser 4526 also operates as a delay device or filter, so that momentary transients such as static or other interfering currents will not cause the application of ringing current to the channels at the receiving terminal.

Ringing voltage which builds up across the condenser 4526 is applied to the control grid of the right-hand section of tube 4612, which tube amplifies the ringing voltage and applies it through further delay, filtering, and coupling condensers 4613 and 4614 to a voltage doubler rectifying arrangement comprising rectifiers 4615 and 4616. Rectifiers 4615 and 4616 may be of any suitable type, such as diodes, copper-oxide rectifiers, silicon or germanium. The output of the rectifier arrangement is applied to the control grid of the left-hand section of tube 4618 through a filter and delay network comprising condensers 4629, 4617 and resistor 4620. This delay network is provided to further delay the response of the equipment to ringing current to insure that ringing current will not be applied to the receiving channels in response to momentary disturbances which may be experienced in the system.

The output of the left-hand section of tube 4618 extends over conductor 4619 to the terminal equipment shown in FIG. 10 and associated with channel 5 at the receiving station. This equipment is provided with a ringing relay which is operated in response to the application of positive potential to the control grid of the left-hand section of tube 4618, which positive potential is derived from the rectifier doubler in a manner described above. The operation of this relay causes ringing current to be applied to the fifth channel at the receiving station.

A corresponding ringing relay at the transmitting station is shown in FIG. 21. Here relay 2118 is operated from the receiving equipment shown in FIG. 5 in response to ringing current received from the distant end over channel 5. When the tube at the transmitting station corresponding to tube 4618 at the receiving station has a positive potential applied to its control grid the current flows through its anode circuit and thus through the winding of relay 2118. Relay 2118 operates due to current flowing through its winding and applies ringing current to the transmission path extending from the terminating equipment 2119 to the terminal equipment 2111. Ringing current is thus applied by an oscillator circuit comprising tubes 2120, 2122 and the output coil and inductance 2129. Tubes 2120 and 2122, as well as the coil 2129 and associated condensers and equipment form an oscillator circuit which oscillates at approximately 20 cycles per second or any other suitable ringing frequency.

Thus, ringing current may be applied to each of the channels at the transmitting terminal, transmitted over the system and again applied to the corresponding channel at the receiving station.

At the end of the application of ringing current the circuits will return to their previous conditions and are available for transmission of the speech or other complex signaling waves.

Ciphering

As pointed out hereinbefore the coded signals are susceptible of reception and interpretation by some of the more conventional types of receiving equipment, so the information transmitted over the communication paths may be intercepted by unauthorized persons. In order to increase the security and render the signals secret at least for short periods of time it is desirable to provide methods and apparatus for ciphering the signals so that they may not be readily intercepted and interpreted and so that the complex wave form represented by the signals may not be readily reconstructed. On the other hand, it is desirable that means be provided for deciphering the signals by authorized equipment or stations.

The ciphering arrangement employed in the exemplary embodiment described herein makes use of a series of key pulses generated by a keyer in an essentially random manner. While it is desirable to have these pulses generated in an essentially random manner it is also necessary that they be reproducible at the receiving station.

The key pulses are combined with the coded pulses which produce an unintelligible and ciphered output. The ciphered pulses are then transmitted over the transmission system to the receiving station where a similar keyer is employed for generating a series of key pulses identical with the series of key pulses generated at the transmitting station. These key pulses are then combined with the ciphered pulses in such a way that the coded pulses are recovered. These coded pulses are decoded in the manner described above and distributed to the respective channels where the complex waves similar to those received at the transmitting station are regenerated and transmitted over the respective channels to the desired destinations.

While it is not necessary that the key pulses and the coded pulses be generated at the same rate, the specific arrangement described herein does so generate them. It is, of course, evident that the key pulses could be generated either faster or slower than the code pulses and then combined with them in the manner described hereinafter to provide the ciphered signals.

As explained hereinbefore the keying equipment comprises two ring circuits which are stepped or advanced independently of each other and in an essentially random manner under control of certain selected pulses representing portions of the intelligence transmitted over selected ones of the various channels. The outputs of these ring circuits are then combined to form a series of key pulses which pulses are combined with the coded pulses to produce the ciphered signals actually transmitted over the transmission medium which is a radio system in the exemplary embodiment described herein.

Figure 13:
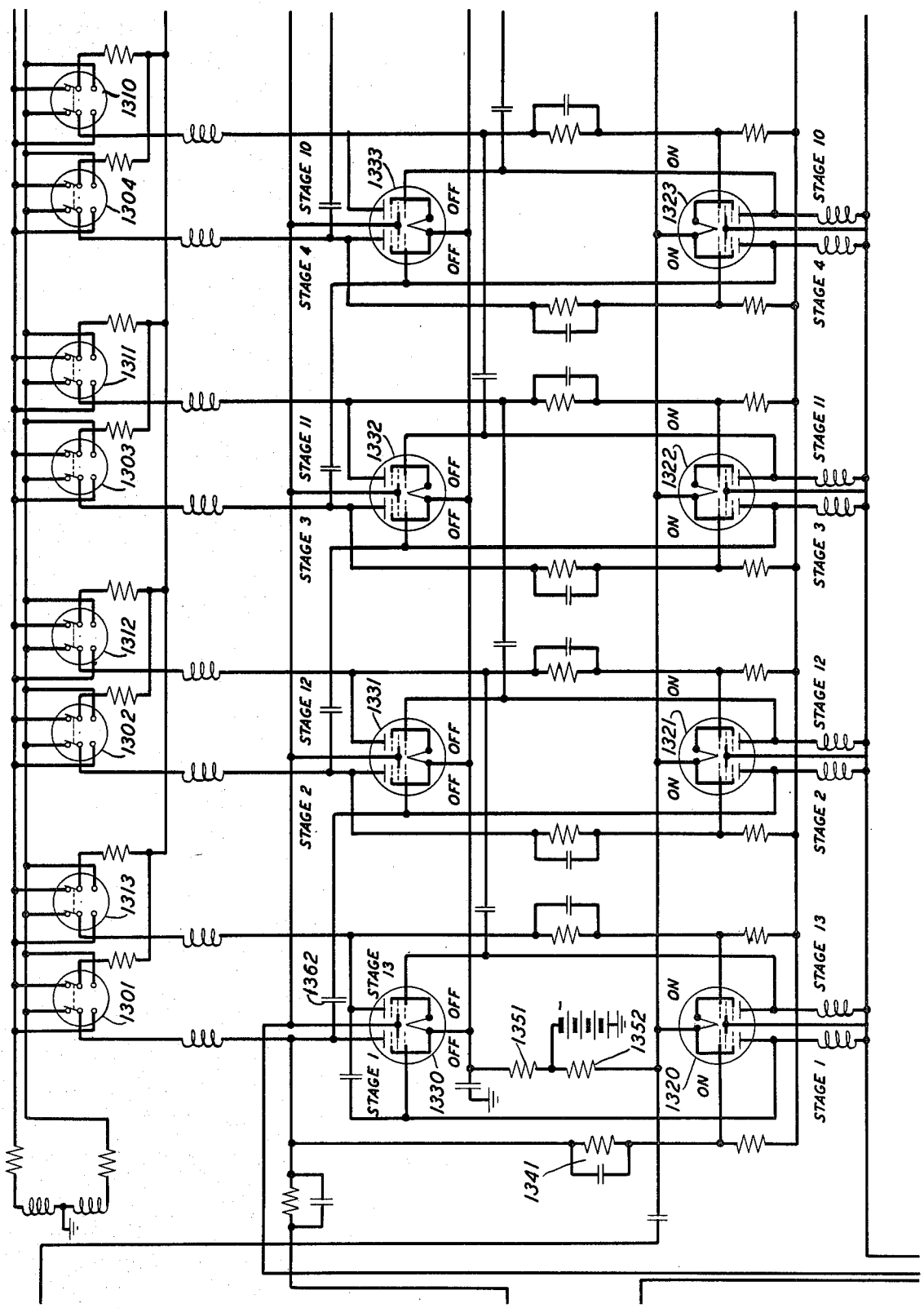
Figure 14:
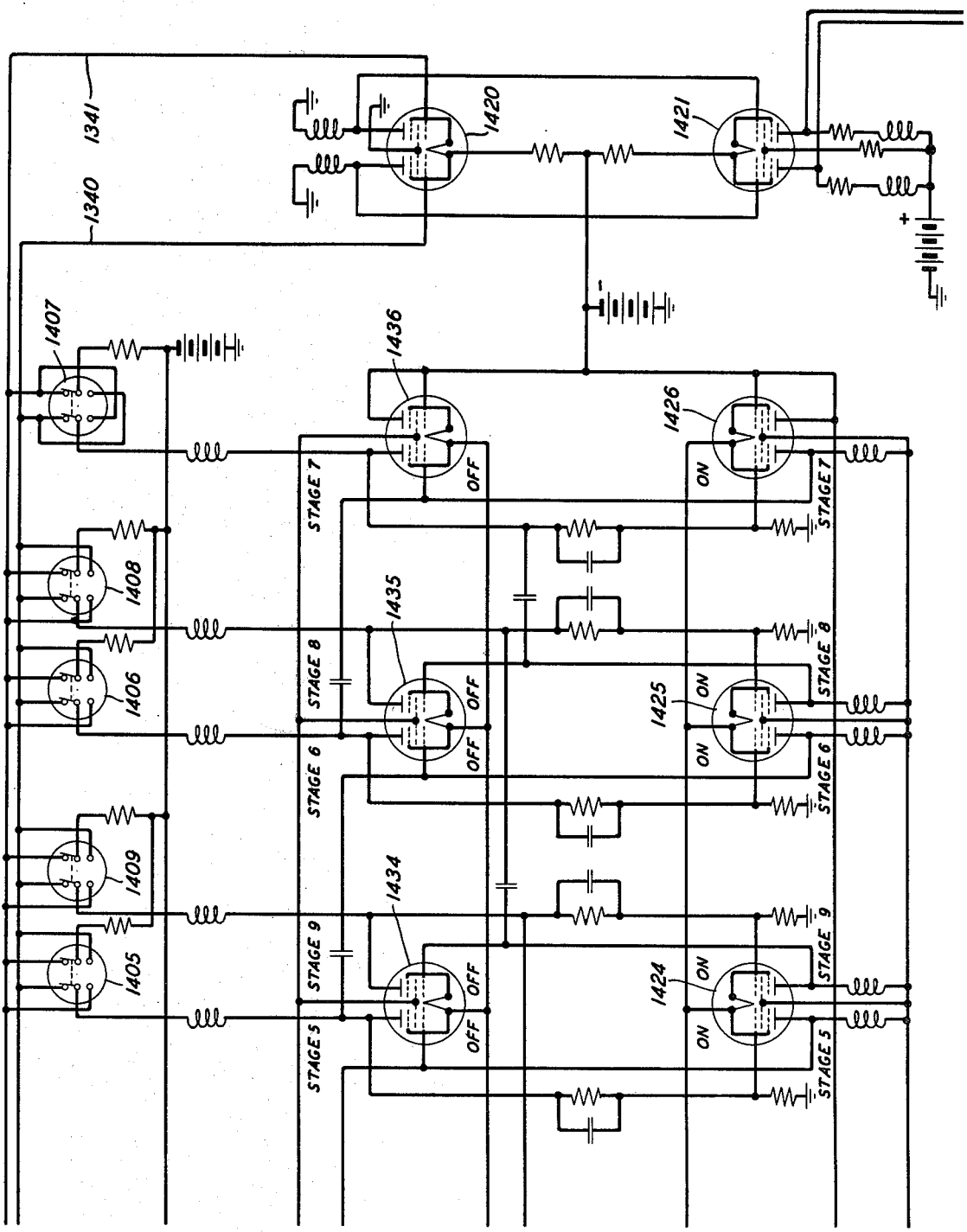
Figure 17:
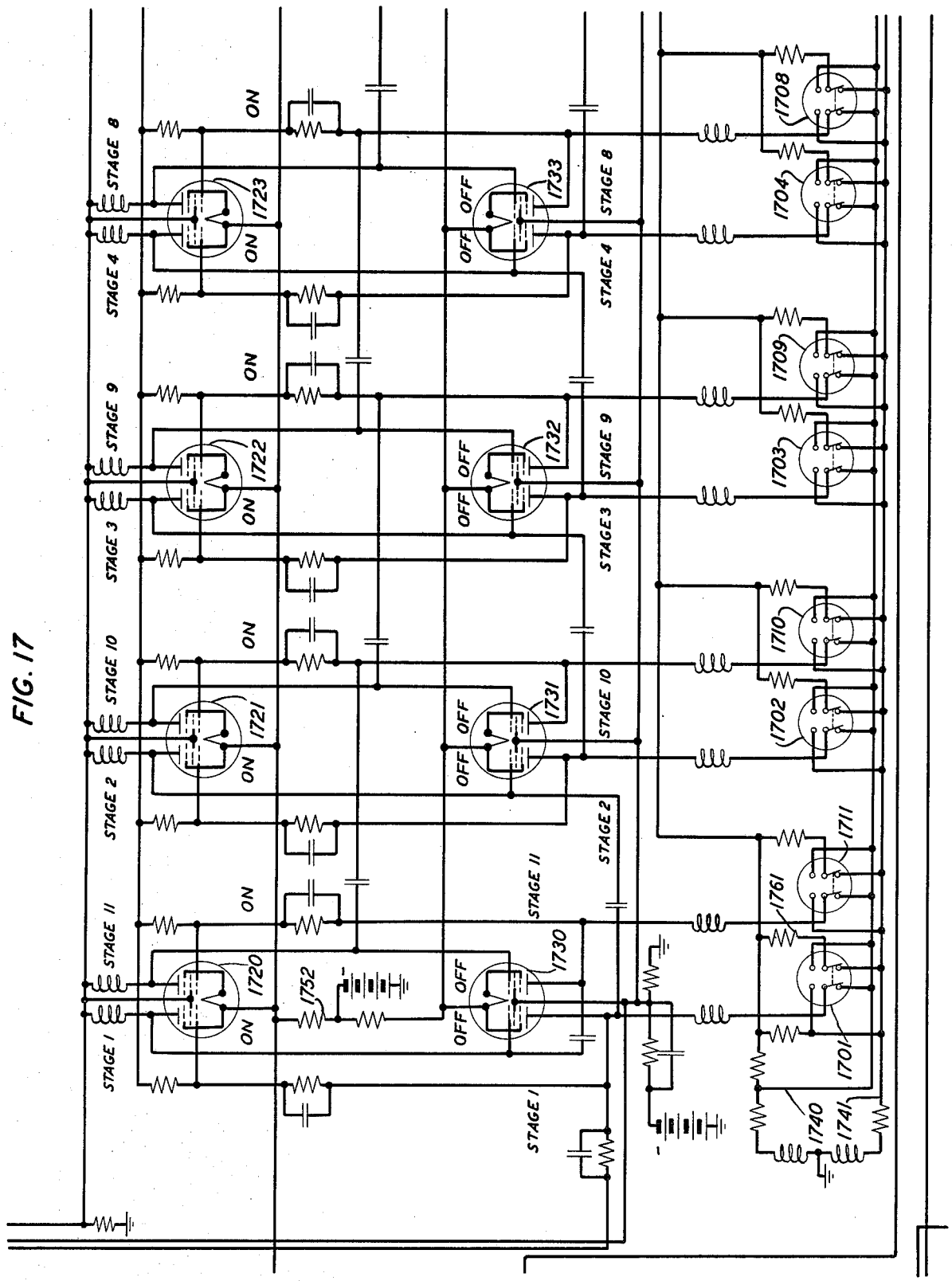
Figure 18:
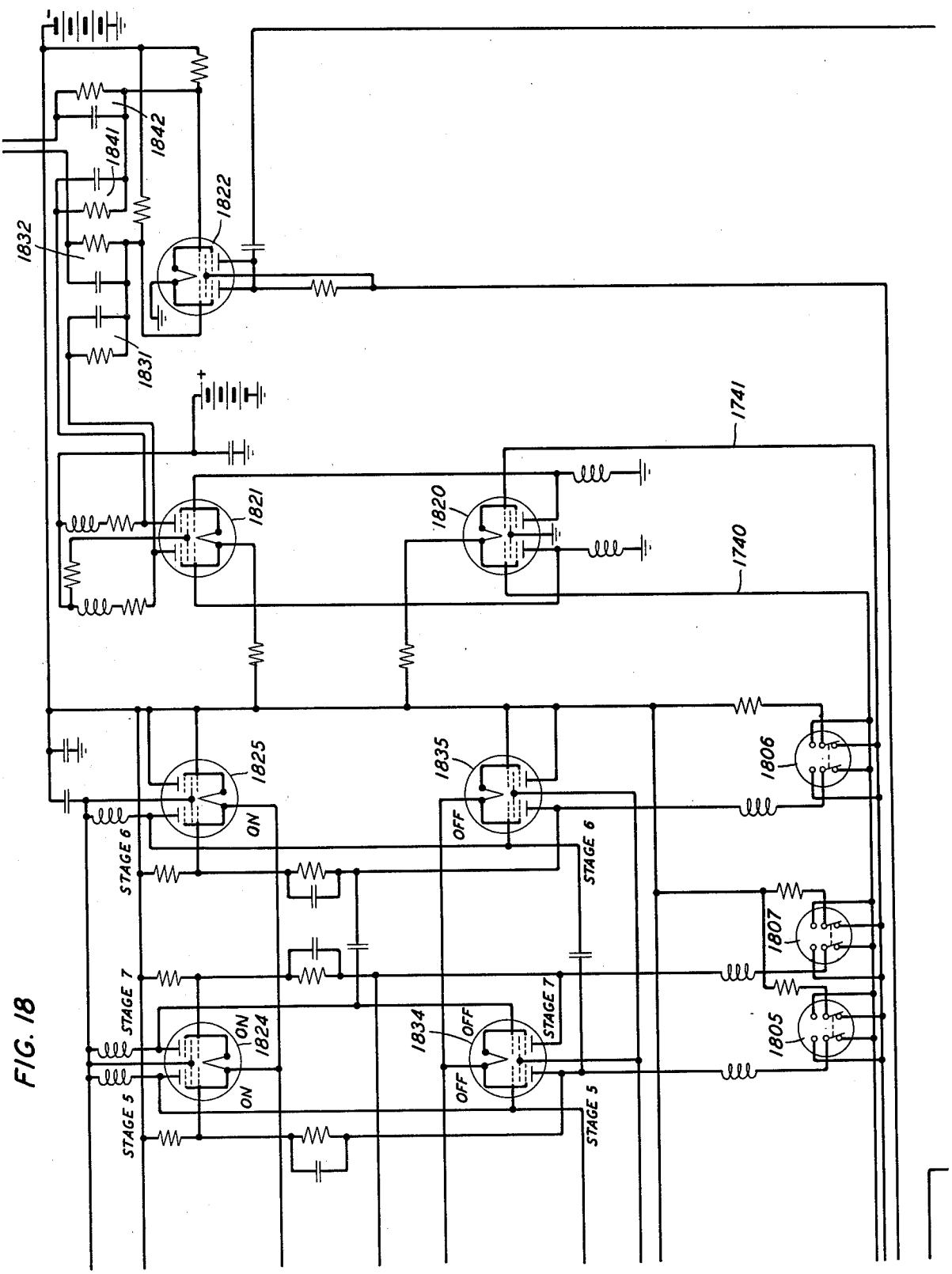

In the exemplary embodiment described herein one of the rings is provided with 11 stages and the other with 13. The 11-stage ring is shown in FIGS. 17 and 18, while the 13-stage ring is shown in FIGS. 13 and 14. Each of these stages comprises a double stability circuit equivalent of two multielement vacuum tubes. These tubes are arranged in a circuit such that when one of the tubes is conducting the other is non-conducting. The circuit is so arranged that this state or condition continues until a change at which time the non-conducting tube is rendered conducting and the conducting tube rendered non-conducting. The circuits then remain in this condition until again changed, at which time they are restored to their initial condition. The tube that is normally conducting is referred to herein for convenience as the "on" tube, while the tube that is normally non-conducting is referred to as the "off" tube. When a particular stage is actuated or operated the "off" tube becomes conducting and the "on" tube non-conducting. At a later time the stage is returned to its normal condition with the "on" tube conducting and the "off" tube non-conducting.

These various tubes or stages are arranged to be driven or operated from a 320-kilocycle oscillator and are arranged so that they may be stepped when desired one stage for each cycle of the 320-kilocycle current received from the oscillator. In order to permit these tubes to be driven at this speed and at the same time mounted in a straight line on a supporting equipment, use has been made of dual tubes, each of which comprises two sections, each section being the full equivalent of a complete multielement vacuum tube. Two lines or two sets of tubes are provided, one being "on" tubes and the other "off" tubes. Thus, one section of an "on" tube and a section of an "off" tube provide one stage of each of the rings. By so combining the various sections of the various "on" and "off" tubes, it is possible to have the tubes progress from one to the other down the line and then back using one section for one direction of progression and the other section for the other direction of progression. In this way, it has been possible to maintain substantially the same distributed capacity between the leads connecting the various stages as well as between the leads of the respective stages. Consequently, the reliability of operation of the entire ring has been materially improved by so arranging the various tubes and sections forming the respective stages of the different rings.

Tubes 1330, 1331, 1332, 1333, 1434, 1435 and 1436 comprise the "off" tubes of the 13-stage ring, while tubes 1320, 1321, 1322, 1323, 1424, 1425 and 1426 comprise the "on" tubes of this ring. Tubes 1730, 1731, 1732, 1733, 1834 and 1835 comprise the "off" tubes of the 11-stage ring. Tubes 1720, 1721, 1722, 1723, 1824 and 1825 comprise the "on" tubes of the 11-stage ring. Inasmuch as the operation of these two ring circuits is substantially the same the operation of only the various tubes of the 13-stage ring enumerated above will be described in detail, it being understood, of course, that the 11-stage ring is operated in substantially the same manner. The manner in which these rings are driven is substantially the same. However, the points of difference will be pointed out as well as the manner in which the output from the various rings is combined to form the key pulses will also be described.

Referring now to the 13-stage ring, each of the stages comprise an "on" section and an "off" section. For example, stage 1 comprises the left-hand section of the "off" tube 1330 and the left-hand section of the "on" tube 1320. The control grid of the left-hand section of the "on" tube 1320 is connected through coupling network 1341 to the anode of the "off" section of stage 1. The control grid of the "off" section of stage 1 is connected to the anode of the "on" section of stage 1. Such an arrangement forms a so-called double stability circuit arrangement sometimes called a trigger circuit of the Eccles-Jordan type. Such a circuit arrangement is stable with either tube conducting and the other non-conducting. The arrangement is not stable in some intermediate position but tends to immediately advance to either one or the other of the two stable positions. Each of the other sections of both rings are provided with similar types of tubes in a similar circuit arrangement. The cathodes of all of the "off" sections are all connected together and provided with a common cathode resistor 1351 and the cathodes of all of the "on" sections are likewise connected to the other and provided with another common cathode resistor 1352. The cathode resistance 1351 of the "off" section is of such a value that only one of the "off" sections may be conducting at any given instant of time. In other words, when one of the "off" sections conducts, the cathodes of all the other sections are raised in value so that discharges will not be initiated through them. The common cathode resistor 1352 of the "on" section is not so proportioned because all but one of the "on" sections will normally be conducting current.

When power is first applied to the system one of the "off" sections will start to conduct and maintain its associated "on" section non-conducting. The particular one of the "off" sections which starts to conduct is a matter of chance determined by the differences in the distributed capacity, tube parameters and the like. Assume for purposes of illustration that the "off" section of the stage 1, that is, the left-hand section of tube 1330 starts to conduct when power is first applied to the system. None of the other "off" sections will therefore be conducting at this time while the "on" section of stage 1, that is, the left-hand section of tube 1320, will be non-conducting and all of the other "on" sections of all of the "on" tubes will be conducting, that is, current flows in their anode-cathode circuits. The circuits then remain in this condition until advanced by the pulse applied to advance or drive the ring.

The circuits are arranged to be advanced or driven by negative pulses applied to the cathodes of the "on" sections from tube 1210. The manner in which the pulses are obtained in the output circuit of tube 1210 will be described hereinafter. Assuming as described above, that the "off" section of stage 1 is conducting, and the "on" section of stage 1 is non-conducting; then, upon the application of a negative pulse across the cathode resistor 1352 of the "on" sections, the cathodes of all of these sections will be made more negative. Making the cathodes of all the conducting "on" sections more negative will produce little or no effect upon these tubes since they are already conducting substantially their maximum amount of current. However, the application of negative pulses to the cathode of the non-conducting "on" section, that is, the cathode of the left-hand section of tube 1320, under the assumed condition, tends to make the relative grid to cathode potential more positive and thus causes the current to start to flow through this section of the "on" tube 1320.

When the current starts to flow through the left-hand section of tube 1320 its anode falls in potential, that is, becomes less positive. Inasmuch as the grid of the "off" tube of stage 1, i.e., the left-hand section 1330, is connected to this anode this grid also becomes more negative and interrupts the current flowing in the left-hand section of tube 1330. As a result the anode potential of this section of tube 1330 rises in value and in turn applies a more positive potential to the grid of the left-hand section of tube 1320 thus tending to further increase the current flow through the left-hand section of tube 1320. The above action is thus repeated until the maximum current flows through the "on" section of stage 1 and the current flow is interrupted through the "off" section of this stage. Stage 1 of the 13-stage ring is now restored to its normal condition.

As pointed out above when the current ceases to flow through the left-hand section of the "off" tube 1330 the anode of this tube rises in potential, that is, becomes more positive. The anode of the left-hand section of tube 1330 is coupled to the control grid of the "off" section of stage 2, that is, to the control grid of the left-hand section of tube 1331. As a result, when the flow of current through the "off" section of stage 1 is interrupted a positive potential is applied through the coupling condenser 1362 to the control grid of the "off" section of stage 2. As a result, current starts to flow through this "off" section and interrupts the current flowing in the "on" section of stage 2, i.e., interrupts the current flowing through the left-hand section of the "on" tube 1321.

Thus, in response to the application of a negative pulse to the cathode resistor 1352 the actuated stage 1 is restored to normal and the next stage, namely, stage 2 is actuated to its operated position. The circuits then remain in this condition until another negative pulse is applied across cathode resistor 1352 at which time stage 2 is restored to its normal condition and stage 3 actuated to its operated condition. In this manner each of the stages of the 13-stage ring is actuated in succession. After the 13-stage has been actuated it will cause the first stage to be actuated in response to the 13th pulse, at which time the operation of the circuits is repeated. Thus, the 13-stage ring is repeatedly driven or stepped one stage at a time by the application of negative pulses applied across the common cathode resistor 1352.

The 11-stage ring is similarly driven by the application of negative pulses from tube 1610 applied across the common cathode resistor 1752 of the "on" tubes.

The negative pulses for driving the 11- and 13-stage rings are obtained from the crystal controlled oscillator which operates at a frequency of 320 kilocycles per second. A portion of the output of this oscillator is applied to the control grid of the right-hand section of tube 2430. Tube 2430 is biased to act as an overloaded amplifier or so-called clipper. The output of the right-hand section of tube 2430 is coupled to the input of the left-hand section of this tube which is likewise biased to operate as a limiter tube. A differentiating network comprising inductance 2432 and a resistor 2431 are connected in the output or anode circuit of tube 2430 and serve to differentiate the pulses applied to the control grid of this tube. The differentiated pulses are applied to the control grid of the right-hand section of the tube 1611 and amplified by this tube. These pulses are then applied to the control grids of the upper sections of tubes 1612 and 1212. The right-hand section of tube 1611 is normally biased to substantial cut-off so that the negative portions of the differentiated pulses applied to it are not amplified whereas the positive portions of the differentiated pulses are amplified and inverted appearing in the plate circuit as amplified negative pulses. These negative pulses are applied to the grids of the upper sections of tubes 1212 and 1612 and inverted by these tubes to be positive pulses which are applied to the control grids of tubes 1610 and 1210. Tubes 1610 and 1210 operate as power amplifier tubes and invert the pulses and thus apply negative pulses across the cathode resistors of the respective 11- and 13-stage rings.

Thus, a negative pulse is applied to the control grids of the upper sections of tubes 1212 and 1612 for each cycle of the 320-kilocycle current derived from the controlling oscillator. However, not all of these pulses are repeated to the control grids of the respective tubes 1610 and 1210 because the anodes of the lower sections of tubes 1612 and 1212 are connected in parallel with the anodes of the upper sections of these tubes. The upper sections of these two tubes are biased so that they normally conduct current except for the time during which a negative pulse is applied to their control grids. If, however, the lower sections are conducting at the time a negative current pulse is applied to the upper sections of these tubes no pulse is repeated because of the current flowing through the lower sections of these tubes. The anode circuits of these tubes are arranged so that an appreciable pulse is transmitted in the output circuit only when both sections are non-conducting.

The selection of the pulses to be suppressed is under the control of a coincidence circuit, which in turn is controlled by the 11- and 13-stage rings, under control of the transmitted pulses representing portions of the signals transmitted, and under control of both the 5-stage and the 8-stage distributor rings of the coding equipment.

Inasmuch as the keyer equipment at the receiving station must operate in synchronism with the keyer equipment at the receiving station, the voice controlled pulses at the receiving station must be first deciphered by the keyer and then employed to control the keyer at the receiving station. In order that this may be accomplished, it is necessary to first transmit the code pulses used to control the stepping of the 11-stage and 13-stage ring and at a predetermined interval of time later employ the pulse to control the keyer. This means that the code pulses used to control the stepping of the ring circuits must be first stored and then later employed to control the keying equipment.

Figure 12:
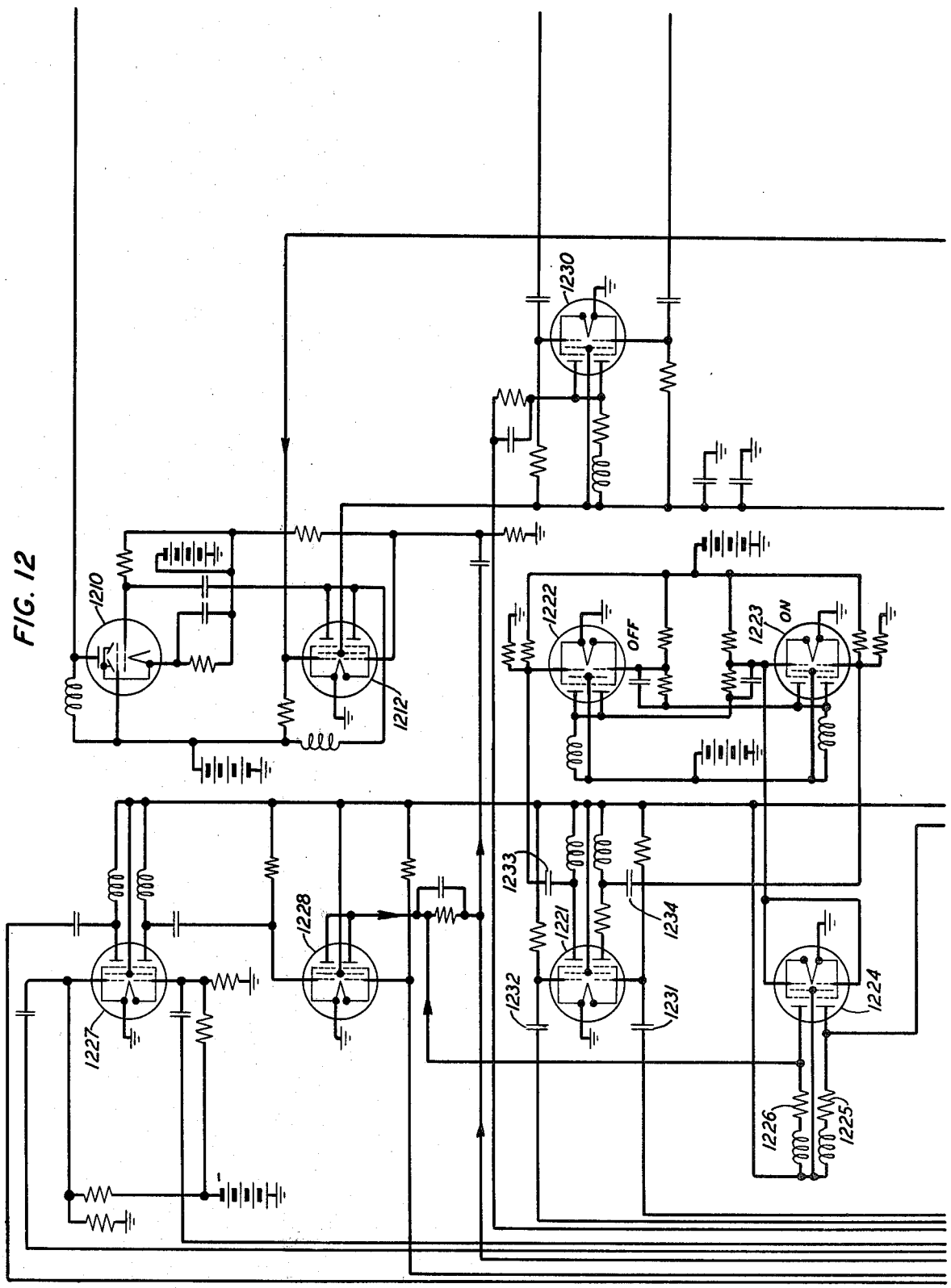
Figure 16:
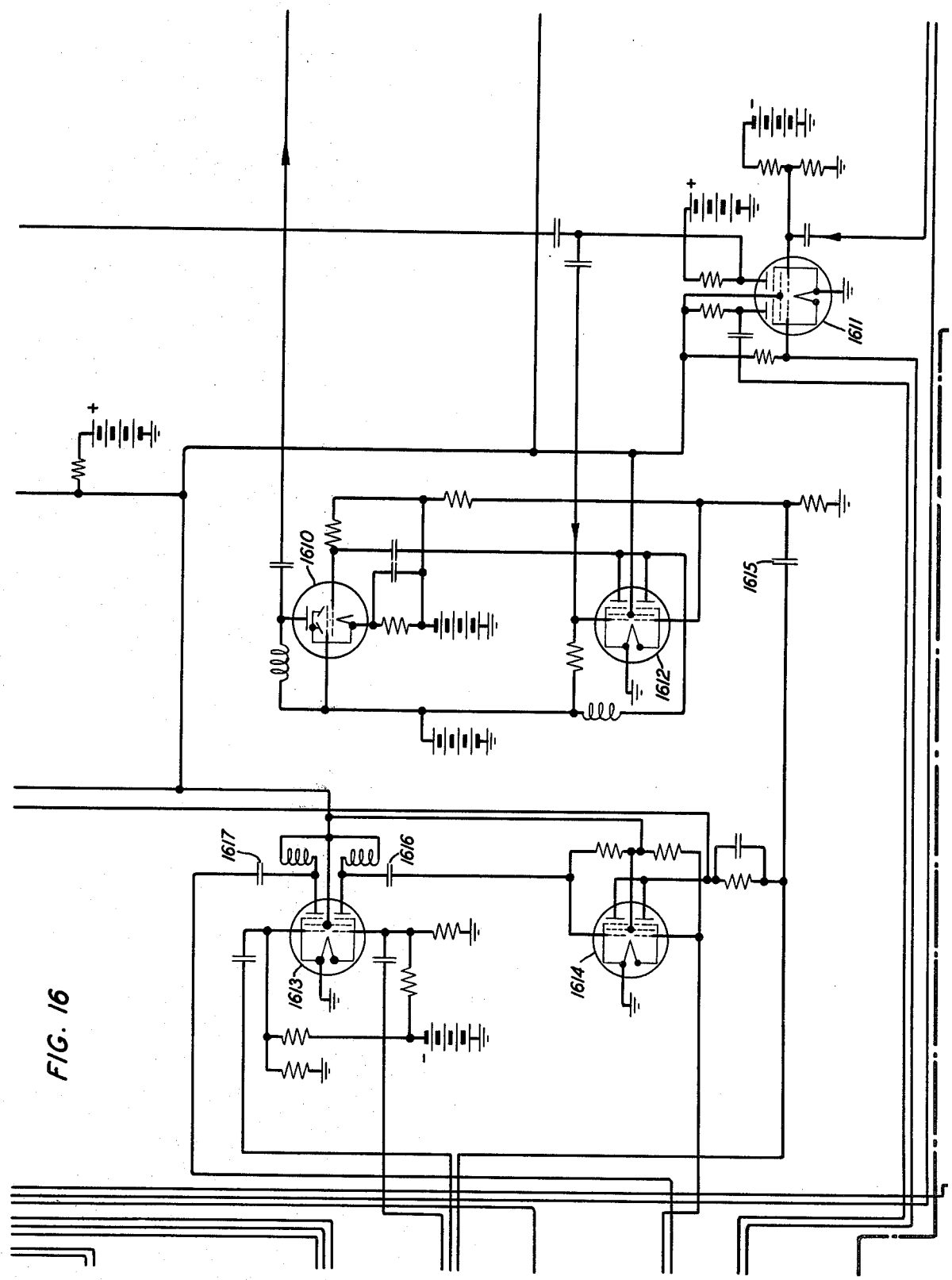

These functions are under the control of a plurality of vacuum tubes and related circuits shown in FIGS. 12 and 16.

The first pulse of each code group has been selected as the code pulse, which may be employed to suppress driving pulses to the ring circuits of the keyer. If this pulse is of one character or polarity it will cause the pulse to be suppressed to one or the other of the rings of the keyer. If this pulse is of the opposite polarity, the corresponding stepping pulse to the keyer will not be suppressed.

Inasmuch as the first pulse of each code group represents the smallest increment of a given signal amplitude, or, in other words, is equivalent to the units digit or denominational order of the binary number corresponding to the code group, the character of this pulse changes most frequently in an essentially random manner, so that it cannot be predicted in advance for any given code combination or any group of code combinations whether this pulse is of one or the other character.

Thus, the keyer is controlled in part at least in a random manner.

The output of the "off" tube of the first stage of the counter 3014 is coupled to the control grid of tube 2510 through the coupling network 2534. When the "off" tube 3014 is conducting the grid potential of the control grid of tube 2510 will be at a low value. On the other hand, when the "off" tube 3014 is not conducting the grid of tube 2510 will be at a higher positive value.

The suppressor grid of tube 2510 is connected in parallel with the suppressor grid of the distributor tube 2511 and consequently receives a positive pulse from the 5-stage ring when stage 1 thereof is actuated to its operated condition, i.e., during the time that the first pulse of each code group is transmitted as described above. Consequently, if the count ends with the "off" tube 3014 of the first stage conducting, a code pulse will be transmitted by tube 2611, as described above, but no current will flow through the output circuit of tube 2510 at this time. Consequently, the potential of its anode will remain at a high positive value. On the other hand if the count ends with this "off" tube non-conducting, no code pulse, i.e., a spacing or no current pulse will be transmitted by tube 2611, as described above. However, a negative pulse will be caused to flow in the output circuit of tube 2510 due to the fact that tube 2510 will conduct current during the first pulse interval under these conditions. The negative pulse from the anode of tube 2510 is applied to the control grid of the upper section of tube 1221 through the coupling condenser 1232.

At substantially the same time a negative pulse is applied to the control grid of the lower section of tube 1221 from the first stage of the 5-stage ring through the condenser 1231. This pulse is obtained from the anode of the buffer amplifier tube 2328 and consequently is of a negative polarity. A negative pulse is applied to the control grid of the lower section of this tube during each cycle of the 5-stage ring circuit whereas a negative pulse is applied to the upper section of the tube only if the count ends with the "off" tube of the first stage of the counter non-conducting. This occurs substantially half of the time but in a random manner. Both sections of tube 1221 are biased so that upon the application of a negative pulse to the control grids a pulse is repeated in the output circuits. The anode of the upper section of tube 1221 is coupled to the control grid of the upper section of tube 1222 through the coupling condenser 1233. This coupling condenser, together with the grid resistors of the upper section of tube 1222 are such that the pulse applied to the upper control grid of tube 1222 has substantially the same shape as the pulse repeated in the output section of the tube 1221 and thus substantially the same shape as the pulse received from the distributor tube 2510.

The anode circuit of the lower section of tube 1221 is coupled through the coupling condenser 1234 to the control grid of the lower section of tube 1223. The value of the capacitor 1234, together with the value of the grid resistors of the lower section of tube 1223, are of such values that the pulse flowing in the output circuit of the lower section of tube 1221 is effectively differentiated.

Figure 53:
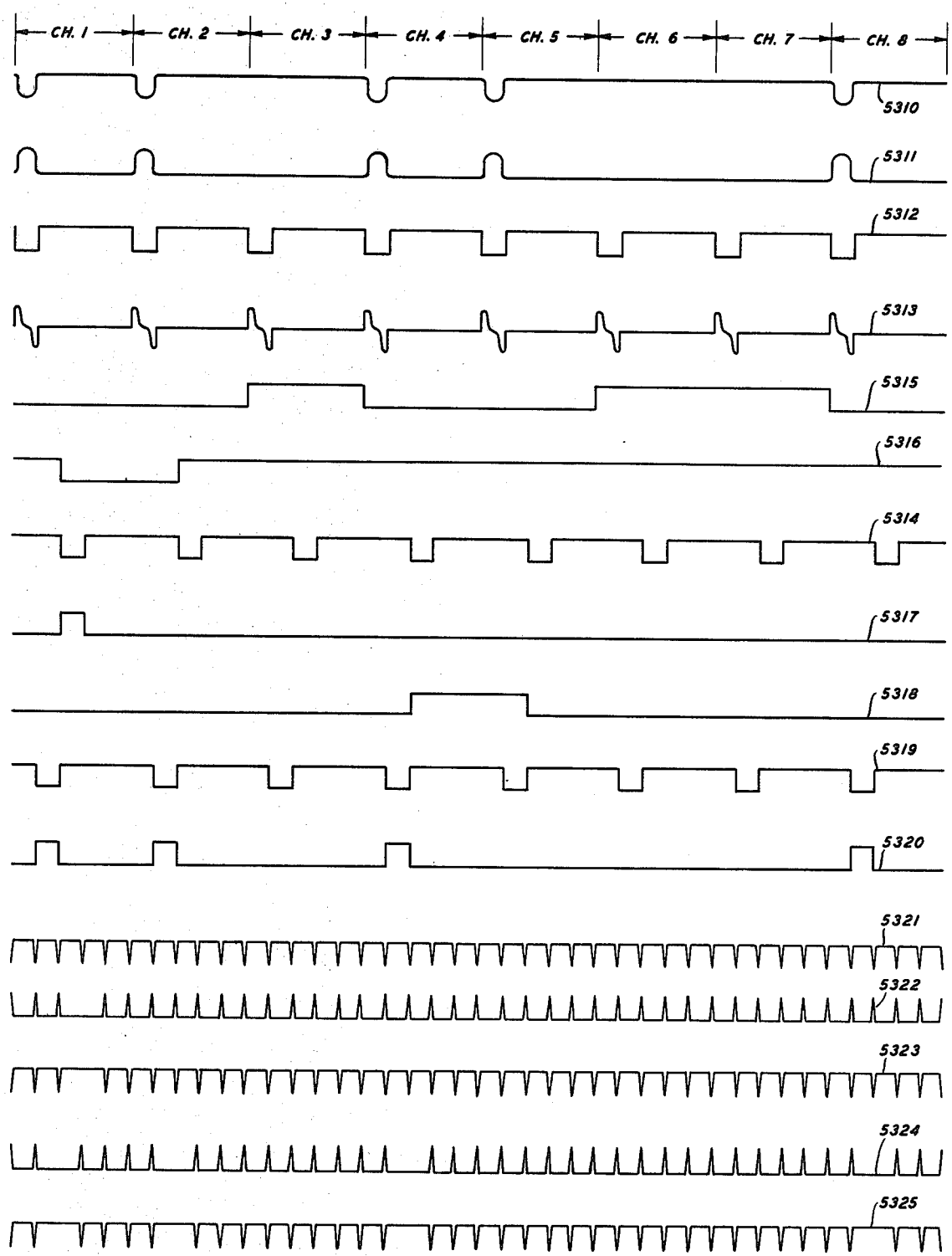

The wave form of the pulses applied to the control grid of the upper section of tube 1221 is illustrated by graph 5310 and the wave form of the pulses applied to the control grid of the upper section of tube 1222 is illustrated by graph 5311 of FIG. 53. The wave form of the pulses received from the first stage of the 5-stage ring as applied to the control grid of the lower section of the tube 1221 is illustrated by graph 5312. The wave form of the differentiated pulses applied to the control grid of the lower section of tube 1223 is illustrated by the graph 5313 of FIG. 53.

The lower section of tube 1222 and the upper section of tube 1223 are connected to form a double stability circuit, that is, a circuit arrangement in which either section may be conducting. The circuit will remain in either condition until changed by the application of signals or potentials to the circuit. These potentials are in the form of pulses in the exemplary system disclosed herein. The tubes are so arranged that the upper section of tube 1223 is normally conducting and the lower section of tube 1222 is normally non-conducting. Consequently, the upper section of output of tube 1223 is called the "on" tube and the lower section of tube 1222 is called the "off" tube.

The application of a positive pulse to the control grid of the lower section of tube 1223 is repeated by this section which causes a negative pulse to be applied to the control grid of the lower section of tube 1222, thus interrupting the flow of current through this section, if it had previously been conducting. Likewise, the application of a positive pulse to the control grid of the upper section of tube 1222 is repeated by this tube and applied as a negative pulse to the control grid of the upper section of tube 1223, thus interrupting the current flowing through this section, if it had previously been conducting. Applications of negative pulses to the control grid of either the upper section of tube 1222 or the lower section of tube 1223 is ineffective to produce any useful result, first, because these sections are normally biased to or beyond cut-off so that the negative pulses applied to their grids are not repeated by these sections, and second, because any residual portion of the pulses repeated would only tend to maintain the circuits of the other sections of these tubes in the condition in which they were at the time of the application of the negative pulses.

As illustrated in graph 5313 the positive pulses obtained by differentiating the pulses represented in graph 5312 are of short duration and occur either before or simultaneously with the positive pulses applied to the upper section of tube 1222. If positive pulses are applied to the control grid of the lower section of tube 1223 only, these positive pulses serve to turn off the lower section of tube 1222, which in turn causes a discharge to be initiated through the upper section of tube 1223. The circuits then remain in this condition until a positive pulse is applied to the control grid of the upper section of tube 1222. Meantime if additional positive pulses are applied to the control grid of the lower section of tube 1223, these pulses will be repeated but will be ineffective to change the condition of the upper section of tube 1223 or the lower section of tube 1222. When a pulse is simultaneously applied to the control grids of the upper section of tube 1222 and of the lower section of tube 1223, conduction will be established through the lower section of tube 1222 and current flowing through the upper section of tube 1223 will be interrupted. The exact process by which this is accomplished may vary from time to time or be slightly different at the transmitting end and the receiving end, due to the fact that the pulses applied may be slightly different. At the transmitting end, the short differentiated positive pulses are applied to the control grid of the lower section of tube 1223 simultaneously with the application of longer signaling pulses which are applied to the upper section of tube 1222. Inasmuch as the pulses applied to the lower section of tube 1223 are of shorter duration than the pulses applied to the control grid of the upper section of tube 1222, the effect of these short pulses is counteracted and overcome by the longer pulses applied to the control grid of the upper section of tube 1222. Consequently, any current flowing or tending to flow through the upper section of tube 1223 is interrupted while current eventually starts to flow through the lower secton of tube 1222.

If, on the other hand, a positive pulse is applied to the lower grid of tube 1223 first and at a very short interval of time later, a positive pulse applied to the upper grid of tube 1222, for example, as illustrated by graphs 5311 and 5313, then any current flowing through the lower section of tube 1222 is interrupted and the flow of current through the upper section of tube 1223 initiated in response to the positive pulse applied to the lower section of tube 1223. Immediately thereafter the current flowing through the lower section of tube 1223 is interrupted and current flowing through the lower section of tube 1222 initiated due to the application of the succeeding positive pulse to the control grid of the upper section of tube 1222.

Consequently, if the "off" tube of the first stage of the counter is conducting at the end of the count, no positive pulse will be applied to the control grid of the upper section of tube 1222. Consequently, no current will flow through the "off" or lower section of tube 1222 during the transmission of the remainder of the pulses of the particular code group in question. On the other hand, if the count ended with "off" tube non-conducting, a positive pulse will be applied to the control grid of both the upper section of tube 1222 and the lower section of tube 1223. As a result, current will flow through the lower section of tube 1222 during the remainder of the pulses of the code group.

Thus, the condition of the lower section of tube 1222 and the upper section of tube 1223 stores the character of the first pulse transmitted or received during the remainder of the code group so that the keyer circuit may be later controlled in accordance with the character of this pulse.

The anode or output of the lower section of tube 1222 is coupled to the control grid of both sections of tube 1224 and thus rendered available for later control of the stepping of the 11- and 13-stage ring circuits. If the lower section of tube 1222 is conducting, its anode will be at a relatively low potential and thus in effect apply a negative potential to the control grids of both sections of tubes 1224. If, on the other hand, the lower section of tube 1222 is not conducting, its anode will be at a relatively high potential and apply a more positive potential to the grids of both sections of tube 1224. Tube 1224 is biased so that it is normally conducting current in its anode-cathode circuit.

As pointed out above, the upper section of tube 1612 repeats pulses to the driving tube 1610 of the 11-stage ring, unless the grid of the lower section of tube 1612 is positive. The grid of the lower section of tube 1612 is normally biased to a negative value, so that substantially no current normally flows through the anode-cathode path of the lower section of tube 1612. However, upon the application of a positive pulse to the grid this lower section will conduct current and thus prevent the upper section from repeating pulses due to the fact that their anodes or output circuits are connected in parallel.

The lower grid of tube 1612 is coupled through condenser 1615 to the anodes of both sections of the tube 1614 and the anode of the lower section of tube 1224. All of these sections have a common anode impedance 1225. Furthermore, these tubes are all arranged or biased so that they are normally conducting, unless a negative pulse is applied to their control grids. Inasmuch as these tubes have a common anode impedance, a negative pulse has to be applied to the control grids of all of them simultaneously before a positive pulse is applied to the control grid of the lower section of tube 1612. As pointed out above, a negative pulse is applied to the control grid or lower section of tube 1224, in accordance with the character of the first pulse of each code group transmitted. If this pulse is of a spacing character, that is, the "off" section of the first counter stage non-conducting, the lower section of tube 1222 will be rendered conducting and consequently its anode will be at a relatively low potential and apply a negative pulse to the control grid or lower section of tube 1224, thus cutting off this tube and partially conditioning the circuits for the selection of a pulse to be suppressed under control of tube 1614.

If, on the other hand, the first pulse of the code group is of a marking character, then the lower section of tube 1222 will be non-conducting so that its anode will be at a relatively high positive potential. Consequently, the lower section of tube 1224 will be non-conducting and, as a result, no keyer driving pulse will be suppressed during the following pulses of that code group.

The control grid or the lower section of tube 1613 receives pulses from one of the second, third, fourth or fifth stages of the 5-stage ring, depending upon the setting of switch 1540 comprising switch arms 1541, 1542 and 1543. The control grid or lower section of tube 1613 is connected to switch arm 1541 and then to the anode of the "on" tube of the corresponding stage of the 5-stage ring. As shown in the drawing, this switch is set in a position in which the grid of the lower section of tube 1613 is coupled to the anode circuit of the "on" tube of stage 3 of the 5-stage ring. Consequently, this grid receives a positive pulse each time the 5-stage ring is advanced to its No. 3 position or stage. The lower section of tube 1613 repeats these pulses and due to the inversion action of the tube, they appear as negative pulses in the output circuit of the tube. These negative pulses are applied to the control grid of the upper section of tube 1614, where they interrupt the current flowing through this section and thus tend to select the third impulse interval as the time during which the transmission of a driving pulse to the 11-stage ring may be suppressed.

Graphs 5314 shows the negative pulses as applied to the control grid of the upper section of tube 1614.

The control grid of the upper section of tube 1613 extends to the anode of the "on" tube of the No. 3 stage of the 8-stage ring when the switches 1540 and 1530 are set in the positions shown. The circuit extends from the control grid of the upper section of tube 1613 through switch level 1542 of switch 1540 through the switch arm 1531 of switch 1530 and then to the anode circuit of the right-hand section of tube 2215, which is the "on" tube of the third stage of the 8-stage ring. Thus, the grid of tube 1613 receives a positive pulse during the time the 8-stage ring is in its No. 3 position or has its No. 3 stage activated. Tube 1613 repeats these pulses so that negative pulses are applied to the lower control grid of tube 1614 in a circuit extending from the lower control grid of tube 1614 through the switch arm 1533 and coupling condenser 1617 to the anode of the upper section of tube 1613. Consequently, the lower section of tube 1614 is cut off during the time a code group of pulses representing a sample from the first channel is being transmitted. If the first pulse of this code group is marking the lower section of tube 1224 will be conducting so no pulse will be suppressed. On the other hand, if this first pulse is spacing, then during the third pulse of the first channel code group of pulses the lower section of tube 1224 and both sections of tube 1614 will be at cut-off. Consequently, the anodes of these tubes will rise to a relatively high potential and apply a positive pulse to the control grid of the lower section of tube 1612, thus suppressing the transmission of a pulse during this time to the driving tube 1610 of the 11-stage ring of the keyer circuit. It is thus possible by appropriately setting the switches 1530, 1540 to select any one of the last four pulse intervals of any of the code combinations assigned to any of the channels and then suppress a pulse to the stepping circuit of the 11-stage ring if the first pulse of the corresponding code group is spacing and not suppress the pulse if the corresponding pulse is marking. Switch 1540 selects the particular pulse interval of each of the code groups during which the pulse to the keyer may be suppressed. Switch 1530 selects the particular channel interval. That is, it selects a time during which the pulses of a particular channel are transmitted for further selecting the specific pulse which may or may not be suppressed, depending upon the character of the first pulse of each code group.

It should be noted from FIGS. 49 and 50 that the times during which the respective stages of the 8-stage ring are actuated, during which times the samples are taken from the respective channels, do not coincide in times with the time during which the code pulses representing the respective sample are transmitted. Neither do they coincide with the time of transmitting any complete code group. Instead the change from one stage to another of the 8-stage ring occurs between the second and third pulses of each code group. These differences in time have been compensated for by appropriate connections from the respective stages of the 8-stage ring and contacts of switches 1510 and 1530. However, it should be further noted that none of the keyer pulses are suppressed during the first pulse of any code group because the character of this pulse determines whether or not a pulse will be suppressed and this is not known in advance of the transmission of the first pulse. Consequently, it is impossible to suppress a pulse at this time and have the keyer at the receiver maintained in synchronism with the keyer at the transmitter.

It should be further noted that when the time of transmission of the second pulse of a code group is selected for the suppression of a pulse to a ring of the keyer, the upper grid of tube 1613 is connected through switch arm 1532 to a stage of the 8-stage ring instead of through arm 1531. This change in connection is due to the position of the switch arm 1542 being in a position corresponding to the second pulse transmitted. The connection to the contacts cooperating with switch arm 1532 is connected to the next preceding stage of the 8-stage ring instead of to the same stage as the corresponding contacts which cooperate with ring 1513. The reason for this becomes apparent from FIGS. 49 and 50, which show that if the second pulse of a channel is selected the next preceding stage of the 8-stage ring should also be selected to secure the desired pulse of the desired channel.

The suppression of the pulses for driving the 11-stage ring is selected and suppressed in the manner described above with reference to the 13-stage ring, it being possible to select the pulses to be suppressed for this ring independently of the pulses selected to be suppressed or skipped by the 13-stage ring. However, for purposes of proper synchronizing, as will be described hereinafter, either switch 1510 or 1530 must be in the zero position. However, it is essential that one of them and the same one at each end be in the zero position. With one of these keys in the zero position the circuits driving the corresponding ring operate in a slightly different manner than that described above. In this case the pulse selected by the corresponding switch associated with the 5-stage ring is suppressed on each channel except one, which is the fifth channel in the exemplary embodiment described herein.

For purposes of illustration, switch 1510 has been shown in the zero position and in this position the operation of the tubes 1221, 1222, 1223 and 1224 operate as described above. In addition, the lower section of tube 1227 receives a positive pulse once during each cycle of operation on the 5-stage ring. With switch 1520 in the position shown in the drawing the second pulse is selected. The lower section of tube 1227 thus receives a positive pulse during the time the No. 2 stage of the 5-stage ring is activated and repeats this pulse and causes a corresponding negative pulse to cut off when current flows through the upper section of tube 1228 in response thereto. Likewise, a positive pulse is applied to the upper control grid of tube 1227 through switch arms 1522 and 1512 from the "on" tube of the sixth stage of the 8-stage ring. Upon examination of graphs 4912, 4936, and 5018 of FIG. 49 it is apparent that the sixth stage of the 8-stage ring is in its activated condition during the transmission of the No. 2 pulse of the fifth channel.

With switch 1510 in its zero position, the anode of the upper section of tube 1227 is connected through the switch members 1513 to the control grid of the left-hand section of tube 1611. The upper section of tube 1227 in responding to the positive pulse applied to its grid inverts the pulse and applies a negative pulse to the control grid of tube 1611, which tube in turn again inverts the pulse and applies the positive pulse to the lower grid of tube 1228.

As pointed out above with respect to tube 1614, with switch 1510 in any but the zero position the lower section of tube 1228 is biased so that this section normally conducts current except on the application of the negative pulse to its grid. However, with switch 1510 in its zero position the bias on the grid of the lower section of the tube 1228 is changed due to resistances 1515 and 1516 and battery 1517 so that this tube is normally non-conductive, except upon the application of a positive pulse to its grid. Consequently, this section, together with the upper section of this tube, will partially condition the grid of the lower section of the tube 1212 to suppress a pulse under control of the pulse control tube 1224 during the transmission of codes from all of the channels except channel No. 5. When the switches 1510 and 1520 are set in the position shown in the drawing, a driving pulse to the 13 stage will be selected for suppression during the transmission of the No. 2 pulse of all of the channels except channel 5. The suppression of the selected pulses is still under control of the character of the first pulse transmitted in the respective channels. Thus, if the No. 1 pulse in channel 1 is marking, the pulse applied to the 13-stage ring during the transmission of the No. 2 pulse channel will not be suppressed. If, on the other hand, the first pulse of the No. 1 channel is spacing, the pulses transmitted to the keyer during transmission of the succeeding No. 2 pulse of this code group will be suppressed. The same operation takes place for each of the other channels except channel No. 5. When the No. 2 pulse is transmitted on the No. 5 channel, the lower grid of tube 1228 will receive the positive pulse and thus maintain the grid or lower section of tube 1212 negative, which in turn permits the corresponding pulse to be transmitted through the upper section of this tube to the driver tube 1210 and thence to advance the 13-stage ring one step or stage.

Thus, the 11-stage and 13-stage rings are stepped under control of the 320-kilocycle current one step for each cycle thereof, except for the pulses or cycles suppressed under control of the setting of the various switches and the character of the units pulse of each code combination, that is, the first pulse of the code combination selected to control the suppression of the driving pulses to the respective rings.

A pulse may be suppressed to one or the other of the rings by still another control circuit called a coincidence circuit. This circuit comprises tube 1230 which has its upper grid connected through the coupling condenser to the anode of the "off" tube of the No. 1 stage of the 13-stage ring and the grid of its lower section coupled through another coupling condenser to the anode of the "off" section of the No. 1 stage of the 11-stage ring. Both sections of tube 1230 are provided with a common anode impedance of relatively high value and they are biased so that both sections normally conduct current. The anode current, however, is limited by the anode impedance, so that a negative pulse applied to only one of the grids produces substantially no change in the current going to the common impedance and thus produces no output pulse. However, when the No. 1 stage of both rings is simultaneously activated, that is, both rings arrive simultaneously at the No. 1 stage, negative pulses are applied simultaneously to the grids of both sections. The tube 1230 then interrupts all of the current flowing in the anode resistor of this tube and raises the anode potential, thereby causing a positive pulse to be generated in the anode circuit of this tube. The anodes of these tubes are connected to the contacts of switches 1520 and 1540 associated with the respective switch arms 1523 and 1543. Normally, as shown in the drawings, one of these switch arms will engage a contact to which the anodes of tube 1530 are connected, while the other switch arm will not engage such a contact. As shown in the drawing, the anode circuit of tube 1230 extends through the switch arm 1523 to the grid of the lower section of tube 1212. Consequently, when both No. 1 stages of the 11 and 13-stage rings are activated, a positive pulse is applied to the lower grid of tube 1212, thus preventing the transmission of a stepping pulse to the 13-stage ring. When the 11-stage ring advances to its No. 2 position, the positive pulse is removed from the grid of the lower section of tube 1212, thus permitting this tube to thereafter be controlled in the manner described above for transmitting pulses for driving the 13-stage ring. If the positions of switch arms 1523 and 1543 had been reversed so that switch arm 1543 engages a contact connected to the anodes of tubes 1230 while switch arm 1523 engages a contact not so connected, then the driving pulses to the 11-stage ring would have been suppressed.

The purpose of the coincidence tubes and circuits described above may be more fully understood after certain other features of the keyer circuits have been described and will be described at that time.

As pointed out hereinbefore in the description of FIGS. 3–10, each of the rings has an output circuit associated with it. A key is provided individual to each stage between that stage and the output circuit, as shown in FIGS. 13 and 14 for the 13-stage ring and FIGS. 17 and 18 for the 11-stage ring. A double output circuit is provided for each ring, which output circuit resembles a push-pull circuit. With the key associated with an individual stage in one position, a negative pulse is applied to one side of the output circuit each time the corresponding stage is activated. If the key is actuated or operated to the other position, the negative pulse is applied to the other side of the output circuit each time the associated stage becomes activated. In addition, in order to keep the circuits substantially balanced, a resistance is shifted between the two output circuits in the opposite manner to which the anode of the "off" section is shifted.

For example, when key 1701 is in the lower position as shown in FIG. 17, the anode of the "off" section of the stage one, that is, the left-hand section of tube 1730, is connected to the upper conductor 1740 of the output circuit while resistance 1761 is connected to the lower conductor 1741 of the output circuit. Had switch 1701 been operated to its upper position, then the anode of the left-hand section of tube 1730 would be connected to the output conductor 1741 and resistor 1761 connected to the upper conductor 1740. Each one of the other keys 1701 to 1704 and 1708 to 1711 and 1805 to 1807 is likewise operated to one or the other position. When each of these switches is in one position, a pulse of one character or polarity is thus obtained so far as the output circuit is concerned in response to each negative pulse from the corresponding stage of the ring circuit and when the pulse is in the other position a switch of opposite character or polarity is obtained by the application of a negative pulse to the other one of the two output leads. The 13-stage ring is similarly provided with a group of keys, one for each stage for similarly connecting each stage to a second output circuit, which also is a double output circuit resembling a push-pull circuit arrangement.

The output conductor 1740 extends to the control grid of the left-hand section of tube 1820. The output conductor 1741 extends to the control grid of the right-hand section of tube 1820. This tube is biased to repeat the negative pulses applied to these leads by the respective stages of the 11-stage ring in accordance with the setting of the keys associated with them. The sections of tube 1820 repeat the pulses applied to their control grids and apply corresponding positive pulses to the control grids of tube 1821. This tube again repeats the pulses and causes negative pulses to flow in the respective output circuits of the sections of this tube.

Tubes 1420 and 1421 similarly amplify and shape the pulses applied to the two output circuits of the 13-stage ring and cause negative pulses to be repeated in the anode circuits of the respective sections of tube 1421 in response to negative pulses applied to the corresponding output circuits or leads of the 13-stage ring. The anode of the left-hand section of tube 1821 is connected through coupling network 1831 to the control grid of the left-hand section of tube 1822. Likewise the anode of the left-hand section of tube 1421 is similarly connected through the coupling network 1832 to the same control grid of the left-hand section of tube 1822.

The control grid of the right-hand section of tube 1822 is similarly connected through coupling networks 1841 and 1842 to the anodes of the right-hand section of tube 1821 and to the anode of the right-hand section of tube 1421, respectively.

If the pulses simultaneously applied in the output circuits of the 11-stage ring and the 13-stage ring are of opposite character, for example if a negative pulse is applied to conductor 1740 of the 11-stage ring and to conductor 1341 of the 13-stage ring. The potential of the anode of the right-hand section of tube 1821 will be at a relatively high positive value, while the anode of the right-hand section of tube 1421 will be at a relatively lower potential. These two potentials will tend to neutralize each other through the coupling networks 1841 and 1842, so that the potential of the control grid of the right-hand section of tube 1822 is at an average value between these two values of potential. Likewise, under the above circumstances the anode of the left-hand section of tube 1821 is at a relatively low potential, while the anode of the left-hand section of tube 1421 will be at a relatively high positive potential and as a result the grid of the left-hand section of tube 1822 will be at an average potential between these two potential values. Tube 1822 is biased to cut-off so that no current normally flows in the anode circuit of either section of this tube and consequently the anodes of this tube are at a relatively high positive value, unless more positive signalling potentials are applied to the grids of either section of this tube. The average values of potential applied to the grids of tube 1822 are insufficient to cause anode current to flow in either section of this tube.

If a ring pulse is applied to conductor 1340 of the 13-stage ring simultaneously with the application of the negative pulse to the output conductor 1741 of the 11-stage ring, the outputs of the respective sections of tubes 1821 and 1421 are still opposite, so that both grids of tube 1822 are at an average value between these various values. Consequently, no current flows in the output circuit of either section of this tube when pulses of different character are applied to the output circuits of the two rings.

However, if a negative pulse is simultaneously applied to conductors 1740 and 1340, then current flows in the left-hand section of both tubes 1821 and 1421, reducing the anodes of both of these tubes to a relatively low potential and thus, in effect, applying a negative potential to the grid of the left-hand section of tube 1822. The negative potential applied to the grid of the left-hand section of tube 1822 maintains this section of the tube non-conducting at this time. However, the right-hand sections of tubes 1821 and 1421 will both be non-conducting at this time. Consequently, their anodes will be at a relatively high positive potential with the result that a relatively high positive potential is applied to the right-hand control grid of tube 1822, thus causing this section of tube 1822 to conduct current and thereby reduce its anode potential and cause a negative current pulse to flow in the output circuit of this tube. Likewise, when negative pulses are simultaneously applied to the output conductors 1741 and 1341, the left-hand section of tubes 1821 and 1421 will be non-conducting, while right-hand sections of these tubes will be conducting. Consequently, the right-hand anodes will be at a relatively low positive potential and apply a low negative voltage to the control grid of the right-hand section of tube 1822, thus preventing current flow through this section of the tube. However, the anodes of the left-hand sections of tubes 1821 and 1421 will be at a relatively high positive potential and thus apply a more positive potential to the control grid of the left-hand section of tube 1822, thus causing current to flow through the left-hand section of this tube and reduce the potentials of the anodes. As a result, a negative pulse flows through the output circuit of this tube at this time.

Thus, unlike pulses in the output circuits of the two rings cause the output of tube 1822 to be of a relatively high positive value, while like pulses in the two output circuits cause the potential of the anodes of the tube 1822 to be at a low value.

Figure 54:
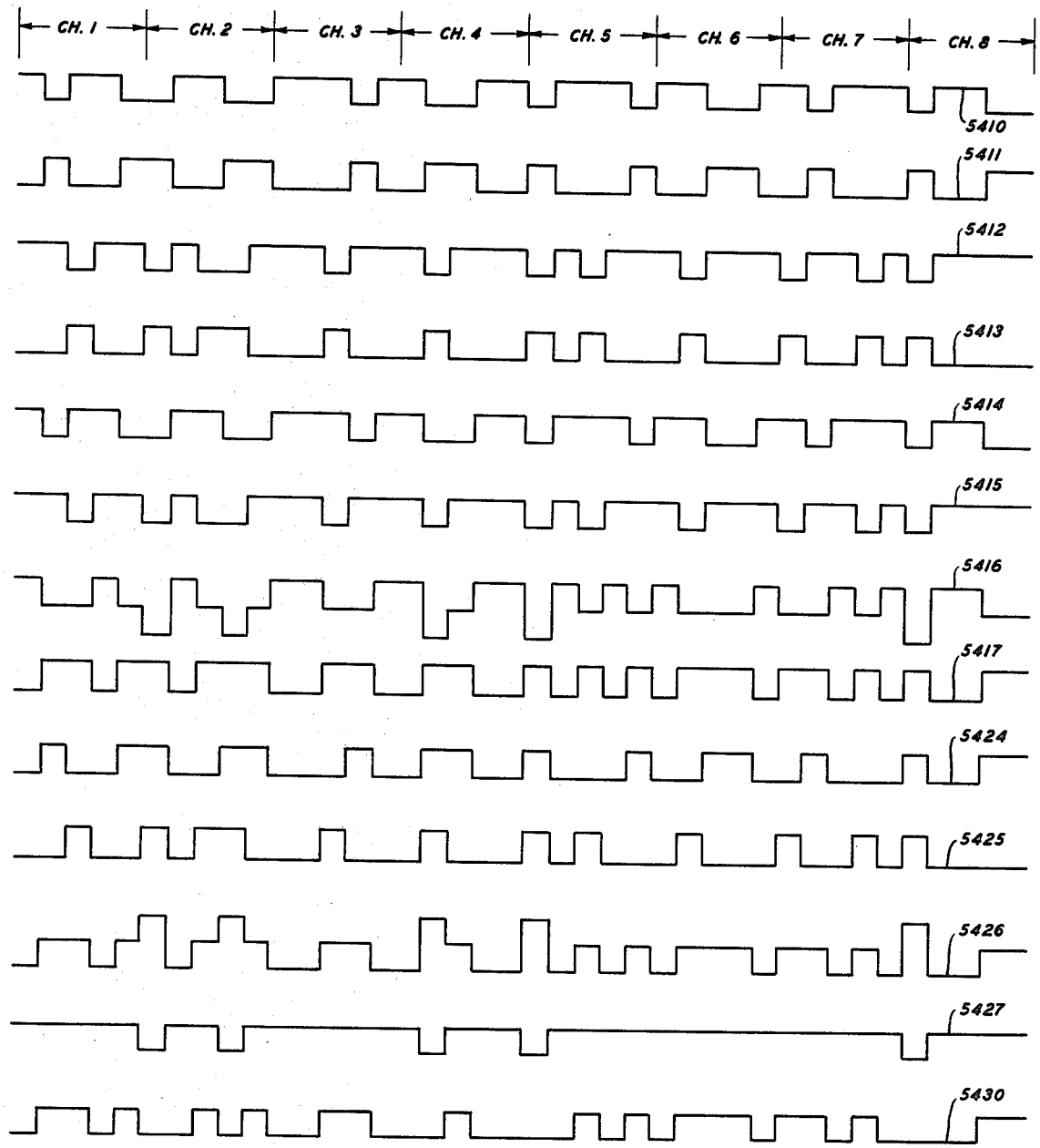

The operation of the circuits for supplying driving pulses to the keying equipment is illustrated in FIG. 53 and the manner in which the pulses are combined in the output circuits as shown in FIG. 54. In FIG. 53, graph 5310 represents pulses which are supplied to the upper control grid of tube 1221 during the transmission of the first pulse of the various code groups. Curve 5311 shows the wave form of the corresponding positive pulses applied to the control grid of the upper section of tube 1222. Graph 5312 shows the wave form of the pulses obtained from stage 1 of the 5-stage ring as applied to the control grid of the lower section of tube 1221. Graph 5313 shows the wave form of the pulses as applied to the control grid of the lower section of tube 1223. The wave form shown by graph 5313 is substantially the derivative graph of pulses 5312.

Graph 5315 shows the wave form of the potential of the anode of the lower section of tube 1222 and thus the wave form applied to the control grid of both sections of tube 1224. As described hereinbefore each time a negative pulse is applied to the control grid of the upper section of tube 1221 in response to the transmission of the No. 1 spacing pulse, the control grids of tube 1224 are changed to a negative value for the remainder of the code group. On the other hand, when no such pulse is received, that is, when the No. 1 pulse of a given code group is marking the potentials of the grids of tube 1224 are maintained positive for the remainder of the code group. Such operation is clearly shown by comparison between graphs 5310, 5311, 5312, 5313 and 5315.

Graph 5316 shows the wave form potential applied to the control grid of the lower section of tube 1614 and graph 5314 shows the wave form of the potential applied to the control grid of the upper section of tube 1614. Graph 5317 shows the corresponding pulses or wave form applied to the control grid of the lower section of tube 1612. It should be noted that when the potentials represented by graphs 5314, 5315, 5316 are all negative, a positive pulse is applied to the control grid of the lower section of tube 1612, thus suppressing a stepping pulse to the 11-stage ring. Such condition prevails during the third code pulse interval of channel 1 as illustrated in FIG. 53 by graph 5317.

Figure 15:
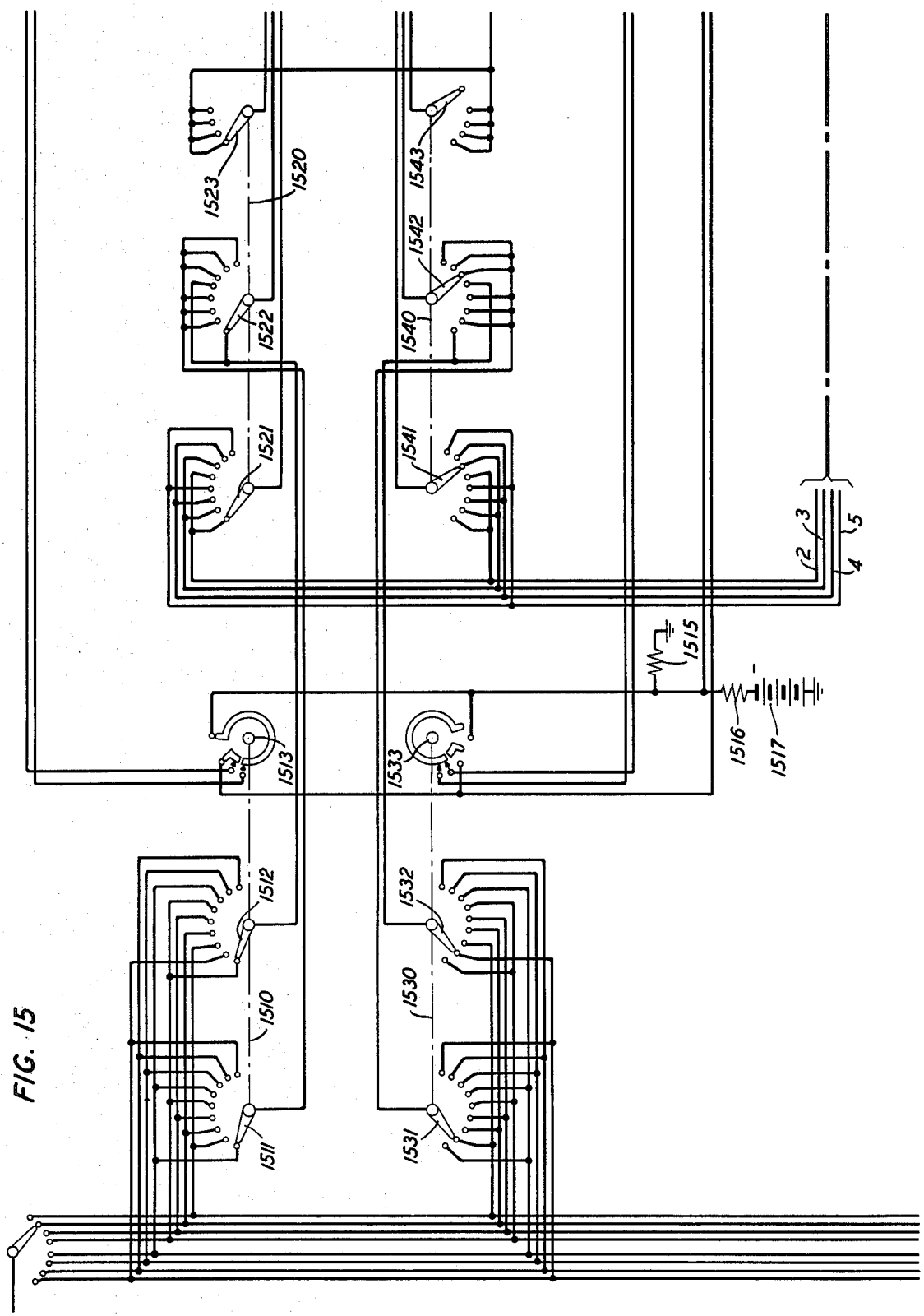

Graph 5318 shows the potential applied to the control grid of the lower section of tube 1214. As described hereinbefore this potential is negative except for the time of operation of the 6th-stage of the 8-stage ring when the switches are set as shown in FIG. 15. The time interval during which this stage is operated to its actuated condition occurs between the fourth and fifth channels as shown by graph 5318 as well as by graph 4936 of FIG. 49. The switch 1520 has been set to select the second code interval for suppression of driving pulses to the 13-stage ring. Consequently, the pulses applied to the control grid of the upper section of tube 1214 are illustrated by graph 5319 of FIG. 53. Here again, when the potentials represented by graph 5315, 5318 and 5319 are all negative a positive pulse is applied to the control grid of the lower section of tube 1212 thus suppressing a pulse to drive 13-stage ring as shown by graph 5320. Graph 5321 illustrates the pulses applied to the grid of the upper section of tube 1612, while graph 5322 illustrates the pulses applied to the control grid of tube 1610. Curve 5323 shows the corresponding negative pulses applied to the cathodes of the "on" tubes of the 11-stage ring. Curve 5321 also shows the wave form of the pulses applied to the control grid of the upper section of tube 1212, while curve 5324 shows the wave form of pulses applied to the control grid of tube 1210, and graph 5325 shows the corresponding negative pulses applied to the cathodes of the "on" stages of the 13-stage ring to advance the 13-stage ring stage by stage. It should be noted that each time the grid of the lower stage of tube 1612 or 1212 becomes positive a driving pulse in the corresponding ring is suppressed, consequently the ring is not advanced each time.

Graph 5410 shows the wave form of pulses applied to the output circuit 1340, and 5411 shows the corresponding opposite potential conditions of the conductor 1341. These wave forms are merely for purposes of illustration and are not intended to be the wave forms corresponding to the setting of the various switches shown in the drawing under the condition of transmission of the pulses described herein. The exact correspondence between the various wave forms under these various conditions is not believed to be essential to the full understanding of the application. Consequently, a detailed description of the exact key pulses generated under any specific set of conditions will not be described since these pulses vary in an essentially random manner. Curves 5412 and 5413 show the pulses applied to the respective output conductors 1740 and 1741 of the 11-stage ring. Graph 5414 shows the corresponding potentials of the anode of the left-hand section of tube 1821, while graph 5415 shows the corresponding potentials of the anode of the left-hand section of tube 1421. Graph 5416 shows the potentials applied to the control grid of the left-hand section of tube 1822, while graph 5417 shows the potential of the anode of the left-hand section of tube 1822, assuming that no current flows in the right-hand section of this tube. Graphs 5424, 5425, 5426 and 5427 show the wave form of the corresponding potentials applied to the corresponding elements of the right-hand sections of tubes 1421, 1821 and 1822. Curve 5430 is a combination of curves 5417 and 5427 and thus shows the output pulses from the keyer circuit.

In addition to the coded pulses applied to the control grid of the left-hand section of tube 2610, as described above key pulses from the keyer are applied to the control grid of the right-hand section of this tube. The key pulses are obtained from the keyer and applied to the control grid of the right-hand section of tube 2618. This tube inverts and clips and shapes the pulses received from the keyer. The anode of the right-hand section of tube 2618 is coupled through coupling condenser 2620 to the control grid of the right-hand section of tube 2610. Thus, tube 2610 serves to mix the code pulses with the key pulses.

The anode of the left-hand section of tube 2610 is provided with anode resistors 2621 and 2623 and the right-hand section with resistors 2622 and 2624. In addition, resistors 2625 and 2626 are coupled between the two anodes and the common point connected to the control grid of the right-hand section of tube 2612. The output or anode of each section of tube 2610 is coupled to the control grid of the corresponding section of tube 2611. Tube 2611 serves as a phase-inverting tube and is provided with a common output or anode resistor 2627, which is coupled to the control grid of the left-hand section of tube 2612. Both sections of the tube 2612 are provided with a common output resistor 2628 which in turn is coupled to the suppressor grid of tube 2613. Tube 2613 operates as a gate tube, so that no current flows in its output circuit unless a positive pulse or signaling potential is applied both to its control grid and its suppressor grid. The control grid is supplied with positive pulses from the 320-kilocycle oscillator, as will be described hereinafter. If either of the grids of tube 2612 are positive, current flows through the common anode resistor 2628 reducing the potential of the suppressor grid of tube 2613 preventing the transmission of a pulse to the radio system as will be described hereinafter.

Thus, if one grid of tube 2610 is positive and the other negative, the center point of resistors 2625 and 2626 will be at a mean or average value. Likewise, if one of the grids of tube 2611 is positive and the other negative, the anodes of both sections of this tube will also be at a mean or average value. Tube 2612 is so biased that if both grids are of a mean or average value, substantially no current flows through the common output resistor 2628 and as a result the suppressor grid of tube 2613 will have a positive pulse or potential applied to it. As a result, each of the pulses applied to the control grid of this tube will be transmitted through it and eventually conveyed to the distant station.

However, if both grids of tube 2610 are positive, the anodes of both sections of this tube will be at a relatively low positive potential due to current flowing through the anode resistors in the output circuits. As a result, the common point between resistors 2625 and 2626 will also be at a relatively low potential, which is below the average potential described above and as a result the right-hand section of tube 2612 will have a somewhat negative potential applied to its control grid so that substantially no current will flow through the right-hand section of this tube. However, with the anodes of both sections of tube 2610 at a relatively low potential the control grids of both sections of tube 2611 will also be at a relatively low potential, so that substantially no current will flow through the output circuit of either section of this tube. Consequently, the anodes of this tube as well as the control grid of the left-hand section of tube 2612 will be at a relatively high positive potential with the result that current flows through the left-hand section of this tube. Current flowing through the left-hand section of tube 2612 causes the potential of the anodes to fall to a low value and thus applying a less positive or more negative potential to the suppressor grid of tube 2613 which prevents the transmission of pulses through this tube at this time. Likewise when both grids of tube 2610 are negative, substantially no current will flow from either section of this tube. Consequently, the common point between resistors 2625 and 2626 is of a relatively high positive potential, which in turn causes the right-hand section of tube 2612 to become conducting and again applies a more negative potential to the suppressor grid of tube 2613, thus preventing the transmission of pulses through the system.

It is thus apparent that when the potentials applied to the control grids of both sections of tube 2610 are unlike, the pulses will be transmitted through tube 2613. On the other hand, when pulses of like polarity are applied to the grids of both sections of tube 2610, no pulses will be transmitted through tube 2613.

Graph 5023 represents typical pulses received from the keyer circuit. These pulses do not correspond to the ones shown in graph 5430 nor do they necessarily correspond to the pulses that might be received in response to the various signals and settings of the keys as shown and described herein. These pulses nevertheless represent typical pulses from the key equipment and are shown to illustrate clearly the manner in which they are combined with the code pulses shown in graph 5018. As described above, the pulses from the key equipment as shown by graph 5023 are applied to the control grid of the right-hand section of tube 2618. Graph 5024 shows the inverted pulses obtained from the anode of the right-hand section of tube 2618 as applied to the control grid of the right-hand section of tube 2610.

Graph 5025 shows the wave form of the potential of the common point of resistors 2625 and 2626. Thus when both the code pulse and the inverted key pulse as illustrated by pulse 1 of channel 5 in graph 5018 and 5024 are negative, the potential at this point is at a high positive value as shown in curve 5025. When the two pulses are of opposite polarity the potential of this common point and thus the potential of the control grid of the right-hand section of tube 2612 is at intermediate or average voltage, whereas when both of the pulses are positive the potential of the control grid of the right-hand section of tube 2612 is negative. Graph 5026 shows the potential applied to the control grid of the left-hand section of tube 2612. As illustrated by graphs 5025 and 5026 the potentials applied by these two grids are just the inverse of one another due to the inverting action of tube 2611 as described above. Graph 5027 illustrates the short pulses obtained from the 320-kilocycle oscillator and applied to the control grid of tube 2613, while graph 5028 shows the pulses applied to the suppressor grid tube 2613. Graph 5029 shows the corresponding positive output pulses as they appear at the cathode of tube 2615. Thus a positive output pulse is obtained when the pulses applied to the grid of both sections of tube 2610 are alike. This means of course, due to the inverting action of the right-hand section of tube 2618 as described above, that a positive output pulse is obtained when the code pulse and key pulse are of the same polarity or character, that is, either both marking or both spacing but no output pulse, that is, a spacing output pulse is obtained when the key pulse and the code pulse are of opposite polarity, that is, one is marking and the other spacing.

It should be noted that biases applied to the elements of tubes 2610, 2611, 2612 and 2613 are such that in the event that either key pulses or the code pulses are interrupted no further pulses are transmitted from tube 2613 to the radio system. Consequently, it is impossible to send out either unciphered code pulses or to send out key pulses alone.

The output of tube 2613 is coupled to the control grid of tube 2614, which tube repeats the pulses and operates as a limiting or clipping amplifier to improve the wave shape of the pulses. The output of tube 2614 is coupled to the power amplifier tube 2615, which in turn repeats the pulses to an output circuit. It should be noted that the marking pulses as repeated by tubes 2613 are pulses of a negative polarity on the anode of tube 2613. These pulses are inverted by tube 2614, so that pulses of positive current of polarity are applied to the control grid of tube 2615. Tube 2615 operates as a cathode follower tube so pulses of positive polarity are also applied to the output conductor 2629.

Assume, for example, that for some reason the key pulses are not supplied to the control grid of the right-hand section of tube 2610. As a result the control grid of the right-hand section of tube 2610 will become positive due to the fact that the grid resistor is returned to a plus B battery potential and no key pulses are applied to the control grid. Likewise, the grid of the right-hand section of tube 2611 will also become positive when the coupling condenser 2608 becomes fully discharged. The grid bias potentials supplied to both sections of tubes 2610, 2611 and 2612 are obtained by allowing the grid to become slightly positive at frequent intervals of time in the well-known manner.

When the key pulses are no longer received by the right-hand section of tube 2610 and thus not repeated to the right-hand section of tube 2611, the code pulses as applied to the left-hand section of tube 2610 are inverted and repeated to the left-hand section of tube 2611. In addition, the code pulses as inverted by the left-hand section of tube 2610 are also repeated to the right-hand section of tube 2612. The inverted code signals are repeated by the left-hand section of tube 2611 and applied to the left-hand section of tube 2612. In other words, inverted code signals are applied to the control grid of the right-hand section of tube 2612, while normal code signals are applied to the control grid of the left-hand section of this tube. Inasmuch as the anodes of both sections of this tube are connected together, the inverted signals cancel the normal signals with the result that no signals are applied to the suppressor grid of tube 2613. Tube 2613 is biased so that positive potential must be applied to the suppressor grid in order to have a marking pulse transmitted, so no marking pulses can be transmitted when no signals are applied thereto. Under certain circumstances some residual noise potentials may be applied to this control element but they are usually insufficient in magnitude to be transmitted through the remainder of the system. Even if they are transmitted they are due to noise and other stray currents and transients which do not convey any intelligence and cannot be deciphered by any receiving equipment.

In a similar manner, if the code signals are interrupted the key signals will not be transmitted. Under these circumstances the opposite sections of tubes 2610 and 2611 operate as described above when the key signals were interrupted.

Attention should be directed to one final condition, namely, during pauses in the transmission of one or more or perhaps all of the channels so that substantially the same set of code pulses would be normally transmitted. Under these circumstances, it might be possible to derive the key code or key pulses from the transmitted pulses since the key would be the only variable factor in the transmitted pulses.

Figure 19:
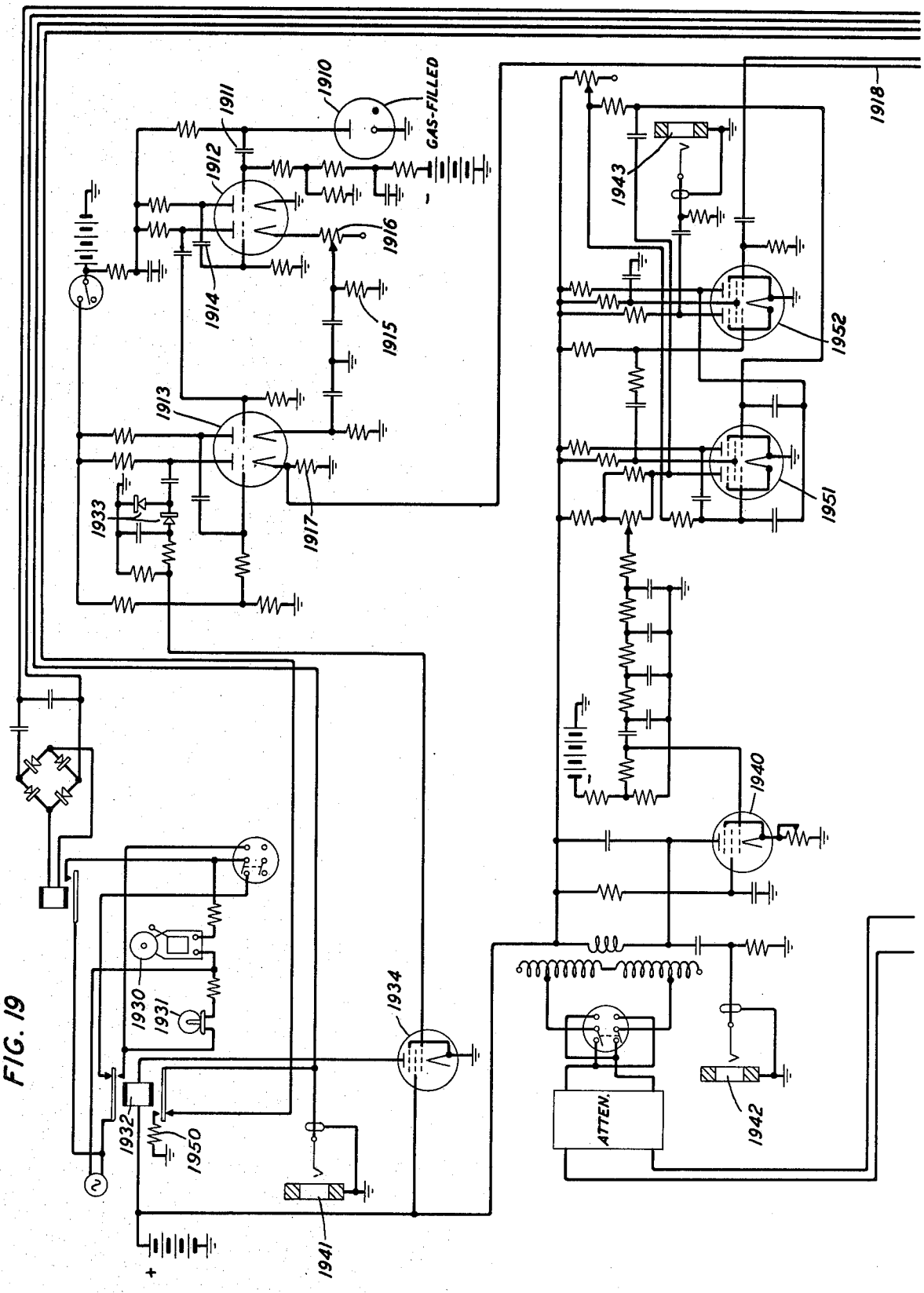

In order to remove the possibility that the key pulses might be so transmitted, low level noise is added to each of the channels as described hereinbefore by the noise generator circuit shown in FIG. 19. The frequency spectrum of the noise generator is sufficiently wide that the arrangement shown is equivalent to an independent noise source for each channel. The amplitude of this noise is such that it will cause the counter to count plus or minus three steps on each side of the middle count of 15 and thus the counter counts between 13 and 19 under control of the noise signals which are random and thus adds a random variation to the code signals so that even during idle intervals the code signals vary in a random manner and thus mask the key pulses so that it is impossible for unauthorized receiving equipment to determine the character of the key pulses. Consequently, it will be impossible even under these circumstances to obtain any clues as to how the various switches of the keyer are positioned.

It is thus apparent that both the code signals and the key signals are fully protected so that a high degree of security is obtained under all operating and trouble conditions because it is impossible for the equipment to transmit unciphered code pulses or to transmit the cipher key pulses in the absence of code pulses or to transmit unvarying code pulses to be ciphered in accordance with the key pulses.

These pulses may be conveyed over any suitable transmission path or medium to the receiving station and applied to the input terminal of tube 4212, for example, where they are shaped and amplified and applied to the succeeding amplifier tubes 4211 and 4210. From these tubes the pulses are conveyed to the mixing tube 4310 where they are employed as described above for operating the decoding system. The pulse output of the tube 4211 is transmitted to the synchronizing equipment of FIG. 39.

However, in the specific embodiment of the invention described herein the pulses from the output tube 2615 are applied over conductor 2629 to the radio transmitter 2650. This radio transmitter is of the type employed in the AN/TRC-6 microwave system employed by the Signal Corps. In this system the radio transmitter employed and designated 2650 in the drawing is usually located on the top of a tower and includes a video amplifier 2651, a pulsed amplifier or oscillator 2652 and a directive antenna system 2653.

Any suitable type of receiving equipment, of course, may be employed to receive such microwave pulses which is capable of responding to these pulses and delivering low frequency, that is, video frequency pulses to the terminal equipment shown at the receiving station. As pointed out hereinbefore, it is to be understood that the radio pulses may be transmitted through any number of intermediate relay repeater stations which may be of the type disclosed in the above-identified copending application of Anderson-Edson, filed on even date herewith. It is also to be understood that any other suitable types of repeater stations may likewise be employed between the transmitting station and the receiving station or terminal.

In accordance with the exemplary system set forth herein, the receiving equipment employs the radio portion of the above-identified Radio Set AN/TRC-6. This system includes a radio receiver-converter 4250 and an intermediate frequency and video amplifier 4251.

The radio receiver converter 4250 is mounted on a tower and includes a directive receiving antenna 4253, crystal detector system 4254, beating oscillator 4255 and a preamplifier 4256. The output of the preamplifier is conveyed by a cable 4257 to the intermediate frequency and the video amplifiers 4251 comprising an intermediate frequency amplifier 4258, a second detector 4259, video amplifier 4260 and the pulse limiter and shaping equipment 4261. The output of this amplifier is illustrated by graph 5111 of FIG. 51. Tubes 4215 and 4214 operate as video amplifiers and, in addition, serve to limit and otherwise improve the wave form of the pulses. The output of tube 4214 is coupled through a small condenser 4216 to the control grid of tube 4213. Condenser 4216, together with the anode resistor 4217 and the grid resistor 4218 are so related to the tube constants that its condenser and its related resistances serve to differentiate the applied pulses. Tube 4213 is so biased that it is normally conducting so that the positive pulses applied to the grid of tube 4213 due to differentiation are effectively suppressed by this tube due to grid current and saturation of the plate current. The negative pulses due to the differentiation by condenser 4216, as illustrated by graph 5112, are amplified by tube 4213 and cause the positive pulses, as illustrated by graph 5113, in the anode circuit of tube 4213. It should be noted that due to the differentiating action of condenser 4216 and the related circuits and due to the bias applied to the elements of tube 4213, the trailing edge of the pulses 5111 is selected. In other words, the positive pulses shown by graph 5113 are in response to the trailing edges of the received pulses. As pointed out in the above-identified application of Anderson-Edson, it has been found that the trailing edge of the received pulses is the most reliable and most accurate portion of each of the pulses.

The output of tube 4213 is coupled to the input circuit of tube 4212. Tube 4212 is provided with a high impedance anode circuit comprising variable resistor 4219. Condenser 4220 is also connected to the anode of the tube 4212 and to the control grid of tube 4211. In addition to condenser 4220, the output capacitance of tube 4212 and the input capacitance of tube 4211, together with the distributed capacity of the wiring between these elements, are such that they require an appreciable time to be charged through the high resistor 4219 in the anode circuit of tube 4212.

Tube 4212 has bias potentials normally applied to its elements such that substantially no current flows in its anode circuit.

Each time a positive pulse is applied to the control grid of tube 4212 current will flow in the anode circuit of this tube and discharge the upper terminal of capacitor 4220 and the related capacitances in parallel therewith, as described above. When current ceases to flow in the anode circuit of tube 4212, the upper terminal of condenser 4220 starts to recharge through the high anode resistor 4219. The value of the capacitor 4220 and charging resistor 4219 are such that it requires an appreciable time for the upper terminal of condenser 4220 to become recharged. After a period of time the upper terminal of condenser 4220 will reach a value at which grid current starts to flow through tube 4211. The grid current flowing through tube 4211 thereupon prevents the potential of the upper terminal of condenser 4220 from rising any further.

Graph 5152 shows the wave form of the potential of the upper terminal of condenser 4220.

The values of the capacitance 4220, resistor 4219 and the bias potentials applied to the various elements of tubes 4212 and 4211 are such that current normally flowing through the anode circuit of tube 4211 is decreased for approximately one and one-half microseconds in response to the application of each of the short negative pulses represented in graph 5112 and which are applied to the grid of tube 4211. As a result a positive pulse flows in the output circuit of tube 4211 having a duration of substantially one and one-half microseconds in response to each received code pulse. The one and one-half microseconds is substantially one-half the pulse interval which has been found to be the most advantageous pulse length to apply to the controlling oscillator for reasons of noise, as will be described hereinafter. The application of the pulses from the output circuit of tube 4211 to the input circuit of the left-hand section of tube 3933 for controlling the synchronizing is described elsewhere herein.

The output of tube 4211 is likewise applied to the control grid of tube 4210. Tube 4210 is similar in operation to tube 4212. This tube is provided with an adjustable high anode resistor 4221, which is employed to control the length of pulse repeated by this tube. The anode of tube 4210 is also connected to the upper terminal of condenser 4322 and to the control grid of the lower section of tube 4310. Each time a positive pulse such as that illustrated in curve 5115 is applied to the control grid of tube 4210 anode current flowing through this tube discharges the upper terminal of condenser 4322. Upon the termination of each of the positive pulses applied to the grid of tube 4210 condenser 4322 starts to recharge through the high resistor 4221. At a slightly later time the control grid of the lower section of tube 4310 starts to draw grid current and thus effectively prevents any further appreciable rise in potential of the upper terminal of condenser 4322. The bias potentials applied to the elements of tubes 4210 and the lower section of tube 4310 and the time constant comprising condenser 4322 and resistor 4221 are such that no current will flow in the output circuit of the lower section of tube 4310 for substantially an entire pulse interval in response to the application of each of the positive pulses applied to the control grid of tube 4210. Graph 5116 shows the wave form of potential applied to the control grid of the lower section of tube 4310. These pulses are then deciphered by combination with pulses from the keyer as will be described herein so pulses similar to the original code are recovered and applied to the decoders in the manner described hereinbefore.

Deciphering

The output of the keyer at the receiving station in the form of negative pulses from tube 3822 is applied to the control grid of the upper section of tube 4310.

Representative output pulses from the keyer are shown by the graph 5117.

It is assumed that the output of the keyer corresponds with the output of the keyer at the transmitting station and the manner in which this correspondence is obtained will be described hereinafter.

Representative pulses obtained from the received signal are indicated by graph 5116 and are applied to the lower grid of tube 4310. The plates of tube 4310 conduct when the corresponding grid waves are most positive and do not conduct on the negative portions of the grid waves so that the plate output wave is represented by graph 5118. As illustrated in curve 5118, the potential of the output of tube 4310 has substantially three different distinct values, a low value, a high value and an intermediate value substantially halfway between the other two values. As illustrated by the graphs 5116, 5117 and 5118 the output of tube 4310 is at the intermediate value at all times when the pulses from the keyer as applied to the control grid of the upper section of tube 4310 are of the opposite character from the pulses received from the radio system as applied to the control grid of the lower section of tube 4310. When both of these pulses are negative the output potential of tube 4310 is a maximum and when both of these pulses are positive the output is a minimum.

The output of tube 4310 is applied to the control grid of the left-hand section of tube 4311. This section of tube 4311 serves to accurately repeat and invert the wave form output from tube 4310. Consequently, the potential wave of the anode of tube 4311 under the assumed conditions is illustrated by graph 5119. The potential wave form from the output of tube 4310 is also applied to the grid of the left-hand section of tube 4312 and the output wave form from the left-hand section of tube 4311 is applied to the control grid of the right-hand section of tube 4311.

The right-hand section of tube 4311 and both sections of tube 4312 are provided with a common anode resistor 4314 which, together with resistor 4315 connected between the anodes and ground, effectively limit the current flowing in the anode circuits of these tubes so that all of the tubes have to be cut off to produce a substantial positive anode potential. In other words, any one of the tubes remaining conducting maintains the plates of all of these tubes at a sufficiently low value so that no pulse is transmitted in the output circuit.

The right-hand section of tube 4311 and the left-hand section of tube 4312 are biased by grid rectification so that current does not flow in their output circuit unless the grids thereof are at the most positive potential of the three possible values illustrated by graphs 5118 and 5119. Consequently, when the pulses applied to the grids of both sections of tube 4310 are of opposite character, both the right-hand section of tube 4311 and the left-hand section of tube 4312 will be cut off. However, when both of the grids of tube 4310 are negative, the output potential of tube 4310 will be positive and thus cause current to flow through the left-hand section of tube 4312. When both grids of tube 4310 are simultaneously positive, the output or anode potential of both sections of this tube will be at a relatively low value, thus reducing the anode current of the left-hand section of tube 4311 to a low value and causing its output potential to be relatively high and thus cause current to continue to flow through the right-hand section of tube 4311. The right-hand section of tube 4312 is supplied at regular intervals with pulses of substantially one microsecond duration from the 320-kilocycle crystal-controlled oscillator. These pulses are obtained from the anode of tube 3911 through the coupling network 3916 and right-hand section of tube 4316. The right-hand section of tube 4316 operates as a limiting and shaping amplifier so that negative pulses of substantially one-microsecond duration such as illustrated by graph 5120 are supplied to the control grid of the right-hand section of tube 4312. One of these pulses is supplied for each cycle of the 320-kilocycle current.

If both the right-hand section of tube 4311 and the left-hand section of tube 4312 are cut off the one-microsecond negative pulses applied to the control grid of the right-hand section of tube 4312 are repeated by this section and inverted so that positive pulses are applied to the control grid of the left-hand section of the clipping and shaping amplifier tube 4313. If either the right-hand section of tube 4311 or the left-hand section of tube 4312 is conducting when the one microsecond pulse is applied to the control grid of the right-hand section of tube 4312 the pulse is not repeated; it is suppressed instead, as illustrated in graph 5121.

The pulses repeated by the right-hand section of tube 4312 are then transmitted through the right-hand section of tube 4313 which further shapes and amplifies these and causes positive pulses to be applied to the suppressor grids of gating tubes such as 4414 and the corresponding tubes of the other decoding circuits, which operate in the manner described above.

It should be noted that the pulses obtained after the key pulses are combined with the received pulses as described above, are the same as the coded pulses at the transmitter before enciphering except they are inverted in character. This inversion is due to the inversion of the key pulses by the right-hand section of tube 2618 at the transmitting station. These pulses are, therefore, suitable for decoding in the manner described above. It should also be noted that the key pulses are combined with the received pulses in the same manner as the key pulses are combined with the coded pulses at the transmitter. In other words, by successively combining the key pulses first with the code pulses and then with the supplied pulses in substantially the same manner, the code pulses are recovered in their original form. Such combining circuits are sometimes called reentry circuits.

The combined output of the received enciphered pulses and the keyer pulses, i.e., the deciphered pulses, is applied to the control grid of tube 4020. The suppressor grid of tube 4020 is supplied with positive pulses from the buffer amplifier tube 4028, which in turn receives pulses from the No. 1 stage of the 5-stage ring. Tube 4020 is biased so that no current flows in its output circuit unless positive pulses are simultaneously applied to its control grid and suppressor grid. In this manner tube 4020 operates as a gate tube to separate out only the first pulses of each of the code groups. When both these No. 1 pulses and the positive potential pulses from the output of right-hand section of tube 4311 and both sections of tube 4312 are positive, a corresponding pulse is repeated through tube 4020. The repeated pulse will be negative. This pulse together with a negative pulse from the anode circuit of tube 4028 are then applied to the control grids of both sections of tube 3221, in the same manner as the first code pulses and a pulse of the 5-stage ring is applied to both sections of the phase-controlled tube 1221, and control the keyer at the receiving station in the same manner as has been described hereinbefore with regard to the transmitter station. These pulses tend to set the tubes 3222 and 3223 in the same manner as tubes 1222 and 1223 of the transmitting keyer were set or conditioned at the transmitting station so that when the time of a succeeding one of the pulses of the code group is selected for suppressing a pulse to the driving circuit of either the 13-stage or 11-stage ring.

The following table shows the response of various circuits to the character of the No. 1 pulse of each code group as employed to control pulses for driving the circuits of the keyer both at the transmitting station and the receiving station. It will be observed that the selected driving pulse to the keyer both at the transmitting station and at the receiving station is correspondingly suppressed or not suppressed at both stations in response to the character of the first pulse of the corresponding code group:

|  | First Pulse At Transmitter | |
|---|---|---|
| First Pulse | Marking | Spacing |
| 1st Stage counter | | |
| "on" tube 3015 | non-conducting | conducting |
| "off" tube 3014 | conducting | non-conducting |
| Distributor tubes 2511 | conducting | non-conducting |
| 2510 | non-conducting | conducting |
| Upper section tube 1221 | no negative pulse | negative pulse |
| Upper section tube 1222 | no positive pulse | positive pulse |
| Lower section tube 1222 | non-conducting | conducting |
| Both sections tube 1224 | conducting | non-conducting |
| Selected driving pulse to keyer at transmitter | not suppressed | suppressed |

| Transmitting Keyer Pulse | Marking | Spacing | Marking | Spacing |
|---|---|---|---|---|
| Right-hand section of tube 2610 | conducting | non-conducting | conducting | non-conducting |
| Transmitted pulse | marking | spacing | spacing | marking |

|  | At Receiver | | | |
|---|---|---|---|---|
| Receiving Keyer | Marking | Spacing | Marking | Spacing |
| Deciphered pulses | spacing | spacing | marking | marking |
| Right-hand section tube 4311 and both sections tube 4312 | conducting | conducting | non-conducting | non-conducting |
| Tube 4020 | non-conducting | non-conducting | conducting | conducting |
| Lower section tube 3222 | non-conducting | | | conducting |
| Both sections tube 3224 | conducting | | | non-conducting |
| Selected driving pulse to keyer at receiver | not suppressed | | | suppressed |

The character of the No. 1 pulse thus determines whether or not a driving pulse is to be suppressed at the receiver in the same manner as it did at the transmitter.

It is assumed, of course, that the various switches of the keyer are set in the same positions at each of the stations of the system. Thereafter, during the pulse interval selected, the driving pulse will be or will not be suppressed at both stations and thus maintain the circuits of the receiving station keyer in exact synchronism with the keyer circuits at the transmitting station so that the proper key is always supplied to the receiving station for deciphering the received pulses.

Synchronizing and Receiving Equipment

As pointed out hereinbefore, upon the application of power to the system the circuits at the receiving end will not start in proper relationship with the circuits at the transmitting station. As a result, high level noise currents will be present on all of the received channels. Inasmuch as channel 1 has been selected for synchronizing purposes in the exemplary embodiment described herein, the conductor 4621 extends from the output of channel 1 at the anode of the left-hand section of tube 4609 of FIG. 46 through FIGS. 45, 44, 41 and 40 to the grid of the right-hand section of tube 3930 of FIG. 39. The right-hand section of this tube amplifies the noise potentials, applied to its grid and applies them through the coupling condenser 3943 to the anode and grid of the left-hand section of tube 3930. The anode and grid of the left-hand section of tube 3930 are connected together, so that this section operates as a two-element rectifier tube and develops positive voltage across the cathode resistor 3944 in response to the noise potentials. This positive voltage is applied to the grid of the right-hand section of tube 3931 after a delay interval introduced by capacitor 3941 and resistor 3942 as well as by capacity 3945.

The bias normally applied to the right-hand section of tube 3931 is such that substantially no current flows in the output circuit unless a positive potential is applied to its grid. The positive potential from the diode when applied to the control grid of the right-hand section of tube 3931 causes current to flow in the output circuit of tube 3931 through switch 3938, the winding of relay 3935 and switch 3937. Relay 3935 thereupon operates and in operating short-circuits the resistor 3942 and thus reduces the discharge time of condenser 3941 when it is desired to discharge this condenser, as will be described hereinafter. The operation of relay 3935 also controls certain elements of the alarm circuit 3936, thus indicating an abnormal or improper operating condition of the system.

In addition relay 3935 in operating removes the positive potentials from the screens of both sections of tube 3932, from the screen grid of both sections of the ringing tube 4618 and from the screens of the ringing tubes associated with the other channels, thus preventing these tubes from operating as amplifiers and preventing the transmission of signals through them.

By removing the positive screen potential from the screen of both sections of tube 3932 and connecting ground thereto these sections are effectively blocked, so that no component of the incoming signals will be applied to the local oscillator.

In addition, the operation of relay 3935 changes the natural frequency of the oscillator comprising the tubes 3910 and 3911 by changing the phase angle of the coupling impedance between the anode of tube 3910 and the control grid of tube 3911. Relay 3935 in operating connects condenser 3947 between the anode of tube 3910 and ground. This modifies the phase characteristic of the oscillator circuit so as to produce a change in the frequency of the oscillations produced thereby.

With relay 3935 operated, the frequency of the oscillator comprising tubes 3910, 3911 and crystal 3913 oscillate at a slightly lower frequency than the frequency of the 320 kilocycle oscillator at the transmitting station. The difference in frequency is low compared to 320 kilocycles and around 4 cycles per second in the exemplary system. With the equipment at the receiving station thus running slightly slower than the equipment at the transmitting station the multiplex equipment at the receiving station will successively occupy each of the different possible relative positions between the multiplex equipment at the receiving station and that of the transmitting station. As the receiving equipment passes through the various relative positions it will be in each of the positions sufficiently long to allow the keying circuits to assume all of the possible relative positions, so that when the multiplex equipment is in synchronism at the two ends of the system and where the keys associated with the keying equipment for both the eleven-stage and thirteen-stage rings and also the driving circuits at the receiving station are set in identical positions with those at the transmitting station, the keying equipment will likewise come into synchronism and thereafter remain in synchronism. This hunting toward the proper synchronizing position may be made sufficiently slow, by making the two frequencies sufficiently close to each other at the two ends, that upon reaching synchronism at the receiving end sufficient time will be allowed to change the circuits to lock them in synchronism.

When the keyer circuits as well as the multiplex circuits come into synchronism the noise level of channel 1 falls to a low value imposed by the low level noise applied to all of the channels. This noise level is far below the noise level encountered when the system is out of synchronism. As a result, the noise potentials applied to the left-hand section of tube 3930 through the right-hand section of this tube also fall in value so that the potential of the grid of the right-hand section of tube 3931 falls to a sufficiently low value to interrupt the current flowing through the winding of relay 3935. Relay 3935 thereupon releases and cancels the alarm indications to the alarm circuit 3936. In addition, relay 3935 in releasing removes the short circuit from resistance 3942 so that the application of a positive potential to the grid of the tube 3931 is delayed, thus preventing the improper operation of the system due to static or other stray currents. The release of relay 3935 in addition disconnects condenser 3947 from ground, thus reducing the capacity between the anode of tube 3910 and ground which restores the frequency of the oscillator to substantially 320 kilocycles per second. In addition, the release of relay 3935 supplies the proper operating potential to the screen of both sections of tube 3932, thus conditioning this tube to repeat the signals applied to it.

At this time the pulses received from the radio system and amplified and shaped by the video amplifier tubes 4211, 4212, 4213, 4214 and 4215 will be applied to the control grids of both sections of tube 3933. The anode of the left-hand section of tube 3933 is connected to a sharply tuned resonant circuit 3939 having a high Q. This circuit therefore tends to select the 320 kilocycle component of the received pulses and, in addition, tends to oscillate in response to the received pulses at the 320 kilocycle frequency. However, inasmuch as the pulses are received in a random manner, the magnitude of the oscillating current in this resonant circuit will be a function of the number of pulses received during any interval of time. Graph 5122 shows this oscillating current. The dotted lines show the variation in amplitude of this current due to the variation of the character of the pulses received.

The anode of the left-hand section of tube 3933 is connected to the grid of the left-hand section of tube 3932 through the coupling condenser 3948. The left-hand section of tube 3932 operates as a limiting or clipping amplifier and thus tends to remove the greater portion at least of the amplitude variation of the oscillating currents flowing in the resonant circuit 3939. The output of the left-hand section of tube 3932 is shown by curve 5123 of FIG. 51. This output is then applied to the right-hand section of tube 3932. The output of tube 3932 is provided with a second sharply tuned resonant circuit 3940, which circuit again selects the 320 kilocycle frequency components of the received pulses and applies substantially only the 320 kilocycle component thereof at a substantially constant amplitude as shown on graph 5124 to the anode of the oscillator tube 3910. The 320 kilocycle currents applied to the anode force the oscillator to operate in synchronism with the incoming pulses and in suitable phase with these pulses as shown by graph 5130. Thus, the 320 kilocycle oscillator at the receiving station is now maintained accurately in phase with respect to the received pulses. Likewise, all of the other circuits controlled by it will also be maintained in correct synchronism with the equipment at the transmitting station.

The rlease of relay 3935 also applies the proper operating potential to the screen grids of the amplifier tube 4618 and the corresponding tubes associated with the other receiving channels so that these tubes will operate in their normal manner.

Order Wire

In addition to the communication channels described above, provision is made for an additional communication channel which is not secured and therefore not enciphered. This additional order wire channel employs the entire array of random enciphered pulses, which may be of either one or the other of two different characters and may include pulses of current and the absence of current, as a carrier current. This carrier current then is, in effect, phase modulated, time modulated or position modulated, as this type of modulation is sometimes described. The features of this method of modulation at the transmitting station and demodulation at the receiving station disclosed herein, which may be novel but not claimed herein, are claimed in the above-identified application of Anderson-Edson filed on even date herewith.

Briefly, the order wire signals are received from source 2010 and applied to the coupling transformer 2619. The secondary of this transformer is connected to the grid of right hand section of tube 2616. The order wire signals cause the cathode current of the right-hand section of this tube to vary and thus cause the potential of the cathode to vary due to the varying cathode current flowing through resistors 2636 and 2637. The grid of the left-hand section of tube 2616 is supplied with 320 kilocycle current from the 320 kilocycle oscillator. Condenser 2635 by-passes the cathode resistor for this high frequency current. The amplitude of the 320 kilocycle voltage applied to the left-hand grid of tube 2616 is high so that current flows to the anode for only a small portion of the period. The time constant of the grid resistor 2606 and condenser 2607 is short compared to voice frequencies so that the grid is driven positive on each cycle of the 320 kilocycle wave even with voice frequency voltage impressed on cathode resistors 2636 and 2637.

The output of the left-hand section of tube 2616 is connected to the control grid of tube 2617 and to condenser 2630. Condenser 2630 is charged by the spurts of current to a voltage nearly equal to the cathode potential of tube 2616. When current through tube 2616 is interrupted condenser 2630 starts discharging at a rate depending on resistor 2631 and capacitance 2630 until the voltage equals that of the cathode of tube 2617. Grid current of tube 2617 checks the rise of voltage. The time required to reach this condition depends on the cathode potential of tube 2616 which in turn depends on the voice frequency signal voltage. Thus the length of the positive pulses and the time of occurrence of their trailing edges is a function of this voice frequency signal voltage. Condenser 2638 which couples the output of tube 2617 to the input of tube 2618, together with the resistors 2632 and 2639 are of such a value that the pulses in the output circuit of tube 2617 are in effect differentiated.

Due to the limiting action of the grid of the left-hand section of tube 2618, the positive differentiated pulses are effectively suppressed, while the negative pulses are amplified and repeated to the output circuit of the left-hand section of tube 2618. From the output circuit of this tube these pulses are applied to the control grid of tube 2613 where they control the transmission of the pulses as described hereinbefore.

It should be noted that the negative pulses selected by the left-hand section of tube 2618 occur at the end of the nonconducting period of tube 2617 which is delayed from the time of occurrence of the positive peaks of the 320-kilocycle voltage by an amount proportional to the order wire signal. These pulses are thus position modulated by the order wire signal. These pulses thus control the time of transmission of the pulses transmitted over the radio system in the manner described above. Modulation of this type has been called time modulation, position modulation, or phase modulation. It should be noted that this type of position modulation of the pulses does not in any way add to or subtract from the entire array of pulses. Instead it merely employs these pulses and causes their tramsmission to be advanced or delayed slightly in accordance with the order wire signals.

Thus, the 320-kilocycle pulses from the controlling oscillator applied to the control grid of tube 2613 are advanced or delayed a small increment of time, depending upon the polarity of the order wire signals to be transmitted. These pulses are then transmitted over the radio system in the manner described above and may be transmitted through one or more of the repeater stations or repeaters as set forth in detail in the above-identified application of Anderson-Edson, filed on even date herewith.

Figure 42:
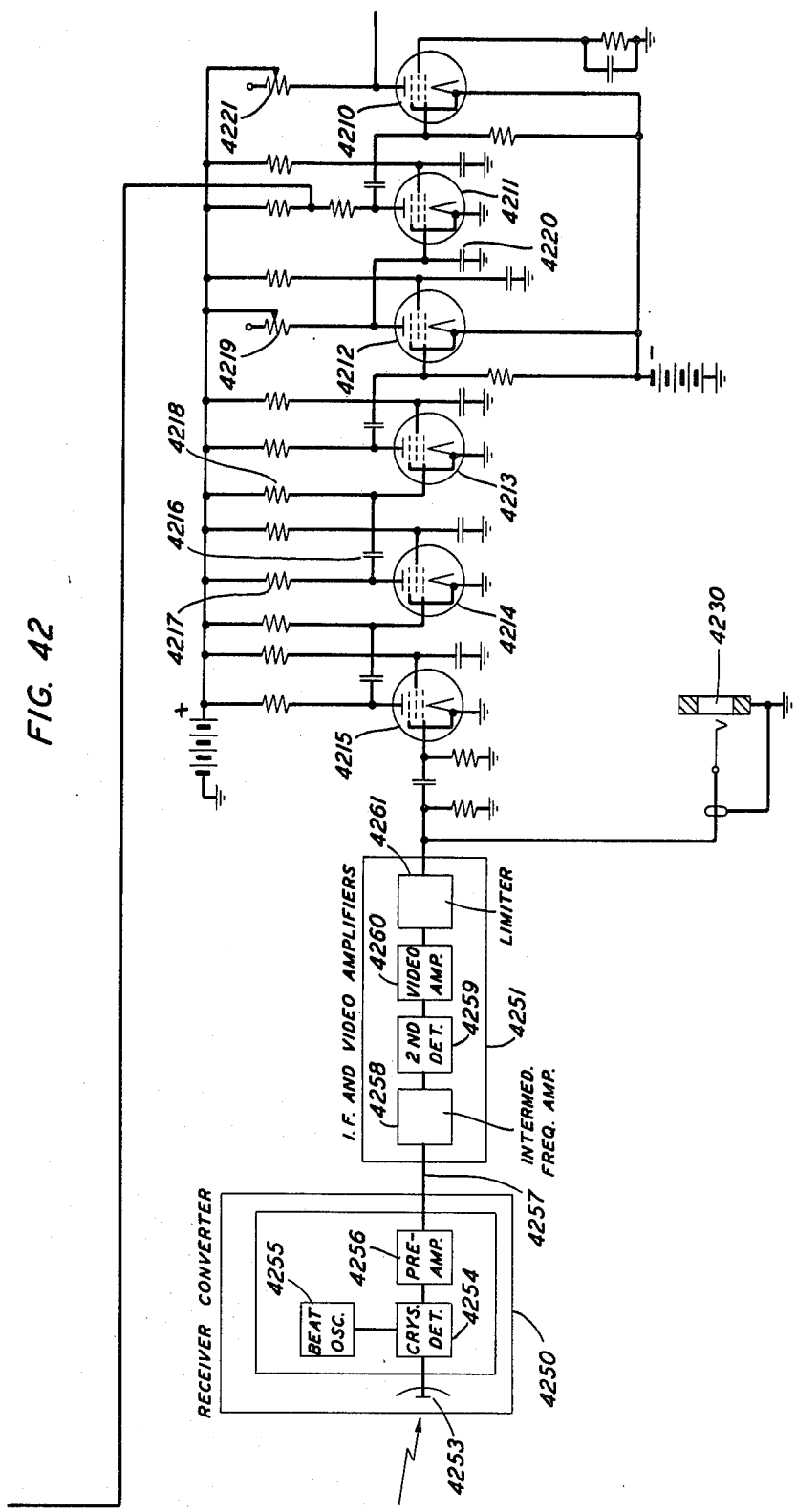
Figure 43:
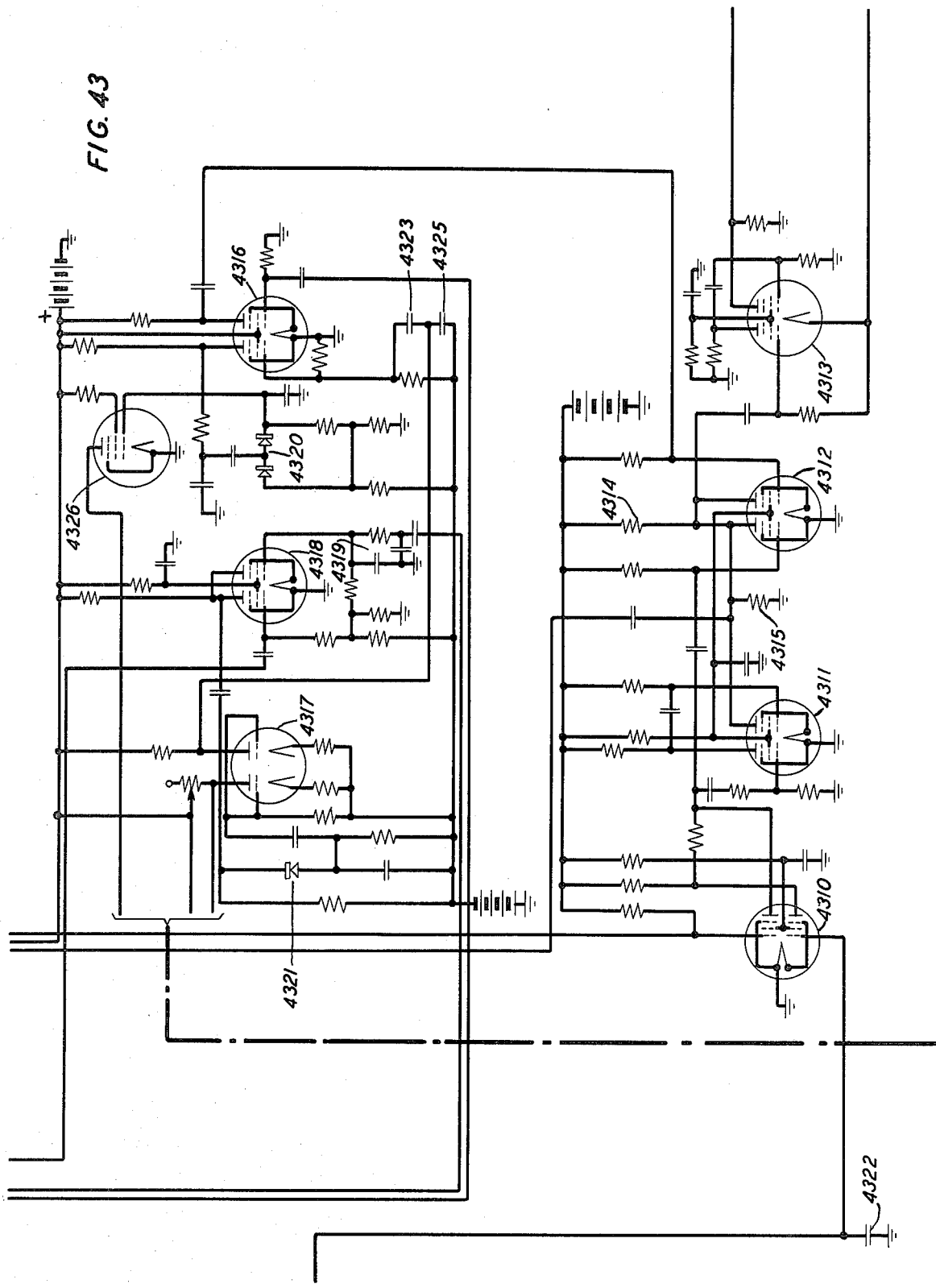
Figure 44:
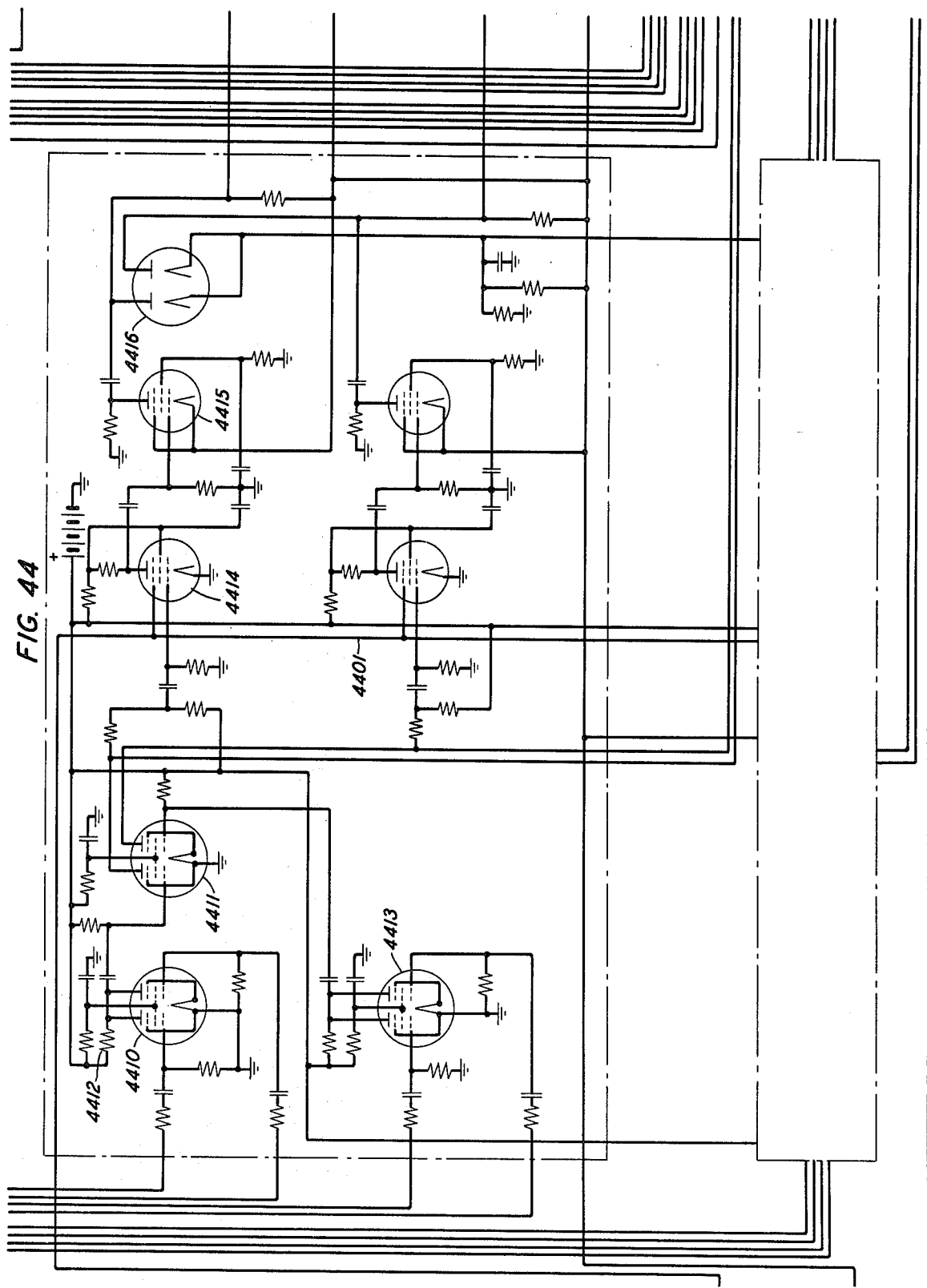
Figure 45:
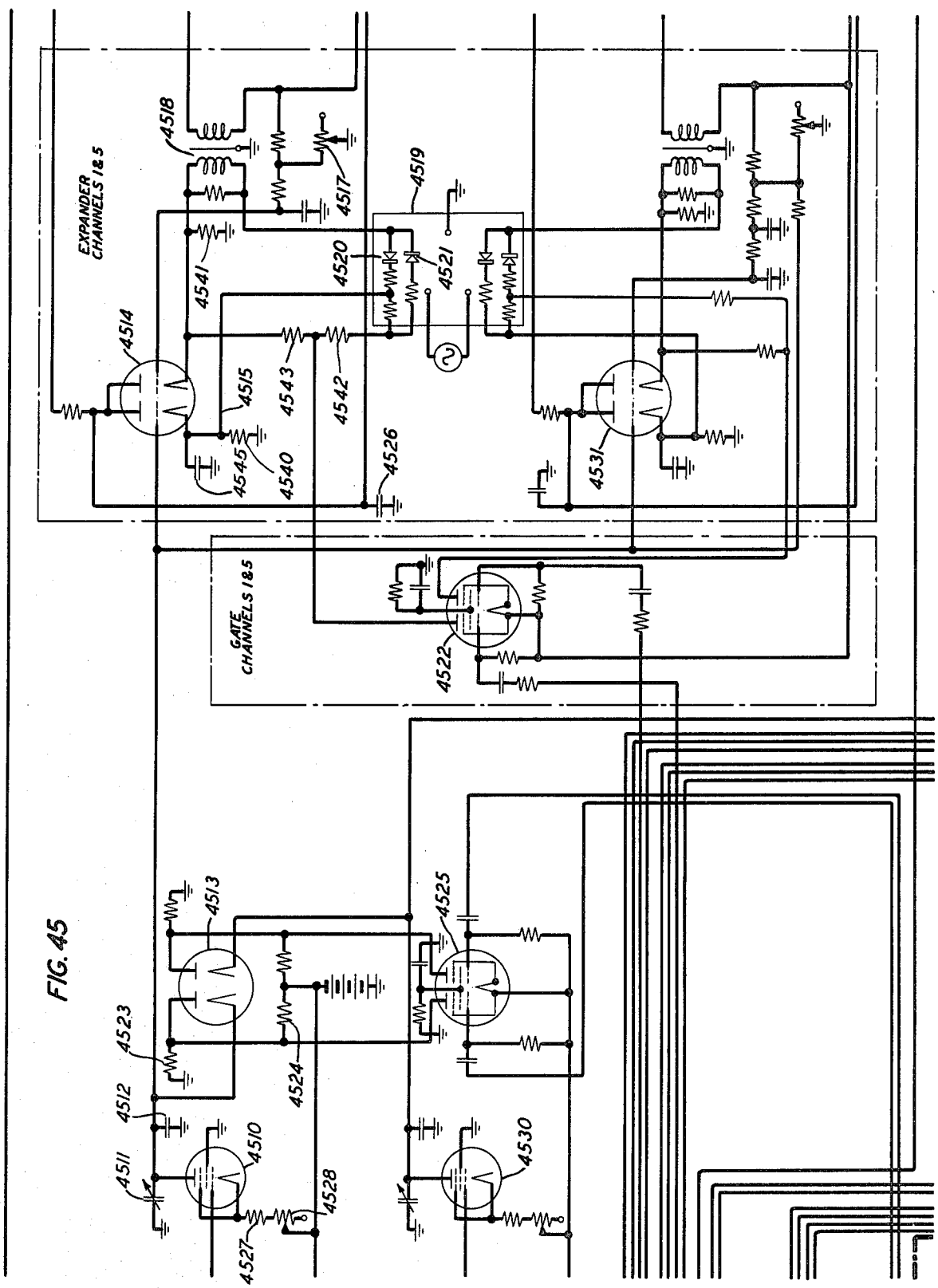
Figure 46:
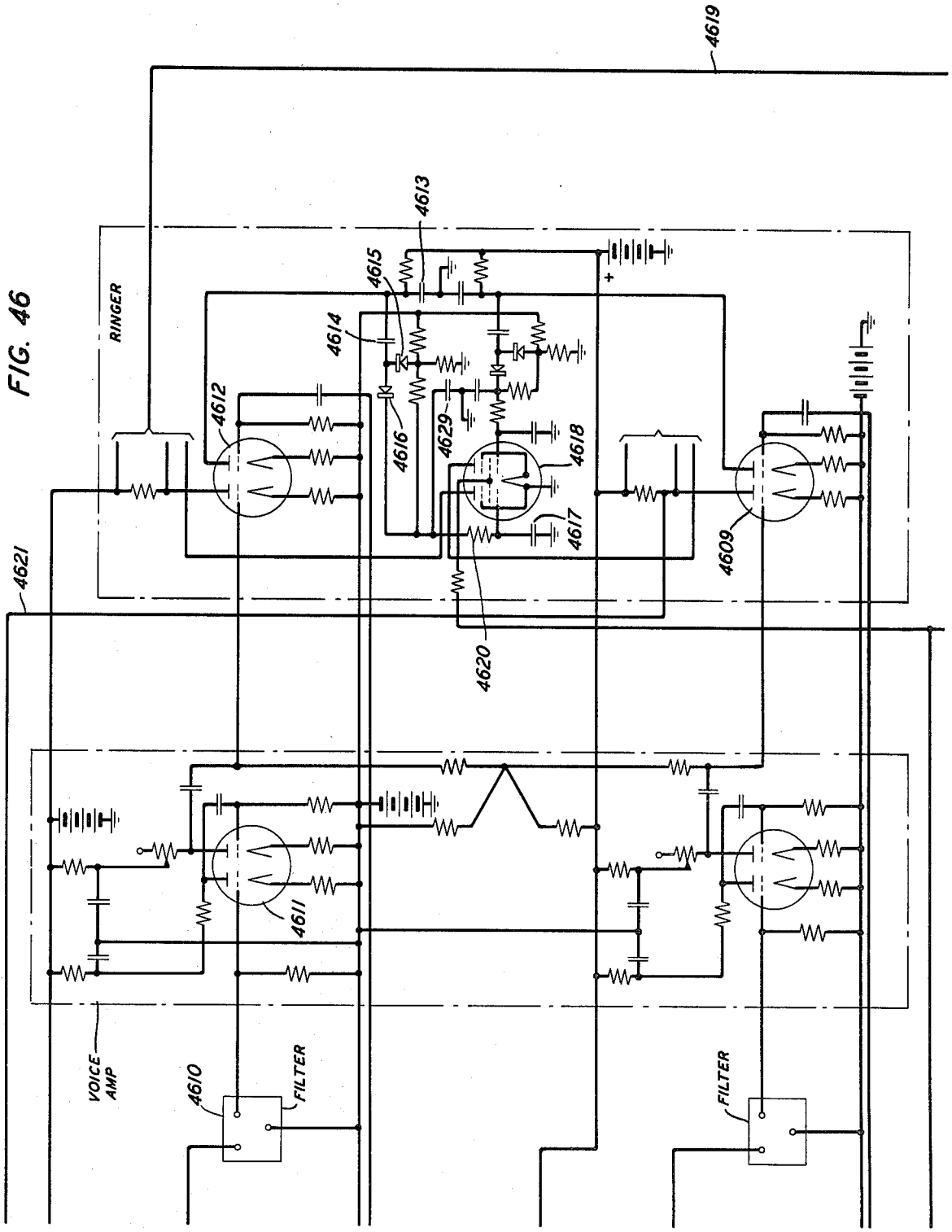
Figure 47:
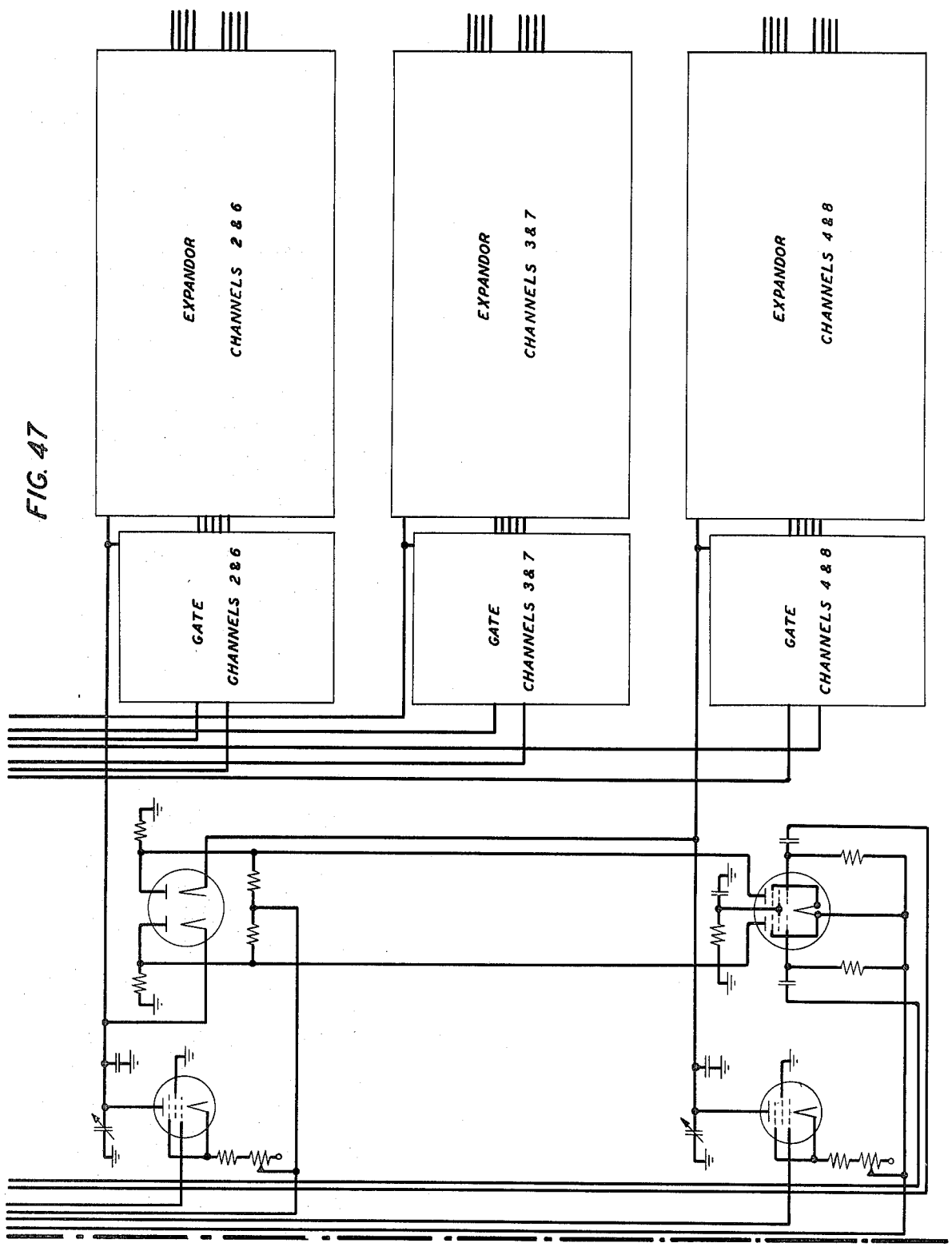
Figure 48:
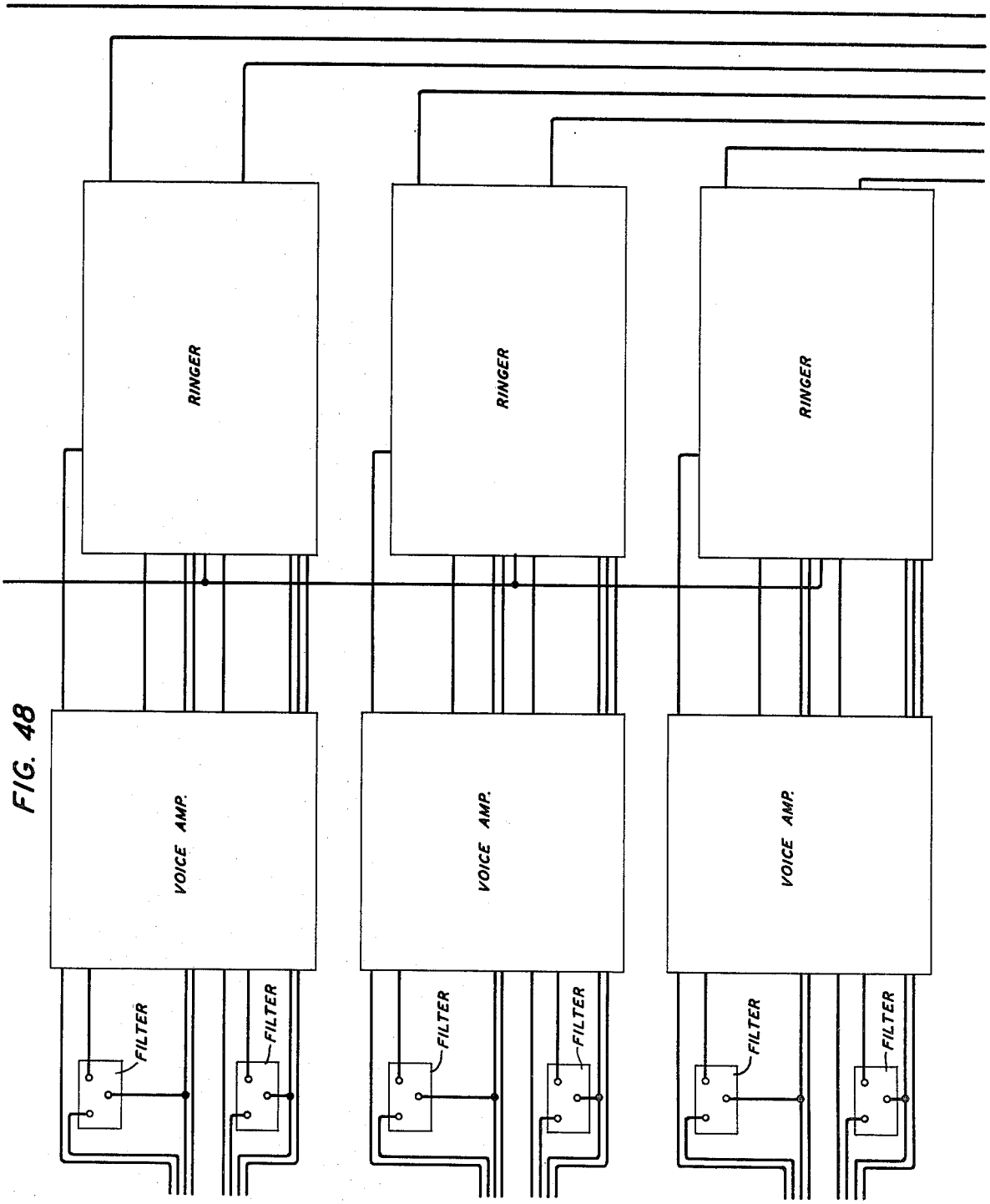

The signals after having been repeated through one or more relay repeater stations are received by the receiving equipment shown in FIG. 42 and delivered to the video amplifier in the same manner as described above. The differentiating action of condenser 4216 and the pulse lengthening equipment comprising tubes 4213, 4212 and 4211, operate in the manner described above. A portion of the output of tube 4211 is applied to the control grid of tube 3933 for maintaining synchronism. In the anode circuit of this tube a selecting network 3939 is employed to, in effect, supply the missing pulses from the received pulses. This is accomplished by tuning the resonating circuit 3939 to substantially the same frequency as the frequency of the incoming pulses. The magnitude of this current, however, will vary somewhat in accordance with the number of pulses received during short intervals of time as described above and shown by the dotted lines of graph 5122. In order to reduce these variations, the left-hand section of tube 3932 operates as a limiter or clipper and the pulses are then applied to the right-hand section of this tube, which is provided with a second resonant circuit 3940, as described hereinbefore. These pulses are then applied or injected into the oscillator circuit by connection through the coupling resistance 3949 to the anode of the oscillator tube 3910. From there, they are transmitted through the coupling condenser 3912 and the second oscillator stage 3911, both to the control grids of the left-hand sections of tubes 4318 and 4316 and also through the crystal 3913, which acts as a highly selective filter circuit or device, to the control grid of tube 3910 and to the control grid of the left-hand section of tube 4318. The current flowing in the anode circuit of tube 3911 follows to a large degree the phase of the incoming signal. However, substantially all the amplitude modulation due to the absence of pulses has been removed by the pulses filled in by the resonant circuits 3939 and 3940. It is to be noted that these pulses filled in by these resonant circuits do not in any way interfere with the coded pulses or the decoding of them as described hereinbefore. This phase modulated signal after passing through the crystal element 3913 has substantially all the phase modulated component removed therefrom. In other words, the phase of the current at the output of the crystal is controlled in accordance with the average time of occurrence of the received pulses instead of the actual time which is the case of the current at the anode of tube 3911. Consequently, it is possible to recover the order wire signal currents by comparing the phase of the current as applied to the crystal element 3913 and the current after it has passed through this crystal element.

Tube 4318 is employed to compare or combine these two currents. The control grid of the left-hand section of tube 4318 is coupled to the left-hand terminal of the crystal element 3913 and consequently is supplied with the 320-kilocycle current after it has passed through this crystal element.

The 320-kilocycle current from the plate of tube 3911 before it has passed through the crystal element is coupled through the phase shifting network 4319, which delays the phase of these currents substantially 145 degrees, to the control grid of the right-hand section of tube 4318. The anodes of both sections of tube 4318 are connected together so that the two currents or voltages applied to the grids of the respective sections of this tube are added together in the anode circuits of this tube. As a result, the amplitude of the total current varies in accordance with the variations in phase of the current applied to the two grids. This manner of combining the two currents is described in greater detail in the above-identified application of Anderson and Edson filed on even date herewith.

The outputs of both sections of tube 4318 are connected to the rectifier or detector elements 4321 which demodulates the amplitude modulated current and applies the demodulated wave to the grids of both sections of tube 4317. The output from the left-hand section of this tube is then applied to the receiving instrument similar to 2010 for permitting the attendants to communicate over the order wire.

It is also possible to ring over the order wire by applying ringing current to the input circuit at the transmitting station or at any of the repeater stations. This ringing current, which may be either 20 cycles or 60 cycles, causes the entire array of pulses to be time or position modulated in the same manner as these pulses are modulated by speech waves. At the receiving station the demodulation is accomplished in substantially the same way. However, the output of the right-hand section of tube 4317 is coupled through a network comprising condensers 4323 and 4325 to the grid of the left-hand section of tube 4316. The condensers 4323 and 4325 tend to operate as a filter for suppressing higher frequency currents and prevent any potentials due to these frequencies from being applied to the grid of the left-hand section of tube 4316. The output of the network comprising condensers 4323 and 4325 is connected to the grid of the left-hand section of tube 4316, which amplifies the low frequency currents supplied to it and applies them to a voltage doubler demodulator or rectifier 4320. The output of this demodulator is then applied to the control grid of tube 4326. Thus, upon the reception of pulses modulated in accordance with ringing current positive potential will be applied to the control grid of tube 4326. Current consequently flows through the anode circuit of this tube and causes a ringing relay to operate which applies ringing current to the local circuits for ringing a bell to attract the attention of the attendants. The ringing relay is similar to relay 2130 shown at the transmitting station and operated in response to ringing current applied to the order wire at the opposite end of the system.

Monitoring, Alarm and Testing Equipment

Figure 20:
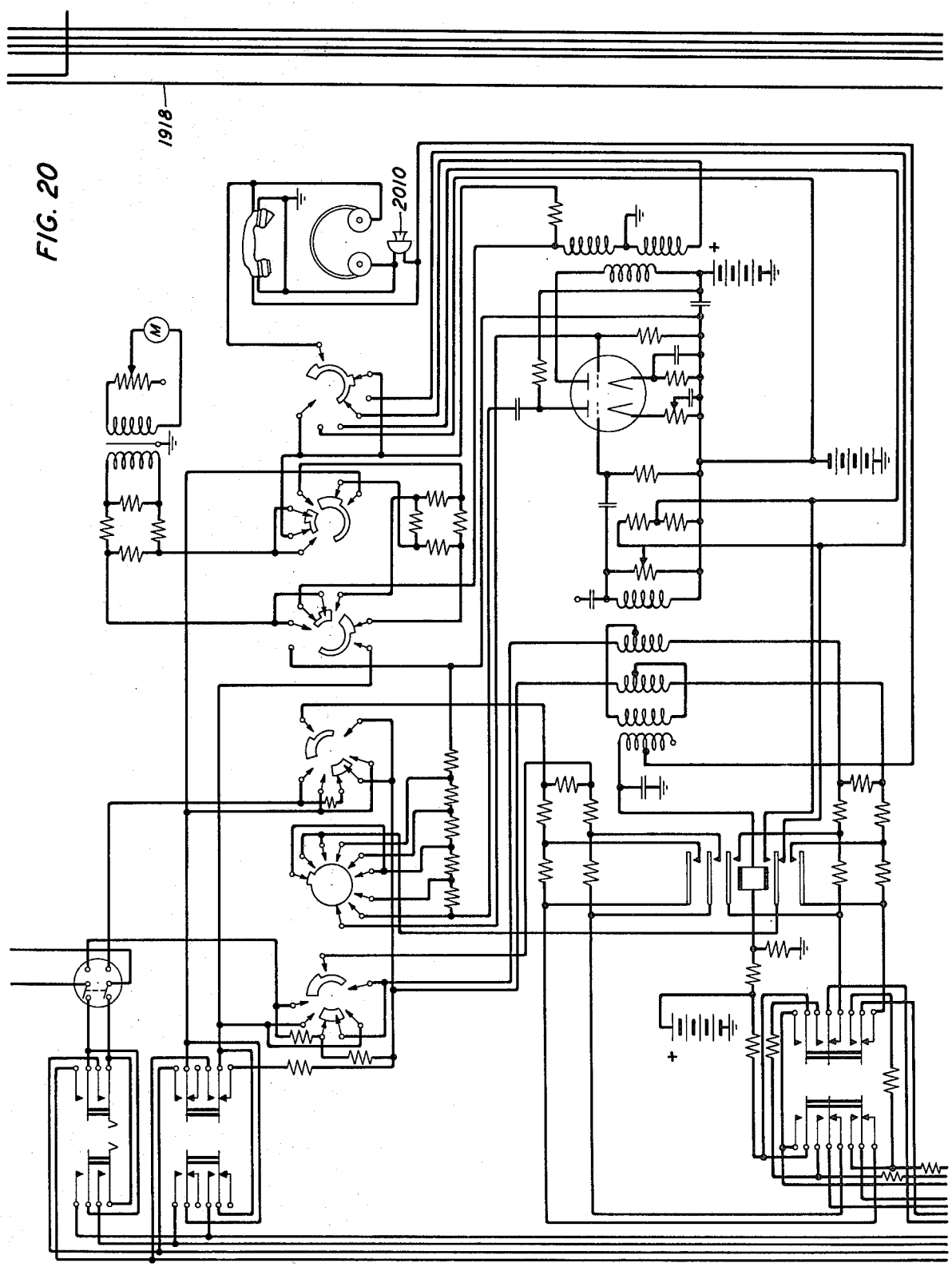

Certain monitoring, alarm and testing equipment has been provided to enable the attendants to properly adjust and maintain the system and the various elements thereof in the proper operating condition. FIG. 20 shows equipment for monitoring on each of the channels and measuring the transmission of each of the channels so that the operation of the system may be checked. The circuits of FIG. 20 include equipment for permitting the attendants to talk on any of the channels and to receive from the corresponding channels as well as to make desired tests. This monitoring equipment shown in FIG. 20 may also be connected to the order wire circuit described above to permit the attendants to talk over the order wire, as described above.

In addition, certain alarm equipment is provided, as illustrated in FIG. 19, comprising a bell 1930 and a lamp 1931. In case the output of the noise generator shown in FIG. 19 should fail, relay 1932 operates and actuates the alarm bell 1930 and lights lamp 1931. So long as the noise generator is operating satisfactorily, noise potentials are applied to the voltage doubler rectifier arrangement comprising rectifier elements 1933, which rectifiers develop a negative voltage in response to the noise potentials. This negative voltage is applied to the control grid of tube 1934 and prevents current from flowing in the anode circuit of this tube through the winding of relay 1932, thus maintaining relay 1932 released.

However, should the output noise fail, rectifier 1933 will cease to function and as a result the negative potential will be removed from the control grid of tube 1934. Consequently, this grid will become more positive and cause current to flow through the anode circuit of tube 1934 and through the winding of relay 1932, causing relay 1932 to operate. The operation of relay 1932 actuates the alarm bell 1930 and lights lamp 1931, thus drawing the attendant's attention to the improper condition. In addition, relay 1932 in operating disconnects conductor 2629 from jack 1940 and substitutes a terminating resistance 1950 thus interrupting the transmission path to the radio transmitter and preventing the transmission of any signals. In this manner the security is protected, even in case the noise generator fails, since no signals can be transmitted under this trouble condition.

Alarm equipment is also provided to attract the attendant's attention in case the system at the receiving station gets out of synchronism as described above.

In addition, numerous monitoring jacks, such as jacks 2430, 2230, 1941, 1942, 1943, as well as similar and other jacks, such as 4230 and 4130 at the receiving station are provided to permit the connection of test and monitoring equipment, such as voltmeters and oscilloscopes to the various circuits to determine their operating condition. In addition, means have been provided for reducing the heater voltage applied to the various tubes to permit testing these tubes and then replacing them before they completely fail.

Tubes 1940, 1951 and 1952 provide a source of 1000-cycle test voltage which may be synchronized at one-eighth the frequency of the 8-stage ring. This is used as a signal source for testing the coding and decoding operations.

What is claimed is:

1. In a multichannel communication system in which the intelligence waves are transmitted by pulse code modulation, means for producing a plurality of series of pulses interleaved in their time of occurrence and the pulses of each series being modulated in duration in proportion to successive samples of the intelligence wave of a corresponding channel, a source of oscillations of constant frequency, a gate controlled by the duration modulated pulses for transmitting oscillations from said source for the duration of each of said pulses, a binary counter having a plurality of tandem connected stages each of two conditions of stability, means for supplying to said counter the oscillations transmitted by said gate, a storage circuit for each stage of said binary counter except the first, a switching circuit connecting each of said storage circuits to the corresponding stage of the binary counter to supply to the storage circuit an electrical quantity under control of the condition of stability of the respective counter stage, a timing circuit for producing a sequence of pulses corresponding to the pulse intervals of each pulse code group, a pulse circuit under control of the first stage of said counter, connections for supplying the first pulse of each of said sequences to said pulse circuit to render it operative for transmitting a pulse when the first stage of said counter is in a predetermined one of said conditions of stability, other connections for supplying said first pulse of each of sequences to said switching circuits for registering on said storage circuit the condition of stability of the respective counter stage, a pulse circuit under control of each of said storage circuits, and connections for supplying to the last-mentioned pulse circuits in succession corresponding subsequent pulses of each of said sequences to render the pulse circuits operative for transmitting a pulse under control of the condition of the corresponding storage circuit.

2. In a multichannel communication system in which the intelligence waves are transmitted by pulse code modulation, means for producing pulses modulated in length in proportion to the amplitude of successive samples of each of the intelligence waves, a source of oscillations of constant frequency, a gate controlled by said length modulated pulses for transmitting oscillations from said source for the duration of each of said pulses modulated in length, a binary counter having a plurality of tandem connected stages each of two conditions of stability, means for supplying to said counter the oscillations transmitted by said gate, a plurality of storage circuits normally inoperative, means each adapted when operative to impress on a respective one of said storage circuits an electric quantity indicative of the condition of stability of the corresponding stage of said counter, means for rendering momentarily operative said lastmentioned means for a short interval subsequent to the termination of each length modulated pulse, and means for transmitting a series of code modulated pulses under control of the condition of said storage circuits while said counter is being operated by the oscillations being transmitted by said gate under control of a subsequent modulated pulse.

3. In a system in which waves are transmitted by pulse code modulation by producing pulses modulated in length in proportion to the amplitude of successive samples of the wave to be transmitted and a binary code group of pulses representing each sample amplitude is determined by counting in a binary counter the number of half cycles of a standard frequency wave occurring during each length modulated pulse, means for regulating the average length of the length modulated pulses comprising means for comparing the number of amplitude samples with the number of counts of the counter stage registering the highest denominational order of the binary code, means for producing a voltage representative of said comparison and means for regulating the average length of said length modulated pulses in accordance with said voltage.

4. In a system in accordance with claim 3, a storage capacitor for producing said voltage representative of said comparison, an electronic gating device controlled by said counter stage registering the highest denominational order of the binary code and operating to supply charges of one polarity to said storage capacitor and another electronic gating device operating at a rate proportional to the sampling rate to supply charges of the opposite polarity to said storage capacitor.

5. In a system in accordance with claim 3, a storage capacitor for producing said voltage representative of said comparison, a charging capacitor, an electronic gating device controlled by said counter stage registering the highest denominational order of the binary code and operating to charge said storage capacitor from said charging capacitor, a discharging capacitor and a second electronic gating device operating at a rate proportional to the sampling rate to discharge said storage capacitor to said discharge capacitor.

6. In a system for producing permutation code groups of pulses representative of length modulated pulses, a source of oscillations of constant frequency, a gate controlled by said length modulated pulses for transmitting said oscillations for the duration of each of said pulses, a binary counter having a plurality of tandem connected stages each of two conditions of stability, means for supplying to said counter the oscillations transmitted by said gate, means responsive to the operation of all the stages of said counter except the first to one of said two conditions of stability for preventing a supply of oscillations to the first stage for actuating it to the other of said two conditions of stability.

7. In a signaling system for transmitting complex signaling waves, apparatus for sampling said signaling waves at recurring instants of time, a binary counter comprising a plurality of stages, means for controlling the number counted by said counter in accordance with the magnitude of each of the samples of the complex wave, apparatus controlled by one of the stages of said counter for transmitting a pulse, other equipment operating to store the condition of the other stages of said counter, means for transmitting the stored information by pulses transmitted in succession, each representing a different denominational order of the number counted by a binary count, and means for controlling the number counted by said couner in accordance with the magnitude of another complex wave sample while said pulses are being transmitted.

8. In a communication system for the transmission of complex waves, apparatus for sampling a complex wave at a recurring instant of time, other equipment for generating permutation code groups of pulses representing each of said samples and means operated in response to the operation of said coding equipment for varying the magnitude of said samples so that the average magnitude of all the samples is in the middle of the coding range of said coding equipment.

9. In a communication system apparatus for sampling complex signaling waves at successive instants of time, a binary counter for controlling the magnitude of each of said samples and apparatus operative incident to the counting of said counter beyond half of its total possible maximum count for reducing the magnitude of said samples to maintain the average magnitude of said samples at a value to cause said counter to operate to half of its maximum count in response to such average magnitude.

10. In a communication system apparatus for sampling complex signaling waves at successive instants of time, a binary counter for controlling the magnitude of each of said samples and apparatus operative incident to the counting of said counter less than half of the total possible count for increasing the magnitude of said samples to maintain the average magnitude of said samples at a value to cause said counter to operate to half of its maximum count in response to such average magnitude.

* * * * *